Dec. 18, 1962   G. A. BAIRD ETAL   3,069,078
ACCOUNTING MACHINE WITH RECORDING APPARATUS
Filed Aug. 15, 1956   54 Sheets-Sheet 1

INVENTORS
GEORGE A. BAIRD
THOMAS A. DOWDS
BY
AGENT

Dec. 18, 1962        G. A. BAIRD ETAL        3,069,078
ACCOUNTING MACHINE WITH RECORDING APPARATUS
Filed Aug. 15, 1956                                54 Sheets-Sheet 2

INVENTORS
GEORGE A. BAIRD
THOMAS A. DOWDS

BY

AGENT

INVENTORS
GEORGE A. BAIRD
THOMAS A. DOWDS
BY
AGENT

INVENTORS
GEORGE A. BAIRD
THOMAS A. DOWDS

AGENT

Dec. 18, 1962   G. A. BAIRD ETAL   3,069,078
ACCOUNTING MACHINE WITH RECORDING APPARATUS
Filed Aug. 15, 1956   54 Sheets-Sheet 6
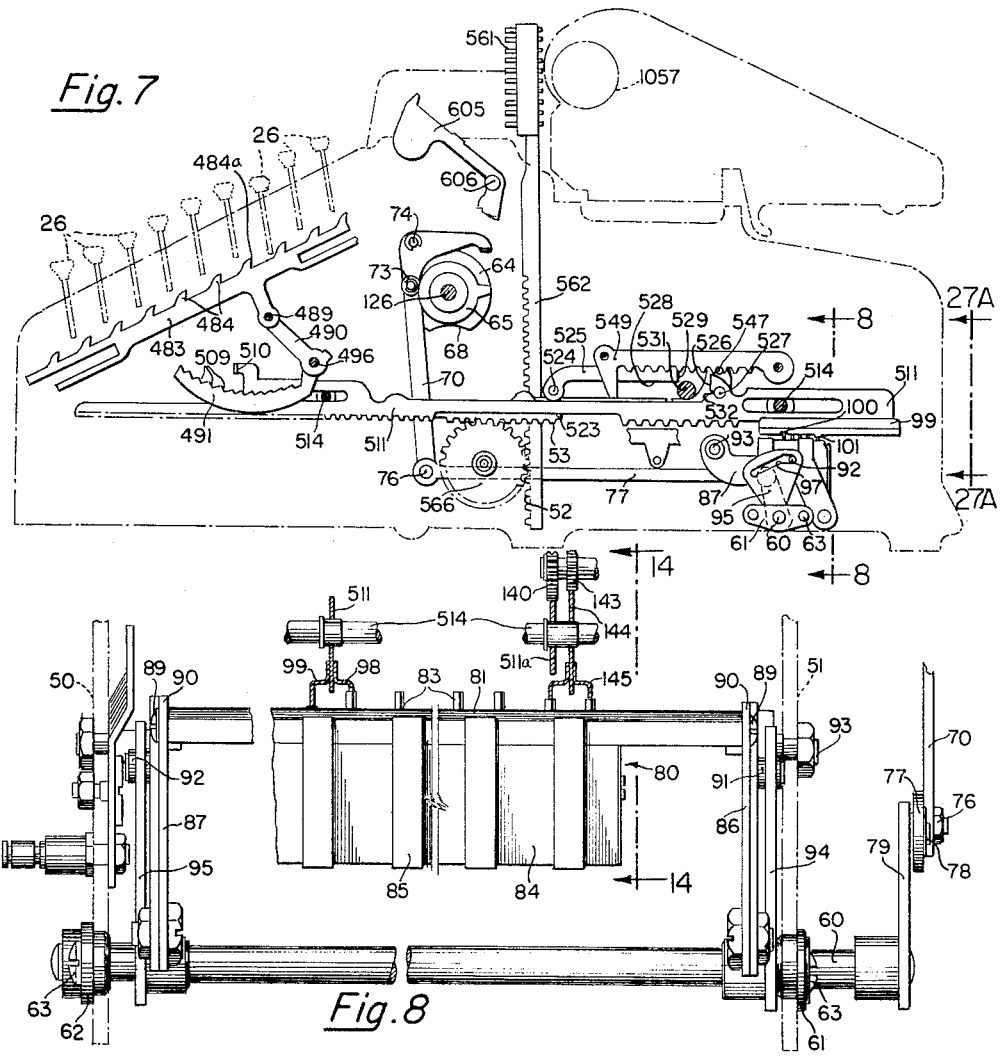
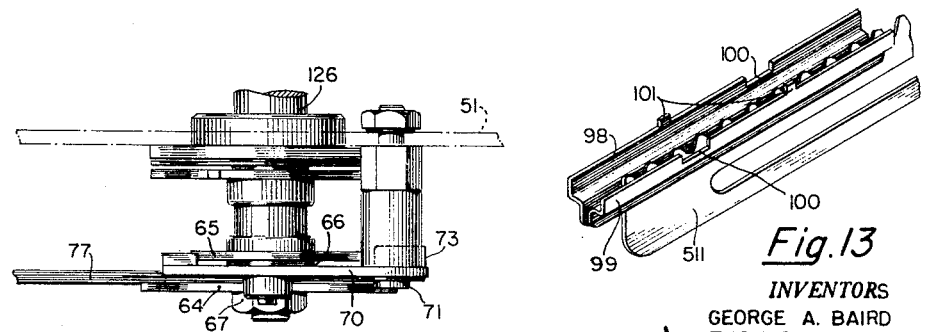
INVENTORS
GEORGE A. BAIRD
THOMAS A. DOWDS
BY
AGENT Dec. 18, 1962   G. A. BAIRD ETAL   3,069,078
ACCOUNTING MACHINE WITH RECORDING APPARATUS
Filed Aug. 15, 1956   54 Sheets-Sheet 7

INVENTORS
GEORGE A. BAIRD
THOMAS A. DOWDS
BY
AGENT

Dec. 18, 1962 G. A. BAIRD ETAL 3,069,078
ACCOUNTING MACHINE WITH RECORDING APPARATUS
Filed Aug. 15, 1956 54 Sheets-Sheet 8

INVENTORS
GEORGE A. BAIRD
THOMAS A. DOWDS
BY
AGENT

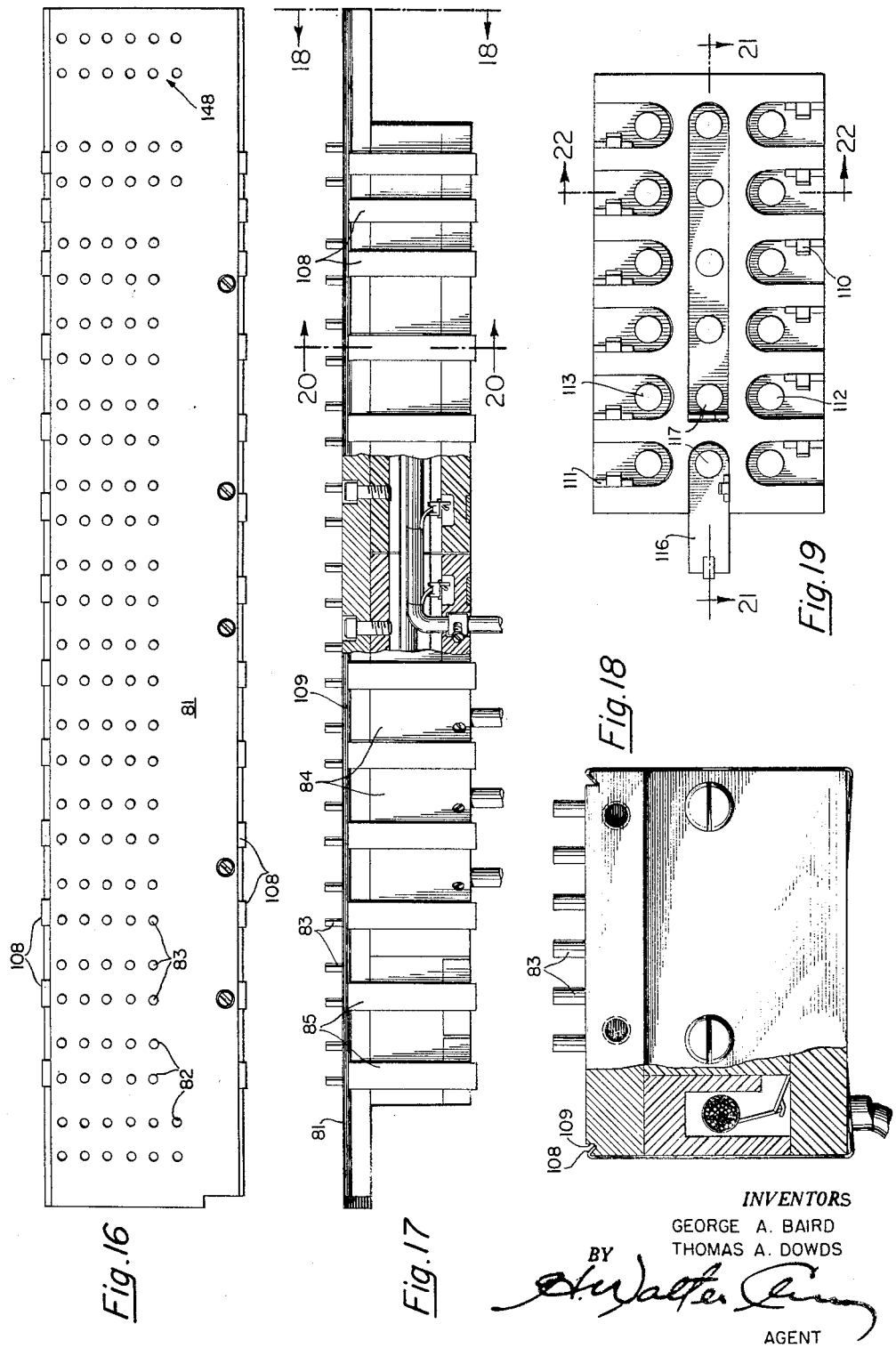

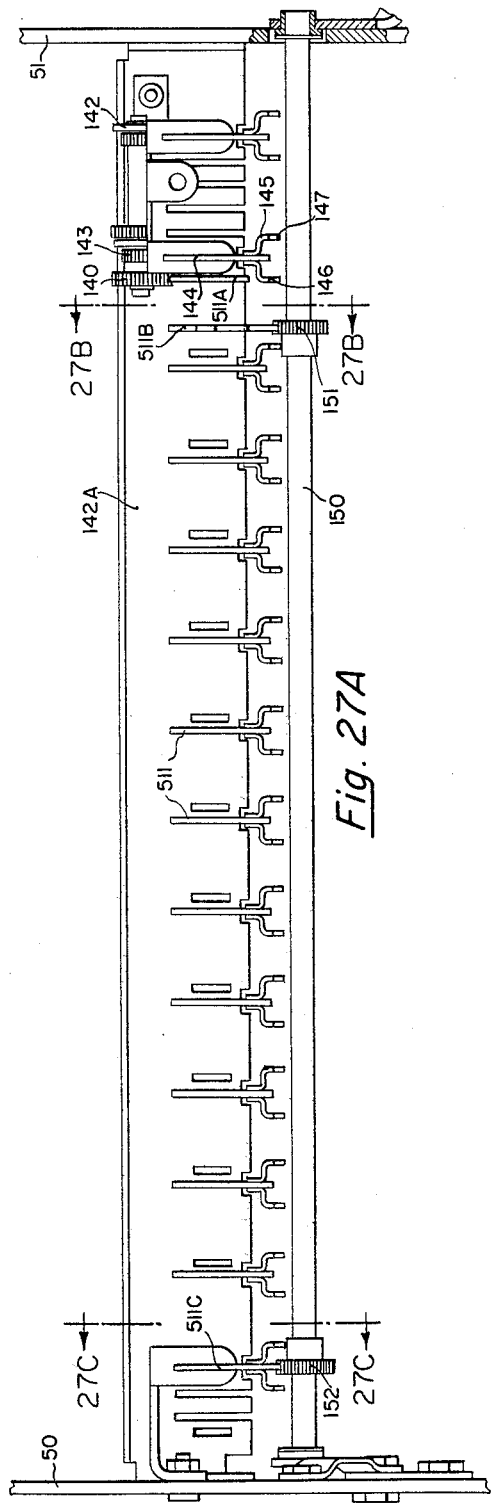
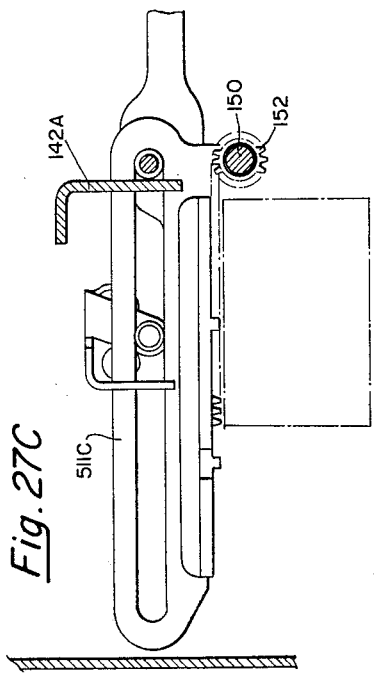
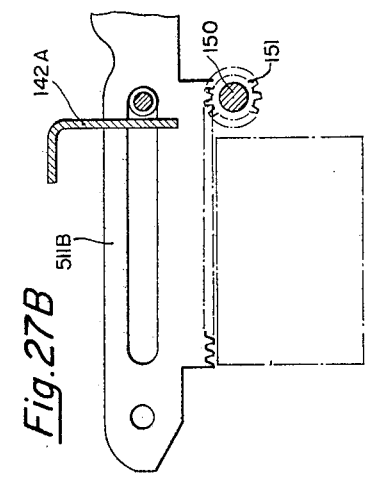

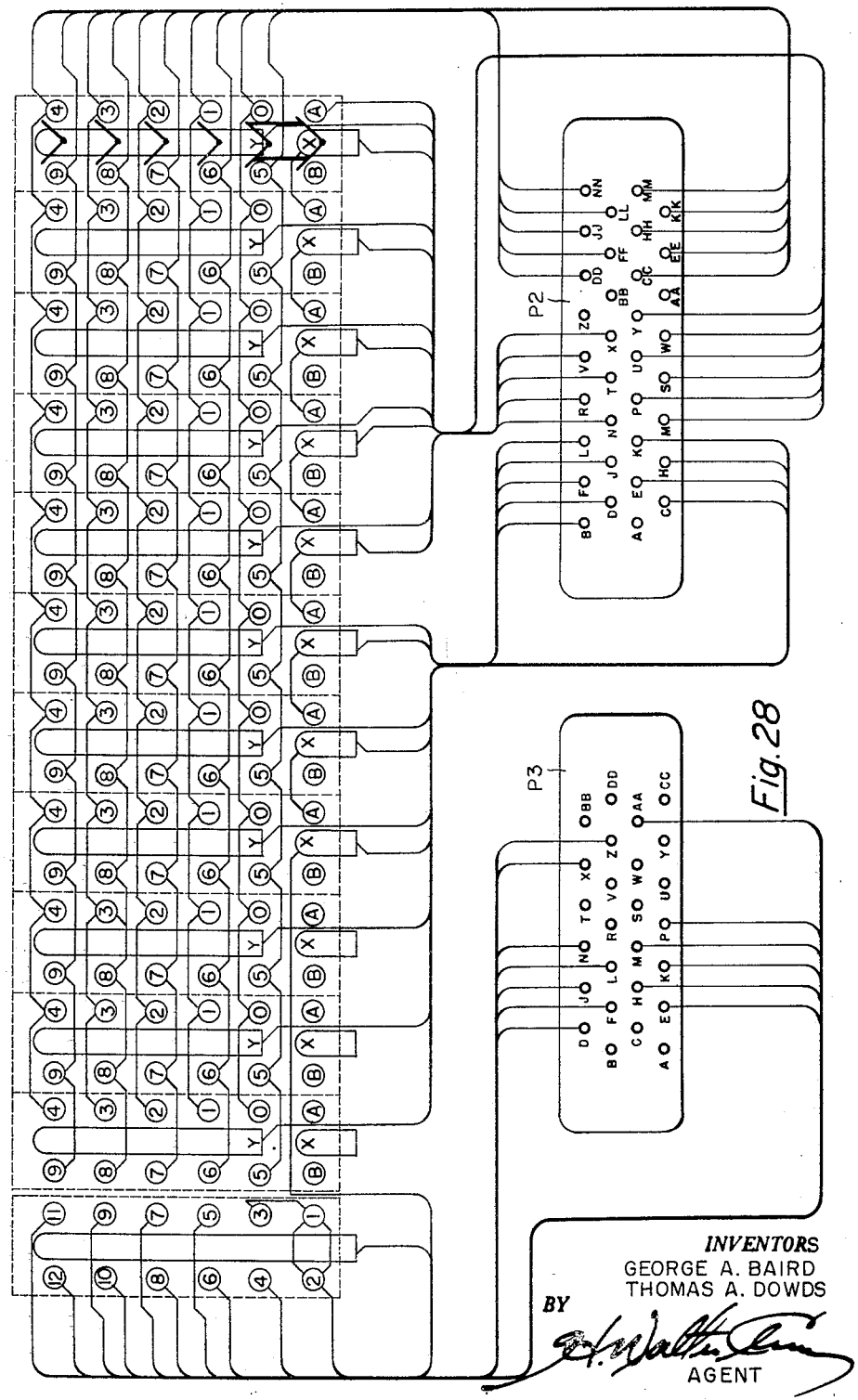

INVENTORS
GEORGE A. BAIRD
THOMAS A. DOWDS

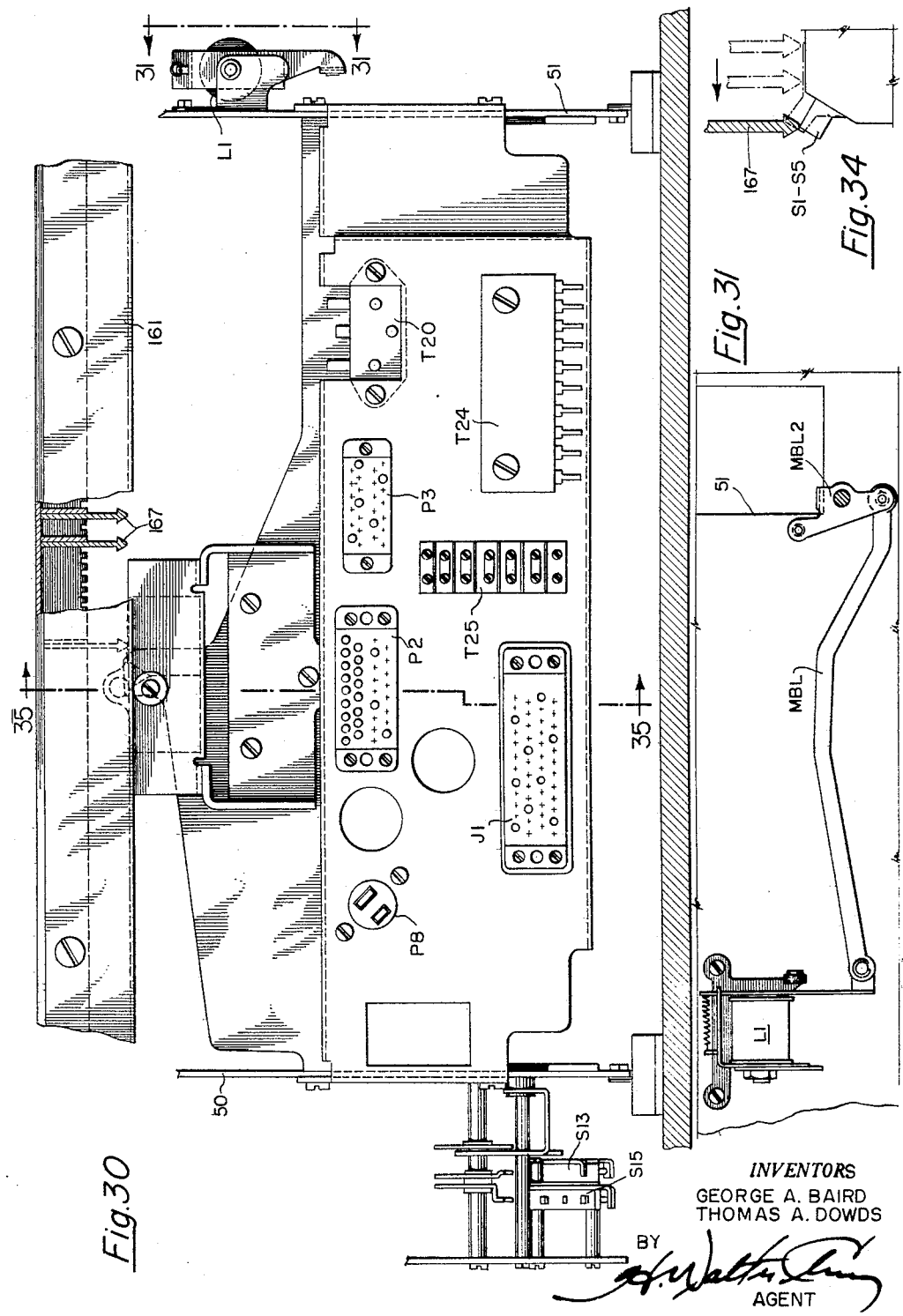

Dec. 18, 1962    G. A. BAIRD ETAL    3,069,078
ACCOUNTING MACHINE WITH RECORDING APPARATUS
Filed Aug. 15, 1956    54 Sheets-Sheet 15

INVENTORS
GEORGE A. BAIRD
THOMAS A. DOWDS
BY
AGENT

Dec. 18, 1962 G. A. BAIRD ETAL 3,069,078
ACCOUNTING MACHINE WITH RECORDING APPARATUS
Filed Aug. 15, 1956 54 Sheets-Sheet 16

INVENTORS
GEORGE A. BAIRD
BY THOMAS A. DOWDS

AGENT

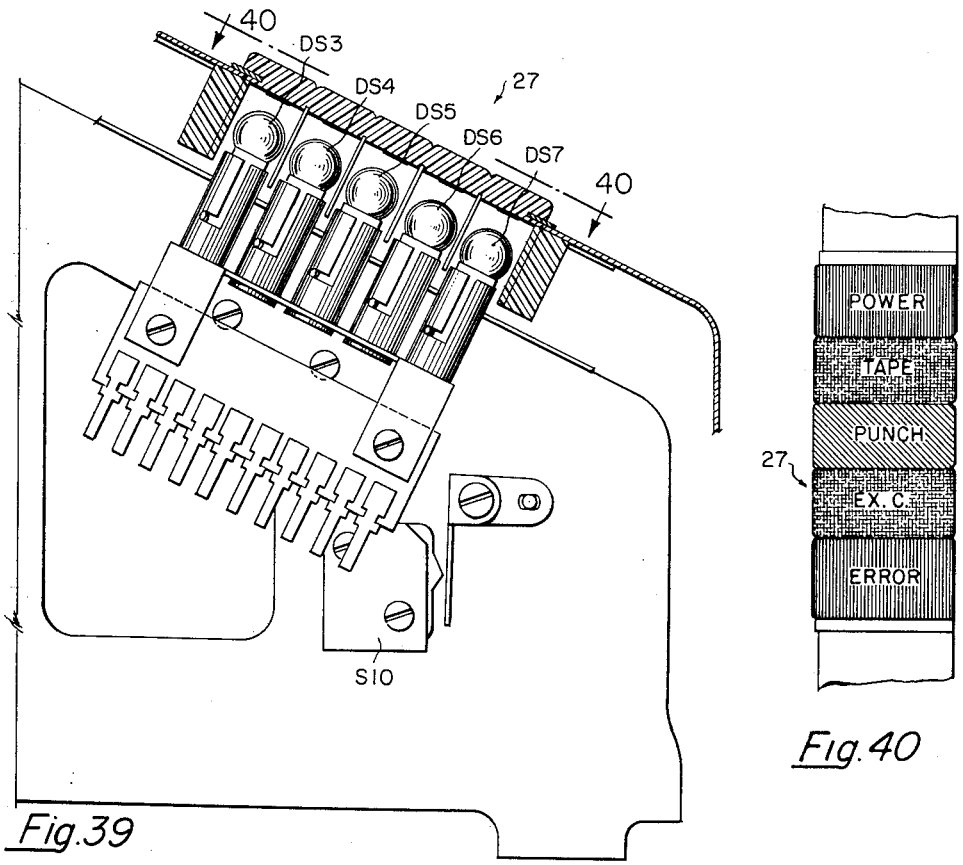
Fig. 39
Fig. 40
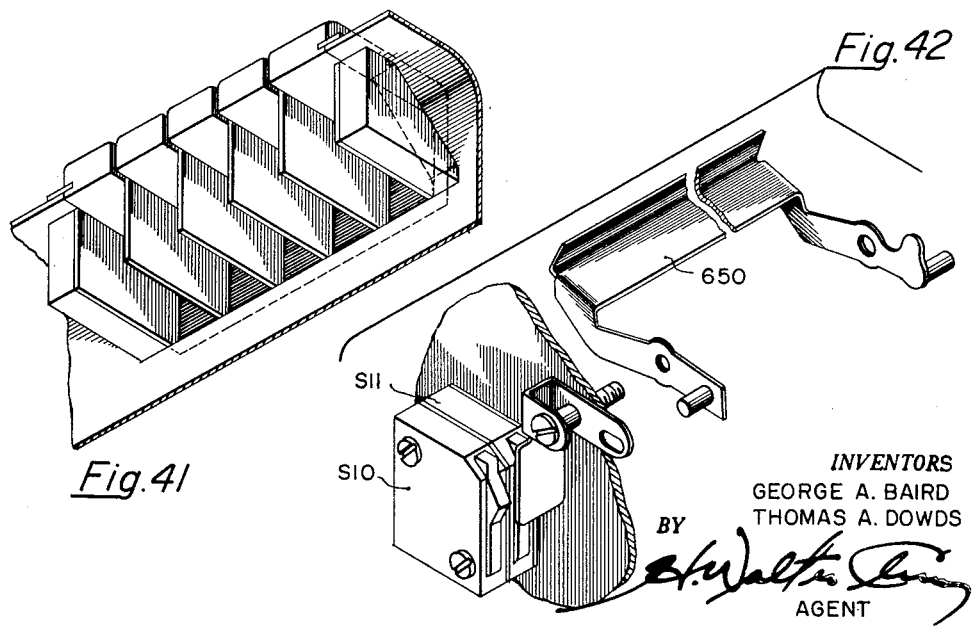
Fig. 41
Fig. 42
INVENTORS
GEORGE A. BAIRD
THOMAS A. DOWDS
BY
AGENT Dec. 18, 1962   G. A. BAIRD ETAL   3,069,078
ACCOUNTING MACHINE WITH RECORDING APPARATUS
Filed Aug. 15, 1956   54 Sheets-Sheet 18

INVENTORS
GEORGE A. BAIRD
THOMAS A. DOWDS
BY
AGENT

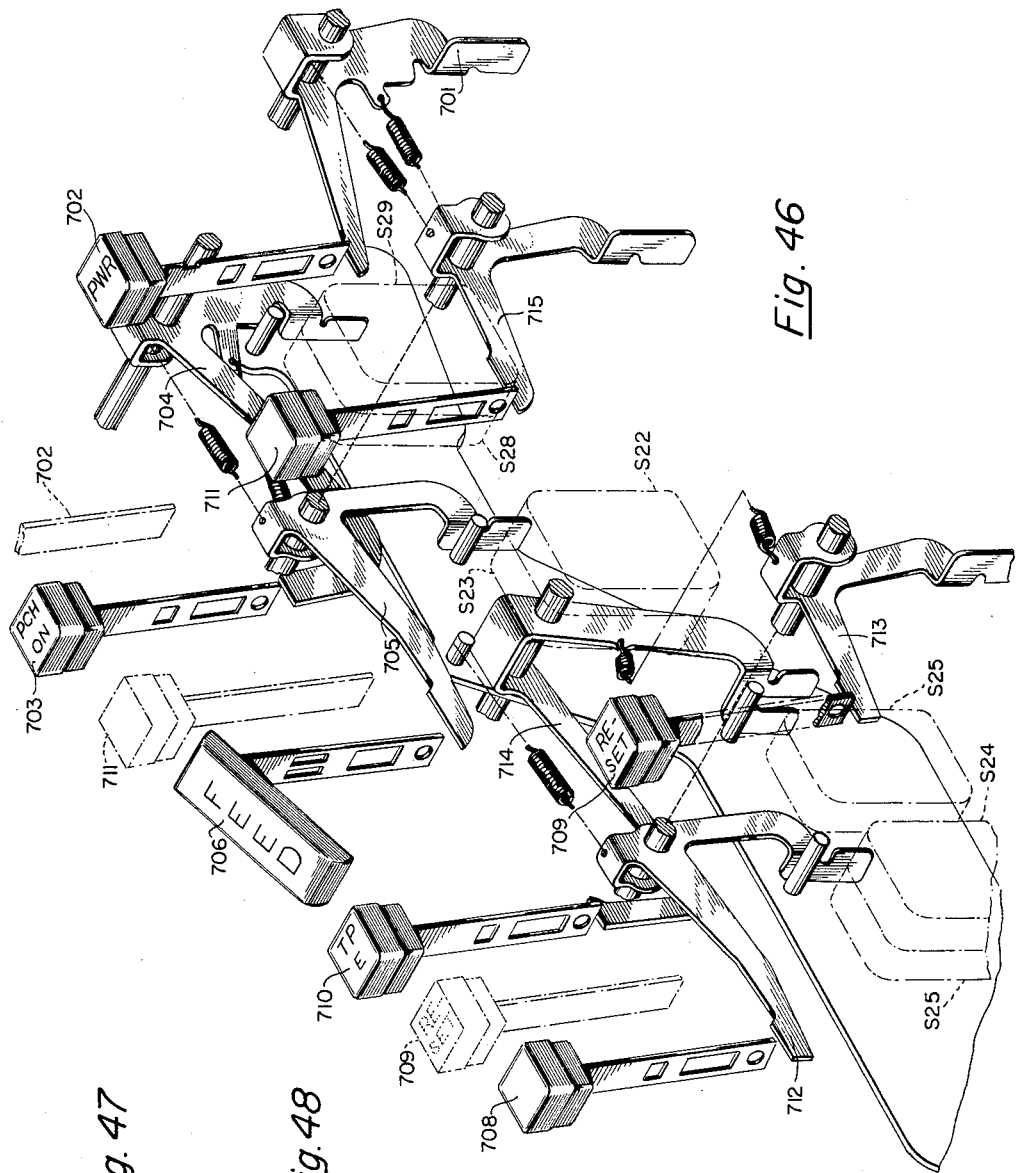

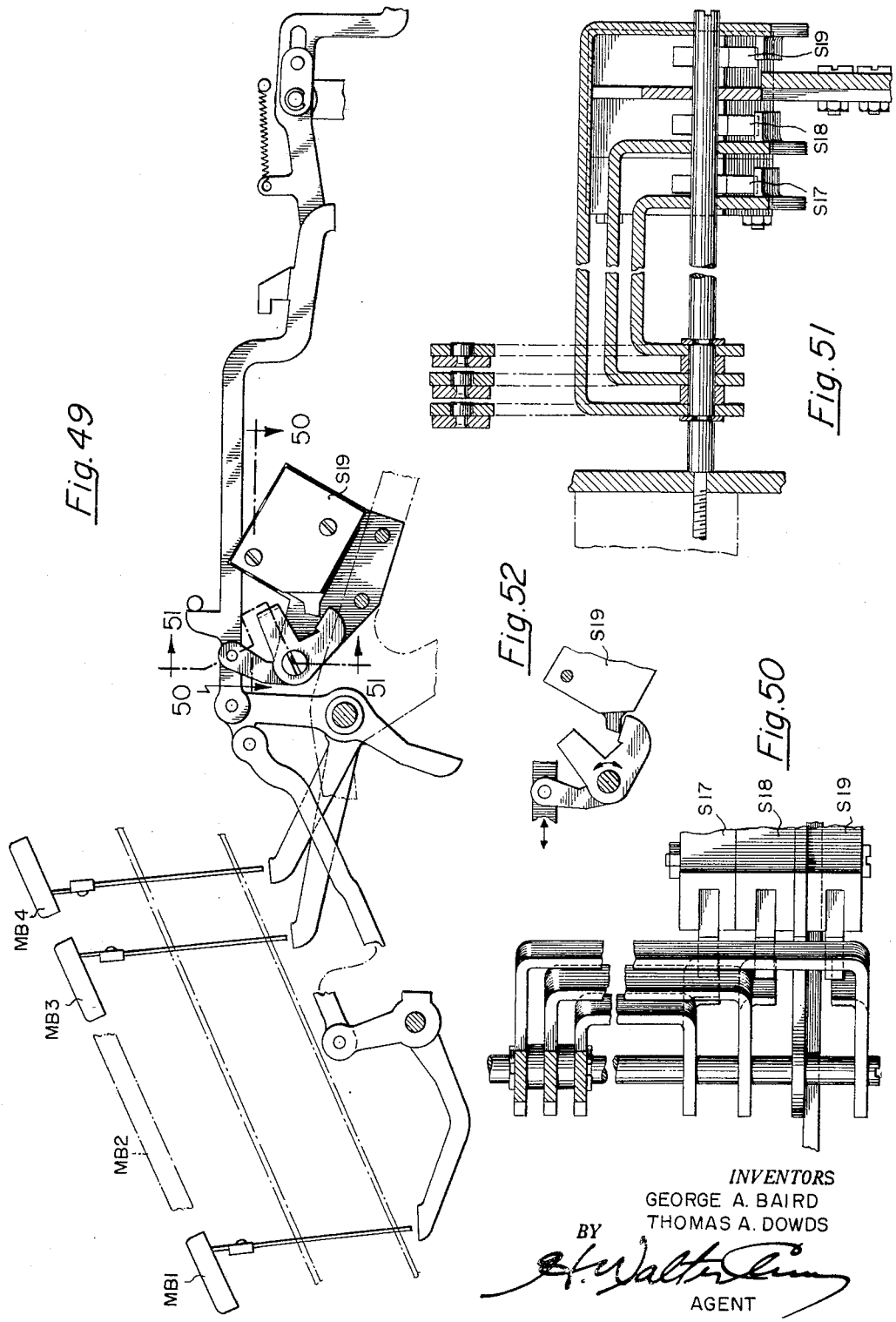

Dec. 18, 1962 G. A. BAIRD ETAL 3,069,078
ACCOUNTING MACHINE WITH RECORDING APPARATUS
Filed Aug. 15, 1956 54 Sheets-Sheet 21
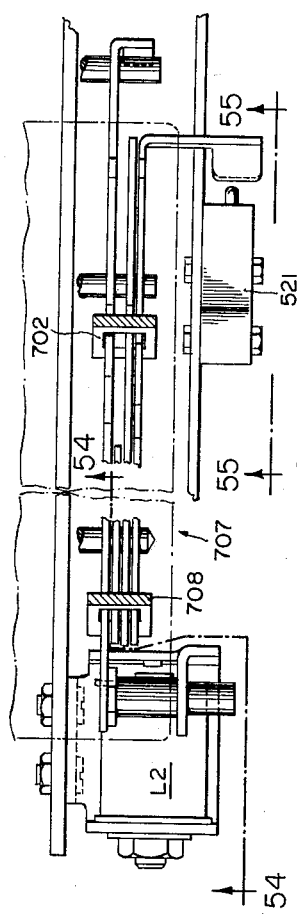
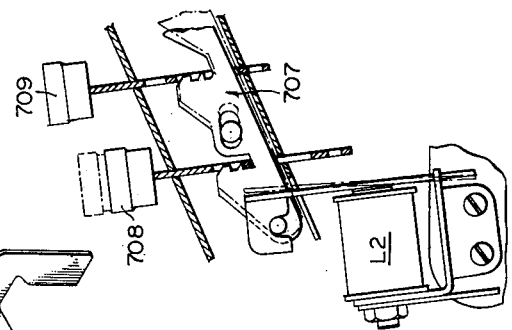
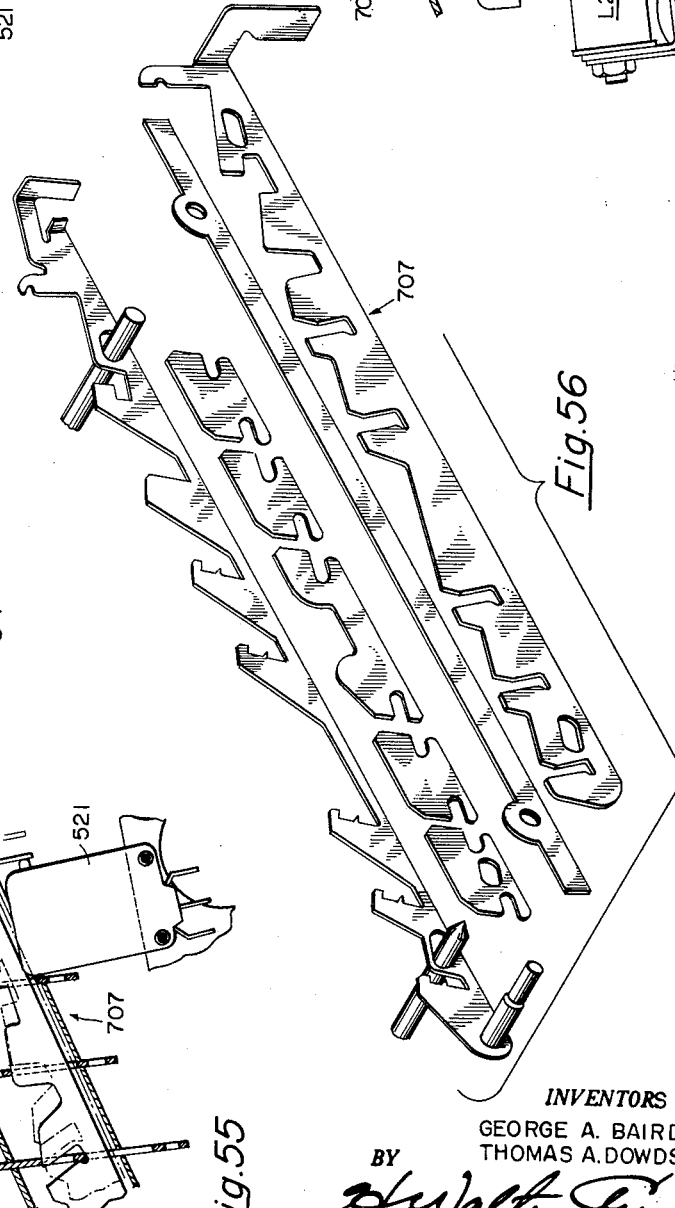
INVENTORS
GEORGE A. BAIRD
THOMAS A. DOWDS
BY
AGENT

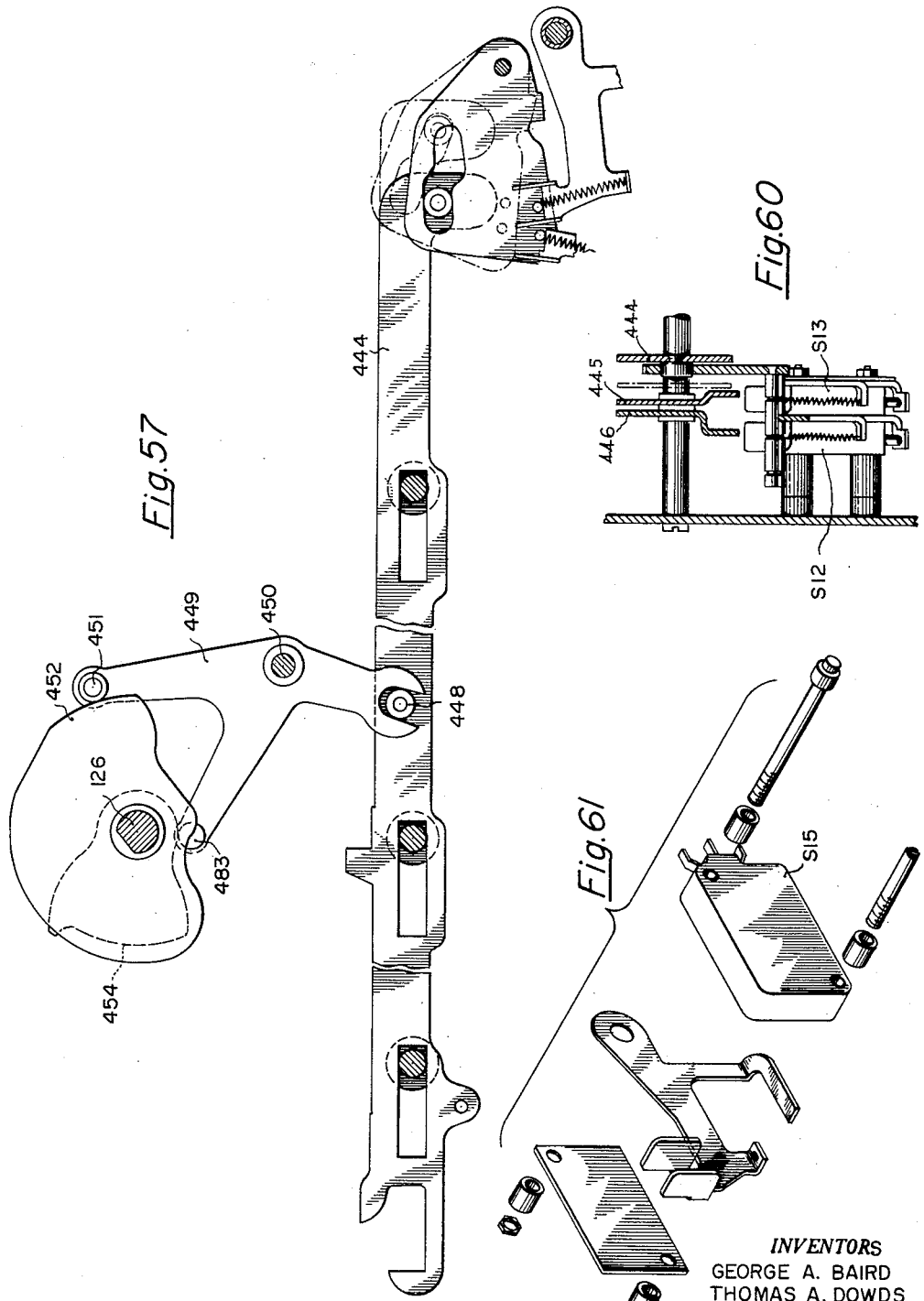

Dec. 18, 1962  G. A. BAIRD ETAL  3,069,078
ACCOUNTING MACHINE WITH RECORDING APPARATUS
Filed Aug. 15, 1956  54 Sheets-Sheet 23
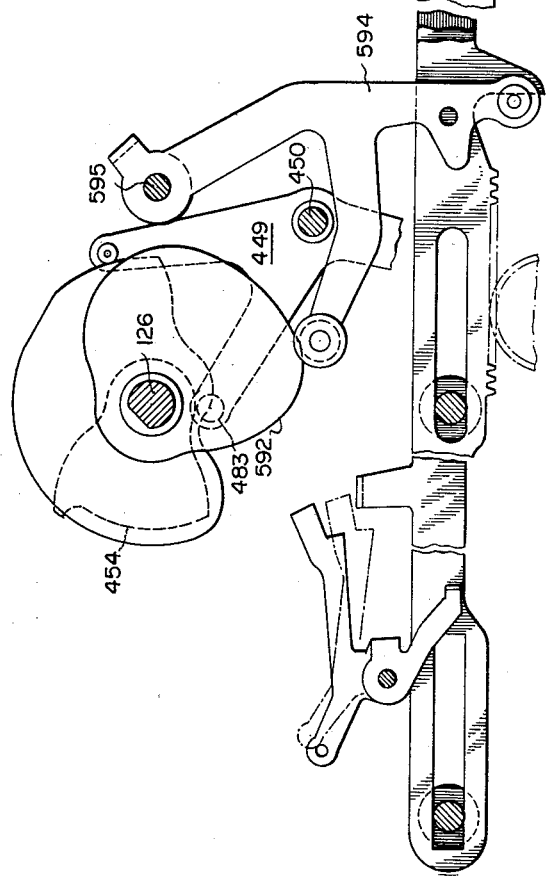
Fig.58
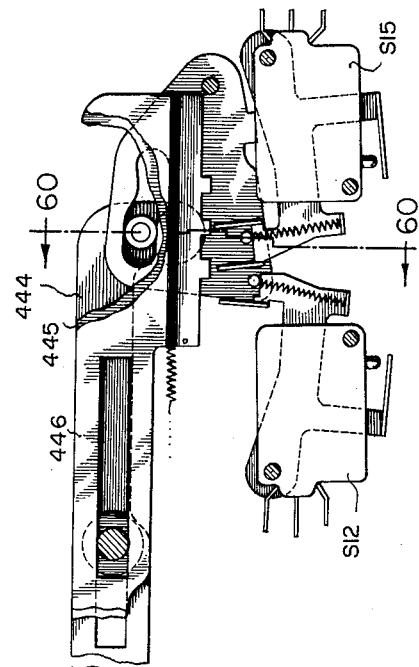
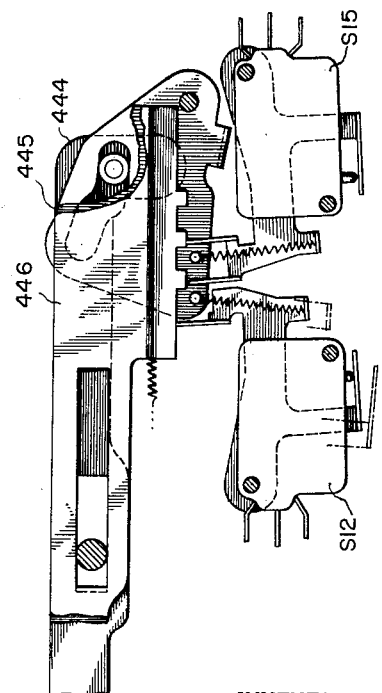
Fig.59
INVENTORS
GEORGE A. BAIRD
THOMAS A. DOWDS
BY
AGENT

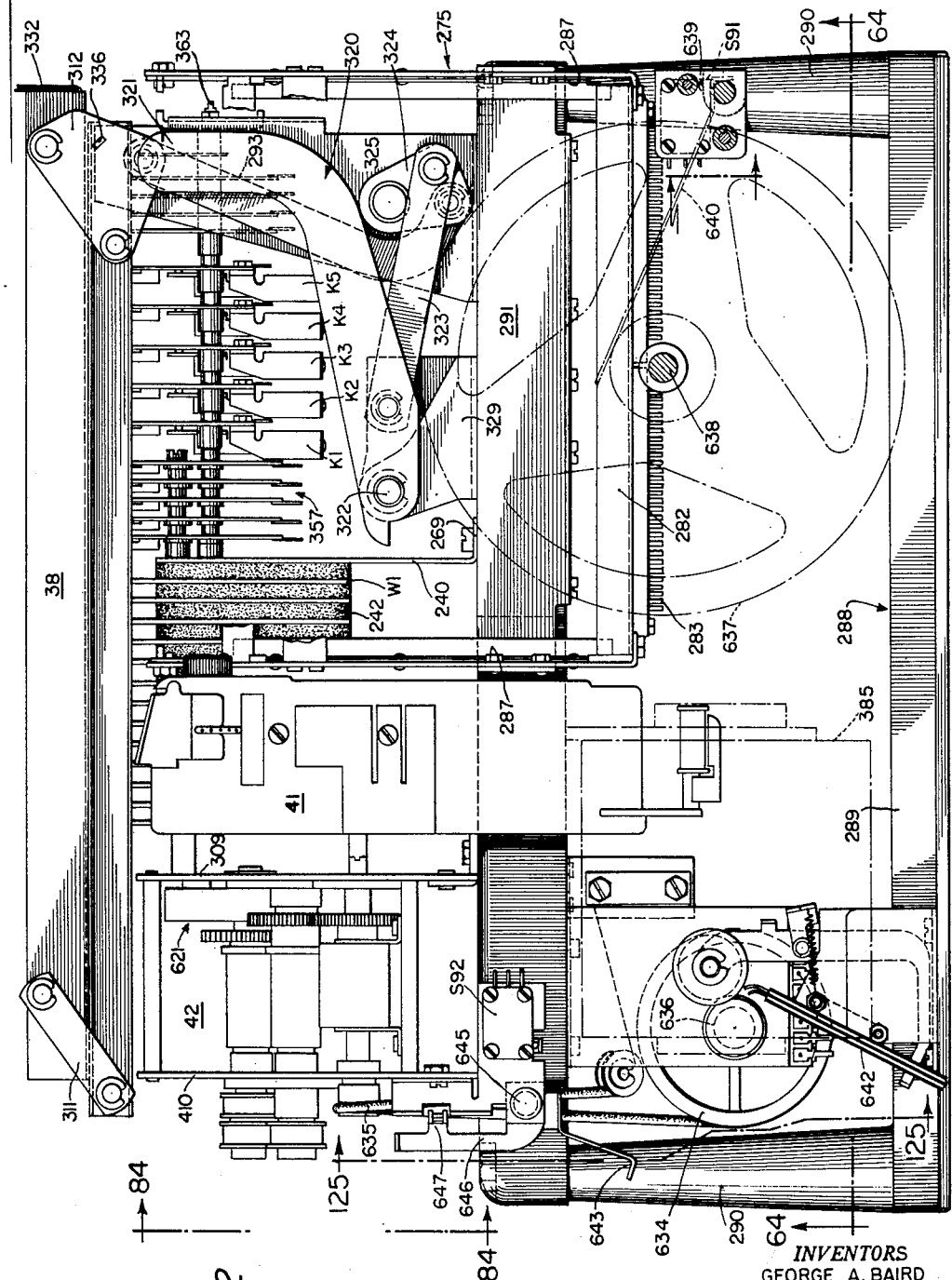

Dec. 18, 1962 G. A. BAIRD ETAL 3,069,078
ACCOUNTING MACHINE WITH RECORDING APPARATUS
Filed Aug. 15, 1956 54 Sheets-Sheet 25
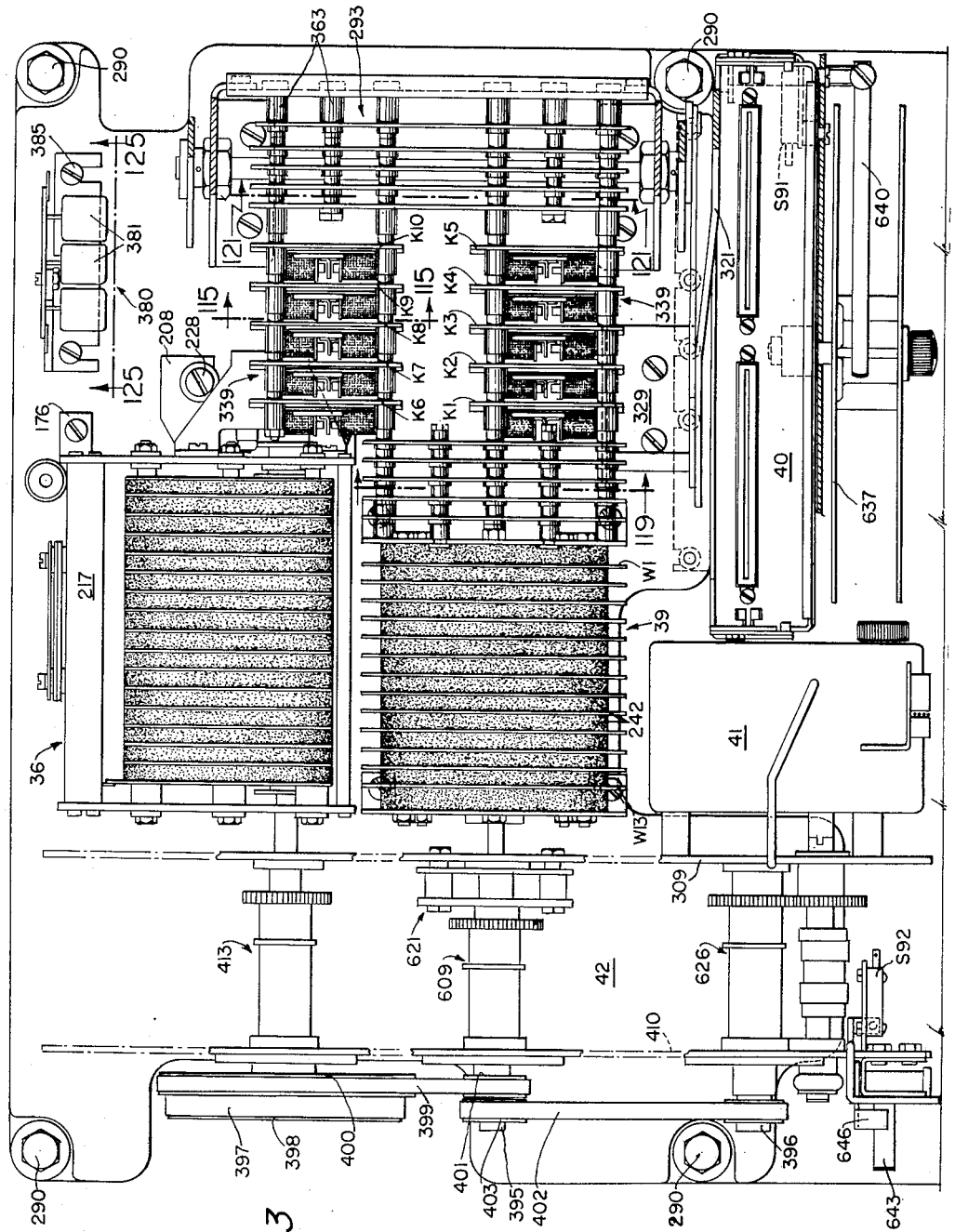
Fig. 63
INVENTORS
GEORGE A. BAIRD
THOMAS A. DOWDS
BY
AGENT

INVENTORS
GEORGE A. BAIRD
THOMAS A. DOWDS
BY
AGENT

Dec. 18, 1962   G. A. BAIRD ETAL   3,069,078
ACCOUNTING MACHINE WITH RECORDING APPARATUS
Filed Aug. 15, 1956   54 Sheets-Sheet 27
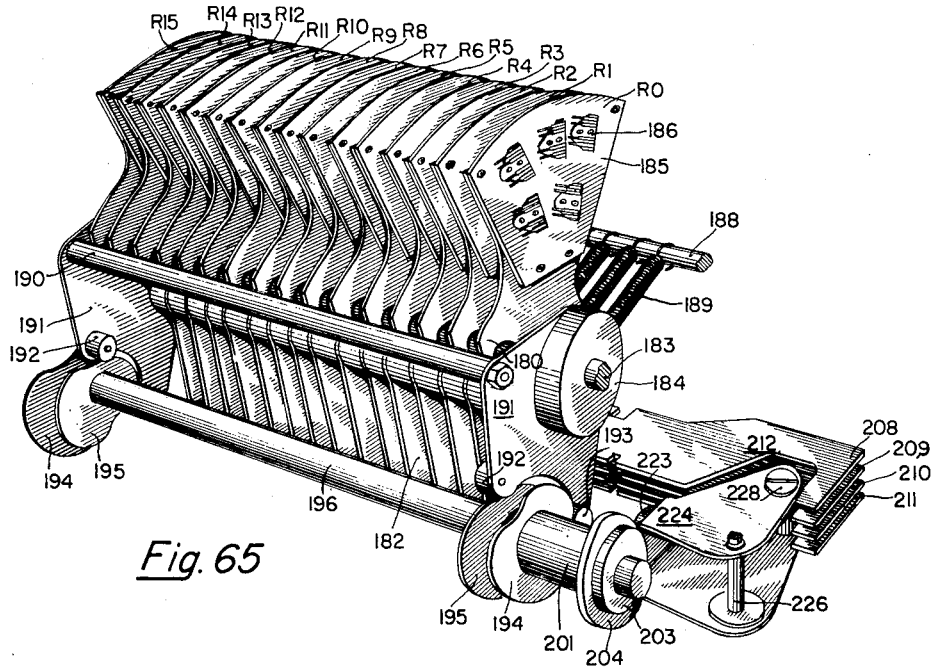
Fig. 65
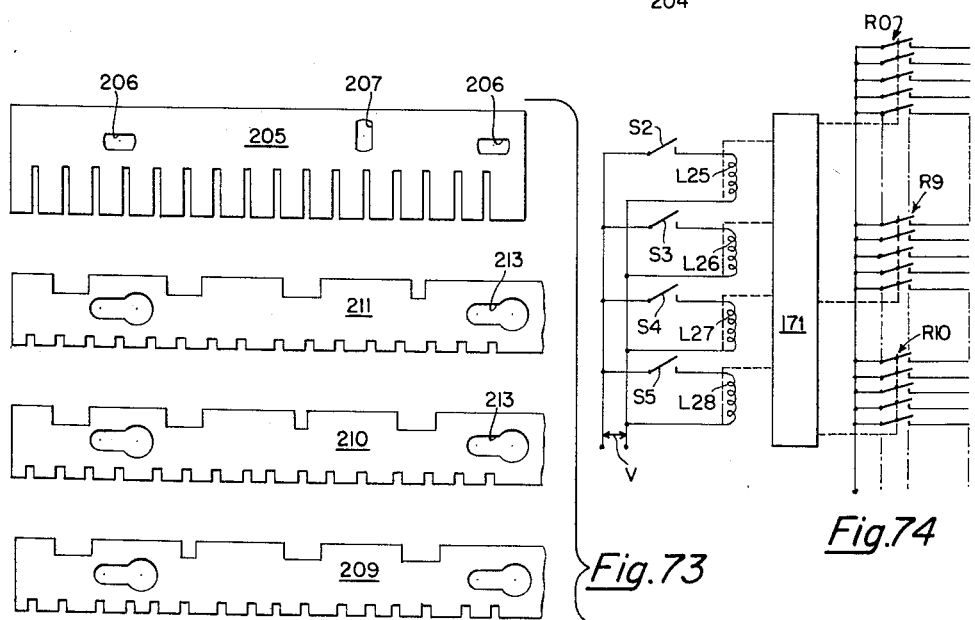
Fig. 73
Fig. 74
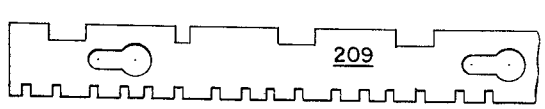
PO TO P15
*INVENTORS*
GEORGE A. BAIRD
THOMAS A. DOWDS
BY
AGENT Dec. 18, 1962 G. A. BAIRD ETAL 3,069,078
ACCOUNTING MACHINE WITH RECORDING APPARATUS
Filed Aug. 15, 1956 54 Sheets-Sheet 28
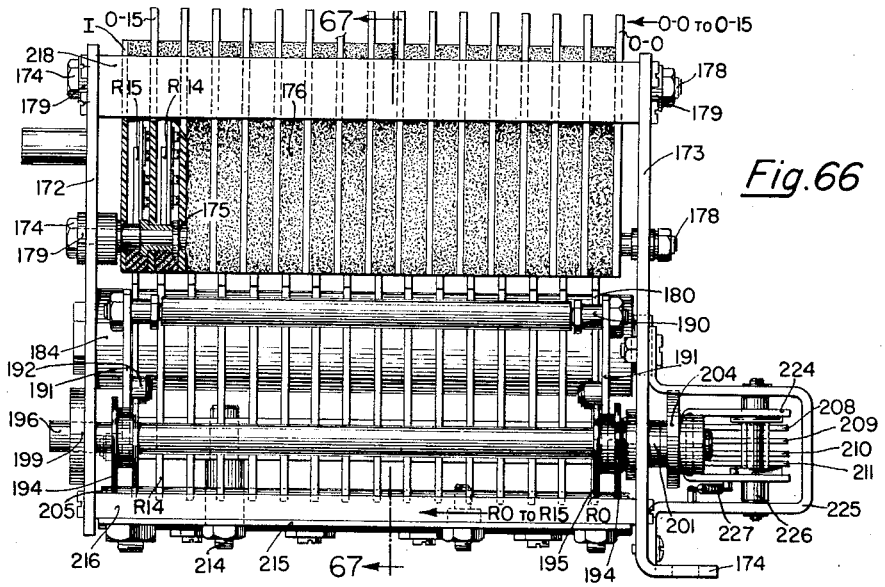
Fig.66
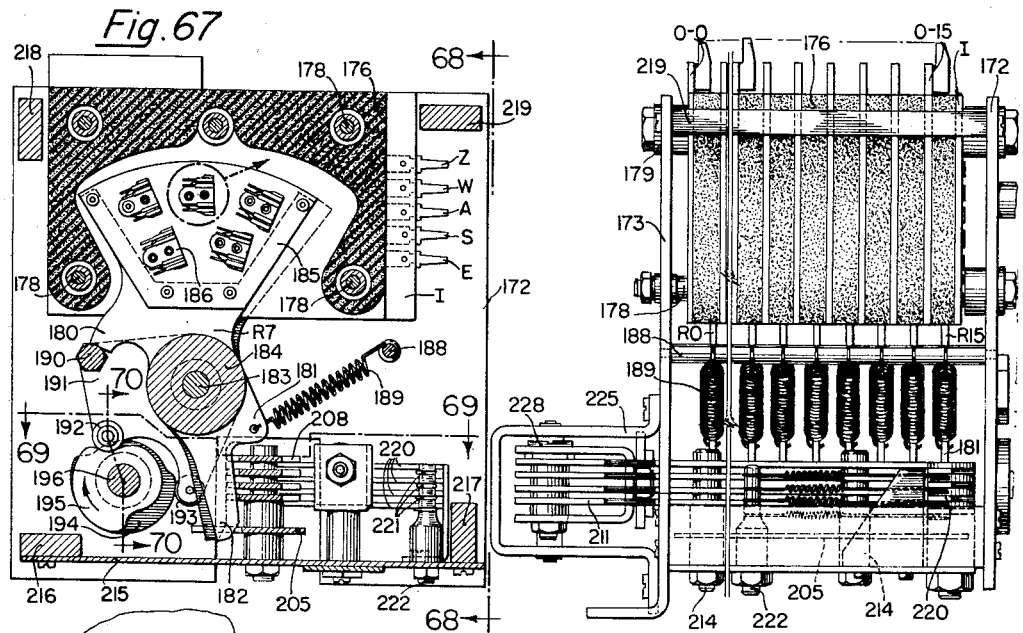
Fig.67
Fig.68
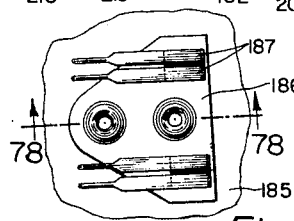
Fig.77
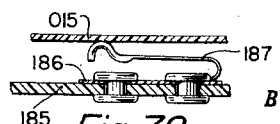
Fig.78
INVENTORS
GEORGE A. BAIRD
THOMAS A. DOWDS
BY
AGENT

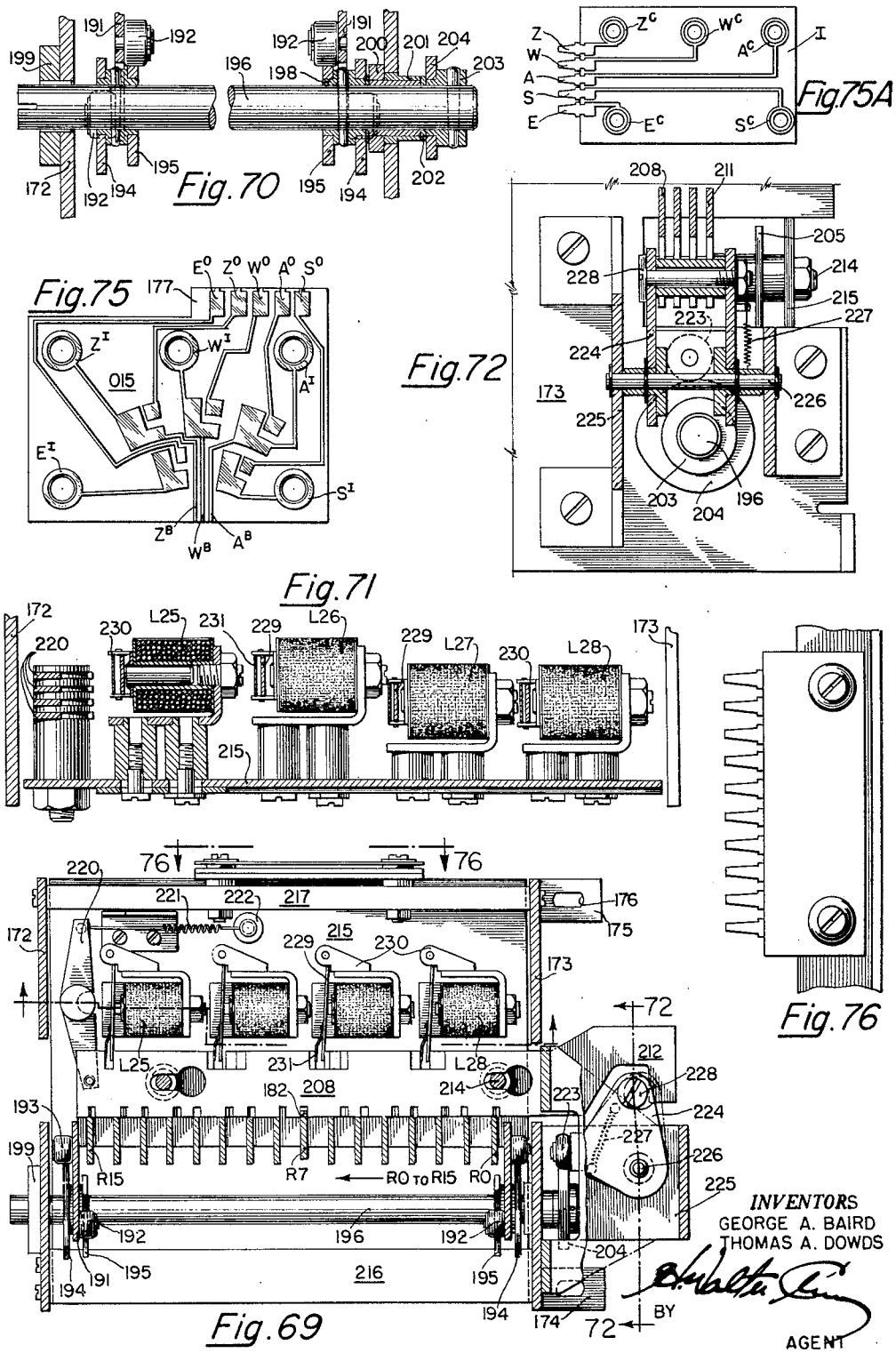

Dec. 18, 1962    G. A. BAIRD ETAL    3,069,078
ACCOUNTING MACHINE WITH RECORDING APPARATUS
Filed Aug. 15, 1956    54 Sheets-Sheet 30

INVENTORS
GEORGE A. BAIRD
THOMAS A. DOWDS
BY
AGENT

Dec. 18, 1962  G. A. BAIRD ETAL  3,069,078
ACCOUNTING MACHINE WITH RECORDING APPARATUS
Filed Aug. 15, 1956  54 Sheets-Sheet 32

INVENTORS
GEORGE A. BAIRD
THOMAS A. DOWDS
BY
AGENT

Dec. 18, 1962 G. A. BAIRD ETAL 3,069,078
ACCOUNTING MACHINE WITH RECORDING APPARATUS
Filed Aug. 15, 1956 54 Sheets-Sheet 33
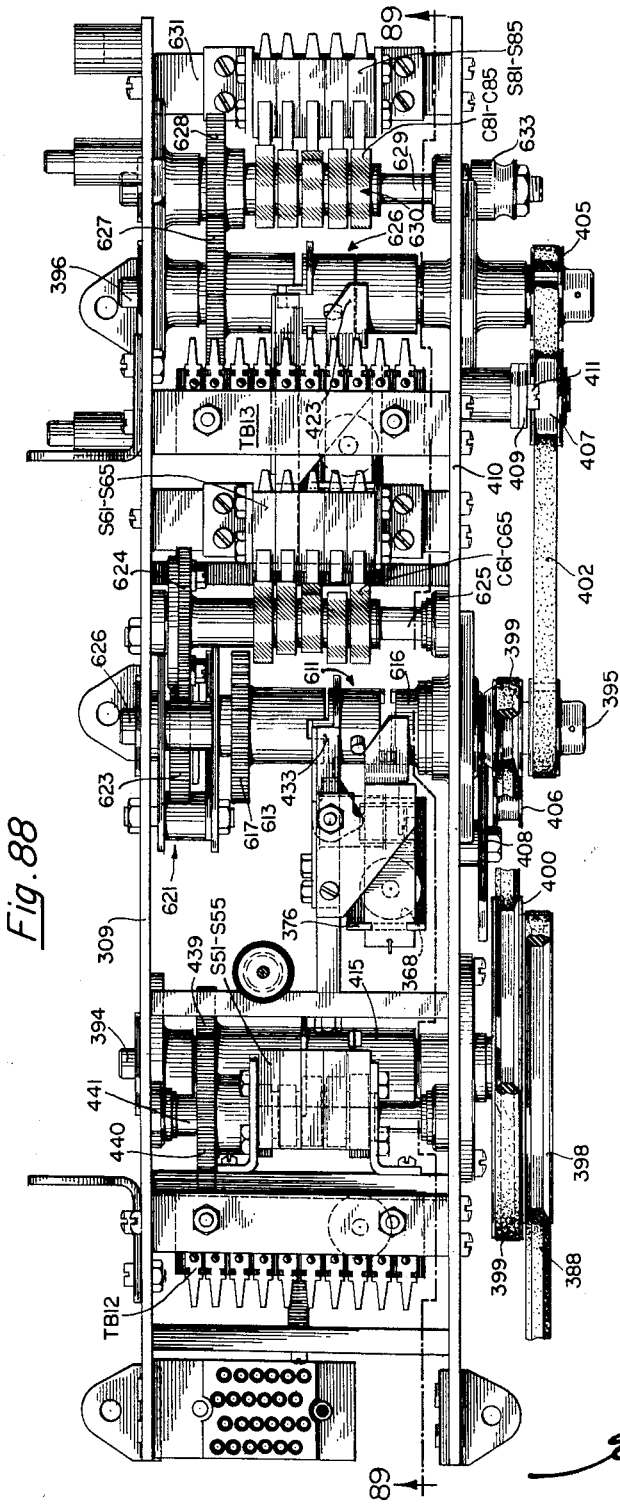
Fig. 88
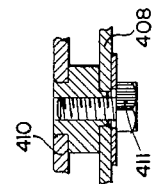
Fig. 87
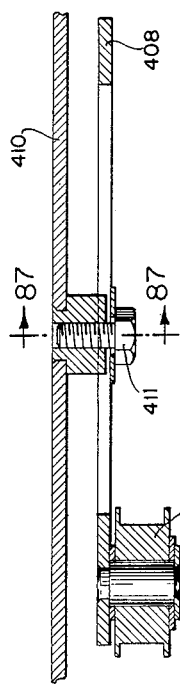
Fig. 86
INVENTORS
GEORGE A. BAIRD
THOMAS A. DOWDS
BY
AGENT Dec. 18, 1962  G. A. BAIRD ET AL  3,069,078
ACCOUNTING MACHINE WITH RECORDING APPARATUS
Filed Aug. 15, 1956  54 Sheets-Sheet 34
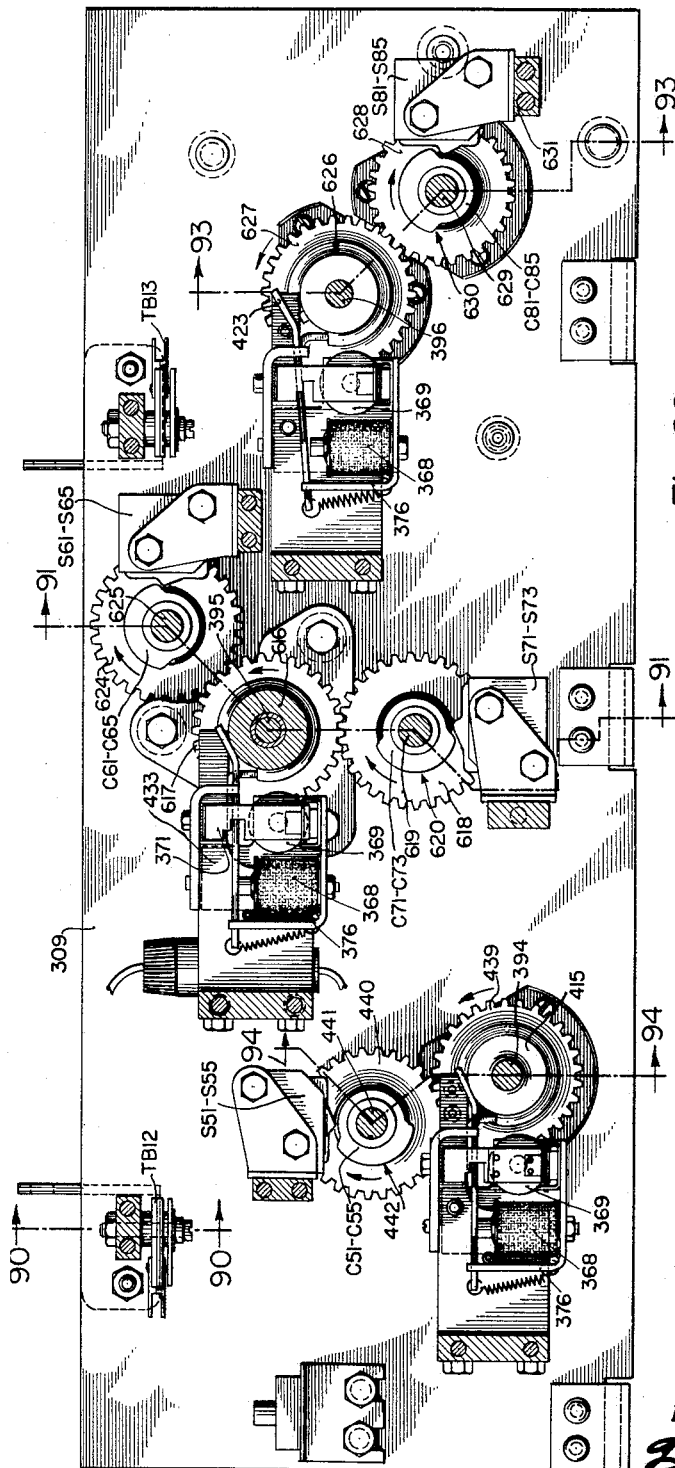
Fig.89
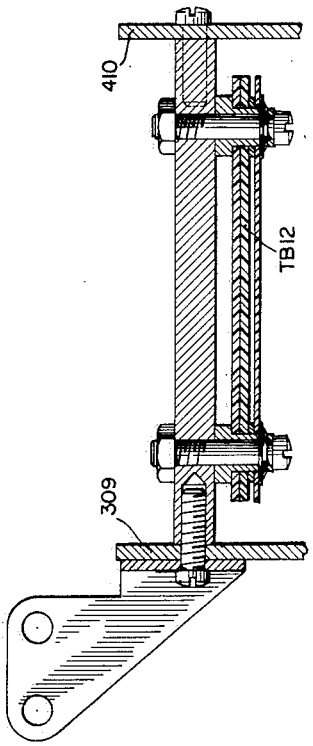
Fig.90
INVENTORS
GEORGE A. BAIRD
THOMAS A. DOWDS
BY
_AGENT Dec. 18, 1962 G. A. BAIRD ETAL 3,069,078
ACCOUNTING MACHINE WITH RECORDING APPARATUS
Filed Aug. 15, 1956 54 Sheets-Sheet 36

INVENTORS
GEORGE A. BAIRD
THOMAS A. DOWDS
BY
AGENT

Dec. 18, 1962   G. A. BAIRD ET AL   3,069,078
ACCOUNTING MACHINE WITH RECORDING APPARATUS
Filed Aug. 15, 1956   54 Sheets-Sheet 38

INVENTORS
GEORGE A. BAIRD
THOMAS A. DOWDS
BY
AGENT

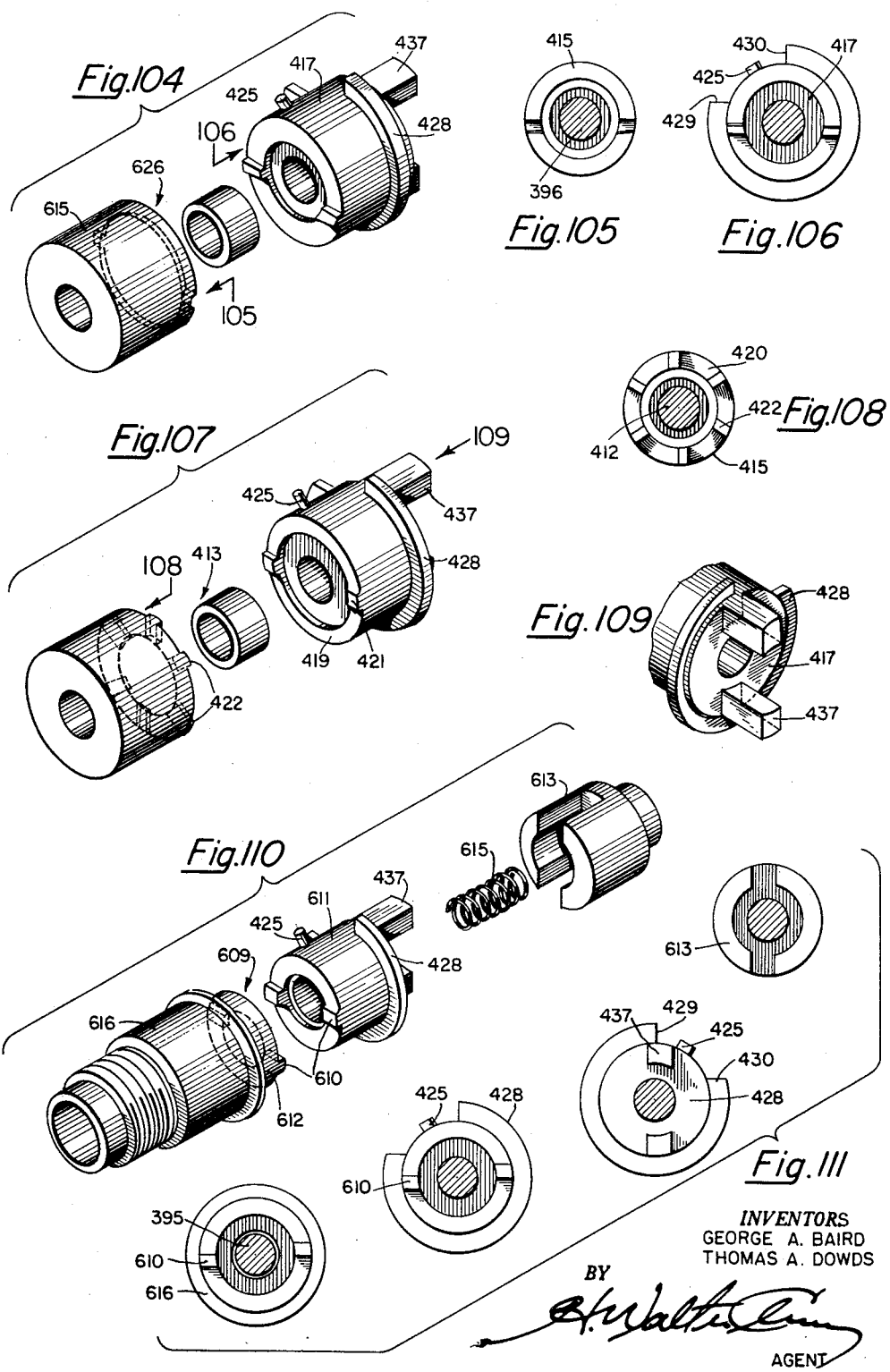

Dec. 18, 1962  G. A. BAIRD ETAL  3,069,078
ACCOUNTING MACHINE WITH RECORDING APPARATUS
Filed Aug. 15, 1956  54 Sheets-Sheet 40

INVENTORS
GEORGE A. BAIRD
BY THOMAS A. DOWDS

AGENT

Dec. 18, 1962 G. A. BAIRD ET AL 3,069,078
ACCOUNTING MACHINE WITH RECORDING APPARATUS
Filed Aug. 15, 1956 54 Sheets-Sheet 41

INVENTORS
GEORGE A. BAIRD
THOMAS A. DOWDS
BY
AGENT

Dec. 18, 1962 G. A. BAIRD ETAL 3,069,078
ACCOUNTING MACHINE WITH RECORDING APPARATUS
Filed Aug. 15, 1956 54 Sheets-Sheet 42
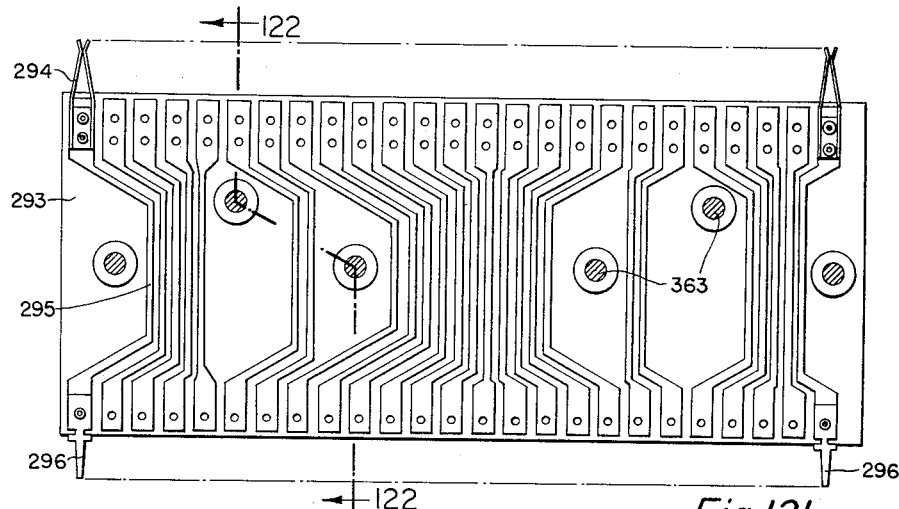
Fig.121
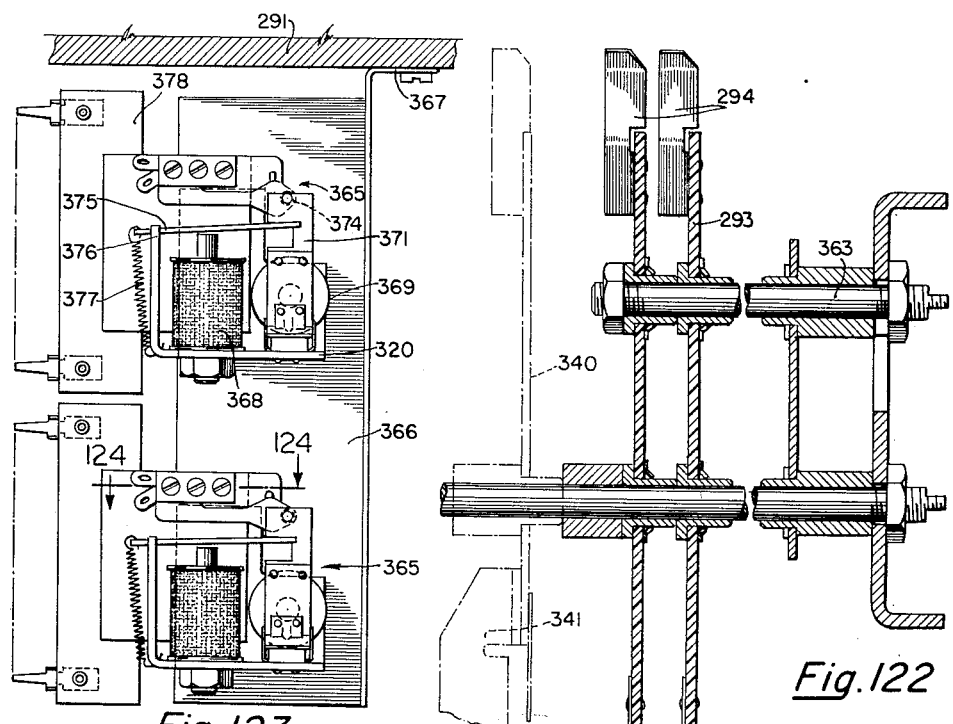
Fig.123
Fig.122
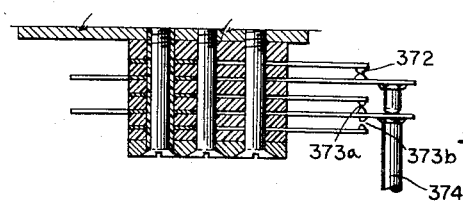
Fig.124
INVENTORS
GEORGE A. BAIRD
THOMAS A. DOWDS
BY
AGENT Dec. 18, 1962     G. A. BAIRD ETAL     3,069,078
ACCOUNTING MACHINE WITH RECORDING APPARATUS
Filed Aug. 15, 1956     54 Sheets-Sheet 43
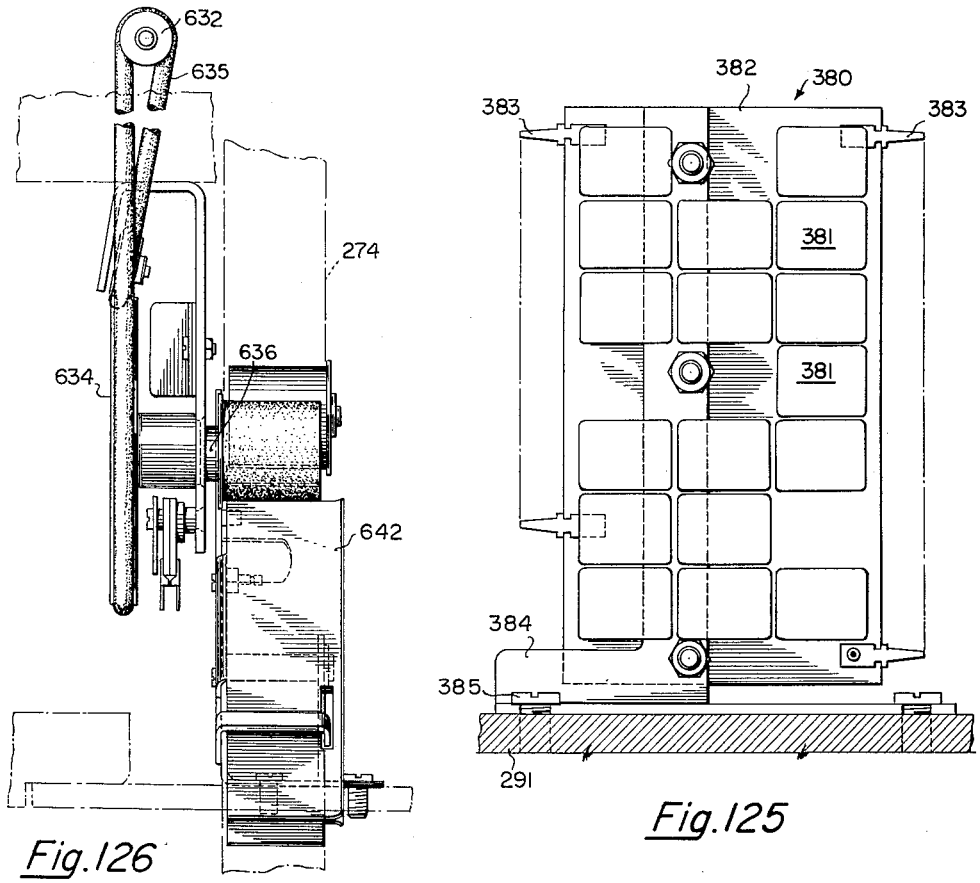
Fig.126
Fig.125
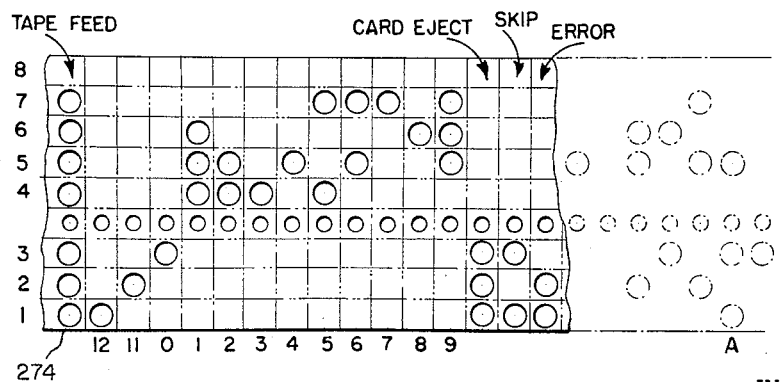
Fig.127
INVENTORS
GEORGE A. BAIRD
THOMAS A. DOWDS
BY
AGENT Dec. 18, 1962 G. A. BAIRD ETAL 3,069,078
ACCOUNTING MACHINE WITH RECORDING APPARATUS
Filed Aug. 15, 1956 54 Sheets-Sheet 44
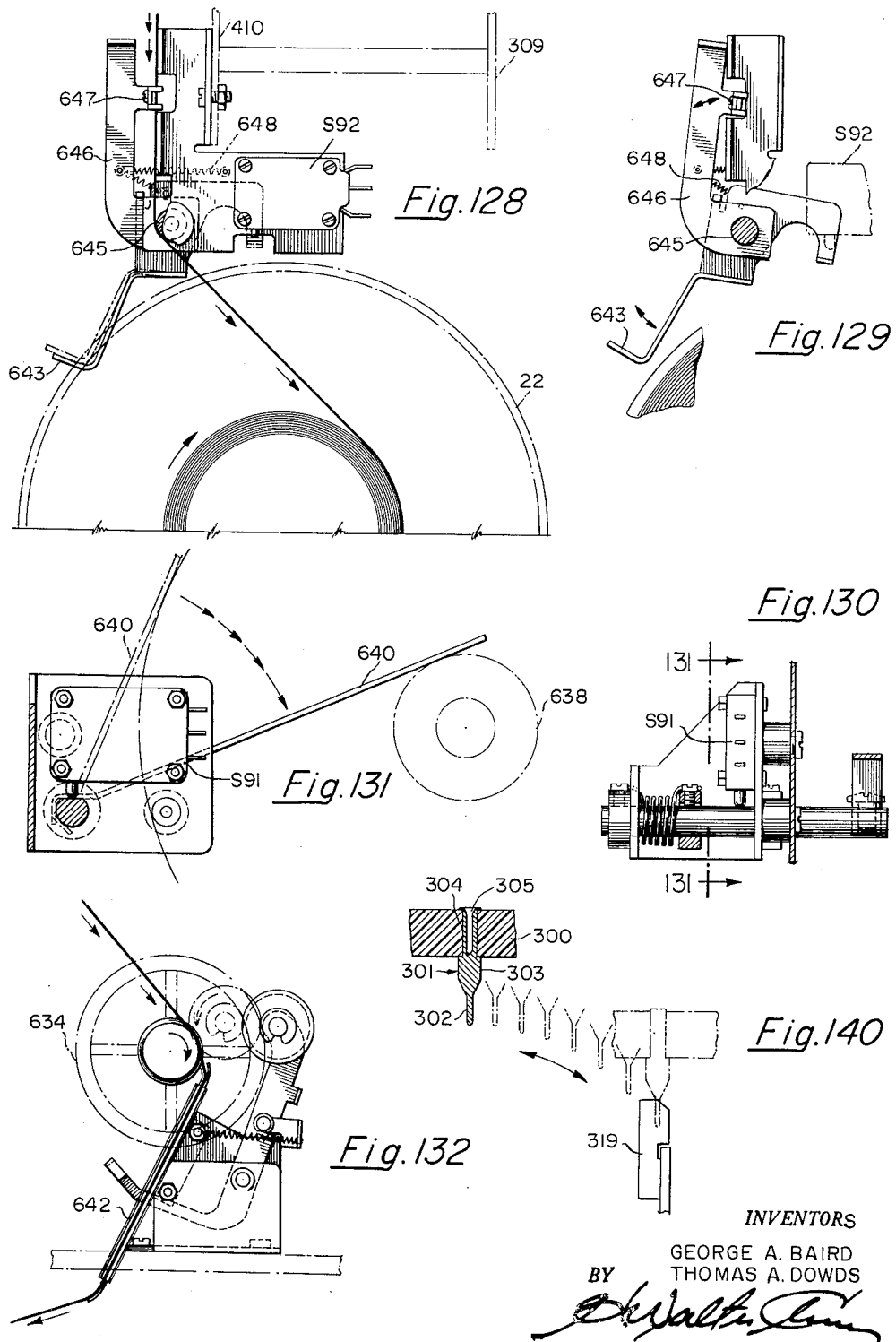
INVENTORS
GEORGE A. BAIRD
THOMAS A. DOWDS
BY
AGENT Dec. 18, 1962   G. A. BAIRD ETAL   3,069,078
ACCOUNTING MACHINE WITH RECORDING APPARATUS
Filed Aug. 15, 1956   54 Sheets-Sheet 45
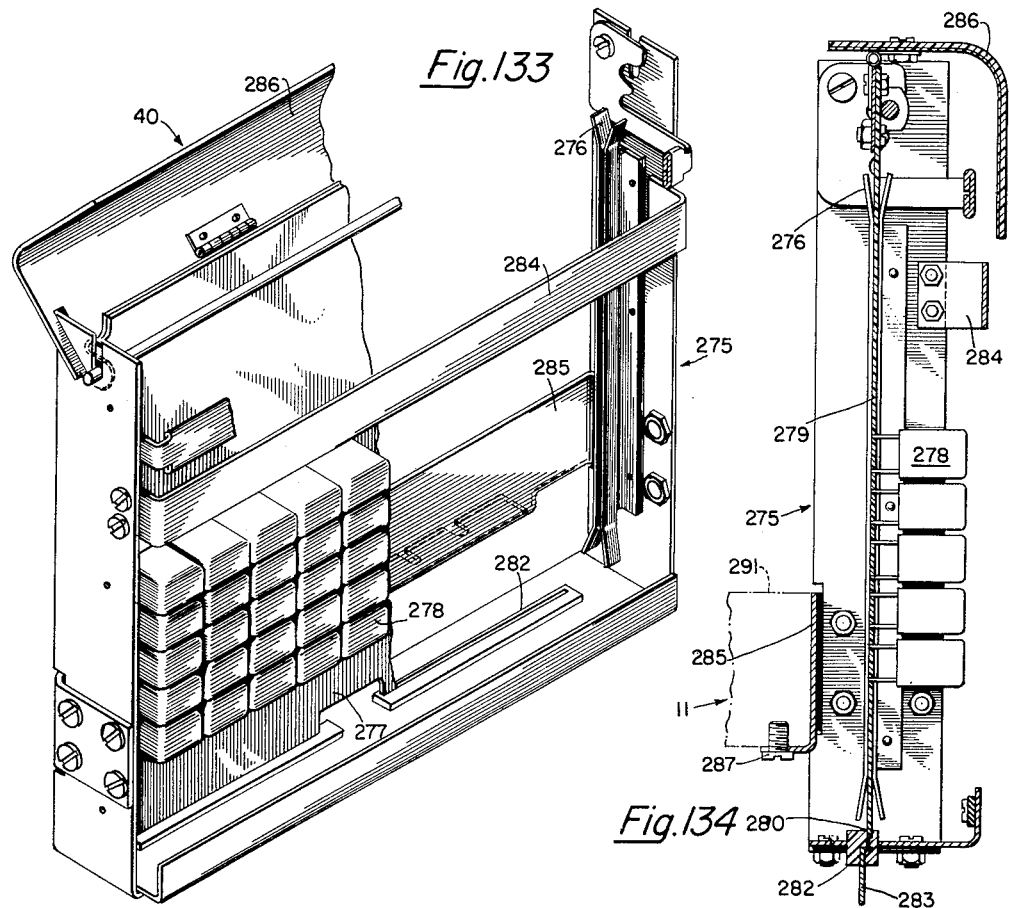
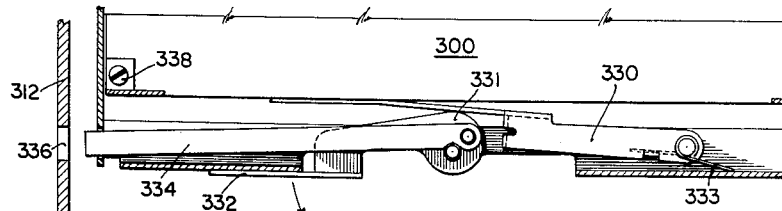
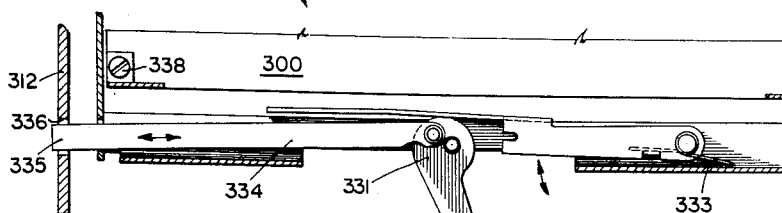
INVENTORS
GEORGE A. BAIRD
THOMAS A. DOWDS
BY
AGENT Dec. 18, 1962    G. A. BAIRD ETAL    3,069,078
ACCOUNTING MACHINE WITH RECORDING APPARATUS
Filed Aug. 15, 1956    54 Sheets-Sheet 46

INVENTORS
GEORGE A. BAIRD
THOMAS A. DOWDS
BY
AGENT

Dec. 18, 1962 G. A. BAIRD ETAL 3,069,078
ACCOUNTING MACHINE WITH RECORDING APPARATUS
Filed Aug. 15, 1956 54 Sheets-Sheet 47

INVENTORS
GEORGE A. BAIRD
THOMAS A. DOWDS
BY
AGENT

Dec. 18, 1962 G. A. BAIRD ETAL 3,069,078
ACCOUNTING MACHINE WITH RECORDING APPARATUS
Filed Aug. 15, 1956 54 Sheets-Sheet 48

INVENTORS
GEORGE A. BAIRD
THOMAS A. DOWDS
BY
AGENT

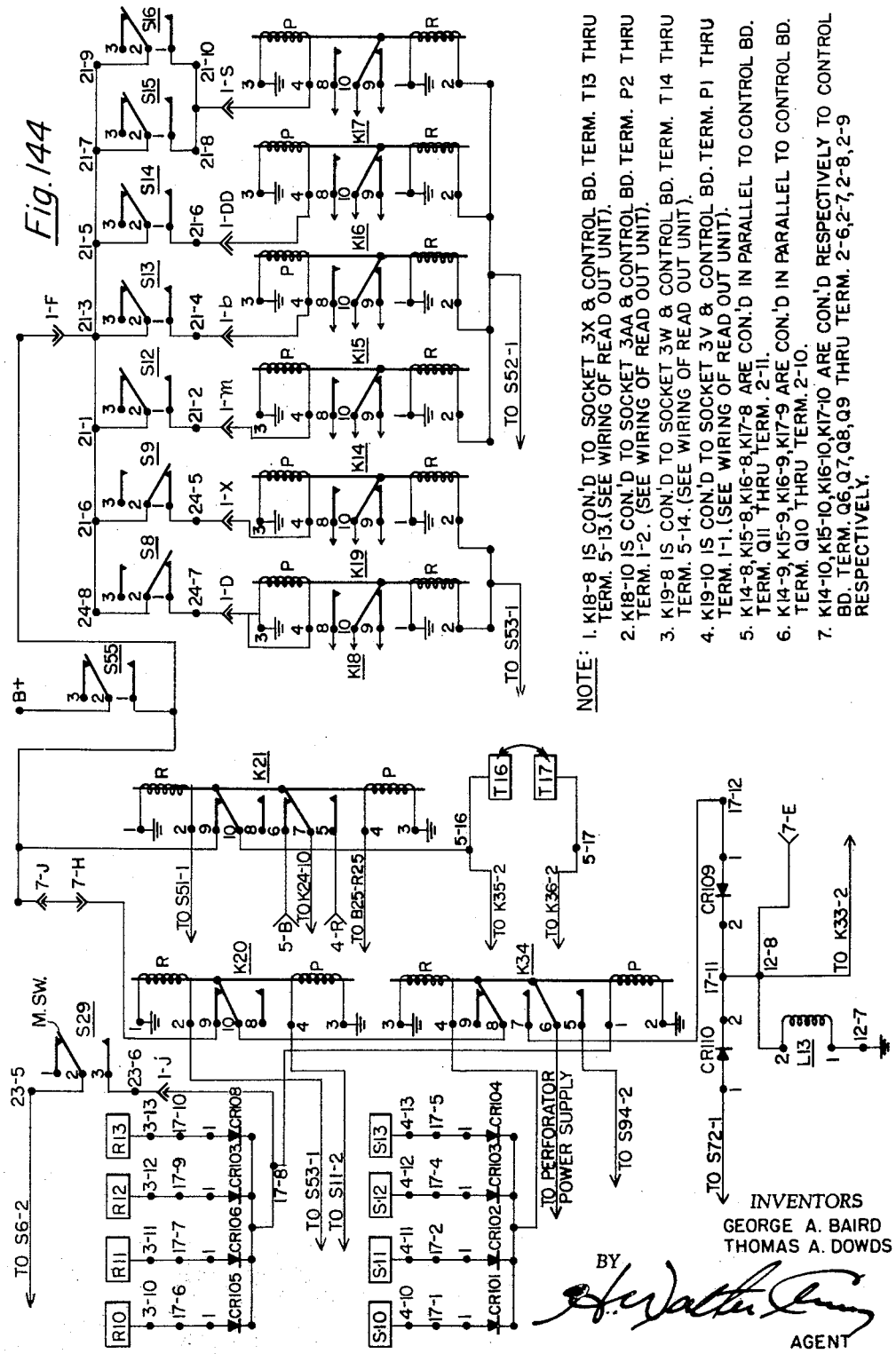
Fig.144
INVENTORS
GEORGE A. BAIRD
THOMAS A. DOWDS
BY
AGENT Dec. 18, 1962 G. A. BAIRD ETAL 3,069,078
ACCOUNTING MACHINE WITH RECORDING APPARATUS
Filed Aug. 15, 1956 54 Sheets-Sheet 53

INVENTORS
GEORGE A. BAIRD
THOMAS A. DOWDS
BY
AGENT

INVENTORS
GEORGE A. BAIRD
THOMAS A. DOWDS
BY
AGENT

3,069,078
ACCOUNTING MACHINE WITH RECORDING
APPARATUS
George A. Baird, Paoli, and Thomas A. Dowds, Malvern, Pa., assignors to Burroughs Corporation, Detroit, Mich., a corporation of Michigan
Filed Aug. 15, 1956, Ser. No. 604,191
38 Claims. (Cl. 235—60.13)

This invention relates to calculating machines of the type employed in accounting and bookkeeping work, and more particularly to a machine operable upon the depression of keys on the keyboard thereof automatically to cause, among other things, the printing of symbols upon a sheet and the recording of corresponding codes upon a record medium at a location either adjacent to or remote from that portion of the system which accomplishes the printing.

Bookkeeping type calculating machines of the kind wherein information and values entered into the keyboard by an operator are used by the machine in predetermined calculating operations, and including means for indicating the result of such operations have been employed for many years. Other machines which print the above noted values in addition to carrying out the desired computations have also been available.

Due to the complexity and tendency toward decentralization of modern business enterprises, a need has arisen for the rapid transmission from branch offices to a central point of all or selected portions of the bookkeeping operations carried out by the above described machines at the branch offices. Additionally, and because of the overwhelming mass of figures involved, rapid means for assimilating and making available the consolidated data, or selected portions thereof, at the central point has been found desirable. This latter has, at least in part, been fulfilled by the development of punched card data processing machines, but this has created the additional problem of getting the accounting information at the branch on punched cards at the central office. Transmission of copies of the original records of the branches to the central point and the punching of the cards there has been found to be undesirable. An alternate procedure not infrequently followed by branch offices is to punch on cards those selected portions of its records desired at the central point, and then physically transport the cards thereto. This latter procedure is not wholly satisfactory because a considerable amount of time and expense is involved in the duplication of effect necessitated by the copying of records, and there is added expense and delay involved in the packing and shipping of the cards.

Systems have been developed whereby the information printed by the accounting machine is simultaneously marked on a tape, which can be physically transported to a central point and used there to prepare corresponding punch cards on any of the commercially available tape-to-card converters. The advantages of this procedure become manifest when logistics is considered. The bulk and weight of a number of punched cards is many times that of a reel of tape carrying identical information. An alternate procedure available if time is important is to put the tape on a "Teletype" at the end of the business day and cause a duplicate to be formed at the central point in a matter of minutes.

While these systems have to some extent overcome the problems of duplication of effort and delay they have not provided a complete solution as they lack flexibility and selectivity. In other words, all of the information printed is also punched or marked in the same order in which it was printed. However, due to the frequent differences in objectives between the branches and central office, or between individual accounts and the consolidated record, the desired sequential recording of the information varies from point to point along the chain of command of the organization. Additionally, while certain information is necessary and meaningful in the branch office operation of the business, that same information may not be needed at the central office. In others of such prior machines, the punched tape is not directly compatible with the fields on the punch card and therefore an intermediate step is necessary prior to punching of the cards. Still other machines require a change in the operational procedure of the machine operator by requiring operational steps unique to the control and operation of the tape perforator.

The present invention overcomes all of these shortcomings by providing a full and complete solution to the above described problem of data assimilation and transmission. Once the recorder is rendered operative at the beginning of business day, it need concern the machine operator no further. The latter follows the exact operational procedure prevailing prior to the installation of the recorder. Additionally any code desired may be employed, and change over from one code to another may be accomplished by the simple expedient of replacing one modular element with another. Further, the inherent flexibility and selectivity of the subject invention is such that any portion of or all of the printed matter may be recorded in any sequence desired regardless of the order in which it is printed. Additionally and where desired, several different but related types of entries may be printed as different types of entries but recorded as identical entries or symbols. Also, automatic and exact compatibility with the fields and format of the ultimate punched card is maintained thus avoiding any need for intermediate operations. It should be noted that as was previously mentioned, the above described features and operations are achieved without requiring additional work by the operator who continues to perform just as if the recorder were not existent.

The important object of this invention is to provide an improved printing calculating machine which also includes a recorder or tape output.

Another important object of this invention is to provide an accounting system wherein selective portions of information printed by an accounting machine are simultaneously recorded on a record medium, such as tape.

It is a further object of this invention to provide an improved printing calculating machine wherein information printed by the machine is automatically recorded on a tape in any sequence desired.

A still further object of the invention is to provide such a machine wherein information printed by the machine is simultaneously recorded on a tape without additional operations being required of the machine operator beyond those necessary to run the machine itself when the latter is operating independently.

An additional object of the invention is to provide an accounting machine wherein printed and tape records of transactions are created as a result of but a single operation by the operator.

For a better appreciation of these and other objects of the invention, reference is made to the following specification and accompanying drawings wherein:

FIGURE 7 is a somewhat schematic cross-sectional view through the accounting machine showing the main operational components thereof;

FIGURE 8 is a fragmentary sectional view taken along the line 8—8 of FIGURE 7;

FIGURE 12 is a view looking in the direction of the arrows on line 12—12 of FIGURE 10;

FIGURE 13 is a fragmentary upsidedown perspective view of the switch operating end of an accounting machine rack;

FIGURE 16 is a top plan view of the switch bank;

FIGURE 17 is a front elevational view of the switch bank shown in FIGURE 16 with parts broken away to illustrate a portion of the interior construction thereof;

FIGURE 18 is a side elevational view of the switch bank looking in the direction of the arrows on line 18—18 of FIGURE 17 and with a part broken away to show portions of its interior construction;

FIGURE 19 is a bottom plan view of one of the switch elements;

Figure 6:
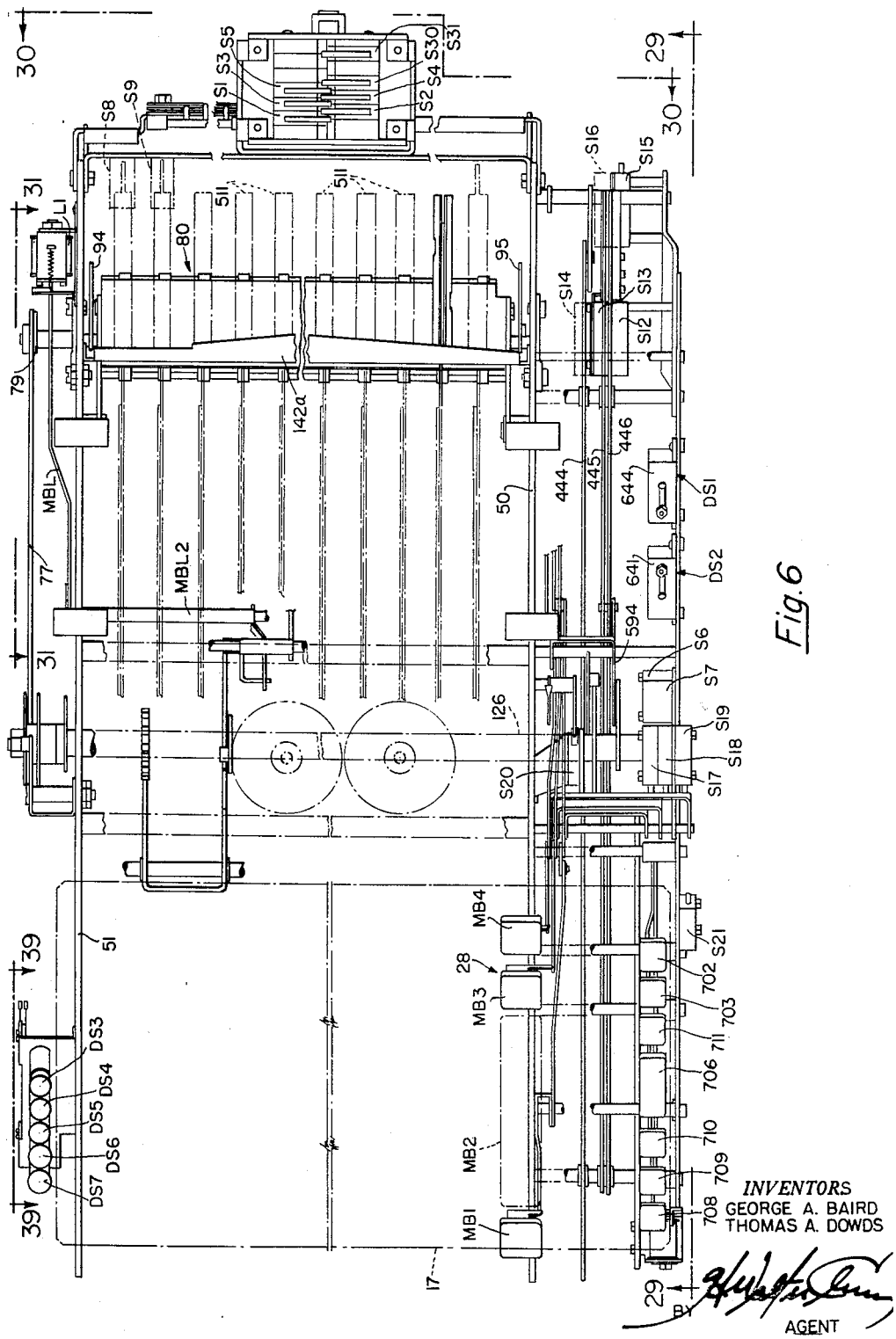
FIGURE 6 is a fragmentary plan view of the accounting machine, some parts thereof being indicated only in broken line.
Figure 22:
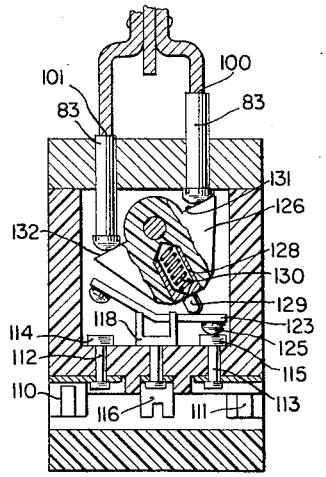
Figure 23:
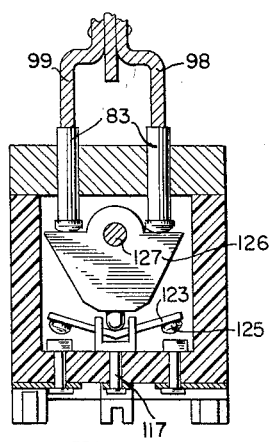
Figure 21:
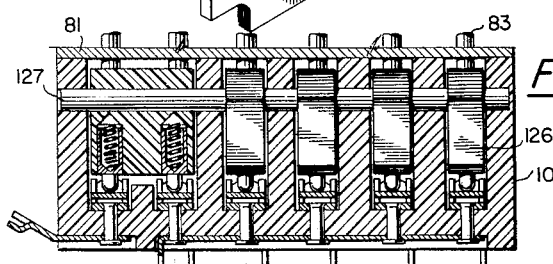
Figure 20:
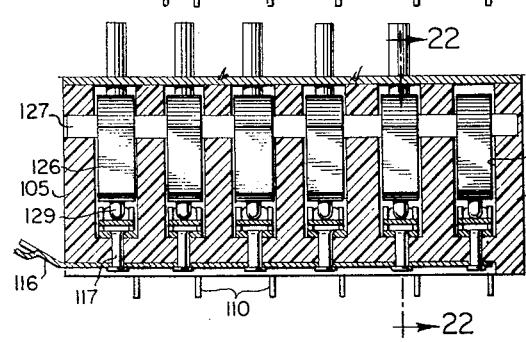
Figure 24:
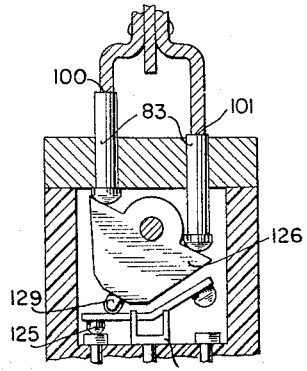
Figure 25:
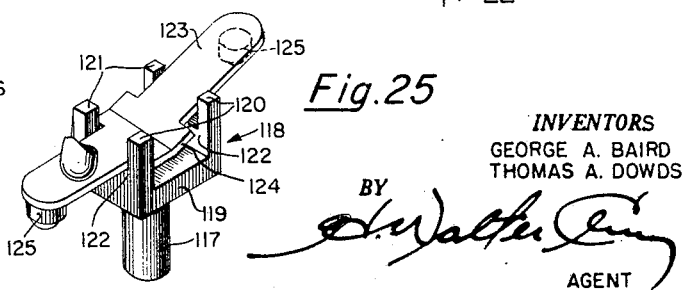
Figures 14, 15:
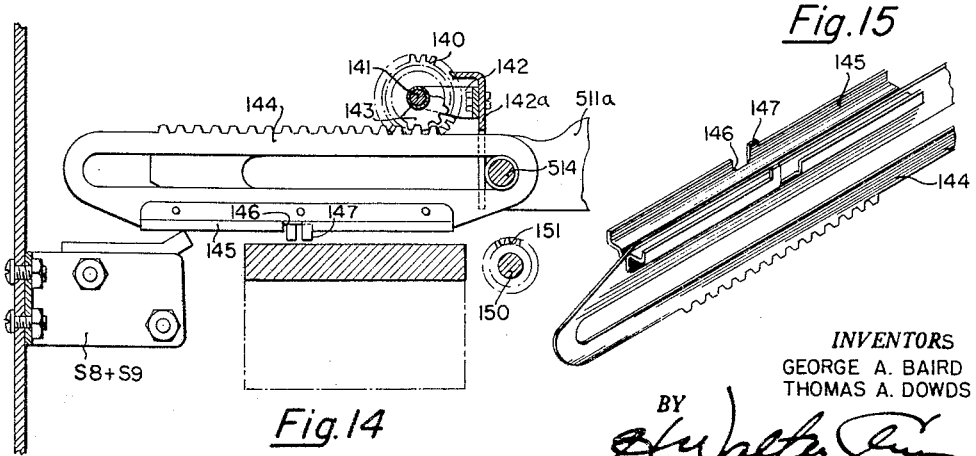
FIGURE 14 is a sectional view taken along the line 14—14 of FIGURE 8 showing another of the rack structures.
FIGURE 15 is a fragmentary upsidedown perspective view of a portion of the rack shown in FIGURE 14.
Figure 26:
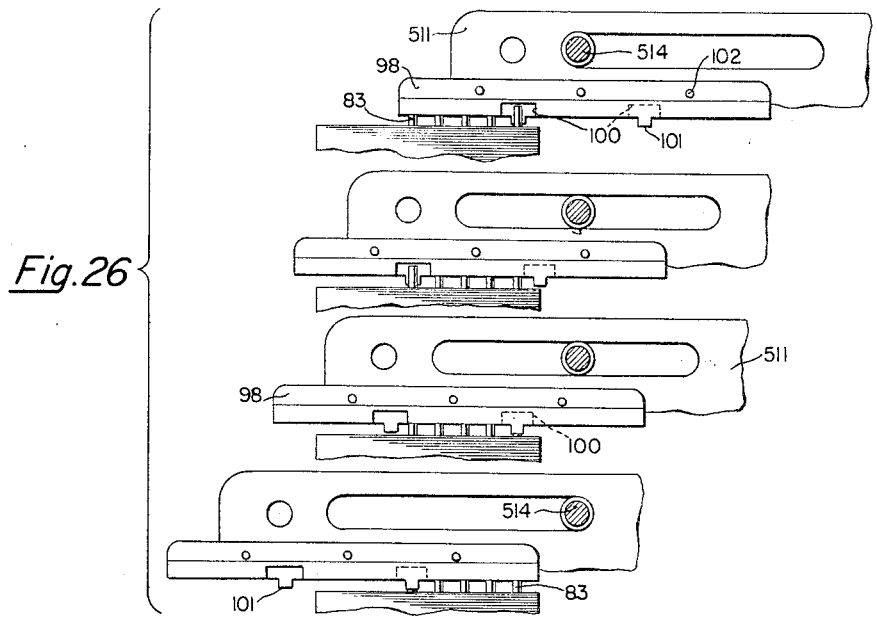
Figure 27:
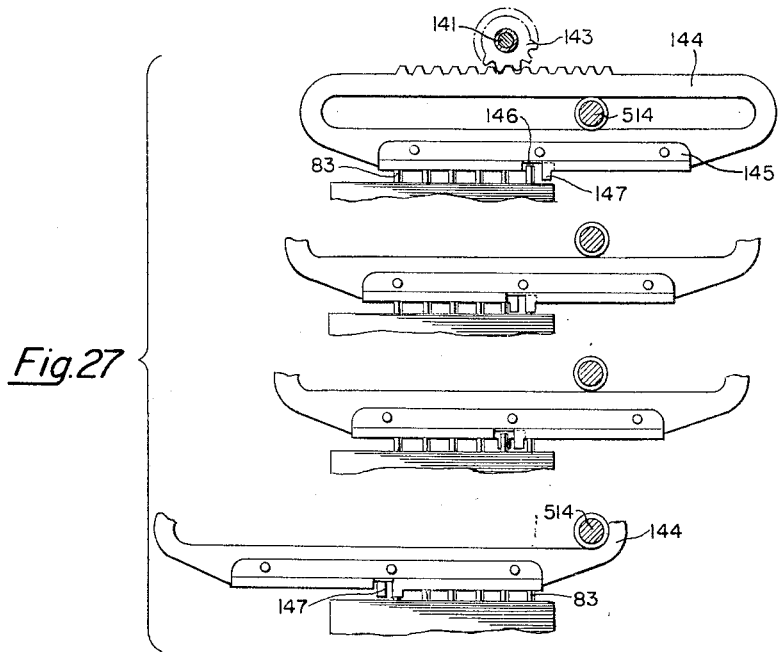
Figure 29:
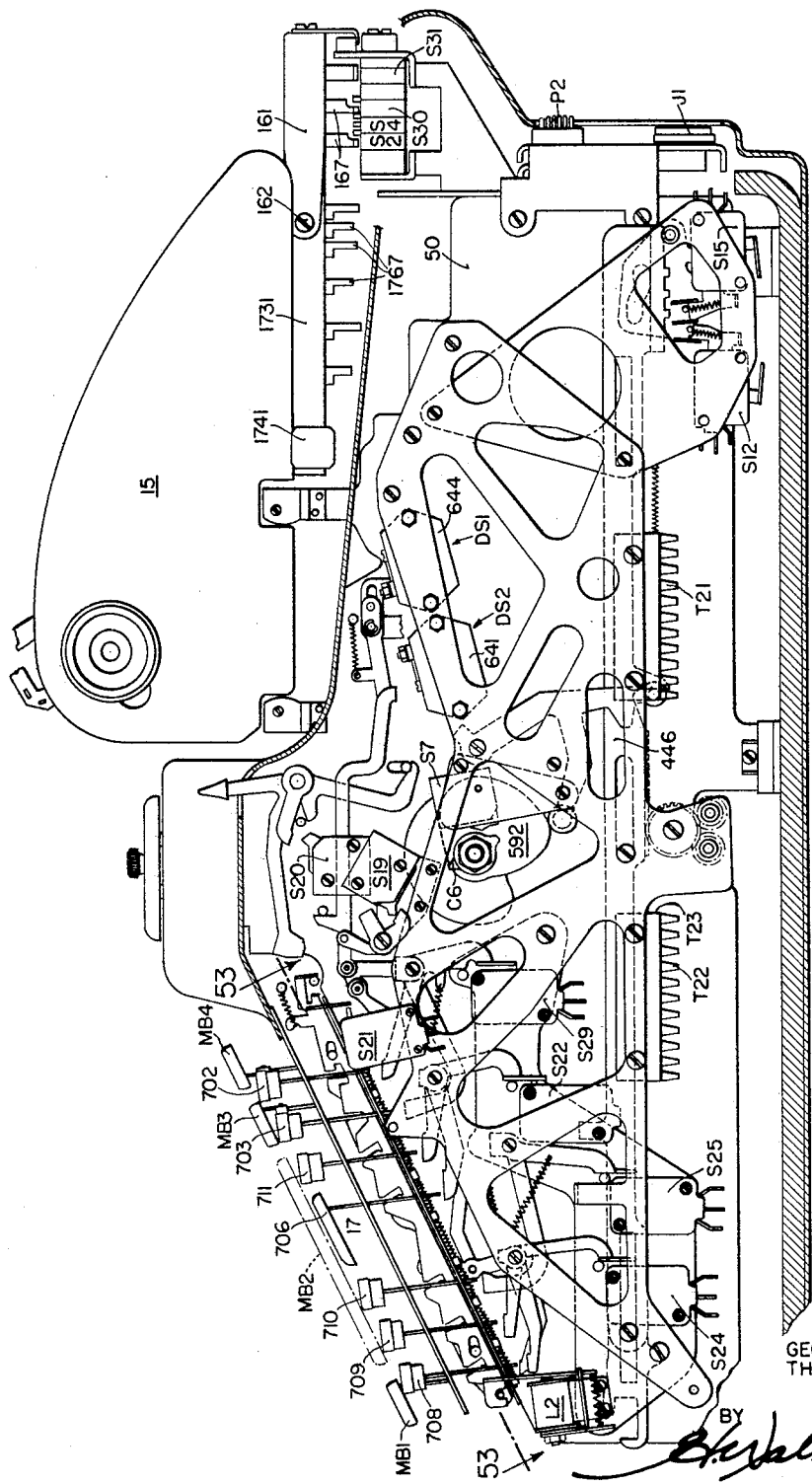
Figure 32:
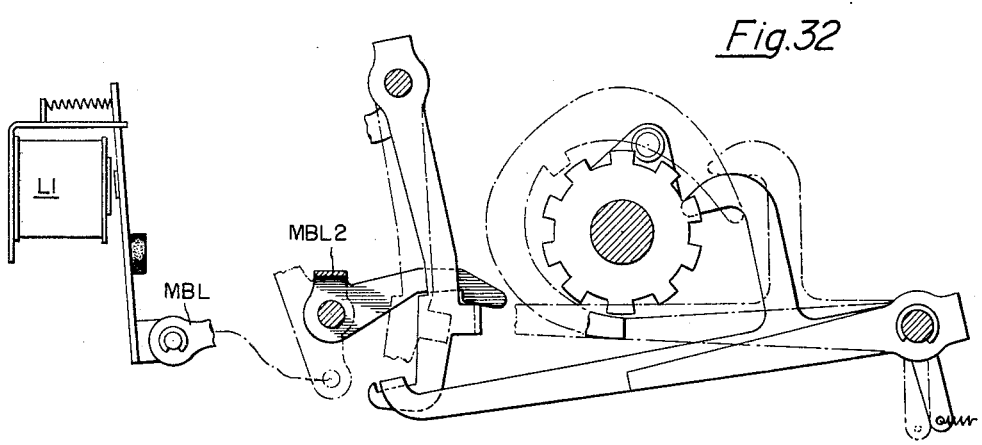
Figure 33:
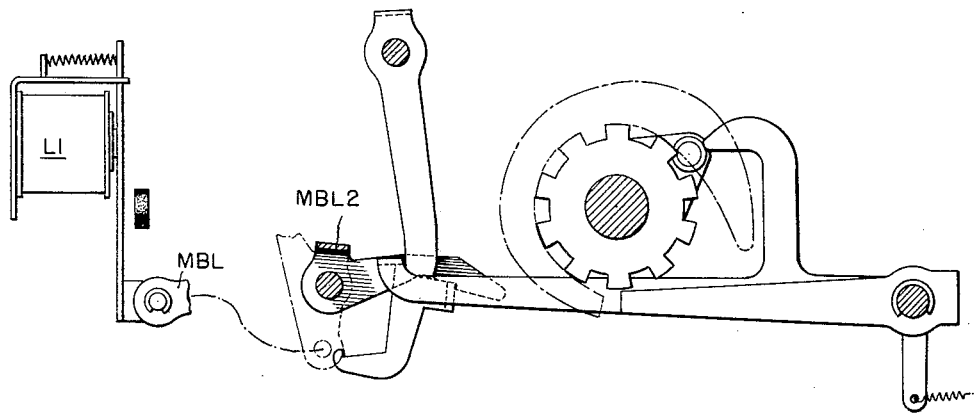
Figure 36:
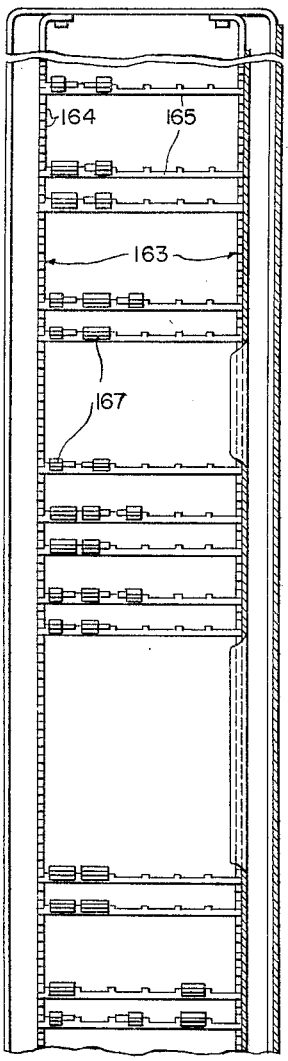
Figure 35:
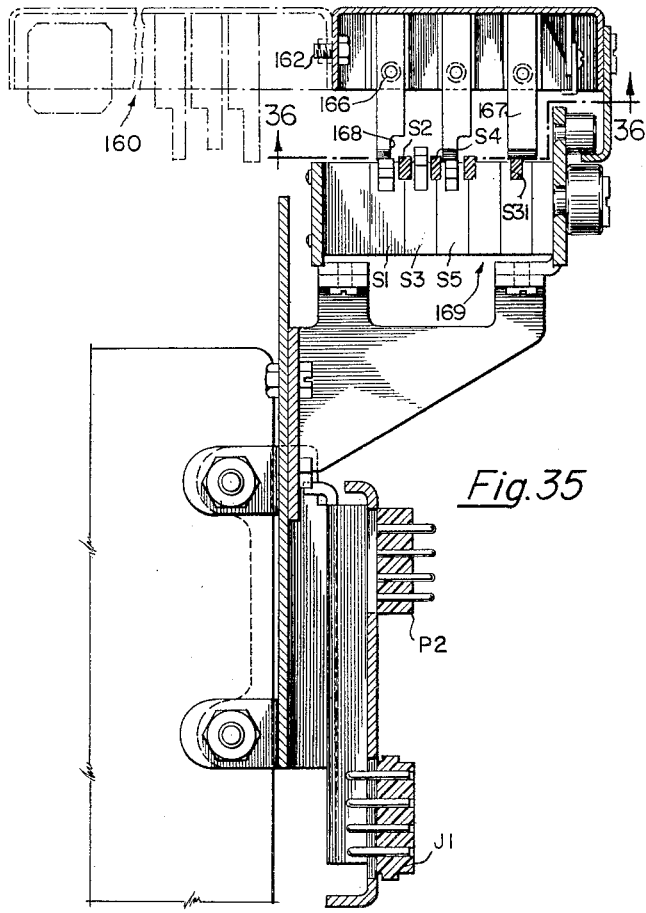
Figure 37:
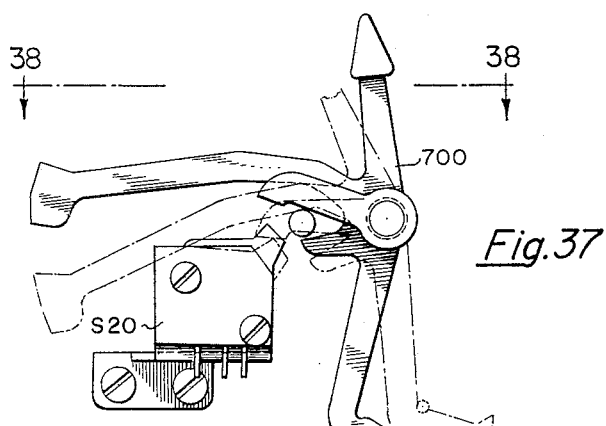
Figure 38:
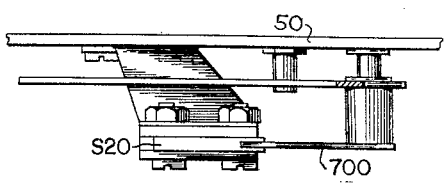
Figure 43:
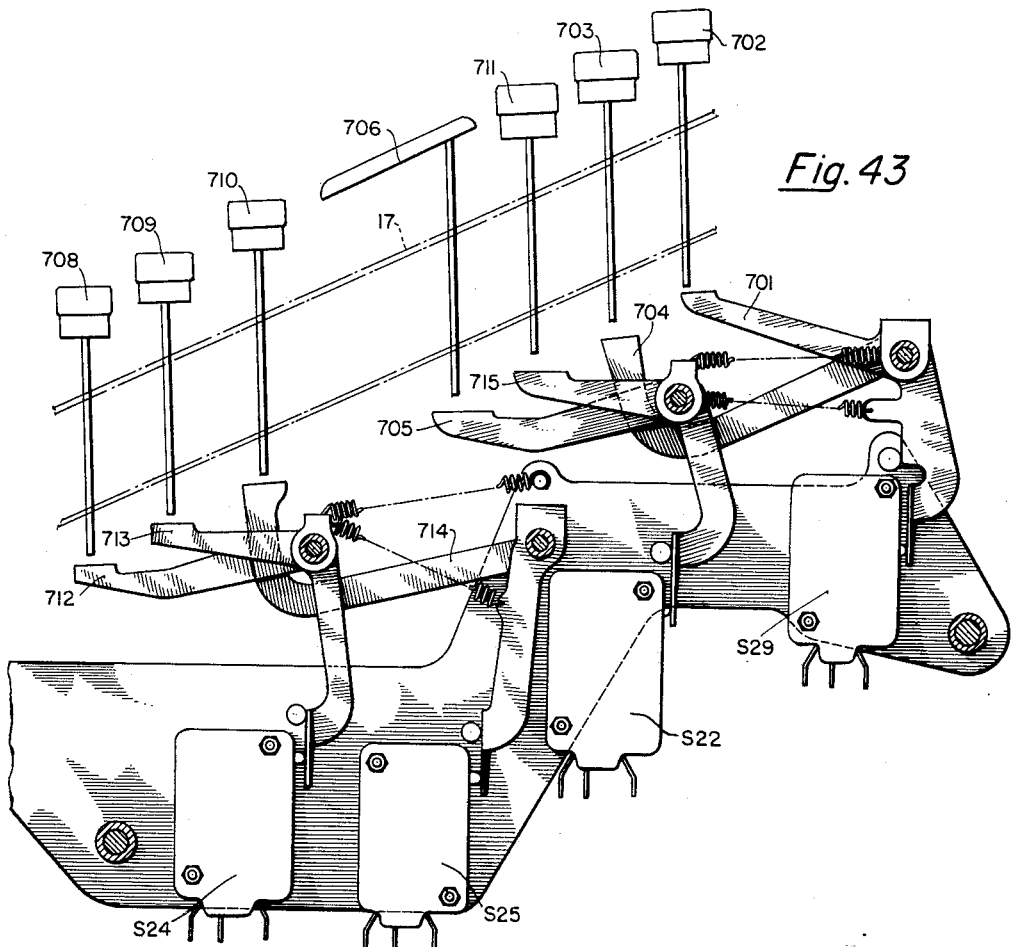
Figure 44:
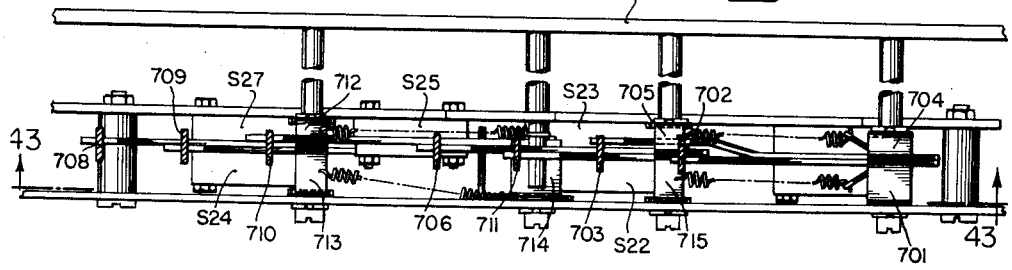
Figure 45:
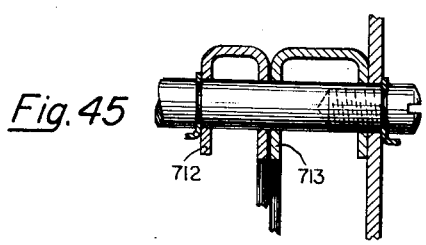
Figure 64:
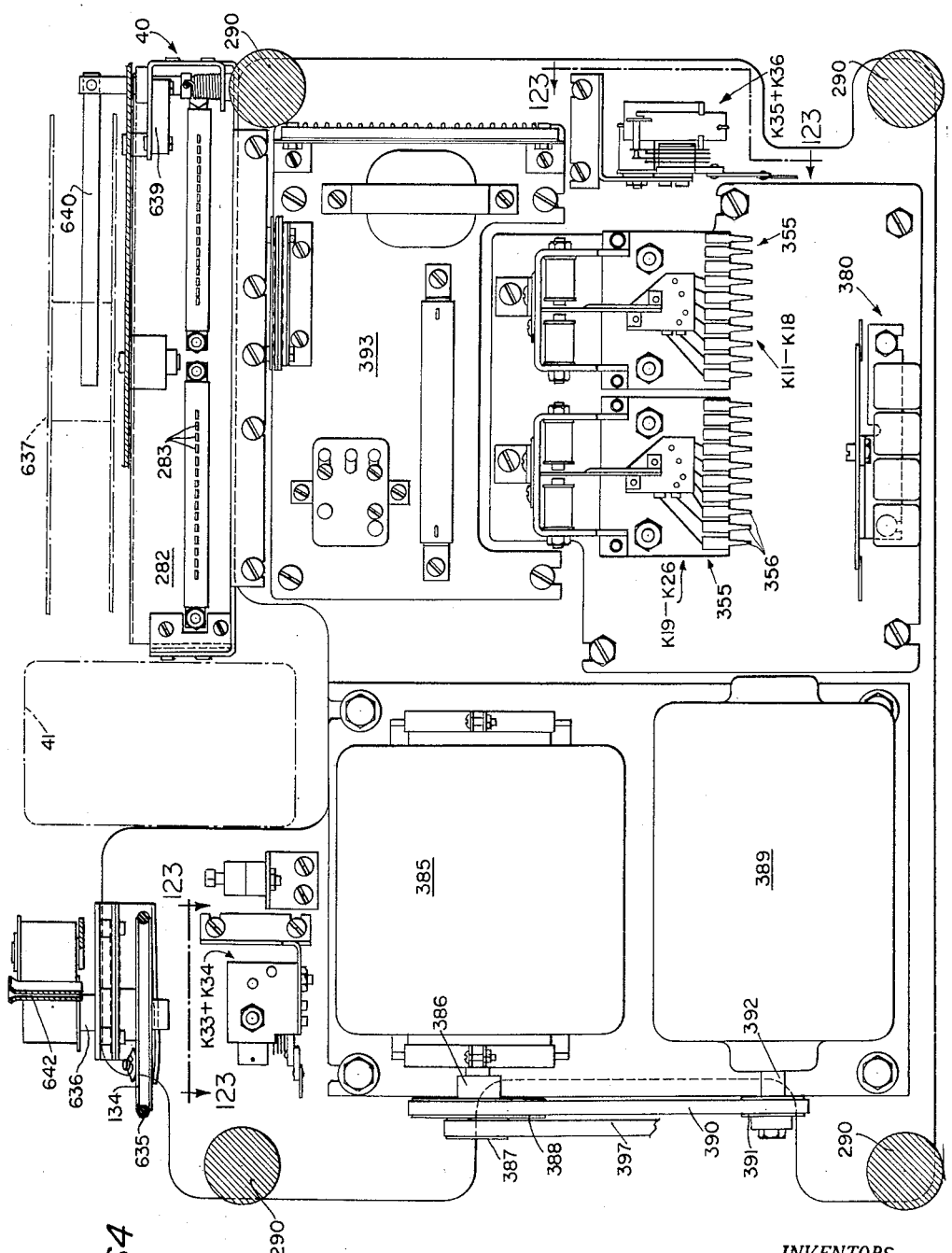
Figure 80:
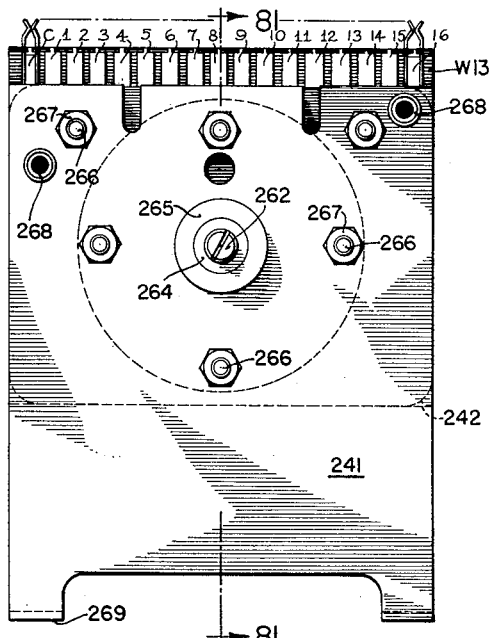
Figure 79:
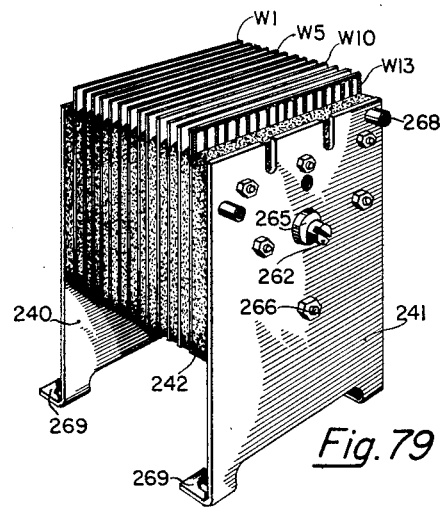
Figure 81:
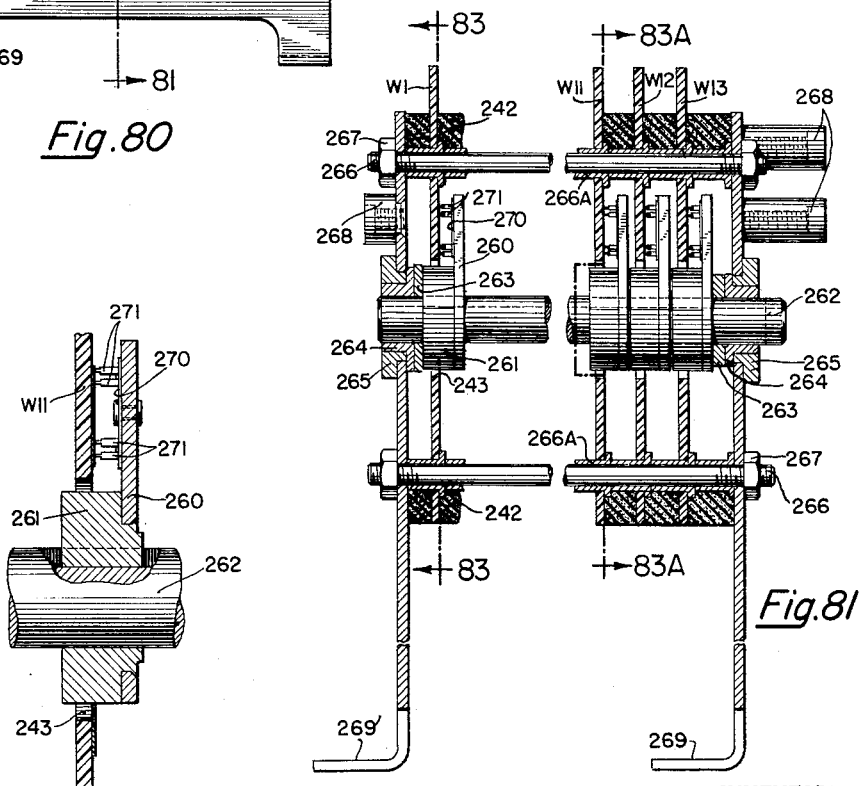
Figure 82:
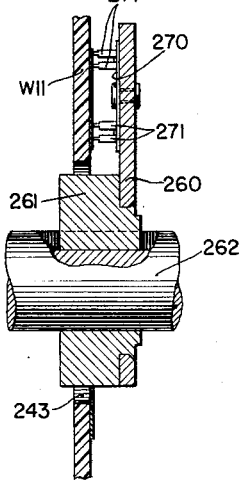
Figure 83:
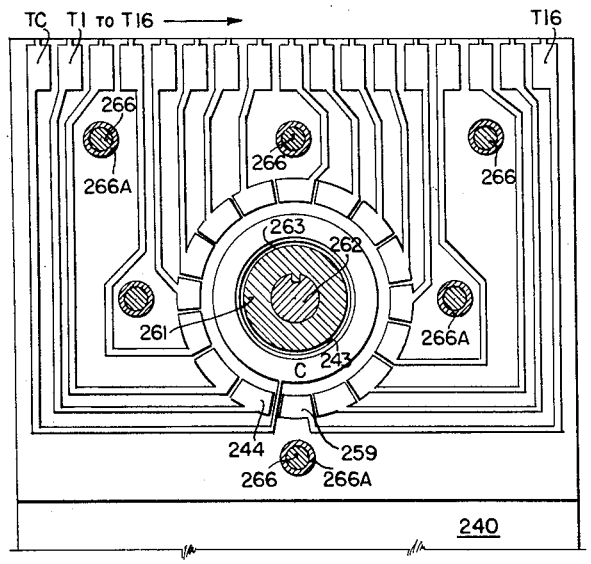
Figure 83A:
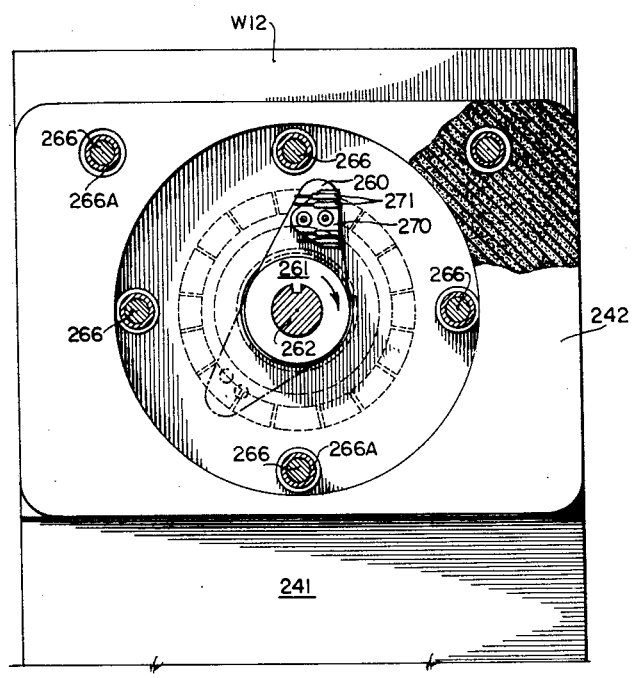
Figures 84, 85:
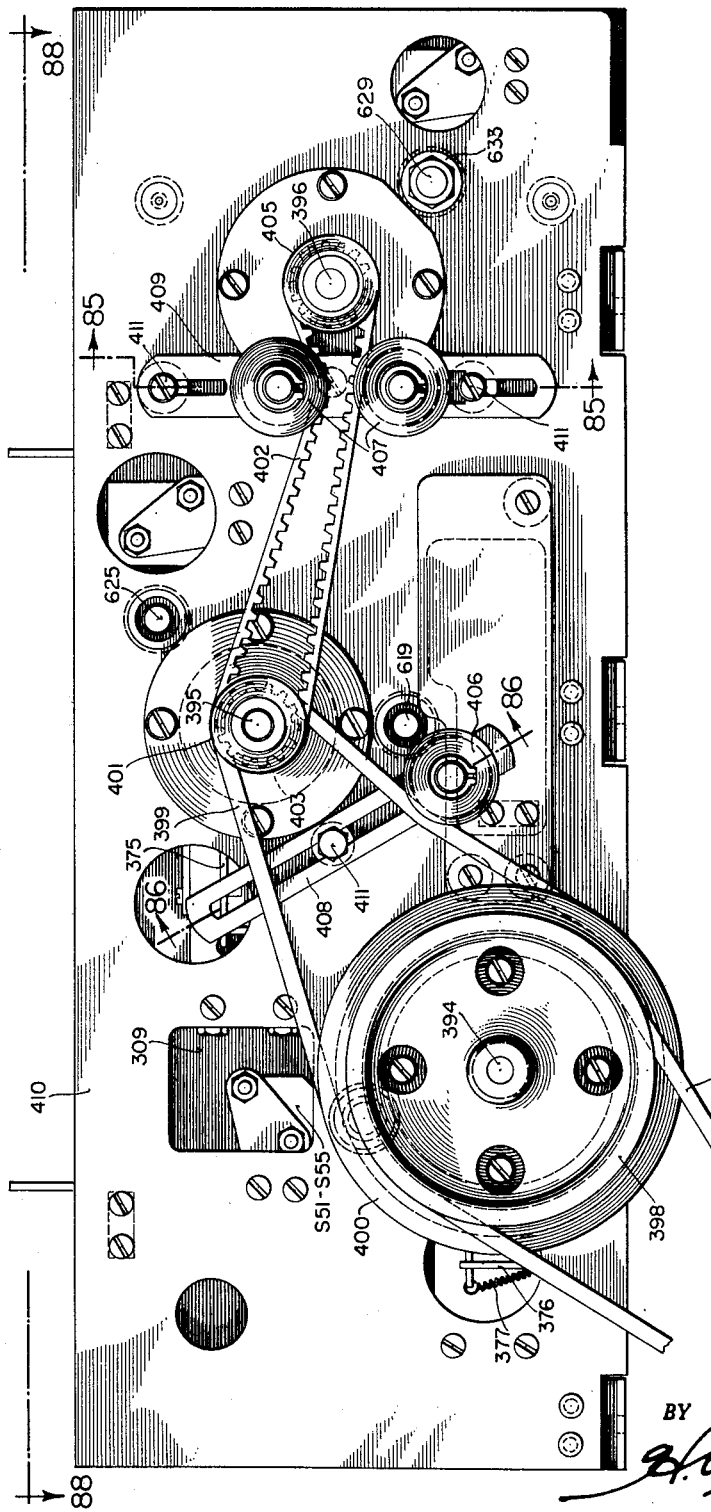
Figure 91:
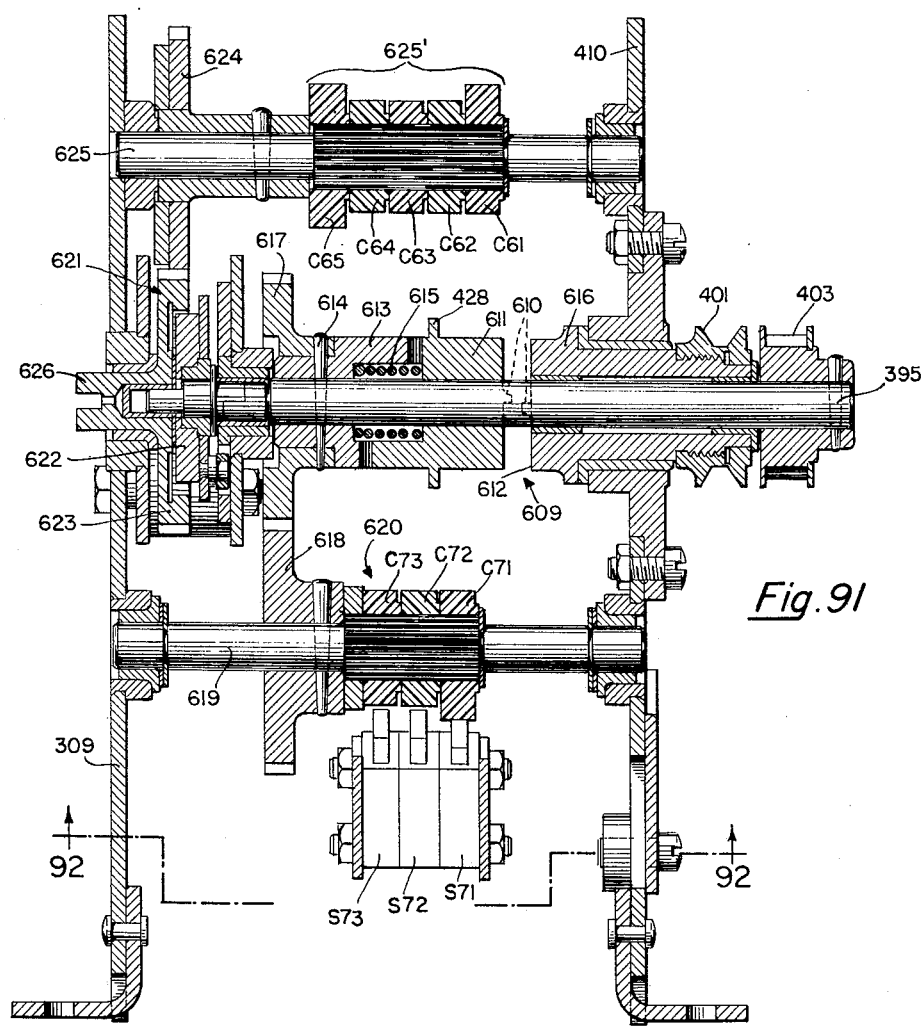
Figure 92:
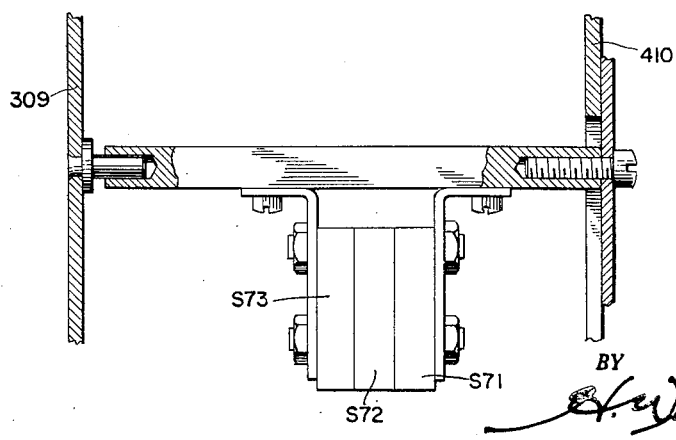
Figure 93:
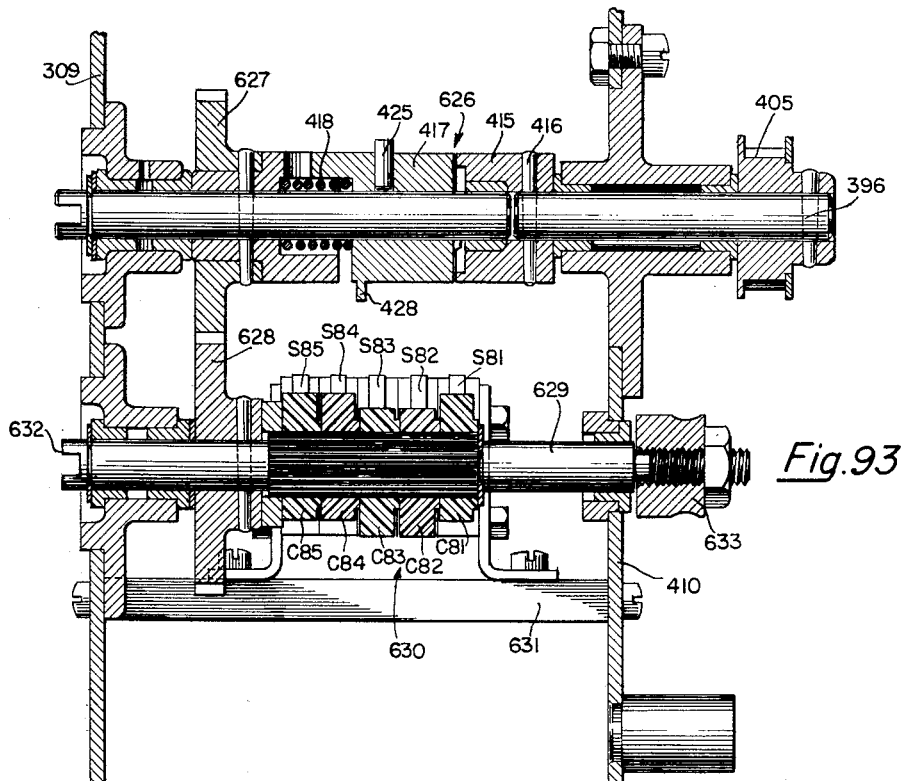
Figure 94:
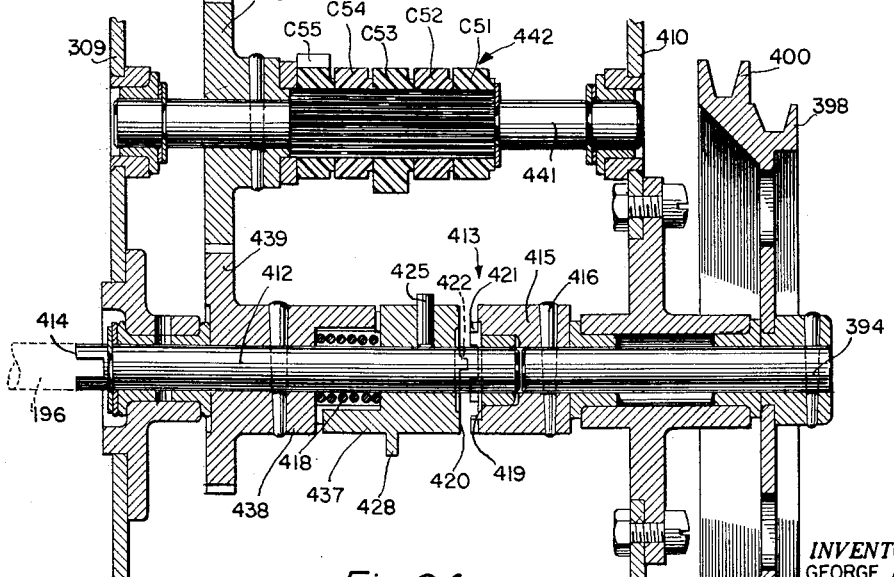
Figure 95:
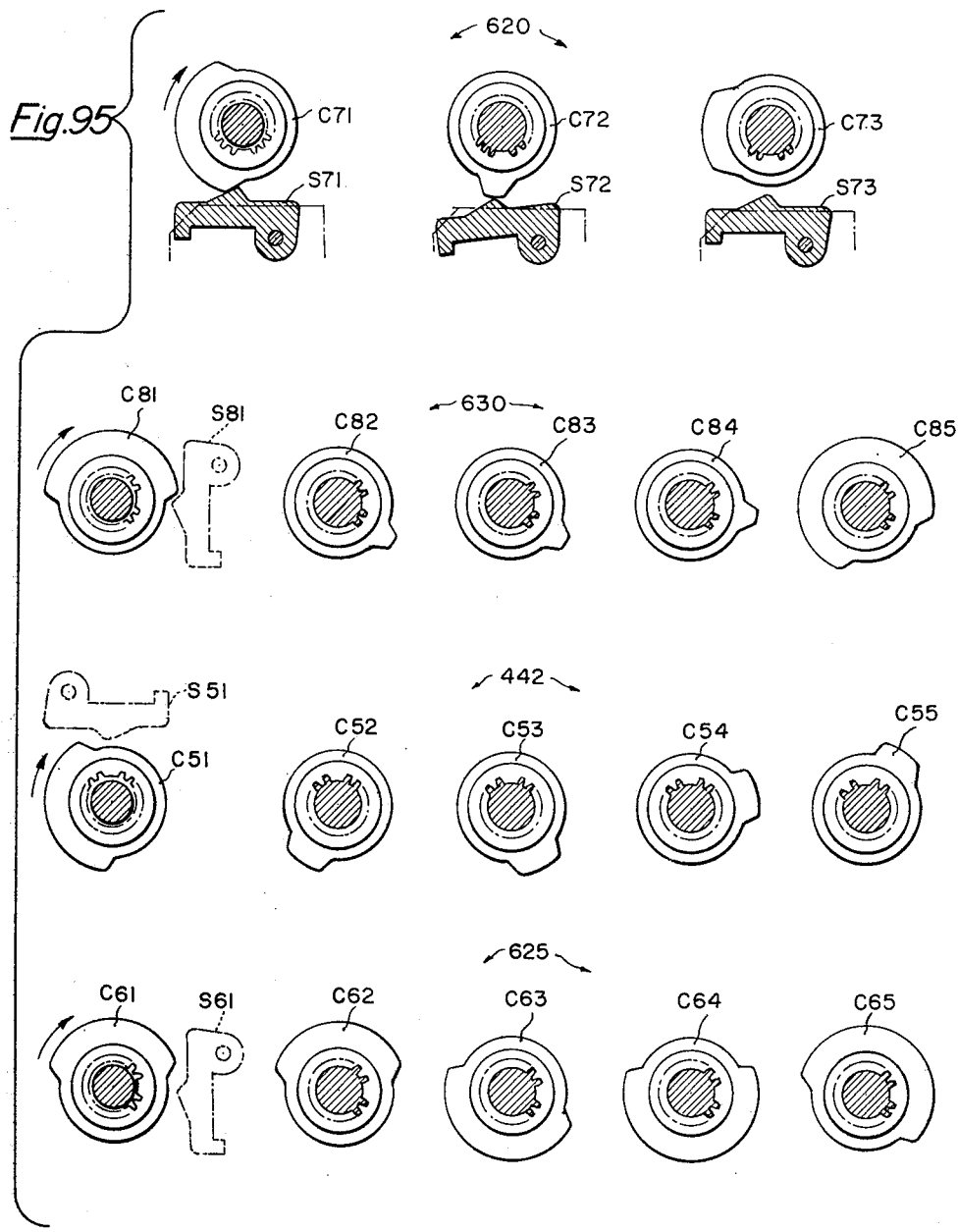
Figure 96:
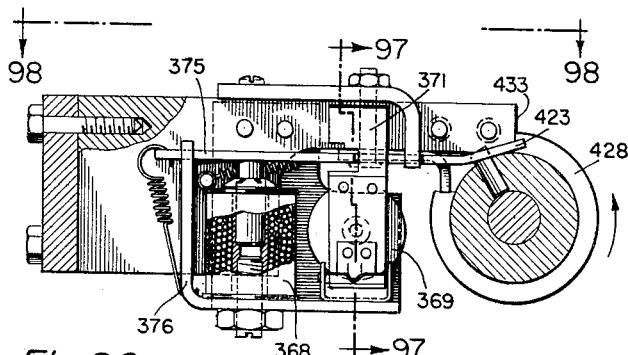
Figure 97:
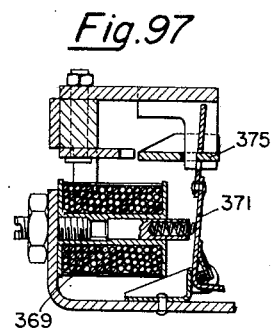
Figure 98:
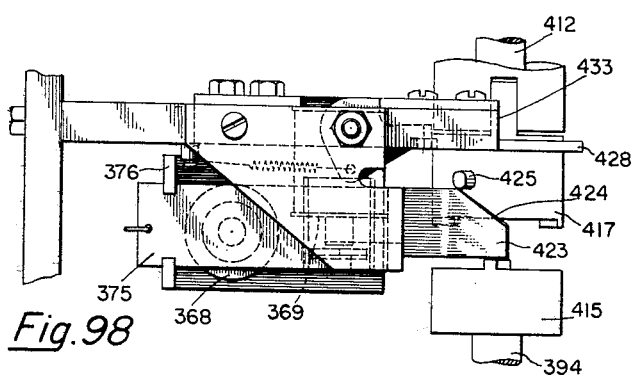
Figure 99:
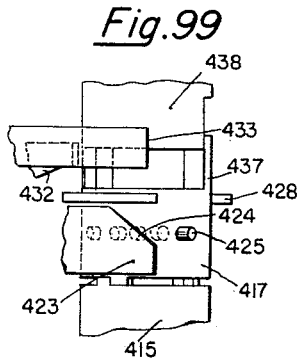
Figure 100:
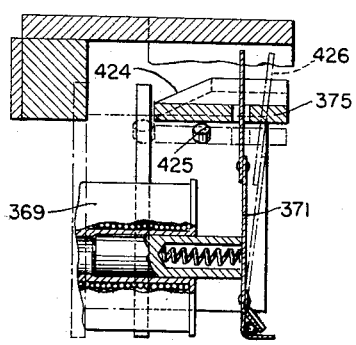
Figure 103:
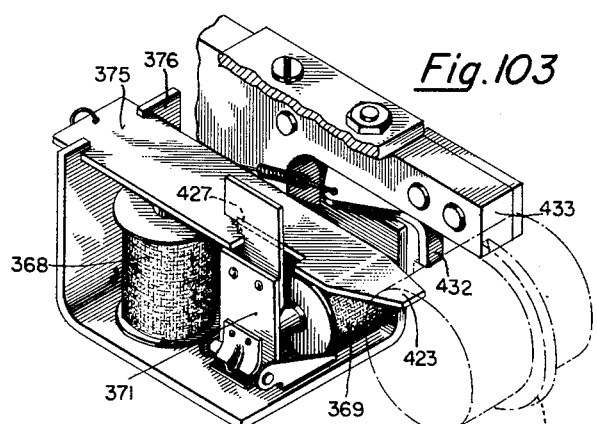
Figure 101:
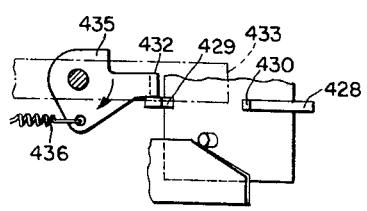
Figure 102:
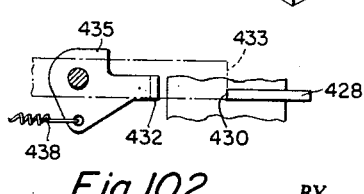

FIGURE 20 (see sheet on which FIGURE 9 appears) is a sectional view taken along the line 20—20 of FIGURE 17;

FIGURE 21 is a view similar to FIGURE 20, but showing a switch construction used in another of the switches of the switch bank and taken along line 21—21 of FIGURE 19;

FIGURE 22 is a sectional view taken substantially along the line 22—22 of FIGURE 19 and 20 and showing the switch mechanism in one operational phase when associated with a rack of the accounting machine;

FIGURE 23 is a view similar to FIGURE 22, but showing another operational phase thereof;

FIGURE 24 is a view similar to FIGURES 22 and 23 and showing a still further operational phase of the switch mechanism;

FIGURE 25 is a perspective view of elements within a switch;

FIGURE 26 is a series of views showing operational association of the racks shown in FIGURE 13 with the switches;

FIGURE 27 is a series of views illustrating the operational association of the rack shown in FIGURE 14 with the switches;

FIGURE 27A is a fragmentary sectional view taken along line 27A—27A of FIGURE 7;

FIGURE 27B is a fragmentary sectional view taken along line 27B—27B of FIGURE 27A;

FIGURE 27C is a fragmentary sectional view taken along line 27C—27C of FIGURE 27A;

FIGURE 28 is a schematic diagram showing the wiring of the switch bank to terminal boards;

FIGURE 29 is a sectional view taken along the line 29—29 of FIGURE 6;

FIGURE 30 is a sectional rear view of the calculating or accounting machine taken along the line 30—30 of FIGURE 6 and showing the mode of operation of the electrical lanes;

FIGURE 31 is a fragmentary view looking in the direction of the arrows on line 31—31 of FIGURE 30, and FIGURE 6;

FIGURE 32 is a view similar to FIGURE 31, but in more detail;

FIGURE 33 is a view similar to FIGURE 32, but showing another operational phase of the mechanism;

FIGURE 34 is a detailed fragmentary view of the means for actuating one of the switches in the electrical lane;

FIGURE 35 is a sectional view taken along the line 35—35 of FIGURE 30 showing the electrical lanes and the terminal boards for connecting the associated recording apparatus to the machine;

FIGURE 36 is a fragmentary bottom plan view of the control panel for the electrical lanes;

FIGURE 37 is a fragmentary side elevational view of a switch operating lever and its associated switch;

FIGURE 38 is a sectional view taken along the line 38—38 of FIGURE 37;

FIGURE 39 is a sectional view of the indicator lights taken along the line 39—39 of FIGURE 6;

FIGURE 40 is a fragmentary plan view of the indicator light panel looking in the direction of the arrows on the line 40—40 of FIGURE 39;

FIGURE 41 is a fragmentary perspective view from the under-side of the indicator light housing;

FIGURE 42 is an exploded fragmentary perspective view of switch elements and their actuator;

FIGURE 43 is a side sectional view taken along the line 43—43 of FIGURE 44, and showing certain of the switches in the accounting machine and their associated actuating linkages and keys;

FIGURE 44 is a sectional view taken along the line 44—44 of FIGURE 43;

FIGURE 45 is a typical sectional view of the pivotal mounting for the actuating levers shown in FIGURES 43 and 44;

FIGURE 46 is an exploded perspective view of the elements shown in FIGURE 43 showing in a broken line the normal position of certain of the "exploded" elements;

FIGURES 47 and 48 are cross sectional views of typical switches used in various places throughout the machine;

FIGURE 49 is a fragmentary side elevational view of the motor bar switches and their actuating linkages;

FIGURE 50 is a view taken along the line 50—50 of FIGURE 49;

FIGURE 51 is a view taken along the line 51—51 of FIGURE 49;

FIGURE 52 is a fragmentary detail view of the actuating lever for one of the switch elements;

FIGURE 53 is a fragmentary sectional view taken substantially along line 53—53 of FIGURE 29;

FIGURE 54 is a view taken along the line 54—54 of FIGURE 53;

FIGURE 55 is a view taken along the line 55—55 of FIGURE 53;

FIGURE 56 is an exploded perspective of certain of the links or slides associated with the keys shown in FIGURES 54 and 55 for retaining and releasing the keys from their operative position;

FIGURE 57 is a sectional view of a switch operating link showing its operational association with the main cam shaft of the accounting machine;

FIGURE 58 is a view similar to FIGURE 57, but showing another of the links;

FIGURE 59 is a fragmentary view of the apparatus shown in FIGURE 58, but with the switch actuating end of the link in a different position;

FIGURE 60 is a sectional view taken along the line 60—60 of FIGURE 58;

FIGURE 61 is an exploded perspective view of one of the switches actuated by the links shown in FIGURE 57;

FIGURE 62 is a front elevational view of the recording or perforator unit;

FIGURE 63 is a top plan view of the recording unit shown in FIGURE 62 with parts removed for clarity;

FIGURE 64 is a bottom view of the perforator taken along line 64—64 of FIGURE 62;

FIGURE 65 is a perspective view of the Program Selector;

FIGURE 66 is a front elevational view of the Program Selector;

FIGURE 67 is a sectional view taken along the line 67—67 of FIGURE 66;

FIGURE 68 is a view looking in the direction of the arrows on line 68—68 of FIGURE 67 and with parts broken away;

FIGURE 69 is a sectional view taken along the line 69—69 of FIGURE 67 with the view turned 90° in a counterclockwise direction;

FIGURE 70 is a fragmentary sectional view taken along line 70—70 of FIGURE 67;

FIGURE 71 is a sectional view taken along line 71—71 of FIGURE 69;

FIGURE 72 is a sectional view taken along line 72—72 of FIGURE 69;

FIGURE 73 (see sheet on which FIGURE 65 appears) is an exploded perspective view of certain operating elements of the Program Selector;

FIGURE 74 is a schematic of the electrical circuit of the Program Selector;

FIGURE 75 is an elevational view of a printed circuit panel typical of those used in the Program Selector;

FIGURE 75A is an elevational view of another printed circuit panel;

FIGURE 76 is a view looking in the direction of the arrows on line 76—76 of FIGURE 69;

FIGURE 77 is a fragmentary plan view of the contactor elements operatively associated with the panel shown in FIGURE 75;

FIGURE 78 is a view taken along line 78—78 of FIGURE 77;

FIGURE 79 is a perspective view of the Stepper Switch;

FIGURE 80 is an end elevational view of the Stepper Switch;

FIGURE 81 is a fragmentary sectional view taken along line 81—81 of FIGURE 80;

FIGURE 82 is an enlarged fragmentary sectional view of the contact wiper elements shown in FIGURE 81;

FIGURE 83 is a sectional view taken along line 83—83 of FIGURE 81, and showing a typical printed circuit panel;

FIGURE 83A is a sectional view taken along 83A—83A of FIGURE 81;

FIGURE 84 is an elevational view of the Drive and Timing mechanism taken along the line 84—84 of FIGURE 62;

FIGURE 85 is a sectional view taken along line 85—85 of FIGURE 84;

FIGURE 86 is a sectional view taken along line 86—86 of FIGURE 84;

FIGURE 87 is a sectional view taken along line 87—87 of FIGURE 86;

FIGURE 88 is a top plan view of the Drive and Timing mechanism looking in the direction of the arrows on 88—88 of FIGURE 84;

FIGURE 89 is a sectional view taken along line 89—89 of FIGURE 88;

FIGURE 90 is a sectional view taken along line 90—90 of FIGURE 89;

FIGURE 91 is a sectional view taken along line 91—91 of FIGURE 89;

FIGURE 92 is a sectional view taken along line 92—92 of FIGURE 91;

FIGURE 93 is a sectional view taken along line 93—93 of FIGURE 89;

FIGURE 94 is a sectional view taken along line 94—94 of FIGURE 89;

FIGURE 95 illustrates the clutch timing cam positions;

FIGURE 96 is an elevational view with parts broken away, illustrating a typical clutch latch for the Drive and Timing mechanism;

FIGURE 97 is a sectional view taken along line 97—97 of FIGURE 96;

FIGURE 98 is a top plan view of the mechanism shown in FIGURE 96 and looking in the direction of the arrows on line 98—98 thereof;

FIGURE 99 is a fragmentary view of the clutch operating means;

FIGURE 100 is a fragmentary sectional view showing the solenoid clapper "latch and release" of the device shown in FIGURE 96;

FIGURE 101 is a fragmentary view illustrating an operational phase of the clutch latch mechanism;

FIGURE 102 is another fragmentary view showing a further operational phase of the clutch latch mechanism;

FIGURE 103 is a perspective view with parts broken away showing the assembly of the clutch latch mechanism.

Figure 112:
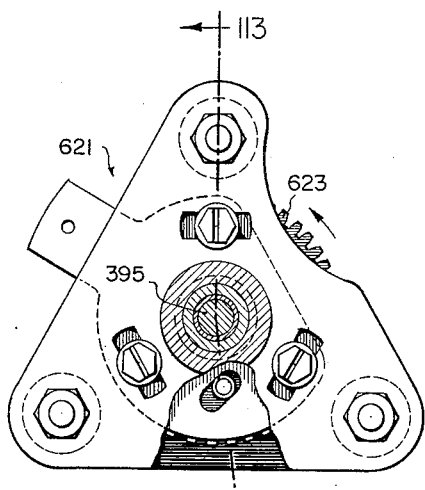
Figure 114:
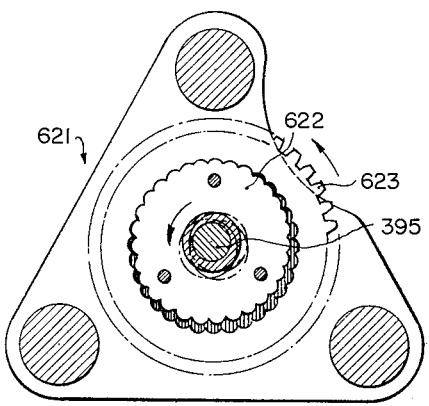
Figure 113:
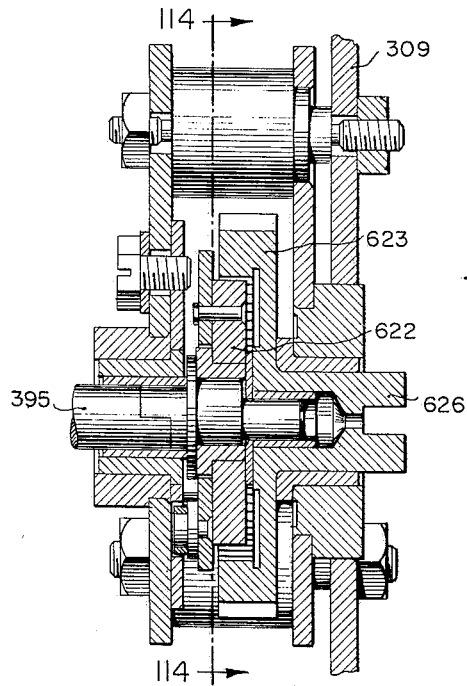
Figure 116:
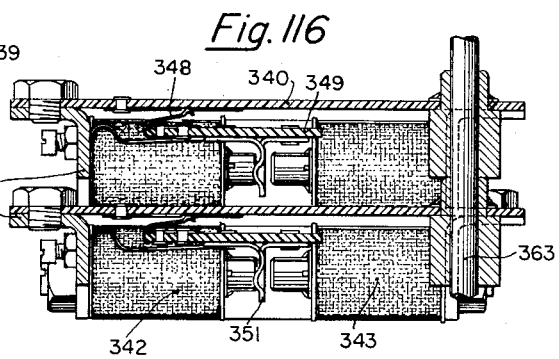
Figure 115:
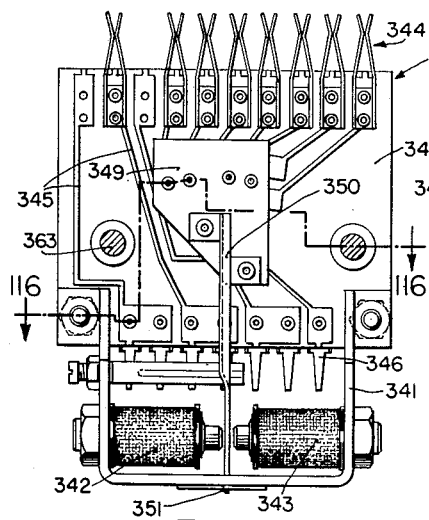
Figure 119:
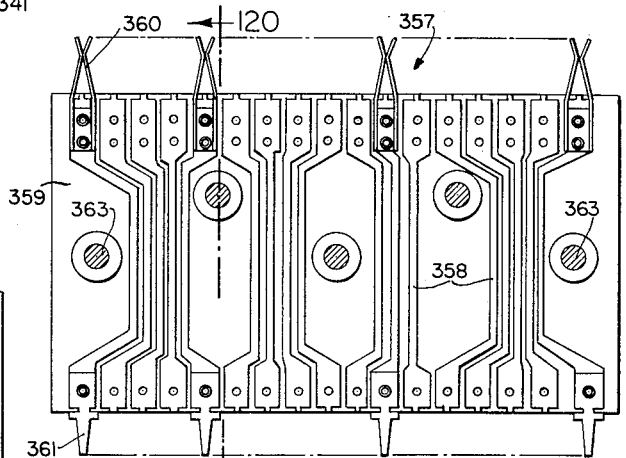
Figure 117:
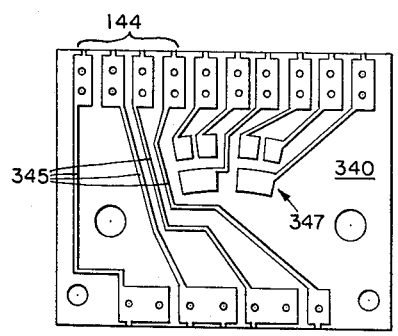
Figure 120:
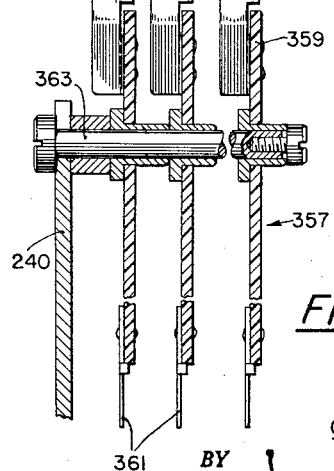
Figure 118:
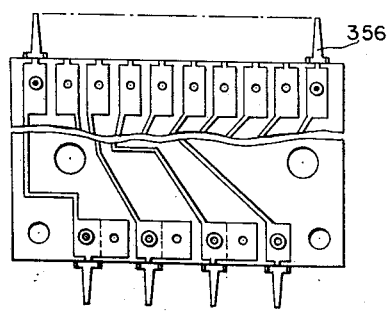
Figure 135:
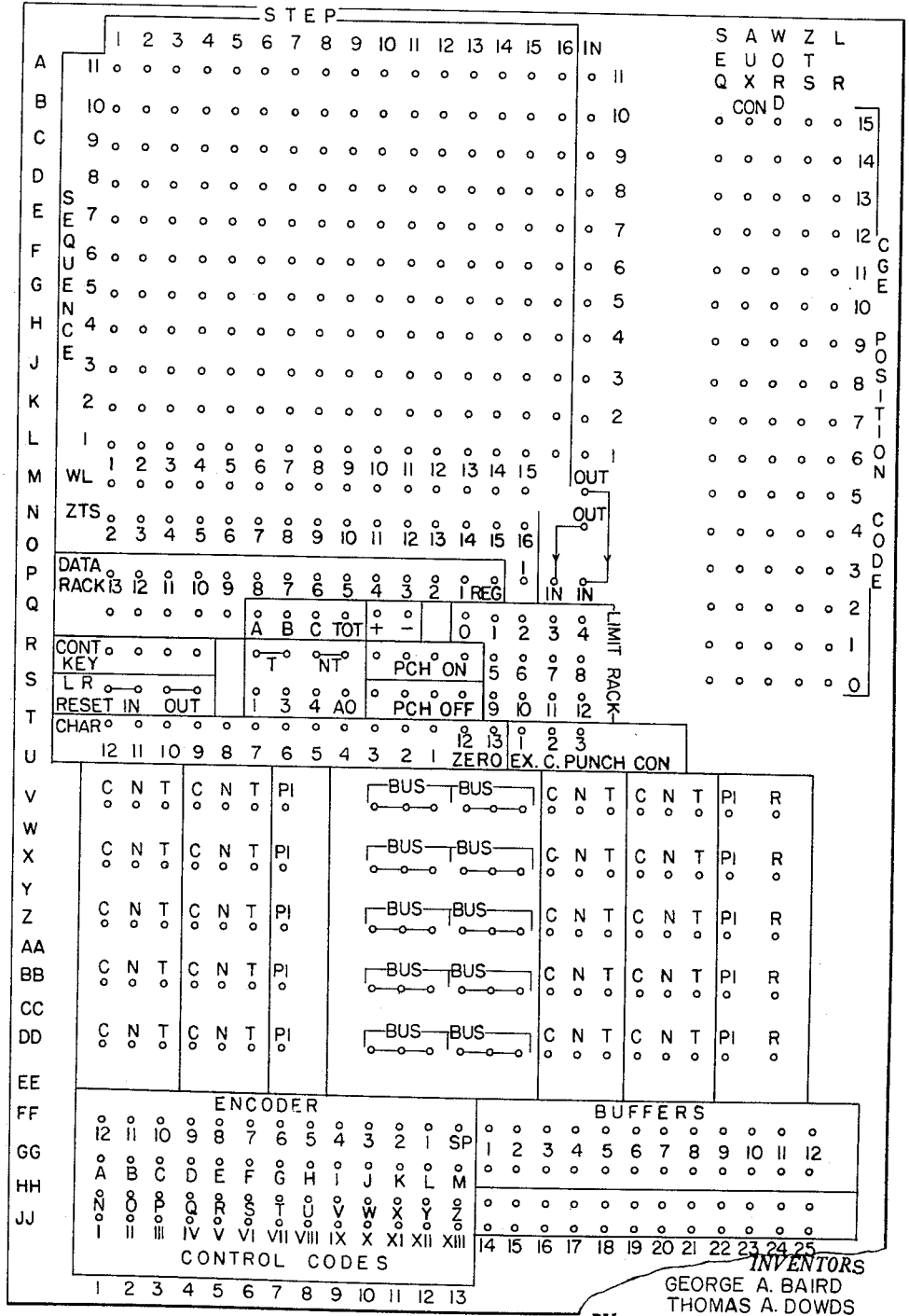
Figure 137:
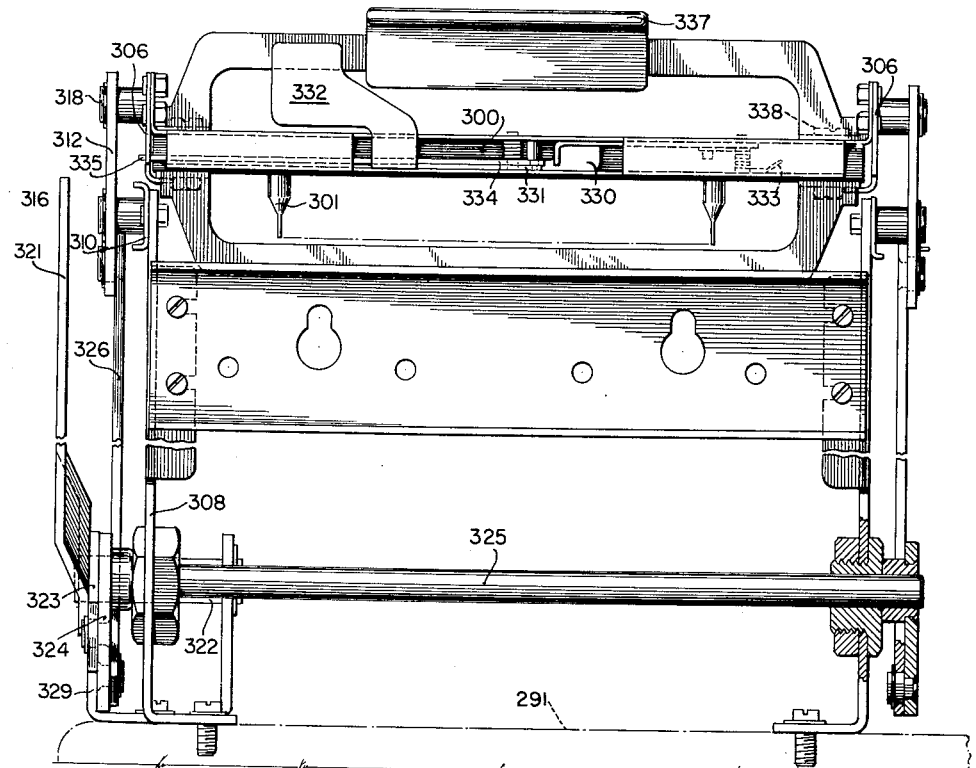
Figure 136:
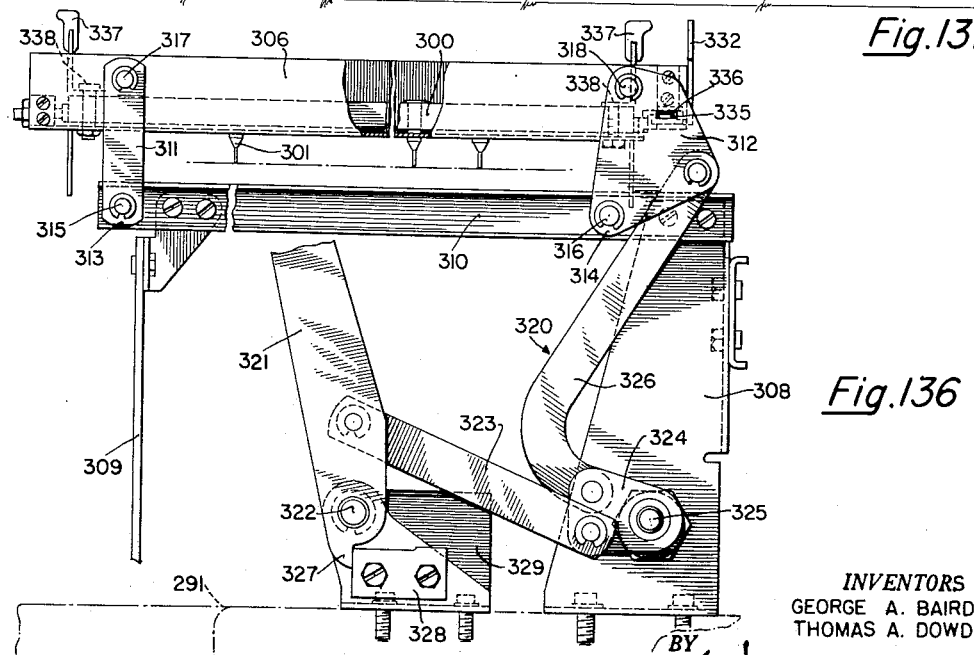
Figure 141:
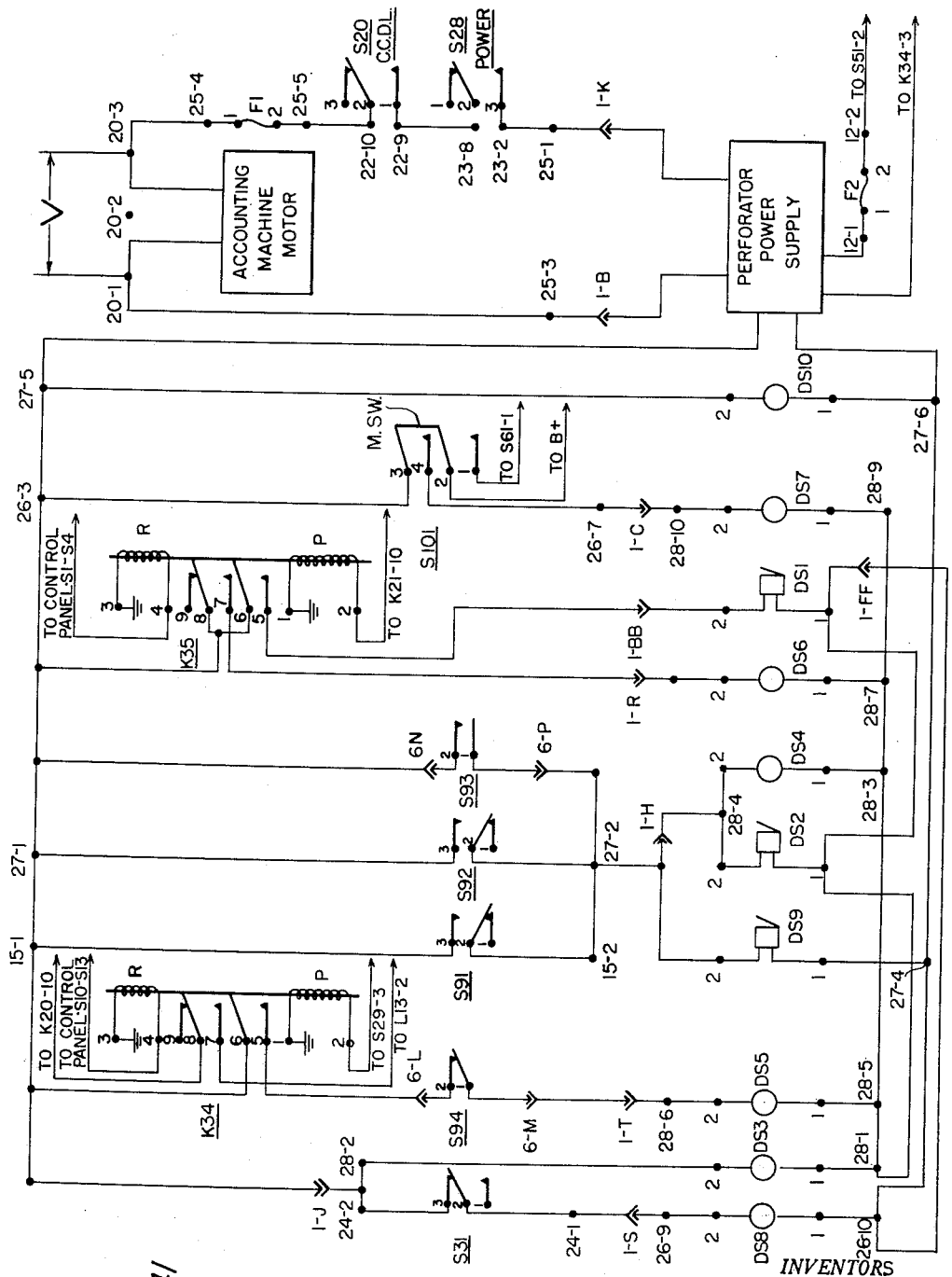
Figure 142:
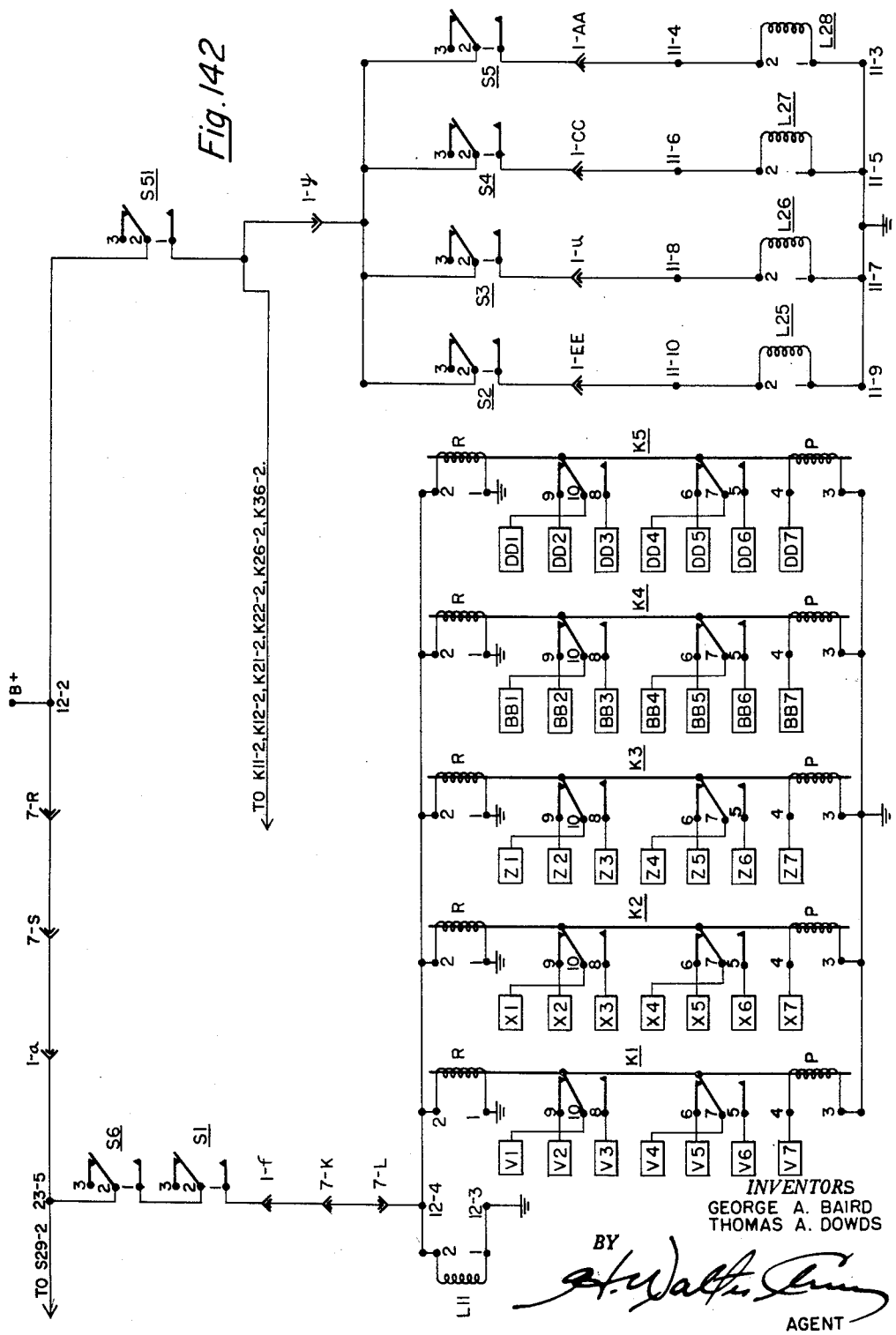
Figure 143:
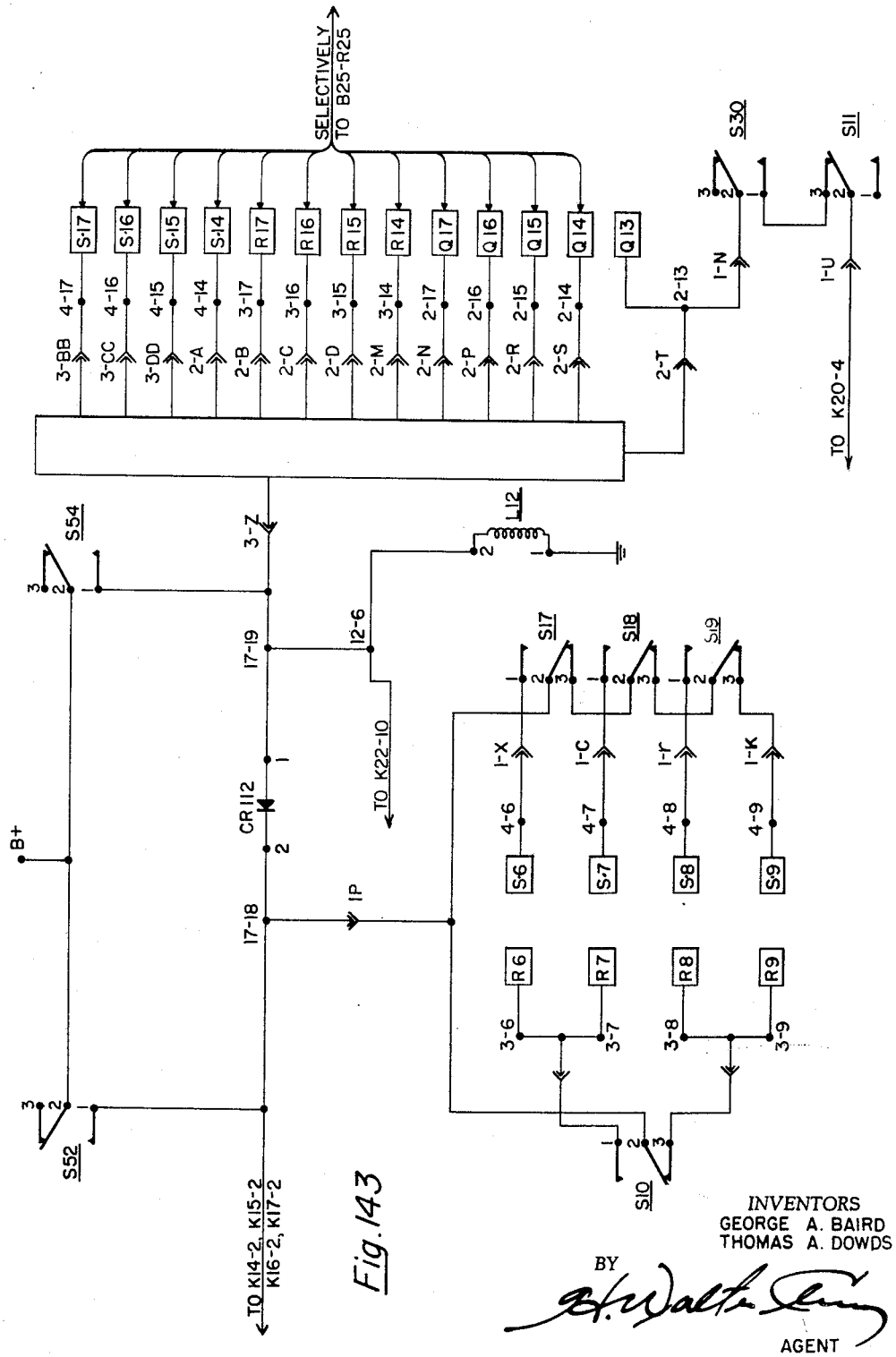
Figure 145:
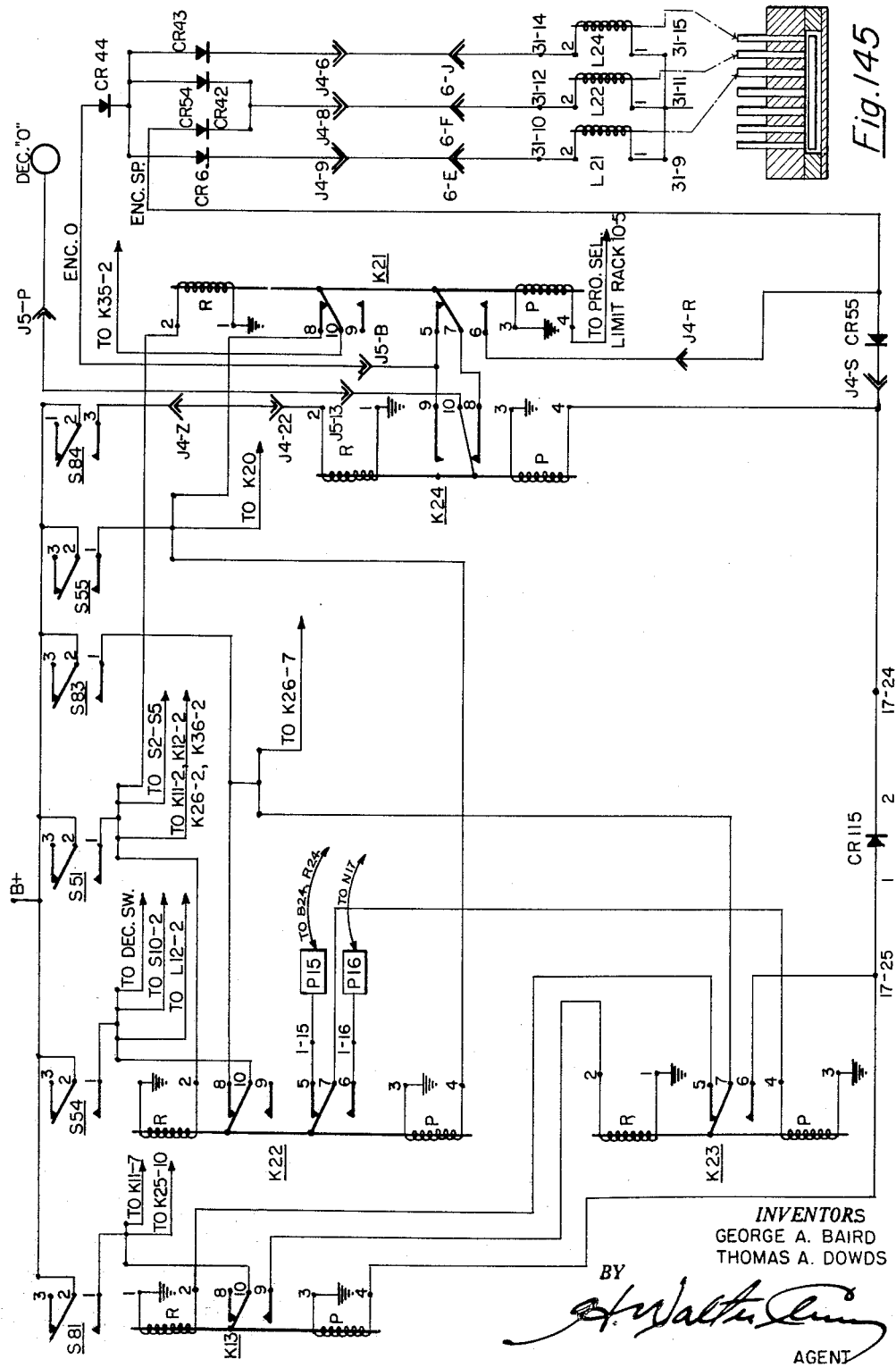
Figure 146:
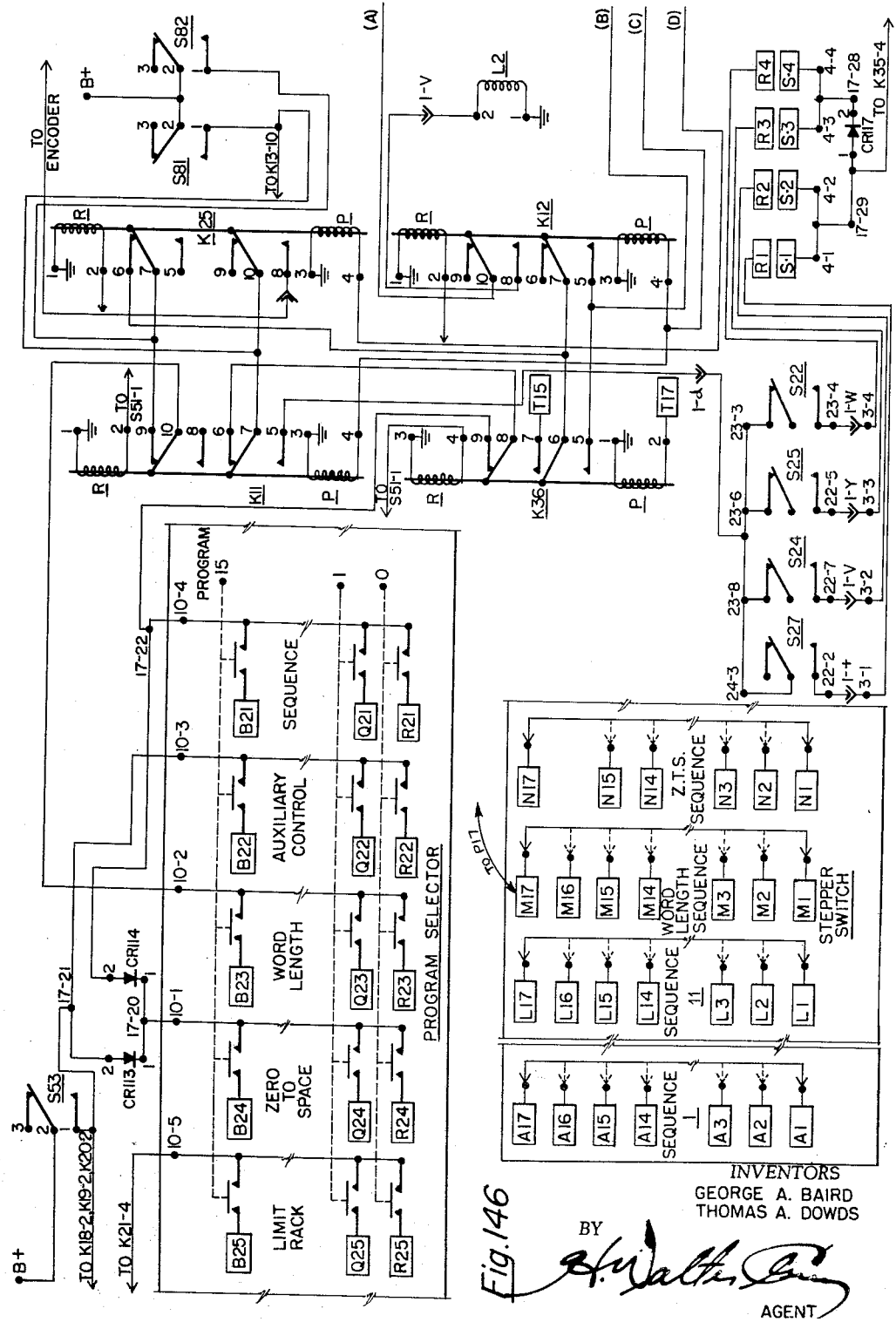
Figure 147:
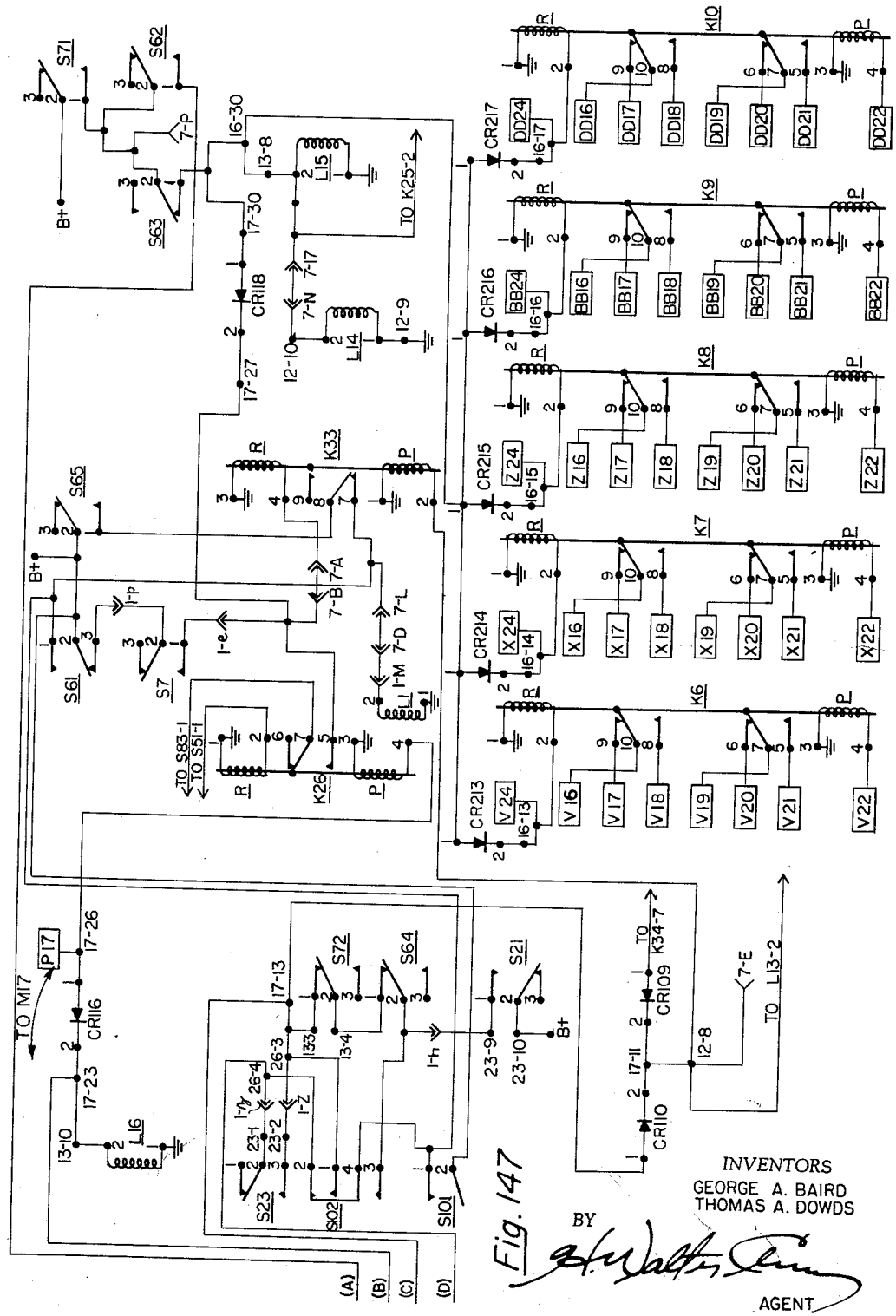

FIGURE 104 is an exploded perspective view of the Program Selector clutch;

FIGURES 105 and 106 illustrate the opposing engaging faces of the Program Selector clutch shown in FIGURE 104;

FIGURE 107 is an exploded perspective view of the Stepper Switch clutch;

FIGURE 108 is a sectional view showing one of the clutch faces of the Stepper Switch clutch;

FIGURE 109 is a fragmentary perspective view of the end face of each of the clutch mechanisms when looking from the right hand side of FIGURES 104 and 107 and 110;

FIGURE 110 is an exploded perspective view of the Punch clutch;

FIGURE 111 is sectional views showing the various clutch faces of the Punch clutch;

FIGURE 112 is an end elevational view partly in section and with parts broken away of a wabble gear mechanism for operating the Stepper Switch one step for each rotation of the wabble gear;

FIGURE 113 is a sectional view taken along line 113—113 of FIGURE 112;

FIGURE 114 is a sectional view taken along line 114—114 of FIGURE 113;

FIGURE 115 is an elevational view of a control board relay taken along line 115—115 of FIGURE 63;

FIGURE 116 is a sectional view taken along line 116—116 of FIGURE 115;

FIGURE 117 is an elevational view of a printed circuit panel forming a component of the control board relay shown in FIGURE 115;

FIGURE 118 is a fragmentary elevational view of a printed circuit panel similar to that shown in FIGURE 117, used in control panel relays similar to that shown in FIGURE 115, but including fixed connector prongs instead of releasable connectors;

FIGURE 119 is a sectional view of printed wiring terminal boards taken along line 119—119 of FIGURE 63;

FIGURE 120 is a sectional view taken along line 120—120 of FIGURE 119;

FIGURE 121 is a sectional view showing in elevation a printed wiring panel used in the incoder buffers and taken along line 121—121 of FIGURE 63;

FIGURE 122 is a sectional view taken along line 122—122 of FIGURE 121;

FIGURE 123 is a sectional view taken along line 123—123 shown in two places on FIGURE 64 and illustrating a typical latching relay;

FIGURE 124 is a sectional view taken along line 124—124 of FIGURE 123;

FIGURE 125 is a sectional view taken along line 125—125 of FIGURE 63 and showing a rectifier panel;

FIGURE 126 is a view taken along line 125—125 of FIGURE 62 and illustrating one form of tape feed mechanism;

FIGURE 127 is a fragmentary view of a tape which may conveniently be used in this apparatus;

FIGURE 128 is a fragmentary view showing a signaling mechanism to indicate a broken tape, and also showing a take-up reel for the tape;

FIGURE 129 showing the signaling apparatus of FIGURE 128 in position to indicate a broken tape;

FIGURE 130 is a fragmentary view taken along line 130—130 of FIGURE 62 illustrating a signaling device to indicate when the tape supply reel is exhausted;

FIGURE 131 is a view taken along line 131—131 of FIGURE 130 and indicating the two terminal positions of the signaling device;

FIGURE 132 is a fragmentary elevational view of a portion of the tape feeding apparatus;

FIGURE 133 is a perspective view of the incoder panel with parts broken away to simplify the illustration;

FIGURE 134 is a vertical section taken through the panel illustrated in FIGURE 133;

FIGURE 135 is a plan view of the control board or panel;

FIGURE 136 is a fragmentary front elevational view of the recorder apparatus and illustrating the mounting means for the control board;

FIGURE 137 is an end elevational view looking from the right hand side of FIGURE 62, with parts removed for clarity of illustration;

FIGURES 138 and 139 illustrate the latching mechanism and its two conditions for latching and unlatching the control panel relative to the recorder apparatus;

FIGURE 140 is a diagrammatic illustration of a control panel pin moving into engagement with contact clips on the recorder apparatus;

FIGURE 141 is a diagram of the circuit for Starting and Signaling;

FIGURE 142 is a diagram of the circuit for Starting the Perforator and Selecting a Program;

FIGURE 143 is a diagram of the circuit for the Bail and Motor Bar Switches and the Blank Keyboard and Limit Rack;

FIGURE 144 is a diagram of the circuit for the Function Control and No Character keys;

FIGURE 145 is a diagram of the circuit for the Zero to Space function;

FIGURES 146 and 147 are diagrams of the co-ordinator circuit of the apparatus.

In general the instant invention comprises apparatus for producing a tape record as an automatic output of an accounting operation in addition to the usual printed record afforded by an accounting machine. Information from the accounting machine is encoded and recorded on the tape which can be used for various purposes, such as to prepare punched cards automatically on a tape-to-card converter, or to transmit data over teletype circuits.

The hereinafter described apparatus, illustrating a preferred embodiment of the invention, includes two basic components, an accounting machine which may be of the type set forth in Patent Number 2,629,549, issued to T. M. Butler, on February 24, 1953, for an Automatic Function Control Mechanism for Accounting Machines, and a tape perforator.

The perforator unit may be incorporated in the accounting machine or located remotely therefrom, but is entirely controlled from the keyboard of the latter. When an accounting machine cycle is initiated by depression of a motor bar, a corresponding punch cycle can be automatically initiated. As determined by the wiring of a perforator control board, information in the accounting machine is scanned, encoded, and punched into the tape. Only when physically handling the tape, changing the control board, or emptying the chad box is it necessary to handle the perforator equipment.

The apparatus is prepared for operation by inserting a selected control panel into the carriage of the accounting machine and by plugging a corresponding control board into the perforator equipment. The "Power on" and "Punch on" keys on the keyboard of the accounting machine are depressed and the system is ready to operate. Actuation of these keys also will energize signal lights indicating these conditions.

Accounting machine operations can proceed as usual with no attention to the perforator. Although the information in the accounting machine is represented by the position of racks, gears and keys, it is automatically translated into electrical signals for use by the perforator. When the accounting machine carriage arrives at a position where a group of characters is to be punched, signals are sent from the control panel switches of the accounting machine to a perforator program selector. Here the signals are decoded, a program selected, and the information transmitted to the control board. When one of the motor bars is depressed, another signal is sent to the control board to initiate a punching cycle. A clutch engages, causing the stepper switch to rotate. Each of the stepper switch contacts can be associated with an add-rack by connection to a corresponding switch in a read-out bank. A signal representing the data in the accounting machine travels from the rack, via the read-out and stepper switches, and through the control board to an encoder where it is encoded. It is then transmitted to the punch unit and punched into the tape. As the stepper switch rotates, information in selected racks can be read, encoded and punched. As many as sixteen characters can be punched into the tape during each accounting machine cycle, the exact number being controlled by the control board wiring.

At the end of a day or a particular problem, the perforator can be turned off automatically as an additional function of clearing the accounting machine accumulators. The "Punch on" light will extinguish at this time. The machine can be completely shut down by depressing the "Power on" key at which time the "Power on" light will extinguish.

Figure 1:
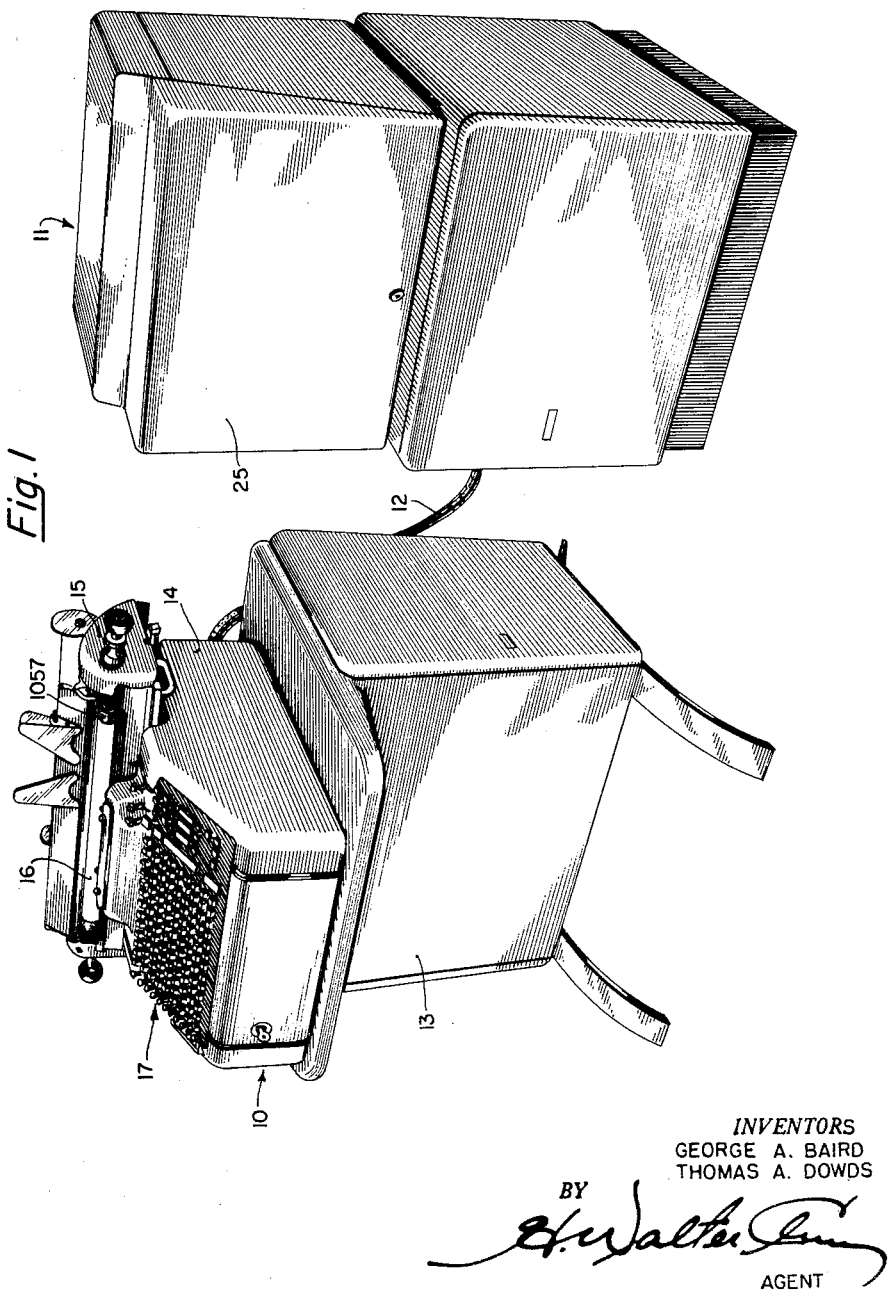
FIGURE 1 is a perspective view showing a combined printing type accounting or calculating machine and its associated recording apparatus constructed in accordance with the present invention.
Figure 2:
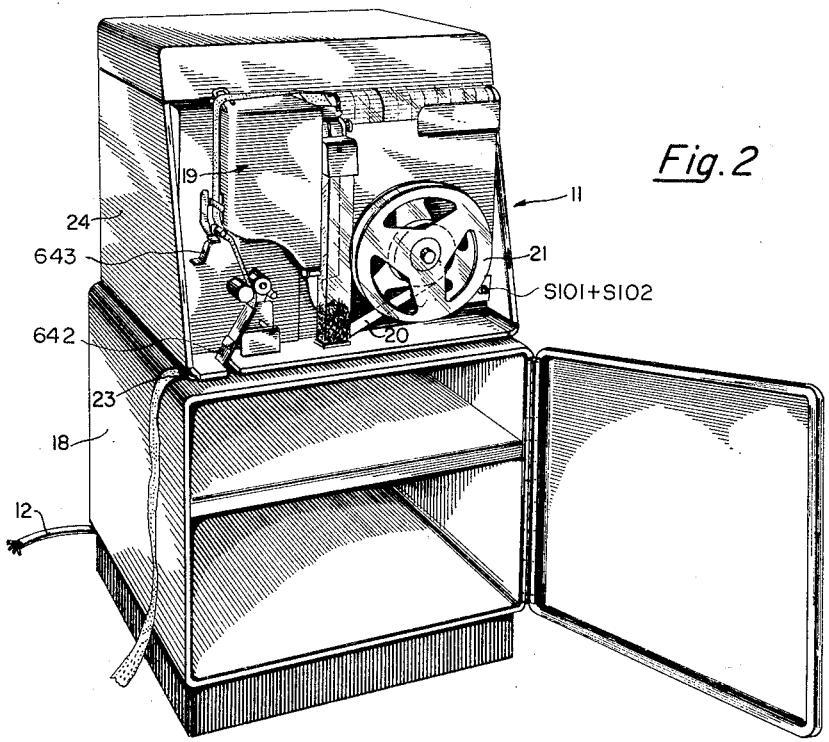
FIGURE 2 is a perspective view of the recording apparatus with its front cover removed, thus to more clearly show certain of its components.

More specifically, the illustrated embodiment of the invention as exemplified in FIGURES 1 and 2, comprises, in general two basic components, an input calculating or accounting unit 10, and a recorder output unit 11. As shown these units are bodily separated from one another but connected by a cable 12. It is evident that these units may be positioned quite remote from one another, such as on separate floors of a building, or even in separate buildings. The invention, however, comprehends the possibility that they might be incorporated in a single machine, and it should be understood that the appended claims are intended to cover such constructions.

The machine 10 may be supported on any suitable structure such as that identified at 13 and comprises in general, an accounting machine of the type disclosed in the aforesaid Butler patent. For the purposes of the present invention, however, the Butler machine has been modified to convert the positions of certain mechanical members therein into electrical signals which are conveyed by cable 12 to the output unit 11. While unit 11 is herein disclosed as a tape perforator associated with certain controlling devices which decode signals transmitted from input unit 10, it is understood that other types of marking means may be employed for indicating the output of the machine.

The accounting machine 10, in general comprises a fixed base member 14 upon which is mounted a movable carriage 15 having a platen 1057, upon which a recording member 16 may be rolled to receive printed impressions. The base unit of the machine carries a keyboard 17, the keys of which are depressible to insert information into the machine.

Figure 3:
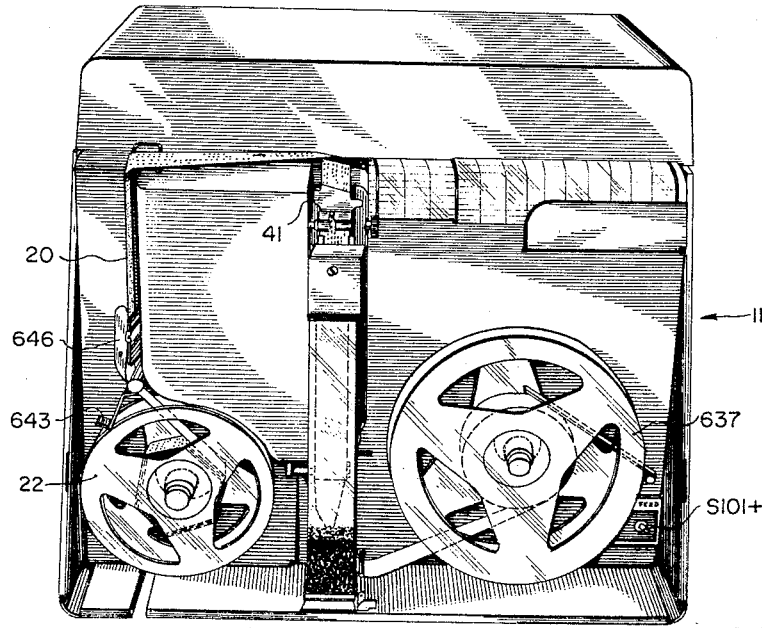
FIGURE 3 is a perspective view of a modified form of recording device.

The output machine which, as shown in FIGURES 2 and 3, is supported on a storage cabinet 18, includes a tape perforator generally indicated at 19 through which a tape 20 to be punched or otherwise marked, is fed. The tape is fed from a supply reel 21 to the perforator and then to either a storage take off reel 22 as shown in FIGURE 3, or through an opening 23 in the side wall 24 of the unit to the outside thereof, as shown in FIGURE 2, and to other associated equipment such as a card punch, not shown. The tape perforator unit may have its front enclosed by a cover member 25, see FIGURE 1, which may be used even during the operation of the machine.

The keyboard 17, generally is like that shown in the aforesaid Butler patent and comprises a main central area of depressible indexing keys 26. On the left hand side of the key board a series of signal lights 27 are provided for indicating different operating conditions or malfunctions of the apparatus. On the right hand side there is provided the usual columns of depressible operational keys 28 for cycling the machine and a column 29 which is in addition to the keyboard of the Butler patent. The different keys in this column will be referred to in more detail hereinafter.

Figure 5:
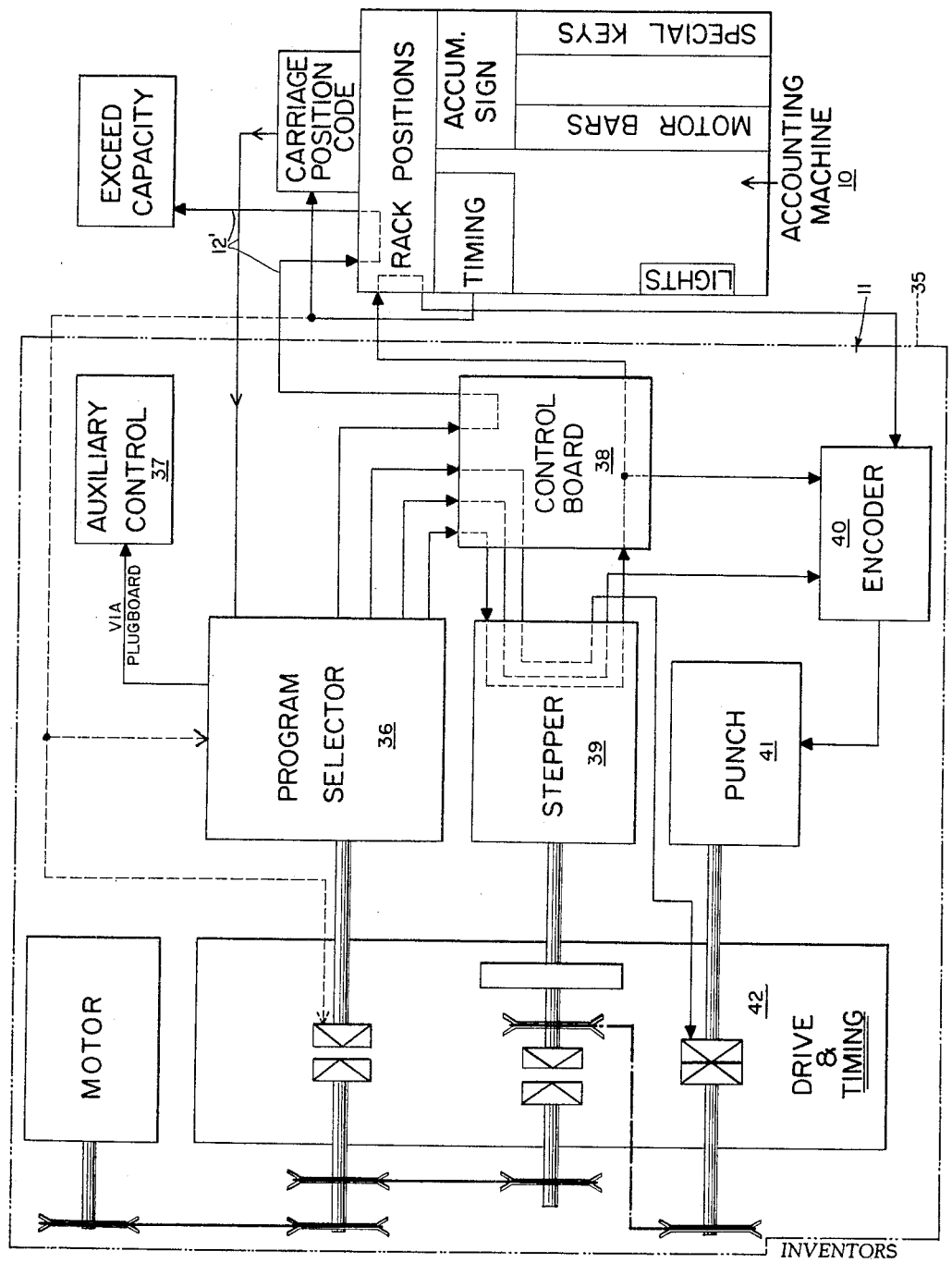
FIGURE 5 is a flow or system diagram.

FIGURE 5 illustrates a schematic flow or system diagram of the apparatus as a whole. The accounting machine unit 10, is shown at the right and includes the major functional components as indicated by legend thereon.

The various components of tape punch 11, indicated generally in this figure by the broken line 35, are connected to machine 10 by cable 12, as seen in FIGURE 1, and as indicated in this figure by lines 12. The tape perforator unit comprises the following apparatus: program selector 36; auxiliary control 37; plugboard 38; stepper 39; encoder 40; punch 41; and drive and timing unit 42, the latter including a motor and various clutches, more fully described hereinafter.

*Accounting Machine*

In order to fully comprehend the significant features of the present invention it is necessary to understand, to at least a limited extent, the apparatus disclosed in Patent Number 2,629,549, which issued to T. M. Butler on February 24, 1953 for an Automatic Function Control Mechanism for Accounting Machines. In order to expedite cross-referencing, the reference numerals employed in the instant disclosure will, to the extent that it is practical, be identical to those designating similar elements in the above identified patent.

In the illustrated embodiment of the invention, and referring more particularly to FIGURE 7, the accounting machine 10 includes a plurality of vertically extending printing or type bars 562 and an equal number of actuator racks 511, all of which lie in planes parallel to that of the drawing. The actuator racks are slidably supported for reciprocatory movements forwardly and rearwardly (right and left as illustrated in this figure) by two rods 514 which extend transversely across the machine and have their ends fixed to side plates, indicated in broken lines at 50 and 51 in FIGURE 8.

The print bars carry at their upper ends a plurality of type slugs 561 which are movable transversely of the bars. To the left of the bars, and pivoted about a shaft 606 are hammers 605, each associated with an individual one of the print bars, and which upon striking an aligned slug in its print bar will cause the latter to leave an impression upon recording medium 16A (FIGURE 1) interposed between the slugs and platen 1057.

Hereinafter, the description will concern itself with only a single print set comprising a print bar, actuator rack, hammer, and related elements, it being understood that the description is equally applicable to the additional print sets, each of which is substantially identical to the one described.

At its lower end, the bar 562 has a series of rack teeth 52 which engage gear 566 in mesh with teeth 53 formed on the lower edge of a plate 523. The plate is mounted on a horizontally extending actuator rack 511 by means of a pair of elongated slots (not shown) on the plate, and mating studs (not shown) on the rack, in order to permit a limited amount of relative movement therebetween. The plate carries a stud 524 on which is pivotally mounted a coupling pawl 525 having in its right end portion a cam slot 526 in which engages a stud 527 fixed to actuator rack 511. Forwardly of cam slot 526 coupling pawl 525 has a slot 528 having a vertical portion behind a shoulder 529 on pawl 525. A tension spring (not shown) is normally connected between rack 511 and its plate 523 to hold the plate at the rearward limit of its possible relative movement with respect to the rack. In this position, stud 527 of the rack is in the upper forward portion of cam slot 526 compelling the pawl to assume a lowered position with respect to the rack.

While the parts are in the above described normal position with the machine at rest, a bail rod 531 extending transversely across the machine is engaged in the vertical portion of slot 528 and between the rearwardly facing shoulder 529 of the pawl and a small concavity in the forward face of a shoulder 532 on the upper edge of the actuator rack. The rack is urged forwardly by a tension spring (not shown) which tends to hold shoulder 532 of the rack in engagement with bail rod 531.

When the bail rod is drawn forwardly by means not herein disclosed, but fully discussed in the above-identified patent to Butler, the actuator rack moves therewith because of the action of the above mentioned tension spring until said rack is positively stopped. After rack 511 has stopped, bail rod 531 acts against the shoulder 529 on pawl 525 and moves the latter, and thus also plate 523, which is rotatably connected to the pawl by stud 524, further forwardly relative to the arrested rack 511. It may be recalled that the plate is slidably mounted on the rack by means of elongated slots and studs. The tension spring, which normally holds the plate in its extreme rearward position with respect to the rack, yields during the above mentioned relative movement.

During the forward movement of the plate relative to the arrested actuator rack 511, stud 527 on the rack shifts into the rearward lower portion of the cam slot 526 in the pawl 525, thus raising the rearward end of the pawl and moving the shoulder 529 substantially above the center of the bail rod 531. By this raising of the rearward end of the pawl 525, a stud 547 on the extreme rearward end thereof is elevated into one of a series of notches in comb plate 549.

During the continued forward movement of the bail toward its forward limit, the bail acts on the edge of shoulder 529 to cam the rear end of pawl 525 still further upward to engage stud 547 higher in the selected notch in plate 549, and to engage the stud 527 in the vertical rear end portion (not shown) of the cam slot 526. Accordingly, as bail 531 moves under shoulder 529 into the horizontal portion of slot 528, stud 527 in the vertical portion of slot 526 positively locks the actuator to the pawl 525 and the plate 523.

In each machine cycle in which the actuator rack 511 is moved forwardly, the corresponding print bar 562 is raised by means of gear 566 to position the appropriate type slug 561 thereon at the printing line in front of platen 1057. As was previously described, bail 531 causes the coupling pawl 525 and connected rack plate 523 to move forwardly a predetermined short distance after the associated actuator rack 511 has been arrested, and similarly causes a corresponding short forward movement of the coupling pawl 525 and rack plate 523 when the actuator rack is held immobile in its normal position during a machine cycle. Consequently, the print bar 562 will be elevated a predetermined short distance in addition to a distance proportional to the amount of movement, if any, permitted the corresponding actuator rack 511 during any machine cycle. This predetermined short distance which the type bar is elevated beyond the distance proportional to the amount of movement permitted the corresponding actuator rack is equal to the distance between the printed line and the uppermost type position on each print bar 562 when the latter is in its normal retracted position. Due to the provision of this incremental retraction of the print bars below the print line, the line is clearly visible before and after each machine cycle. In a machine cycle in which an actuator rack 511 is not moved forward, the associated print bar will still be elevated to bring the uppermost type position thereon to the printing line.

At a point in the machine cycle subsequent to the termination of forward movement of all the actuator racks and the upward movement of their associated print bars, the hammers 605 are caused, in a manner fully described in the above identified patent to Butler, to rotate in a clockwise manner about shaft 606 to drive the selectively aligned slugs of type 561 rearwardly into the recording medium 16 interposed between them and the platen. It is in this manner that the desired numerals or symbols are impressed upon the recording medium.

Slide 483 has on its upper edge a series of upwardly projecting stops 484 including one such stop for each key 26 in the column. The stops co-operate with the lower ends of the stems 327 of the respective keys 26, and are spaced apart along the top of the slide at distances greater than the distance between the stems of adjacent keys in the respective key column so that in the normal positions of the parts with the machine at rest, the distance between the several stops 484 and the stems of the respective keys with which they co-operate, increase progressively from the rear to the front and the amount of movement of each slide 483 required to bring a stop 484 into engagement with the stem of the depressed key in the respective key column decreases as the value of the numeral assigned to the depressed key increases.

Each differential stop slide 483 carries a stud 489 engaged in a slot in an arm 490 of a differential stop sector 491. The stop sector 491 is lockably supported on a shaft 496, which is supported at its opposite ends in the side plates 50 and 51 of the machine frame. Upon initiation of a machine cycle, the differential stop sector 491 is rocked in a clockwise direction from its normal position. If a key 255 is in the depressed position, the lower end of its stem 327 will be engaged by the corresponding stop 484 on the slide 483, to arrest the slide and the connected sector 491 in a differential position appropriate to the particular key which is depressed, in the present instance, the third key from the right, or the "seven" key.

The stop sector 491 has a series of spaced stop shoulders 509 adapted to co-operate with a lateral lug 510 on the associated actuator rack 511. Each stop sector 491 has ten stop shoulders 509 which are spaced at uniformly increasing distances from the axis of shaft 496, the one nearest the shaft brought into the path of the lug 510 of the associated actuator 511 when the associated stop slide 483 moves to its maximum stroke while no key is depressed in the associated column of keys 255. The stops 509 which are successively farther from the axis of the shaft 496, are positioned in the path of the lug 510, when the strokes of the stop slides 483 are limited by the stem of the "1" to "9" keys, respectively, in the associated key column and each permits movement of the actuator 511 to an extent exactly proportional to the digital value of the depressed key. Stopping the actuator rack 511 as described above automatically places the selected digit printing lug 561 into position for printing.

After the printing operation takes place, the bail 531 is restored to its normal rearward position by means fully disclosed in the Butler patent.

*Read-Out Unit*

In order to cause the information which has been indexed into the actuator racks of the machine to be made available for use externally of the accounting machine, a read-out unit is provided for producing an electrical signal which is a counterpart and indicative of a mechanical rack position. This operation must be rapid and accurate. A relatively simple and efficient means for producing this output utilizing the existing indexing elements within the machine will now be described.

Figure 10:
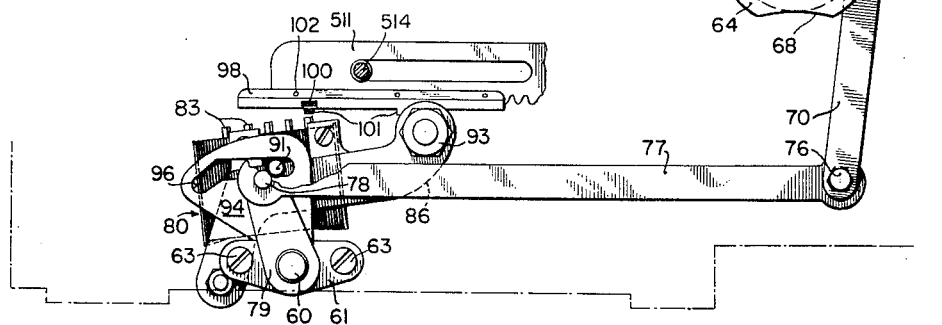
FIGURE 10 is a fragmentary view looking in the direction of the arrows on line 10—10 of FIGURE 8, but additionally showing cam means for actuating the mechanism and with the switch bank in inoperative relationship with the racks.
Figure 11:
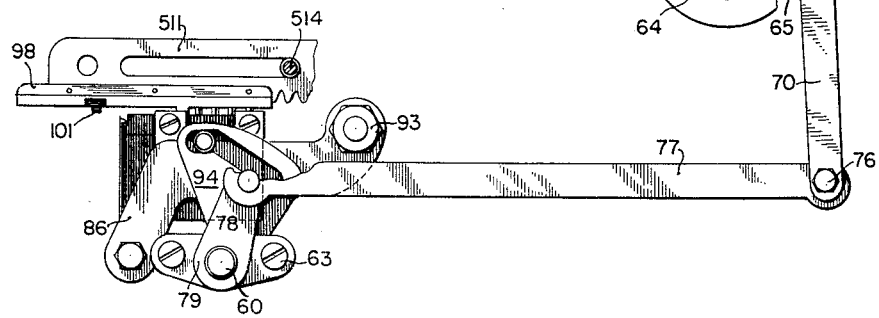
FIGURE 11 is a view similar to FIGURE 10, but showing the switch banks in operative association with the racks.

The operating linkages which provide power take-off means from the main cam shaft 126 of the accounting machine to the switch bank and coded slides of the read-out unit are illustrated in FIGURES 7, 10, and 11, and form the subject matter of a co-pending application Serial Number 492,232 filed March 4, 1955, in the names of Deighton, Du Gan, Margraf, and Stromback and entitled "Data Storage, Read-Out and Transfer Apparatus," now Patent No. 2,914,759.

It can be seen that the complete read-out assembly is adapted to be contained within the housing of the accounting machine which is shown in phantom in FIGURE 7. The read-out unit is generally located in the rearward portion of the machine and no additional extensions of actuator racks 511 are therefore necessary.

In FIGURES 8, 10, and 11, there is shown a shaft 60 mounted transversely of the two side frames 50 and 51 and journaled at both ends thereon. Shaft 60 is adapted to extend slightly beyond the side frames and is provided with a separate bearing plate 61 and 62 at opposite ends thereof which are suitably mounted as by bolts 63 to the external surfaces of each of the side frames. The slight extension of shaft 60 beyond the side frame 51 provides sufficient clearance for the additional apparatus which is adapted to be secured on the main cam shaft adjacent the side frame.

A pair of cams 64 and 65 are secured in spaced relation by means of a bushing 66, FIGURE 12, to the main cam shaft 126, for rotation therewith, by any suitable means such as a nut 67 threadingly engaging the end of the shaft. The outermost cam 64 is provided with a concavity 68, see FIGURE 10, while the innermost cam 65 is provided with a protuberance 69.

A cam follower arm 70 of generally L-shaped configuration is pivotally mounted by means of stud 71 to the side frame of the machine. An upper cam follower roller 72 and a lower roller 73 are separately rotatably mounted to the follower arm by means of pins 74 and 75 respectively.

Cam roller 73 is adapted to be engaged by the protuberance 69 on cam 65, while the roller 72 is caused to follow the concave contour of the cutout 68 on cam 64. Cam arm 70 is thus adapted to rock about its pivotal axis upon rotation of cam shaft 126. The longer or depending end of the follower arm has mounted thereto by means of pivot 76 an elongated link or drive arm 77. The link is horizontally oscillatably pivoted at 78 to a vertically projecting crank arm 79, the ends of link 77 and crank 79 being partly broken away to show mechanism normally hidden behind it. The crank arm is mounted for rocking motion about the shaft 60.

Figure 9:
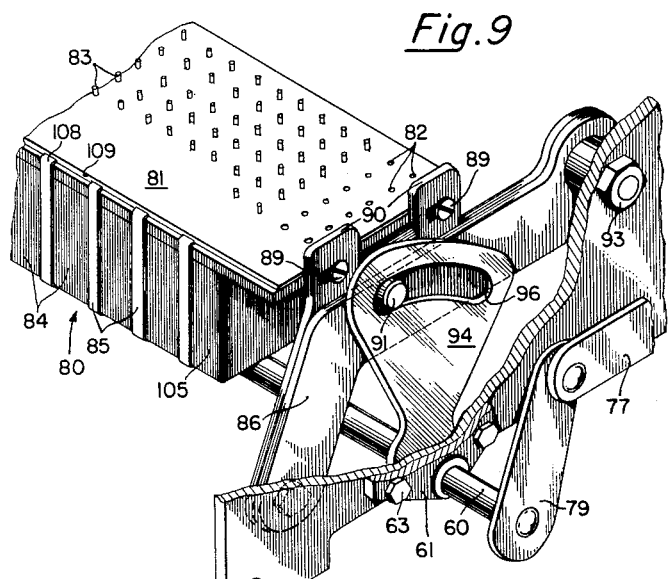
FIGURE 9 is a fragmentary perspective view showing the bank of read-out switches, and also its operational linkage.

A bank of read-out switches 80, as seen in FIGURE 9, is mounted on a base plate 81 which comprises a relatively rigid elongated flat member extending transversely across the machine. The plate is provided with a series of perforations or apertures 82 (FIGURE 16) corresponding in physical position to, and receiving the operating plungers 83 of the switches 84 secured thereto, thus to guide the pins during movement thereof.

Base plate 81 to which the switches are flexibly secured by means of straps 85 is rigidly supported between two arms 86 and 87 disposed adjacent opposite end portions thereof. The two arms provide means for elevating and lowering the read-out switch bank 80 about its pivotal axis toward and away from the area immediately adjacent actuator racks 511. Each of arms 86 and 87 are substantially S-shaped in configuration, and are secured to base plate 81 by means of bolts 89 which are disposed through slots provided in each one of the pair of upstanding tabs 90 located intermediate the ends of the arms 86 and 89. Separated cam follower rollers 91 and 92, respectively, are rotatably mounted on each arm 86 and 87 between each pair of tabs 90. The upper ends of the arms are pivotally mounted to the side frames by bolts 93 in conventional manner.

Individual segments 94 and 95, provided with integral sloping camming slots 96 and 97, respectively, therein, are rigidly secured to opposite ends of the shaft 60 parallel with and immediately adjacent each of the two arms 86 and 87. Thus segments 94 and 95 are obliged to rock back and forth with the rocking motion of shaft 60. The cam follower rollers 91 and 92 rotatably mounted to each of arms 86 and 87 engaged in the slots of their respective segments and are constrained therein to move in the direction of the slope in response to rocking movement of the segment about its axis.

It can be seen from the foregoing description and from the physical disposition of the switch bank within the machine that actuator racks 511 of the accounting machine are adapted to move over the tops of each one of the multi-unit switch assemblies in the switch bank. In order to provide means for translating the mechanical position of the rack into a desired electrical output it is necessary that each one of the racks be provided with means for the switches to sense so that the switch contacts may be positioned to represent or indicate the rack position.

In the operative embodiment set forth there is illustrated a novel sensing means for accomplishing this objective. This sensing means, as seen in FIGURE 13, comprises a pair of angular coded plates or strips 98 and 99 which may take the form of elongated members provided with two opposite right angle bends therein to form rigid elements having a pair of parallel side portions with a central connecting portion. Along one edge of each strip there is provided a notch 100 and a projection 101 spaced from one another intermediate the ends of the strip. Each rack 511 is provided with a pair of these strips which are secured to the rearwardly extending portion of the rack and attached thereto in any suitable fashion, as by rivets 102. The notch of each of the code strips is disposed opposite the projection of its companion strip.

In order to perform the sensing operation, i.e., set the individual switches in the bank with the positional information indexed from the rack, it is necessary to cam the switch bank into engagement with the coded strips on the bottom edges of the racks. It can be seen that the hereinbefore described linkage provided by the cam follower arm 70 and the elongated drive link 77 pivotally attached to one end thereof, is adapted to be oscillated forwardly and rearwardly (left and right as seen in FIGURES 10 and 11) in response to the rotary motion of main cam shaft 126, the cams 64 and 65, and the follower rollers 72 and 73 respectively, which rotate therearound. Since the slotted segments 94 and 95 are fixed to shaft 60, the rockable motion transmitted to the crank arm 79 by the elongated drive arm will force the cam follower roller 91 to raise the switch bank, since the roller is constrained by the slanting camming slot 96 therein. In this fashion the switch bank can be moved upwardly in an accurate path around the pivot point 93 of the arms disposed at opposite ends thereof.

As seen in FIGURES 16 through 25, switch bank 80 comprises a plurality of the small, compact, three position switches 84. The switches are in sets of two types, decimal and duo-decimal. The decimal sets are used with the ten pitch racks, as seen in FIGURE 7, and the duo-decimal sets are used in connection with thirteen pitch racks, fragmentarily shown in FIGURES 9, 14, 15, and 27. The operating parts of the switches are enclosed and sealed from the accumulation of dirt and other foreign material by a casing 105 which when fabricated in a unitary assembly is, or may be provided with a plurality of individual chambers 106, as shown in FIGURES 20 through 24. The casing is fabricated from electrical insulating material such as a phenolic type plastic. Base plate 81 which also serves as a cover for casing 105, extends across the top of the entire switch bank and is fastened to the latter by flexible snap-on U-shaped clamps 85 which are provided with inwardly bent portions 108 at their opposite ends. These inwardly bent portions are adapted to be received in V-shaped grooves 109 in cover plate 81.

The operating members of the switch include a pair of relatively stationary terminals 110 and 111 intended for connection to terminal boards on the rear of the machine, as shown in FIGURES 28 and 30. The terminals are secured to the bottom side of casing 105 by means of posts 112 and 113 respectively, which extend through the base of the casing. The internal ends of the posts are provided with electrical contact buttons 114 and 115 respectively, of substantially circular cross-section. The contact buttons may be formed of any suitable material such as silver, tungsten, or palladium silver alloy, and are secured to the posts in any suitable manner as by brazing or riveting.

Interposed between buttons 114 and 115 and secured to casing 105 by means of terminal 116 and post 117 similar to those aforementioned, is a supporting cradle generally indicated at 118 and more clearly illustrated in FIGURE 25. This supporting cradle is formed of electrically conductive material with a rectangular base 119 and two pairs of upstanding pedestals or projections 120 and 121 integral with the base. A pivot or fulcrum is formed between each pair of the pedestals by providing a bridging ledge or edge 122 therebetween, which are at a higher level than base 119. A tongue-like contactor 123 of electrically conductive material whose oppositely extending portions form an obtuse angle with one another, is rockably supported by the fulcrums 122 of the pedestal. The central portions of the contactor is provided with a pair of oppositely disposed lateral protuberances 124 the edge portions of which are adapted to abut the inwardly facing surfaces of projections 120 and 121 when the contactor is positioned therebetween. A pair of contact buttons 125 are connected to the underside of the contactor at the opposite extremities thereof. The two contact buttons 125 are capable of engaging the contact buttons 114 and 115 respectively at separate times in response to rocking movement of the contactor 123.

As may be seen from FIGURES 22, 23, and 24, contactor 123 and its related elements are tri-stable. In order to move the contactor from one to another of its stable positions, to any one of the other stable positions, an actuator or camming member 126 of electrically insulating material, as shown in FIGURE 22, is pivotally mounted in the casing 105 by means of a pin 127. The pivot point for the camming member is located perpendicular to the transverse center line of the contactor and parallel thereto. The contactor is bent into a relatively flattened V-shaped configuration with the apex of the V directly beneath the pivotal axis of the camming member. The camming member or actuator is illustrated generally as being of wedge-shaped configuration for the purpose of obtaining the maximum utilization of the space alloted. It is understood, however, that other shapes may suffice for this member, if the shape and/or size thereof can be accommodated in the frame 105, and the additional mechanical features now to be described are also provided thereby.

With reference to FIGURE 22, it will be seen that resistingly compressible within a cylindrical bore 128, in actuator 126, is a spring biased rod-like element or plunger 129 which is constantly urged by a spring 130 into engagement with one surface of contactor 123. The dimensions of the camming member with respect to the contactor and the tension of the biasing spring, are initially chosen such that the rod like element is adapted to remain quiescent at the center of the V of the contact arm so as to cause the contactor to assume a neutral position, as shown in FIGURE 23. With the rod like element 129 at rest at the center of the V of the contactor, the end portions thereof bear against both fulcrums 122 of the cradle simultaneously, and thus the contactor is caused to remain in a balanced condition therebetween. The base of the wedge shaped camming member 40 is provided with a pair of oppositely disposed flat surface shoulder portions 131 and 132 which preferably are disposed on a plane intersecting the pivotal axis. Operating elements for the camming member are provided in the form of a pair of plungers comprising the pins 83, as shown in FIGURES 8 and 9, which are slidably mounted in the cover plate 81 of the switch bank assembly.

Plungers 83 are provided with enlarged ends or heads which are adapted to alternatively contact the shoulder portions of the camming member, thus to rock the latter about its pivotal axis in accordance with the positioning of the switch bank relative to the coded strips 98 and 99 attached to the ends of racks 511, as described above. It will be seen in FIGURES 22, 23, and 24 that when the right hand plunger 83 is in registry with a notch 100 in the coded slide and the left hand plunger 83 is in registry with a projection 101 of the slide, that the actuator 126 has been rotated in a counter clockwise direction about its pivot 127 thus to bring contactor button 125 into engagement with contactor 115 on post 113. As mentioned hereinabove, cradle 118 and rocking member or contactor 123 both are formed of electrically conductive material, and in operation serve as part of the conductive path. The cradle is connected by its post 117 to terminal 116 which is external of the casing or housing 105. The contactor or rocking blade 123 is always in contact with a surface portion of the cradle regardless of its position. Thus it is apparent that an electrical circuit may be completed from the terminal 116 and post 117 through the cradle 119, connector 123 to one or the other contact button 114 or 115, depending upon the position assumed by the contactor 123, and thence to either one of the external terminals 110 or 111.

Figure 4:
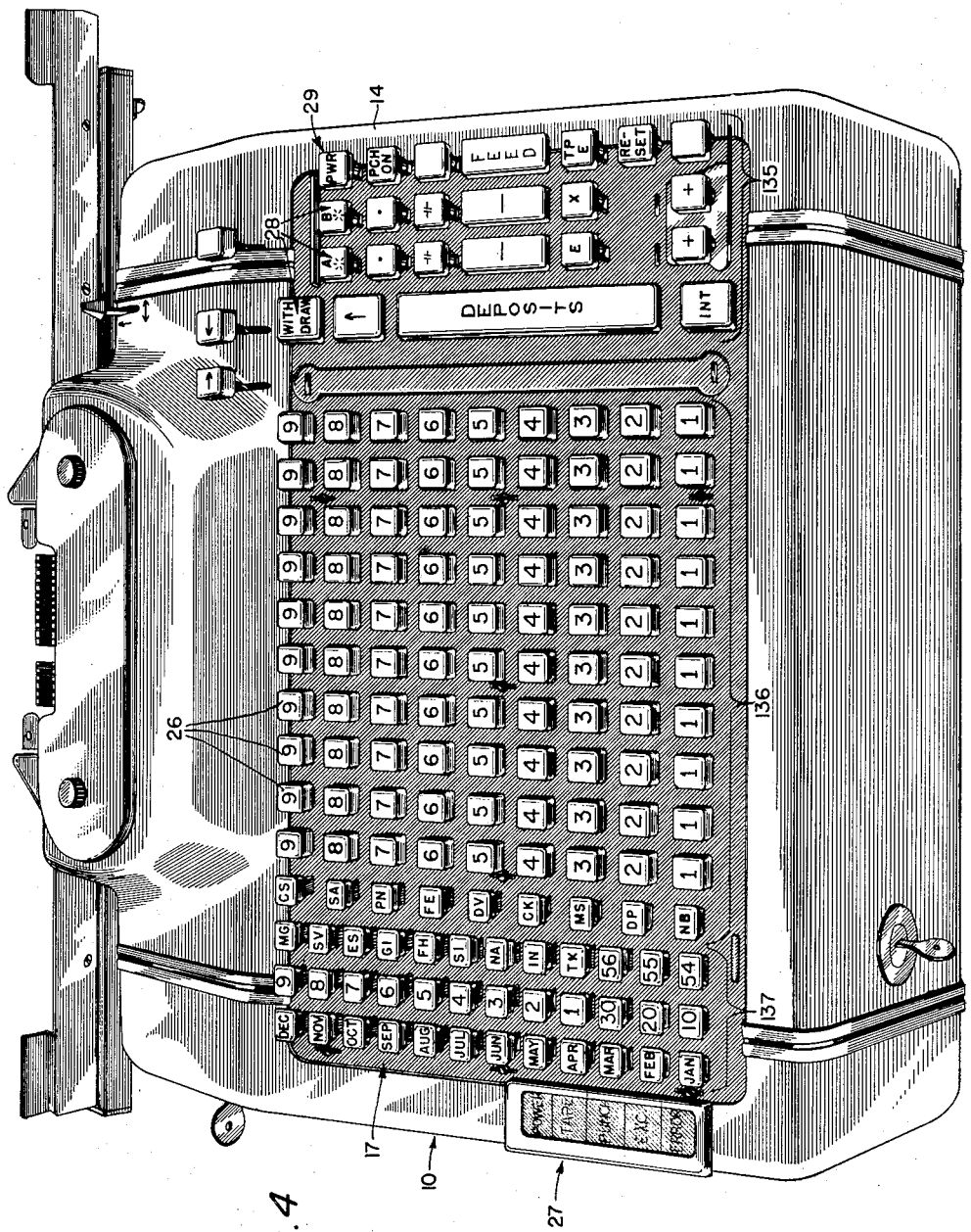
FIGURE 4 is a perspective view of the accounting machine with parts removed, but showing more clearly on an enlarged scale the keyboard thereof.

Now with reference to FIGURE 4, illustrating the keyboard 17 of the accounting machine 10, it is seen that in this examplary embodiment of the invention, the keyboard consists of four columns 135 of functional control keys which are on the right hand side of the keyboard, eleven columns 136 of information insertion keys including ten keys in each column, and to the left of the latter, three columns 137 of twelve keys each for insertion of various other information. The operation of function control keys 135 are described hereinafter. The remaining keys in columns 137 and 138 operate in the manner described in connection with FIGURES 7 through 27 to operate the printing apparatus, as well as the read-out device primarily consisting of the bank of switches described above. With reference to FIGURE 16, it will be seen that the bank of switches includes eleven sets of decimal and one set of duo-decimal switches. The decimal switch sets will be recognized as those having ten operating plungers 83, while the duo-decimal set is recognized as that set provided with twelve plungers 83, the latter set being found at the right side of the bank of switches.

The decimal sets of switches contain one input and ten output terminals. When the switches are indexed against the coded strips on the racks as described above, one of the ten output terminals will be electrically connected to the input terminal. The output terminal will correspond to the digit read into or out of the accumulator by the add-rack (or the data key depressed in the case of non-add data.) Since there are only nine keys per column, a zero in the switch will correspond to "no key depressed." The duo-decimal switch set contains two input terminals and twelve output terminals. This switch set is used only for the rack associated with the non-add keys in the third column from the left. The operation of the duo-decimal switch set is the same as described in connection with the decimal switch sets except that the slide bar used therewith will contain twelve projections instead of the ten on bars 483, as shown in FIGURE 7, and the stop sector will contain twelve notches 509 instead of the ten on sector 491, also as shown on FIGURE 7. It will be realized, of course, that dividing the slide bar into twelve segments instead of ten will reduce the amount of movement of the bars as compared to bars 483 associated with the decimal keys. To compensate for this, rack 511A, as seen in FIGURES 14 and 27A, are provided with teeth along its upper edge which engage and drive during movement thereof, a gear 140 mounted on a shaft 141 supported from the frame, as indicated in FIGURE 14, by means of bracket 142 extending from a framing angle 142A. Rotation of gear 140 by movement of rack 511A will rotate a smaller gear 143 which in turn will move auxiliary rack 144 provided with coded strips 145 on the bottom thereof (see FIGURE 15). Racks 144 are moved in proportion to the particular key depressed in the aforementioned non-add column, thus to move the oppositely positioned notches 146 and projections 147 into positions to actuate the switch plungers 83 of the duo-decimal switch set when the bank of switches is moved upwardly into engagement therewith, as indicated in FIGURES 10 and 11.

While in the present illustrated embodiment of the invention only one duo-decimal switch set is used, it should be understood that others may be provided, depending upon the use of the machine. In fact, the present machine provides space for two additional switches, as indicated at 148 and 149 on FIGURE 16. It is possible, of course, to position all the duo-decimal switch sets desired at one end of the bank of switches, but for reasons of convenience, one place has been provided on the left side. To operate this particular switch set—if one is placed there—there is provided a jack shaft 150, (see FIGURE 27A), which extends across the machine beneath the ends of racks 511 with its ends journaled in the machine framing. Movement of rack 511B associated with a column of keys, which would be added for this switch set, rotates a shaft 150 through gear 151 secured thereto beneath the end of rack 511B. Turning of shaft 150 rotates a gear 152 secured to the opposite end of the shaft thus to move auxiliary rack 511C into position to engage the operating plungers of the duo-decimal switch, if associated therewith, and in accordance with a particular depressed key.

*Function Control Program Unit*

With particular reference to FIGURES 29 and 35, it will be seen that machine 10 is provided with an automatic function control means which comprises an automatic function selection program unit 1731 readily removably supported on the movable carriage 15. This unit is constructed in accordance with that shown in FIGURES 155 and 156 of the aforesaid Butler patent, the description of which begins at line 40, in column 155 of the specification. For a full and clear description of the unit and its operation, reference should be had to these portions of the Butler patent, however, basically the program unit comprises a rectangular inverted shallow pan 1731 (using the same reference characters as used in the Butler patent) having control lugs 1767 of various lengths extending downwardly from the pan at spaced positions throughout its length. The lugs 1767 may be located in any of a plurality of positions throughout the pan in a manner adapted automatically to variably control various functions of the machine during its normal operation as described in the aforesaid patent. Knob 1741 is provided at one side of the tray to change the position of the tray in accordince with a desired preselected program. As described in connection with FIGURE 167 of the Butler patent, lugs 1767 operate a series of tappets and bell cranks in a manner described in the aforesaid Butler patent.

The mechanical control lanes of the accounting machine as shown in FIGURE 157 of the Butler patent are controlled by the series of tappets numbered consecutively from 1811 through 1827 which operate in conjunction with the lugs 1767 within the controlled tray. It must be remembered, however, that these are mechanical controls and therefore have no effect on the operation of the pulse controlled recording device. Therefore, the accounting machine has been modified by the addition of control tray 161 attached to the rear edge of tray 1731 in suitable manner, such as by screws 162. As more clearly shown in FIGURE 36, tray 161 is provided with a pair of spaced apart bars 163, running throughout its length and provided with open ended slots 164 for receiving the ends of a plurality of short transverse bars 165 upon which are mounted by suitable means, such as rivets or screws 166 (FIGURE 35), a plurality of depending switch actuator elements or pins 167. While bars 165 include positions for supporting only five lugs or pins 167, each pin is of sufficient width to establish ten control lanes. This is accomplished by cutting away a portion of the lower ends of certain of the pins as indicated at 168 on FIGURE 35. The control lanes thus established will hereinafter be referred to as electrical or control lanes, one through ten.

Positioned beneath tray 161 are electrical control switches, 169, which are of the on-off type, having their actuators in position to be engaged by the lower ends of pins 167 as tray 161 moves transversely across the accounting machine 10 during normal operation thereof. The switches 169, as will be more fully explained later, when selectively operated by pins 167, will determine whether or not the punch in the perforating unit will be operated, and by which program. The switch in the first electrical lane determines whether or not the punch will be actuated. If the switch is tripped to the "on" position, the punch will be actuated, otherwise it remains inactive. Judicious selection of electrical lanes, two through five, or any combination thereof, will determine which of sixteen possible programs of this embodiment will be used. Electrical lane six, controls disabling of the blank keyboard circuit to be more fully described later, while in the present embodiment lanes 7, 8 and 9 are not used. Operation of the switch at lane 10 energies a signal light. Switches 169 are connected by suitable wires not shown to a terminal board 170, positioned on the back of machine 10, as shown in FIGURE 30. As shown in FIGURE 4, the accounting machine includes various function control keys which are associated with switches for controlling functions of the machine, however, these will be described and identified more fully in connection with the description of the operation of the apparatus.

*Recording Apparatus (Perforator)*

As mentioned above, the various components of the tape perforating unit 11 are as follows: program selector 36; auxiliary control 37; plug board 38; stepper 39; encoder 40; punch 41; and the drive and timing unit 42, all assembled as shown in FIGURES 1, 2, 3, 62, 63, and 64. Certain of the individual units as mentioned above are described more fully hereinbelow, while others will be described in connection with the operation of the apparatus.

*Program Selector*

The Program Selector is fundamentally a device which receives information from the carriage position code switches 169 and converts this information to a form useable by the Perforator. As its name implies, and through means to be hereinafter discussed, this device is the part of the system which institutes activation of the circuitry corresponding to the predetermined program indicated by the carriage position code of the associated accounting machine 10.

Physically, and in its simplest form the Program Selector comprises sixteen groups of five-pole relays, it being possible to energize only one of these five-pole relays during any one cycle. As is shown schematically and in simplified form in FIGURE 74, the carriage position code switches S2 through S5 corresponding to electrical lanes 2 through 5, are connected in parallel across a source of voltage V and are associated respectively with solenoids L25 through L28 of the Program Selector as seen in FIGURES 69 and 71. It may therefore be seen that through selective closure of the switches, sixteen distinct combinations of energized and de-energized solenoids, ranging from none energized to all energized, may be achieved. The specific combination of energized and de-energized solenoids resulting from the predetermined selective closure of switches S2 through S5 will cause the closure through means indicated symbolically at 171 in FIGURE 74, and to be discussed in detail hereinafter, of one of the previously mentioned five-pole relays R0 through R15, while at the same time preventing the closure of any of the other relays. It should be noted that while sixteen relays are present in the device, only three, R0, R9, and R10 have been indicated in FIGURE 74, the others having been omitted from this figure for purposes of clarity.

Referring now more particularly to FIGURE 66 which is a front elevational view of the program selector, it may be seen that this device comprises a pair of end plates 172 and 173. The plate 173 has a pair of outwardly turned ears 174 and 175, best illustrated in FIGURE 72, each containing an elongated slot 176 utilized in attaching the program selector to the perforator frame. Sixteen output printed circuit cards 0–0 to 0–15 (FIGURE 66), an input card $i$ as well as the sixteen previously mentioned five-pole relays (FIGURE 65) hereinafter called Rotors, R0–R15 are contained between and supported by the end plates.

The output cards, all of which are identical in configuration, are exemplified by 0–15 illustrated in FIGURE 75. As shown therein, the card is of substantially rectangular shape having a raised section along the right portion 177 of its upper edge. The card itself is composed of non-conductive material on which the conductive circuits are placed in conventional manner. There are five circuits, S, A, W, Z, and E, representing Sequence, Auxiliary Control, Word Length, Zero to Space and Exceed Capacity, on each card. The inputs to the various circuits occur at the ring-shaped portions $S^I$, $A^I$, $W^I$, $Z^I$, and $E^I$ which are respectively concentric with five perforations in the card. Each circuit has an enlarged portion in which a discontinuity occurs and then continues on to the output tabs $S^0$, $A^0$, $W^0$, $Z^0$, and $E^0$ located on the above mentioned raised section of the card. It should additionally be noted that the Auxiliary Control, Word Length and Zero to Space circuits each have a branch $A^B$, $W^B$, and $Z^B$ respectively, extending from the enlarged input side of each of these circuits to the lower edge of the card to facilitate plating of the wiring.

The input or common card I, best illustrated in FIGURE 75A is of substantially rectangular configuration and is composed of a non-conductive material. Five taper tab terminals of conventional design are riveted or otherwise attached to a vertical edge of the card. These terminals Z, W, A, S, and E are respectively electrically connected to the five printed common input circuits which terminate in the ring shaped portions $Z^c$, $W^c$, $A^c$, $S^c$, and $E^c$, each concentric with a perforation in the card.

Five supporting shafts 178 having threaded extremities extend transversely across the Program Selector, each passing through a corresponding one of the perforations in the above mentioned input and output cards so as to support these cards, and also through registering holes in the end plates 172 and 173, with nuts 174 screwed on to the threaded extremities of the shafts so as to prevent relative movement between the latter and their associated cards and plates.

Bushings 175 each having a flanged end are placed on the above mentioned shafts in end to end contiguous relationship with the above mentioned cards interposed therebetween as is best illustrated in FIGURE 66, so that the underside of the flanges abut the hereinbefore mentioned ring shaped portions of the circuits on the various cards. Accordingly, all of the output cards O-0 to O-15 are electrically connected in parallel to the input card I and any voltage applied to any of the taper tabs of card I will be transmitted across the associated printed circuit to the corresponding one of its ring shaped portions Z$^c$, W$^c$, A$^c$, E$^c$, and S$^c$, where it will be applied to the flange of the abutting bushing 175 The voltage will then be transmitted in turn by each bushing to the one next adjacent. As the flange of each bushing abuts a ring shaped portion on its associated card, the voltage will be applied to the input side of the corresponding printed circuit of each of the output cards O-0 to O-15. The bushings also serve the additional function of spacing the various cards the desired distance apart.

Dust guards 176 composed of sponge rubber or any other suitable material and having the configuration indicated in FIGURE 67 are inserted between the cards in order to prevent the entrance of foreign matter. In order to maintain the dust guards fixedly in place, certain of shafts 178 are inserted through registering holes in said guards.

The above described card assembly is maintained insulated from the end plates 172 and 173 by the interposition of bushings 179 between the extremities of the shafts 178 and the end plates. The bushings 179 may be composed of fiber, ceramic or any other suitable non-conductive material.

It may be seen in FIGURE 65, which is a perspective view of the rotor assembly, as well as in FIGURE 67, that each rotor comprises a substantially elongate member having a sector-shaped upper portion and a forwardly extending abutment ear 180 therebelow. A protrusion 181 having a perforation therein for anchoring one of the extremities of a spring, the purpose of which will be hereinafter discussed, extends rearwardly from the lower central portion of the rotor, while an elongated tooth 182 forms the lowermost portion of the rotor which also contains a centrally located perforation utilized in mounting the rotors upon shaft 183. Bushings 184 are interposed between the rotors in order to space the latter the desired distance apart, as is best illustrated in FIGURE 66.

A non-conductive sector-shaped switching member 185 is riveted or otherwise fixedly attached to the upper sector-shaped portion of each rotor, as is best illustrated in FIGURES 67, 77, and 78. Five discrete switching elements 186 composed of conductive material and having a pair of resilient contact members 187 at each extremity thereof are riveted to each switching member in a special relationship corresponding to that of the enlarged portions of the circuits illustrated in FIGURE 75.

A shaft 188 extending transversely of the program selector and having its respective ends set in the end plates 172 and 173 is utilized to anchor a series of springs 189, each spring being connected to one of the rotors R0 to R15. The shaft 188 contains sixteen undercut portions each being of a width substantially similar to the gauge of the metal comprising the spring. These undercut portions are spaced apart a distance equal to that of the rotors so that when the springs are anchored to undercut portions of said shaft they are maintained a like distance apart. The opposite end of each spring is anchored to the perforation in the protrusion 181 of its corresponding rotor, and will therefore urge the rotor in a counterclockwise direction so that the abutment ears 180 will be normally maintained in contact with a shaft 190 which extends transversely across the program selector as is illustrated in FIGURE 67.

The opposite extremities of shaft 190 are fixedly attached to cam followers 191, each of which carries a pair of rollers 192 and 193 respectively. Each pair of rollers operatively engage a pair of complementary cams 194 and 195 mounted for rotation with the drive shaft 196. Specifically, and as is illustrated in FIGURE 70, the leftward cams 194 and 195 are press fitted upon a bushing 197 which is in turn pinned to the shaft 196 proximate to its left extremity. Similarly the rightward cams 194 and 195 are press fit upon a bushing 198 which is pinned to the rightward extremity of the drive shaft 196. The shaft itself is journalled for rotation between the end plates 172 and 173, a bushing 199 being keyed to the leftward extremity of the shaft, while a pair of bushings 200 and 201 are press fit upon the bushing 198 and a washer 202 is located on the shaft 196 immediately outboard of the bushings 198 and 201 respectively. Immediately outboard of the washer is an additional bushing 203 having a flange thereupon. This bushing carries a cam 204 which will be discussed in detail hereinafter and is also pinned to the drive shaft 196.

Referring now more particularly to FIGURE 67, it may be seen that the springs 189 will urge their associated rotors in a counterclockwise direction so that the abutment ears 180 engage the shaft 190 which is, as hereinbefore mentioned, fixedly connected to the cam followers 191. At the commencement of a cycle the complementary cams 194 and 195 are caused to rotate in a clockwise manner by the drive shaft 196. This will result in the presentation of the high portion of the cams to the roller 192 causing the follower 191, and therefore the shaft 190, to rotate in a clockwise direction. The rotors R0 to R15 will move in a similar direction so that the ears 180 are maintained in engagement with the shaft 190. Later in the cycle when the high portion of the cams are in contact with the follower 193, the shaft 190 and its associated followers 191 are caused to move in a counterclockwise direction, and the rotors, from the urge of springs 189 are caused to move in a similar direction.

An exploded view of the four coded slides and their associated guide plate is illustrated in FIGURE 73. The guide plate 205 comprises a rectangular member having sixteen elongated slots along one of its longitudinal edges, and a pair of longitudinally extending slots 206 in addition to a laterally extending slot 207 located intermediate the previously mentioned longitudinal slots. The slots 206 and 207 are utilized in properly locating the guide in the program selector. The four coded slides 208 through 211 respectively, are also substantially rectangularly-shaped members, each having a hook-shaped portion 212 at one of its extremities, only that hook on slide 208 in FIGURE 73 being illustrated. Each of the coded slides has sixteen stub notches P0-P15 along one longitudinal edge and an additional four notches along the opposite longitudinal edge. It should be noted that whereas the elongated slots in the guide plate are all equidistantly spaced the stub notches in the coded slides are spaced irregular distances apart for purposes to be hereinafter explained. It should further be noted that of the four slots on the opposite longitudinal edge of each coded slide, one of the four is relatively narrow while the other three are wider.

In FIGURE 73, the leftmost of the last mentioned slots is the narrow one in slide 208, while it is the second from the left in 209, the third in 210 and the rightmost in 211. The purpose of these configurations will also be discussed hereinafter. Additionally, each of the slides contains a pair of axially extending elongated perforations 213 having enlarged ends. The coded slides and their associated guide plate 205 are assembled on a pair of studs 214, each of which extends inwardly from a plate 215 screwed to bracing members 216 and 217, which are in turn fastened to the side plates 172 and 173, as is best illustrated in FIGURES 67 and 68.

A similar pair of bracing members 218 and 219 extend across the upper ends of the side plates and are fastened thereto, as is also illustrated in FIGURES 67 and 68.

The coded slides and guide plate are located in their proper relative positions on the studs by the interposition of spacer bushings. Additionally, and because of the elongated slots in the coded slides, a sliding fit is maintained and therefore relative movement between the studs and the slides is made possible.

As is best seen in FIGURES 69 and 71, four rocker arms 220 are mounted in spaced relationship upon a stud extending inboard from plate 215. The arrangement is such that each of the rocker arms is located over one of the coded slides 208 to 211. Four springs 221, each having one of its ends anchored to a stud 222, and its opposite end to one of the extremities of rocker arm 220, tend to cause the arms to rotate in a clockwise direction as viewed in FIGURE 69. As is also seen therein, the opposite extremity of each rocker arm is pin connected to its associated coded slide, the end result being that the coded slides are urged to the left, as viewed in FIGURE 69.

As was previously mentioned, the cam 204 is mounted proximate to the right extremity of the drive shaft 196. This cam is operatively associated with a follower 223 which is attached to a channel-shaped crank arm 224, as is best illustrated in FIGURES 65 and 69. The crank arm is pivotally mounted within a guard member 225 by means of shaft 226, the guard member being fixedly attached to end plate 173. A spring 227 having its opposite ends anchored to the crank arm and guard respectively, tends to urge the crank arm in a clockwise direction, as viewed in FIGURE 69 so as to maintain the follower 223 in engagement with cam 204.

As was previously mentioned, the rocker-arm or bellcranks 220 and springs 221, urge the coded slides 208 to 211 leftward as viewed in FIGURE 69 so as to maintain the hook-shaped portions 212 of said slides in engagement with a pin 228 extending transversely across said hook-shaped portions, and being mounted between the noses on the respective arms of the channel-shaped crank arm 224. The arrangement is such that as the drive shaft 196 rotates, the cam 204, through the follower 223, will rock the crank arm 224 first in a clockwise direction, and then permit it to return under the urging of its spring 227 in a counterclockwise direction. Therefore, and by means of pin 228, the coded slides 208 to 211 are first urged to move rightwardly against the resistance of springs 221, and are then later in the cycle permitted to return to their home positions under the urging of said springs.

As best seen in FIGURES 69 and 71, the four solenoids L25 to L28 previously mentioned in relation to FIGURE 74, are mounted in cantilever fashion, each by means of a pair of studs from the plate 215. Associated with each solenoid is a clapper 229 pivotally mounted upon a bracket 230.

The solenoids, when energized, normally do not have the strength to attract the clappers through an air gap, but do have sufficient strength to maintain the clappers in position against the resistance of springs 221 if the clappers have previously been removed into abutting relationship with the armatures of the solenoids. The operative connection between the clappers and springs 221 will be explained hereinafter.

As illustrated in FIGURE 69, an additional spring 231 is riveted to the forward end of each clapper and is maintained in spaced relationship from said clapper. As seen therein, the forward ends of the various clappers extend into the areas encompassed by the four notches along the longitudinal edge of the coded slides. It may be recalled that each coded slide has one narrow notch and three wide notches. The arrangement is such that the clapper associated with solenoid L25 is operatively engaged with the narrow notch of coded slide 208. The spring 231 of this clapper abuts one edge of the notch while the clapper itself abuts the opposite edge. Accordingly no freedom of movement will be permitted between the clapper and the slide. However, the width of the corresponding notch in each of the slides 209, 210, and 211 is sufficient so that the latter slides may move to the full extent of their permissible sliding movement without either of the edges of said notches in any way engaging the clapper of solenoid L25 or its spring. The same relationship exists between the clapper of solenoid L26 and the second, or narrow notch, of coded slide 209, while the clapper of solenoid L27 is operatively associated with the narrow or third notch of slide 210 and the fourth notch of slide 211 is operatively associated with the clapper of solenoid L28. Accordingly, any movement of slide 208 will be reflected in a corresponding rotation of the clapper of solenoid L25 and similarly with respect to solenoids L26, L27, and L28 in association, respectively, with slides 209, 210, and 211. Conversely, if the clappers or any of them are held stationary, the associated slide will obviously be immobilized.

Referring now again to FIGURE 73, as well as to FIGURE 69, it may be recalled that the sixteen stub notches P0–P15 along the longitudinal edge of various slides are spaced irregular distances apart. The dimensions are such that when the slides are moved to the extremities of their rightward or leftward permissible movement, in any random order, only one set of stub notches will be in alinement with the corresponding elongated guide notch in the guide plate 205, while all the remaining sets of stub notches will be in misalinement. As an example, assuming that slide 208 is held at the rightward limit of its permissible movement while slides 209, 210, and 211 are at the leftward limit of their permissible movement, in this case the P1 stub notches in slides 208 to 211, as viewed in FIGURE 73, will all be in alinement with the corresponding elongated notch in guide plate 205. As to the corresponding sets of noches in the other fifteen positions, at least one of the four notches in each position will be misalined.

Assuming that a program is desired which corresponds to a carriage position code indicated by the closure of switches S2, S3, and S4 of FIGURE 74, and that the last selected program corresponds to closure of none of these switches (which means that rotor R0 is in the selected position with tooth 182 in the alined stub notches P0), the program selector operates as follows: the accounting machine motor bar is depressed causing the drive shaft 196 to rotate. Rotation of shaft 196 and its associated cams 194 and 195 first causes shaft 190 to rock rotor R0 through 6°, so that its ear 180 and tooth 182 are alined with the corresponding parts of the other rotors. This frees the slides 208 to 211 permitting their movement for selection of a subsequent program. Continued rotation of shaft 196 causes a slight further rotation of all the rotors to provide clearance for the movement of the slides 208 to 211. Simultaneously with this further rotation, shaft 196 through cam 204 causes crank arm 224 to rock in a clockwise manner, as illustrated in FIGURE 69. Also, at this time the solenoids L25, L26, and L27 are energized. Such motion of the crank arm will cause the coded slides 208 to 211 to move rightward, as viewed in FIGURE 69, against the resistance of springs 221. Such movement will cause the clappers 229 of the various solenoids to be urged into contact with the armatures of said solenoids because of the engagement of the forward end of the clappers with the narrow notches of their associated slides.

It should be recalled that the solenoids when energized, have the strength to maintain the clappers in engagement with the armatures against the resistance of the springs 221, but they do not have sufficient strength to draw the clappers into said contact through an air gap. With solenoids L25, L26, and L27 energized, their associated clappers will be held in the contact position while the remaining clapper will be free to return to its normal position when the slides move leftward. This latter motion occurs subsequently in the cycle as may be indicated by the configuration of the cam 204, as illustrated in FIGURE 72. When the low side of said cam presents itself to the follower 223, the spring 227 urges the crank arm 224 in a counterclockwise direction permitting the springs 221 and bell crank 220 to return, or attempt to return, their associated slides to the normal leftward position. In the instant example slide 211 is free to so return, however, the slides 208 to 210, due to the energization of their associated solenoids and clappers are held in the rightward position. As a result, the slide 211 will be in its extreme leftward position because of its being permitted to return while the slides 208 to 210 are held in the rightward position by their clappers. This will cause the stub notches P7 to be in alinement while all other sets of stub notches are in misalinement. All of the above described events occur while the rotors R0 to R15 are being rocked in a clockwise direction as viewed in FIGURE 67.

At this time complementary cams 194 and 195 cause shaft 190 to reverse direction allowing the rotor springs 189 to move the rotors in a counterclockwise direction. This counterclockwise rotation continues until such time as the elongated teeth 182 of said rotors reach the plane defined by the leading edge, that is, the edge containing the stub notches, of the coded slides. In the case of the rotor R7, the corresponding stub notches are all in alinement. However, at the position corresponding to each of the other fifteen rotors, at least one of the stub notches is misalined. Accordingly, as the complementary cams 194 and 195 continue to rotate, rotor R7 will move therewith under the urging of its spring 189 until such time as its elongated tooth 182 is fully seated within the four stub notches P7 as is illustrated in FIGURES 67 and 69. However, the other fifteen rotors will stop short of this position due to their abutment against the edge of the slide or slides having the misalined notch or notches corresponding to their position. As a result of the full rotation of the rotor R7, its spring contacts 187 will have moved into a position where they respectively bridge the discontinuities in the enlarged portion of the five circuits on the corresponding output card 0–7, however, the remaining fifteen rotors have been stopped short of this position and therefore their associated spring contacts will have failed to bridge the discontinuities on the corresponding output cards.

Accordingly, and solely, in the case of the output card 0–7, electrical continuity will exist from the input rings $Z^I$, $W^I$, $A^I$, $E^I$, and $S^I$, respectively to the corresponding output tabs $Z^0$, $W^0$, $A^0$, $E^0$, and $S^0$. Therefore the voltages applied to the tabs Z, W, A, S, and E of the input card I will appear on the output tabs of card 0–7. No such voltage will be present on the output tabs of the remaining fifteen output cards. The manner in which the voltages are applied to tabs Z, W, A, S, and E, and the manner in which they are utilized at output $E^0$, $Z^0$, $W^0$, $A^0$, and $S^0$ is fully discussed in the following electrical portion of this case.

After the selected rotor, R7, has seated in the stub notches of the slides, the solenoids L25, L26, and L27 are deenergized. The selected rotor will remain in this position until a new cycle is initiated.

*Stepper Switch*

The Stepper Switch is that portion of the system which is primarily concerned with the distribution or channelling of the electrical pulses to the various components of the system at the proper time. It comprises thirteen distinct levels or wafers, each of which is self-contained mechanical switching unit. Each wafer includes sixteen discreet terminals as well as a common. Through means to be hereinafter described, the terminals are sequentially placed in circuit with the common. Accordingly, any voltage placed upon the common will be sequentially applied to the various terminals. Conversely, if a potential is selectively placed on one or more of the terminals, that potential will appear on the common only when said common is in circuit with the "live" terminal, and no voltage will appear on the common when it is connected to a "dead" terminal.

Referring now more particularly to FIGURE 79, it may be seen that the wafers W1 through W13 inclusive are arranged in parallel planes and are supported between a pair of end plates 240 and 241. Dust guards 242, to be discussed more fully hereinafter, are interposed between adjacent wafers as well as between the end plates 240 and 241 and the wafers W1 and W13 respectively.

Referring now more particularly to FIGURE 83 which is a view of a typical wafer, specifically W1, it may be seen therein that the wafer comprises a rectangular card having a substantially centrally located perforation 243 therein. It is composed of any suitable non-conductive material on which conductive circuits have been placed in conventional manner. There are seventeen circuits on each card, commencing at the rectangular tabs TC and T1 through T16 inclusive, located proximate to the upper edge of the card, and terminating in two rings concentric with the above mentioned perforation 243. It should be noted that the outer ring is divided into sixteen segments starting at 244 and clockwise to 259, the intermediate being omitted for clarity. The segments are electrically connected respectively to tabs T1 through T16 while the inner ring C is undivided and is connected in its entirety to tab TC.

A non-conductive rotor 260 fixedly attached to a boss 261 is operatively associated with each wafer. The respective bosses extend through the perforations in their associated wafers and are keyed to a drive shaft 262 as is best seen in FIGURES 81 and 82. A washer 263 is mounted proximate to each end of the shaft immediately outboard of the extreme rotors, and the entire assembly is mounted between the end plates 240 and 241 by means of bearings 264 and lock nuts 267. Six stiffener rods 265 are inserted through registering holes in the end plates and wafers, and by means of flanged spacer bushings 266A mounted thereon, properly locate the wafers. The rods are held fixedly in place by nuts 267. It should be noted that the upper outer rods also pass through the dust guards 242 which, as may be seen in FIGURES 81 and 83A, each contain a centrally located circular cut-out section. This cut-out section is of a radius which is sufficiently great so as not to cause any interference with the rotors 260. Threaded bushings 268 fixedly attached to the end plates, and slotted ears 269 integral with the lower portion of the end plates are utilized in connecting the above described stepper switch to the perforator housing.

Referring again more particularly to the wafers and their associated rotors, it may be seen in FIGURES 82 and 83A that each rotor has a metallic contact plate 270 riveted thereto. Each plate 270 has integral therewith a pair of resilient contact elements 271 which are respectively spaced a distance from the axis of drive shaft 262 substantially equal to the mean radii of the common and segmented rings on the wafer. The operative relationship is such that one of the pairs of contact elements will ride on the common ring while the other rides on the segmented ring. Accordingly, whenever a voltage is placed on tab TC of a wafer, a similar voltage will appear on the common ring C of that wafer and be transmitted via the contact elements 271 to the segmented ring. As each of the segments is insulated from those next adjacent, rotation of the rotor 260 by means of the drive shaft will cause the voltage to be applied sequentially on each of the tabs T1 through T16.

In operation, voltages will be applied to selected ones of the common tabs on the various wafers. Additionally, in some cases the input will be at one of the tabs T1–T16 rather than at TC. Further, some of the wafers will have no voltage applied to any of its tabs. The exact selection made in any given case is controlled by the predetermined program which will be discussed hereinafter as will be the manner in which the voltages are applied to and transmitted by the stepper switch. Subsequent to the application of voltage to the various tabs, the drive shaft 262 is rotated through 360° causing an identical rotation of all thirteen rotors. It should be recalled at this point that each wafer-rotor combination is insulated from every other wafer-rotor combination. Due to the above mentioned rotation, a voltage will appear sequentially upon tabs T1 through T16 in the case of every wafer to whose common tab TC a voltage was applied. Obviously no voltage will appear on the tabs of the wafers to whose common no voltage was applied. In the case of those wafers where the procedure was reversed and the potential was applied to one of the tabs T1 through T16 as an input, a voltage pulse will appear on the associated common TC only when the rotor wipes across the corresponding segment on the center of the two previously mentioned rings.

*Encoder*

The encoder is a selenium rectifier matrix designed so that the alphameric information entering it from the program selector is recoded in either five or eight channels, depending upon the type of code to be used. Selection of a particular number of code channels simply means that a like number of punches will be used. For example, a six channel code means that six punches will be utilized to punch a line of perforations across the tape 274 (FIGURE 127) including from one to six perforations depending upon the code designation. For example, the letter "A" is designated by holes punched at the one, three, and five positions of the six punches. If a letter "A" is entered into machine 10, it will be routed through the electrical circuitry of the perforator and to the "A" terminal of the encoder from which it will pass through various rectifiers and into the solenoids to actuate the one, three, and five punches, the rectifiers in the encoder providing the means to channel the information to the punches.

Physically, the encoder is illustrated in FIGURES 133 and 134, with parts thereof also being shown in FIGURES 62 and 63. With particular reference to FIGURES 133 and 134, it will be seen that the encoder includes a U-shaped framing member 275, having slides or guide ways 276 attached to the inner sides of the opposite legs of the U for the purpose of receiving the printed circuit matrix board 277 on one side of which the rectifiers 278 are mounted. The terminals of the rectifiers extend through the board and are connected to printed circuitry (not shown) but which is of conventional design, and which connect the terminals of the rectifiers to terminals positioned along the bottom edge 280 of the board. The printed wiring terminals are received in a socket 282, when the board 279 is fully inserted in the frame, as illustrated in these figures. When so mounted, the terminals on board 279 contact the inner ends of terminals 283 shown depending from the underside of socket 282 (FIGURES 134 and 62). With reference to FIGURE 133, it will be seen that braces 284 and 285 are secured to opposite sides of framing member 275 to hold the latter in a rigid condition. It will also be noted that a cover member 286 is provided to prevent inadvertant displacement of the board 277 from its position within the frame.

Certain of the input connections to the encoder are available at the control panel (described hereinafter) but, in addition, output terminals of decimal switches and output contacts of the accumulator function relays (described hereinafter) are directly connected to terminals 283 of socket 282 through which they are directly connected to certain of the rectifiers in the encoder. Also, as described more fully hereinafter in connection with the circuitry and operation of the perforator, the encoder board contains such other wiring as is necessary with the particular code being used.

In FIGURE 134, it will be noted that the encoder assembly is secured to the side of the perforator unit 11, as by machine screws 287. In this regard, it might be pointed out with reference to FIGURE 62, that various major components of the perforator are mounted on a stand 288, including a base member 289, four columns or posts 290, one at each corner of the base framing, as shown in FIGURE 63, and a table or top, 291, secured to the tops of the posts, as shown in FIGURE 62.

The above described program selector, stepper, and other components to be described, have certain of their terminals aligned in a plane across the top of the perforator in position to be readily engaged by contact elements on the control panel described below. Because the encoder is mounted on the side of the perforator, intermediate buffer or terminal boards 293 (FIGURES 121 and 122), are provided at the right hand side of the perforator, as seen in FIGURE 63, with certain of its leaf contact terminals 294, available at the control board. Printed wiring 295 connects terminals 294 with terminals 296 at the bottom of the panel, as seen in FIGURE 121.

*Control Panel*

FIGURES 135 through 140, and incidentally FIGURE 62, illustrate the construction of an unwired control panel and the manner in which it is mounted on the perforator.

With particular attention to FIGURES 135 and 140, it is seen that the control panel consists of a flat board 300, of phenolic or other insulating material, having mounted therethrough a plurality of pin type connectors or contactors 301. The depending end 302 of the contactors comprises a small diameter pin-like member flaring outwardly into a thicker portion 303, and a hollow reduced stem portion 304 passing through the panel with its end flared to secure it to the panel. Tapered pins on the programming wires (not shown) are received in the hollow stem thus to wire the panel. FIGURE 135 represents diagrammatically a top plan view of the control panel showing the various terminal areas of the control panel, as indicated thereon.

As seen in FIGURES 136, 137 and 62, control panel 306 is mounted within a frame 306 with pins 301 extending from the underside thereof. Frame 306 is mounted upon table 291, as by brackets 308 and 309, transverse channel members 310, and links 311 and 312, the latter having their ends 313 and 314 pivotally secured at 315 and 316 respectively to channels 310. The other ends of links 311 and 312 are pivotally secured at 317 and 318 to frame 306. By reason of links 311 and 312, which are of equal length, movement of frame 306 will be parallel to channels 310 and in a manner moving contactors 301 into and out of engagement with the leaf contact elements on the various components of the perforator, as more clearly shown in FIGURE 140.

Movement of frame 306, as described above, is accomplished through the linkage indicated by the numeral 320 in FIGURES 136 and 62 showing the mechanism in its retracted and extended positions respectively. With reference to FIGURE 62, it is seen that such movement may be accomplished by grasping handle 321 and rotating it in a counterclockwise direction about its pivot 322 until it reaches the position shown in FIGURE 136. Such movement will cause link 323 to rotate arm 324 in a clockwise direction about its pivot 325 thus moving link 326 upwardly to rotate link 312 in a counterclockwise direction and raise frame 306 relative to channels 310. When frame 306 reaches its raised position, movement of the handle 321 is halted by contact of its lower extremity 327 against a stop member 328 mounted on framing member 291 as by bracket 329.

Now, with particular reference to FIGURES 138 and 139, it will be seen that the contrtol panel may be latched within frame 306 by pressure of the pivotally mounted arm 330, as exerted by the high point 331 of cam lever 322, when the latter is in the position shown in FIGURE 138. When frame 306 is moved to the position shown in FIGURE 136, latch element 332 may be rotated in a counterclockwise direction to the position shown in FIGURE 139, thereby releasing arm 330 for movement to its retracted position as by spring 333, and simultaneously move link 334 to the left from its retracted position, as shown in FIGURE 138, to its extended position shown in FIGURE 139, wherein its end enters aperture 336 in link 312 (FIGURE 136) thereby to lock the frame 306 in its retracted position. Release of the latch mechanism enables removal of the control panel by means of the handles 337 attached thereto by machine screws 338. Thus it is possible, easily and rapidly, to change the perforator to a different program.

Control Board Relays

The perforator, as indicated at 339 on FIGURE 63, also includes a plurality of control board relays. As more clearly shown in FIGURES 115, 116, and 117, each relay includes a printed circuit board or panel 340, see FIGURE 117, upon which is mounted by a U-shaped bracket 341 (FIGURE 115), a pair of opposing electro-magnets 342 which are energized selectively as described more fully hereinafter by way of input leaf terminals 344, printed wiring 345, and terminals 346 along the lower edge of the board 340. Also printed on board 340 are output wires and terminas 347a, b, c, d, e and f, adapted to be bridged by wiping contactor elements 348 mounted upon an insulating card 349 carried upon the upper end of an arm 350 having its lower end 360 pivotally mounted at the bottom of the U-shaped bracket 341. Energization of electro-magnet 342 moves arm 350 to the left, as seen in FIGURE 115, thus to close the contacts designated by a—e and c—f. Energization of electro-magnet 343 moves arm 350 to the right, thus to break the aforesaid contacts and make contacts b—e and d—f respectively.

The perforating unit includes other similar relays at other positions and in the description, these are referred to as fixed wiring relays and some may be seen at 355 on FIGURE 64. The only difference in these relays over those entitled "Control Board Relays," is that all of the wiring to the panel, illustrated in FIGURE 118, is connected to fixed terminals 356 rather than some being connected by means of leaf contacts 344, as in relays 339.

Terminal Boards

The perforator unit also includes a number of terminal boards of various sizes, but except for size and the number of wires and terminals, they are similar to those seen in FIGURES 119 and 120. Each of these boards includes a plurality of wires 358, printed upon an insulating panel 359, with leaf type connectors 360 along the top edges and permanent type connectors 361 along their bottom edges. On some boards, all terminals are of the permanent type. As seen in FIGURE 63, a group of five terminal boards of the type shown in FIGURE 119, are positioned between the stepper 39 and the relays 339 with their leaf type connectors 360 in the same plane with the similar connectors on the other elements positioned across the top of the perforator unit. It will be noted that these connectors have been omitted from the components as shown in FIGURE 63 for the purpose of clarity, and because they have been shown in the detailed drawings of these components. Positioning of the components with their leaf type contactors in the same plane has been simplified by mounting them on a rod 362 extending transversely across the unit, as shown in FIGURE 63.

Latching Relays

As described more fully hereinafter, certain operations of the perforator requires relays which can be maintained in a fixed position during certain periods of operation. Typical of this type, are those shown in FIGURE 123, wherein a pair of relays, indicated by the numeral 365, are mounted upon an L-shaped bracket 366 secured to the perforator framing as indicated at 367. Each of these relays comprises a pair of electro magnets 368 and 369 mounted upon a bracket 370 with their axes normal to each other. The clapper 371 of electro magnet 369 is arranged to actuate switches 372 and 373a and b, as by pin 374, all as clearly shown in FIGURE 124. Energization of electro magnet 369 draws its clapper 371 rearwardly, or away from the viewer of FIGURE 123 (upwardly as shown in FIGURE 124), thus to close switches 372 and 373A (FIGURE 124). When clapper 371 reaches this position, it is removed from the path of movement of clapper 375 of electro magnet 368, permitting clapper 375 to be swung upwardly about its pivot 376, as by spring 377, thus to move clapper 375 into latching engagement with clapper 371, holding the latter in the position shown in FIGURE 124. In this position, switches 372 and 373A are held in their closed position even though electro magnet 369 is de-energized. Release of clapper 371 from its latched position to permit pin 374 to open switches 372 and 373A and to close switch 373B, is by energizing electro magnet 368, whereupon clapper 375 is drawn downwardly away from latching engagement with clapper 371, thus permitting it to be spring biased to its unlatched position upwardly away from the plane of the drawing. The construction of the clapper to permit push actuation, thereof, is more clearly shown in FIGURE 103, illustrating similar devices for clutch actuation described hereinafter. Input and output energy to and from electro magnets 368 and 369, and switches 372 and 373A and B is by way of terminal boards 378, to which the leads from the electro magnets and the switches are connected.

Rectifiers

As seen on FIGURES 63 and 64, the perforator also includes a pair of rectifier matrices 380, the purpose of which will be described in connection with the circuitry hereinafter. Structurally however, as seen in FIGURE 125, each comprises a plurality of diodes 381 mounted upon a panel 382 provided with a plurality of connectors 383 along each side edge and to which the terminals of the individual rectifiers 381 are connected. The panels 382 are mounted upon L-shaped bracket members 384 secured to table 291, as by screws 385.

Punch

While it should clearly be understood that other types of marking apparatus might as readily be used in the invention, the tape punch 41 is preferred. The particular construction of the punch is not novel with the present inventors and it is contemplated that any suitable type of punch mechanisms might be used. For example, the punch might be in accordance with the co-pending application in the name of Paul R. Hoffman, Serial Number 535,559 filed September 21, 1955 and entitled "Tape Punching Apparatus," now Patent No. 2,775,300.

In the present perforator apparatus, however, the tape punch is one presently manufactured by "Commercial Controls Corporation" and is a high speed solenoid actuated punch unit operating at a speed of 33 punch cycles per second. With regard to the construction of these punches, they include punch pins which are driven through the tape in positions corresponding to the particular code used, as indicated on the fragmentary portion of a tape shown in FIGURE 127, when certain of the solenoids, as identified hereinafter in connection with the description of the circuitry, are pulsed.

Drive and Timing Unit

The various clutches and timing cams required for the operation of the perforator are all enclosed in the drive and timing unit identified by the reference character 42 on the various figures of drawings, such as FIGURE 62 and in 63. The mechanical power for the perforator is obtained from an induction motor 385, the output shaft 386 of which is rated at 1,725 r.p.m. Mounted on the motor shaft are two pulleys 387 and 388, the latter of which is used to drive a D.C. generator 389 by means of belt 390 and a pulley 391 on the generator shaft 392. The generator is a 70 watt 110 v. D.C. unit rated to run at 3,180 r.p.m.

The drive and timing unit 42 includes the input shafts 394 and 396 to the program selector and the punch respectively as shown in FIGURE 84 and the stepper input shaft 616 shown in FIGURE 91. In addition the output shaft 395 from the stepper clutch is shown in FIGURE 84. The drive from motor 385 (FIGURE 64) is through belt 397 to the program selector input by means of pulley 398 attached to the end of shaft 394 (FIGURE 84). Another belt 399 connects the program selector shaft 394 to stepper shaft 616 (FIGURE 91) through pulleys 400 on shaft 394 and 401 on shaft 616. A third belt 402 connects the stepper shaft 395 to the punch shaft 396 through pulleys 403 on the stepper shaft, and 405 on the punch shaft. Because exact synchronism is necessary between the stepper and the punch, belt 402 and pulleys 403 and 405 are of the toothed timing type whereby slippage between belt and pulleys is prevented. While not absolutely necessary, belt 399 and pulleys 400 and 401 may also be of the latter type. It will be noted that both belts 399 and 402 are tensioned by idlers 406 and 407 respectively, slidably mounted on slotted carriers 408 and 409 adjustably fixed to shaft supporting plate 410 as by screws 411.

The program selector input shaft 394, as seen in FIGURE 94, is coupled to output shaft 412 by means of a toothed clutch 413. The output shaft 412 in turn is coupled to the input shaft 196 of the program selector by means of the slotted end 414 of shaft 412.

Clutch 413 includes elements 415 secured to the end of input shaft 394 by means of pin 416 and element 417 slidably mounted on the right hand end of output shaft 412 and is normally spring biased by spring 418 toward element 416, whereby opposing faces 419 and 420 may be brought into locking engagement with each other as by abutments 421 and 422 on their faces. Clutch elements 415 and 417 are normally held disengaged by clapper 423, as seen in FIGURE 98.

With particular reference to FIGURES 96 through 102 which illustrate typical locking relays for actuating all of the clutch mechanisms in the drive and timing unit, it will be seen that these relays are similar to the locking relays described above in connection with FIGURE 123. For more detailed description of these locking relays, reference may be had to the description of FIGURE 123, however, it will be noted that instead of operating switches, as seen in FIGURE 124, the clappers of the instant locking relays are utilized to actuate the clutches of the drive and timing unit. For easy reference, like characters, as used in FIGURE 123 will be applied to the figures under discussion. As seen in FIGURES 96 and 97, however, it will be seen that clapper 375 has been extended to the right, to include an upturned portion 423 having one corner cut off to form a camming surface 424 as seen more clearly in FIGURE 98. Cam surface 424 is adapted to move slidable clutch element 417 away from engagement with fixed element 415, as seen in FIGURES 98 and 99, upon contact therewith of a pin 425 fixed to element 417, and when clapper 375 is in its retracted position, as shown in FIGURE 96, in which position it is locked by clapper 371, as shown in FIGURES 96 and 103. De-energization of electro magnet 368 and energization of electro magnet 369, causes clapper 371, as seen in FIGURE 100, to be drawn to the left permitting clapper 375 to move upwardly out of engagement with pin 425. Spring 418 (FIGURE 94), then is free to move clutch element 417 toward element 415 engaging clutch faces 419 and 420 thus to drive output shaft 412. It will be noted that clapper 371 is prevented from returning to its extended position, shown in broken lines 426 in FIGURE 100, by portion 427 of clapper 375.

When it is desired to disengage the clutch, electro magnet 368 is energized thus to pull clapper 375 downwardly into the path of pin 425 as shown in FIGURE 99, and upon contact of the pin with cam surface 424, clutch element 417 is moved away from engagement with element 415. Clutch element 417 is provided with a discontinuous flange 428 and with reference to FIGURES 101 and 102, it will be seen that the distance between the ends 429 and 430 is such that the ends are adapted to engage a depending hook 432, see FIGURES 101–103, and a fixed bar 433 when in the fully retracted position thus to lock the element against further rotation. Hook 431 depends from a pivotally mounted element 435, spring biased in a clockwise direction as shown in FIGURES 101 and 102, whereby it may be resilient urged in a counterclockwise direction by flange 428 during movement of the latter into retracted position, thus to permit its end 430 to engage the end of bar 435 as seen in FIGURE 103, simultaneously with the movement of hook 432 in a clockwise direction behind end 429 of flange 428.

It will be understood that the operation of all of the clutch mechanisms of the drive and timing unit is similar to that described above, and therefore, no further description will be included when reference is made to the various other clutch mechanisms. However, certain features of the various clutch elements, as seen in FIGURES 104 through 111 are different, and these differences will be pointed out as this description continues.

Again, with reference to FIGURE 94, it is seen that slidable clutch element 417 is keyed, as by projection 437, to the hub 438 of a gear 439 having a one to one ratio with a similar gear 440 on an auxiliary shaft 441, the ends of which are journaled in plates 309 on the left, and 410 on the right. This shaft carries the timing cams 442 for the program selector, which cams are used to actuate switches numbered S51 to S55 and seen more clearly in FIGURE 95, upon rotation of the shaft.

It should be noted here with reference to the continuity of the reference characters which ended at 442 in the last paragraph, that a jump will be made here to 609. The jump is necessitated by the use of the intermediate characters to describe the accounting machine 10 with the same characters used to describe similar parts in the aforesaid Butler patent.

The stepper input shaft 616, which rotates at 1,900 r.p.m., is provided with a two toothed clutch 609 (FIGURE 110) which is capable of engagement in either of two positions as by projections or teeth 610 on opposing faces of clutch elements 611 and 612. Element 611 is similar to clutch element 417 on the previously described clutch mechanism and is slidably mounted on shaft 395 and rotatable therewith by reason of being keyed to collar 613 secured to the shaft by pin 614. It will be noted that clutch element 611 is normally biased to the right toward engagement with element 612 as by coil spring 615 positioned in recess in collar 613. Clutch element 612 is an integral part of a bushing or hollow shaft 616 rotatably journaled in plate 410. Pulley 401 is secured to the outer end of shaft 616 for rotation therewith.

Also pinned to shaft 395 by pin 614, is a gear 617 which is in driving engagement with a gear 618 pinned to an auxiliary shaft 619, the ends of which are journaled in plates 309 and 410. Gear 618 has a one to one ratio with gear 617, and is used for driving the high-speed stepper timing cams 620 used for actuating switches identified as S71 to S73.

Positioned at the left hand end of shaft 395 is a wabble gear mechanism 621, the input element 622 of which is driven by shaft 395. The wabble gear is a novel device and forms the subject matter of Patent 2,816,759, in the name of Hoffman et al., and entitled "Differential Gear Stepping and Marking Device." While the gear per se forms no part of the present invention, it affords a gear reduction of 1 to 16 and additionally gives an intermittent motion to its output element 623. The output in the present instance is geared at a one to one ratio to a gear 624 attached to an auxiliary shaft 625 having its ends journaled in plates 309 and 410 and carrying low speed cams 625' arranged to actuate switches S61 to S65.

Rotation of pulley 401 by belt 399 rotates shaft 616 freely on shaft 395, which will not be rotated until normally disengaged clutch elements 611 and 612 are pulsed to engage. This means that the punch, which is driven from pulley 403, does not operate unless the stepper is rotating. The output element 623 of the wabble gear is provided with a splined shaft 626 for engagement with the stepper shaft 262 (FIGURE 79), thus to drive the latter.

With reference to FIGURE 93, it will be seen that the punch clutch 626, which is also shown in FIGURES 104, 105, and 106, is normally engaged so that once the pulse arrives at the stepper clutch and the stepper starts rotating, the punch is immediately available for punching. Except for the fact that the engaging faces of punch clutch 627 are somewhat different, the clutch is similar to program selector clutch 413, as seen immediately below in FIGURE 94, and therefore, like reference characters, will be used to identify like parts without further description of the punch clutch. Shaft 396 carries a gear 627 in driving engagement at a one to one ratio with a gear 628 pinned to auxiliary shaft 629, the ends of which are journaled in plates 309 and 410. Carried by shaft 629 and punch timing cams 630, positioned to actuate switches identified S81 through S85, shown immediately beneath cams 630 supported upon a bar 631. Shaft 629 is provided with a splined end 632 driving the punch shaft, not shown.

Fixed to the right hand end of shaft 629 is a pulley 633 in driving engagement with one end of a belt 635, the other end of which engaged around a pulley 634 (FIGURE 62) for driving tape take-up reel 22 positioned on the outer end of shaft 636 to which pulley 634 is attached.

With reference to the FIGURE 62, it will be seen that the tape supply reels 637 is rotatably mounted on a shaft 638 on the right hand side of the perforator unit. As shown in both FIGURES 62 and 64, reel 637 is provided with a switch 639 actuated by a spring biased arm 640 which, when in the position shown in broken lines in FIGURE 131 is biased against the tape upon the reel, and which, when the supply of tape is about exhausted, has moved to the position shown in full lines in the same figures, thus to close switch S91 to actuate a buzzer 641 positioned on the accounting machine, see FIGURE 29, to indicate that the tape is about exhausted.

If desired, take-up reel 22 may be eliminated and a tape guide 642 may be provided as shown in FIGURE 132, to feed the tape out of the machine and direct it to associated apparatus, such as a card punching machine (not shown), whereby the coded markings on the tape may be transferred directly to cards.

To indicate when the take-up reel is substantially full of tape, there is provided a feeler arm 643 as shown in FIGURES 128 and 129 which, as the tape builds up on the reel, is moved to the broken line position, shown, thus to close switch S92 to actuate a buzzer 641 (FIGURE 29) to indicate the condition of the reel. Associated with arm 643 which is pivotally mounted on shaft 645 is another arm 646 having a tape guide 647 which when threaded with tape is held in the position shown in FIGURE 128. If for some reason the tape breaks or the end of the tape passes through, arm 643 is urged by spring 648 in a clockwise direction to the position shown in FIGURE 129 thus to close switch S92 to actuate buzzer 641.

*Starting System—Signalling Devices (FIGURE 141)*

Although energized from the same power source, the two major components of the invention may be located remotely from one another, and interconnected by means of electrical cables.

The line voltage V as indicated at the upper right hand corner of FIGURE 141 is applied to the system in a conventional manner and is brought in to terminals 20—1 and 20—3 to which the motor of the accounting machine and the power supply for the perforator are connected in parallel. The motor, its switches, interlocks and peripheral equipment are all described in detail in the above identified Butler patent. The perforator power supply may be of any suitable variety, its details forming no part of the present invention.

A fuse F1 and switches S20 (also see FIGURES 6, 29 and 37) and S28 (FIGURES 6, 29 and 43) are interposed between the power supply and terminal 20—3. The fuse is of a conventional variety and is connected into the line between terminals 25—4 and 25—5, see FIGURES 29 and 30 for the location of the terminal boards. Switch S20, which is associated with the carriage control disabling lever 700 as seen in FIGURE 37, and which is similar in construction to the switch shown in FIGURE 48, is of the single pole, double throw variety and is connected into the line between terminals 22—9 and 22—10. When terminal 2 of switch S20 is connected to its terminal 3, the automatic function control of the accounting machine by its carriage is disrupted. Conversely, when terminals 1 and 2 are interconnected by lever 700 (see broken line position shown in FIGURE 37), the machine is under automatic carriage control. The manner in which this is achieved is disclosed in the aforesaid Butler patent.

The perforator power switch S28, see FIGURE 47 for details, is also of the single pole double throw variety and is connected between terminals 23—2 and 23—8 (FIGURE 29). The respective power lines are brought to the perforator via sockets 1–B and 1–K, connected respectively between terminals 25—1 and 25—3 and the power supply. It may therefore be seen that closure of switches S20 and S28, the latter through lever 701 by depression of "POWER ON" key 702 (FIGURE 43), will bring power to the perforator.

Two sets of lines, one extending rightwardly and the other leftwardly, emanate from the perforator power supply. The former set conveys power to the various operational elements of the perforator while the latter is utilized to energize the various signalling devices found in the system. One of the rightwardly extending lines is connected to terminal 2 of switch S51 while the other is connected to terminal 3 of relay K34 (FIGURE 123). For purposes of clarity, the former of these lines will henceforth be referred to as the power line or B+, and the latter as the ground line or simply ground. It should be understood that any illustration showing a connection to "B+" indicates a connection to the power line while any illustration showing a connection to "ground" indicates a connection to the ground line.

A fuse F2 of conventional design is connected into the power line between terminals 12—1 and 12—2.

As was mentioned above, all signalling devices in the system are connected between the lines extending leftwardly from the perforator power supply in FIGURE 141. These lines are connected respectively to terminals 27—5 and 27—6. Referring more particularly now to the signalling devices themselves, it may be seen that closure of S20 and S28, as described above, will result in the lighting of signal lights DS3 and DS10, indicating that power is available at the perforator. Light DS10 is located in the perforator itself, and is connected directly across terminals 27—5 and 27—6. DS3 is located in the accounting machine, being connected between terminals 28—1 and 28—2. Power is conveyed to it from the perforator via socket 1–J, and the return path is through socket 1–FF.

The punch within the perforator is controlled by means of relay K34, shown in the upper left portion of FIGURE 141. It may be seen that terminal 2 of the pull-in coil P of K34 is indicated as being connected to terminal 3 of switch S29 (FIGURE 144) while terminal 1 of the coil is connected to ground. As will be described fully hereinafter, closure of S29 will result in the energization of K34–P causing the transference of the relay. Interconnection of terminals 7 and 8 of K34 will allow the punch to be activated, while the interconnection of terminals 5 and 6 will result in the application of voltage to vibrator switch S94, located in the punch itself and being connected between sockets 6–L and 6–M (left hand side of FIGURE 141). This switch has no control function within the system and is merely utilized to transmit pulses, via socket 1–T to signal light DS5, which is located on the left hand side of the accounting machine (FIGURES 4, 39, 40, 41, and 42) and connected between terminals 28—5 and 28—6. Repeated flickering, on and off, of DS5 indicates that the punch is in operation. Switch S31, in the electrical lanes of the control tray 161, and on the left hand side of FIGURE 141, also see FIGURE 6, connected in the line between terminals 24—1 and 24—2 is connected in parallel with DS3 at socket 1–J. It is operatively associated with the carriage of the accounting machine, and in a manner to be described hereinafter will be closed as indicated in FIGURE 141 only when the carriage is at a predetermined position. Closure of S31 will result in the lighting of signal light DS8 which is connected in the line between terminals 26—9 and 26—10 and connected to S31 via socket 1–S.

Tape malfunctions are sensed by switches S91, S92, and S93 (left center of FIGURE 141); S91 being connected between terminals 15—1 and 15—2, S92 between terminals 27—1 and 27—2, and S93 between sockets 6–N and 6–P. S91 (also shown in FIGURE 131) is of the single pole double throw variety and interconnection of its terminals 2 and 3 signifies that the tape must be replenished. S92 (also shown in FIGURE 128) is also of the single pole double throw variety and interconnection of its terminals 2 and 3 signifies that the tape take-up reel is full and should be replaced. S93, which is in the punch, is of the single pole single throw variety and its closure indicates a malfunction such as broken tape, tight tape or no tape in the punch. The manner in which these occurrences are sensed by the respective switches will be described hereinafter.

As may be seen in FIGURE 141, the three switches S91, S92 and S93 are connected in parallel to buzzers DS2 (also see FIGURE 29) and DS9, as well as to signal light DS4 which is also connected in parallel. The arrangement is such that closure of any of the three switches as described above will activate the buzzers and the light. DS2 and DS4 are located in the accounting machine and when energized indicate to the operator that the tape needs attention. DS9 is located in the perforator for the purpose of indicating this same fact to its attendant.

When the perforator needs attention it is necessary that the system be rendered inoperative. This is achieved by means of double pole single throw switch S101 located in the perforator as seen in FIGURES 2 and 3. Terminals 1 and 2 of S101 are connected respectively to terminal 1 of switch S61 (FIGURE 147) and to B+, while terminals 3 and 4 of S101 are connected between terminals 26—3 and 26—7. Closure of S101 will energize an interlock which, in a manner to be described hereinafter, will render the system inoperative. Simultaneously, signal light DS7, which is connected in the line between terminals 28—9 and 28—10 will be lighted due to its interconnection with S101 via socket 1–C. The lighting of DS7 indicates to the operator of the accounting machine that the attendant at the perforator has temporarily rendered the system inoperative.

The system is programmed in such a manner that on more than a specified number of digits or characters may be entered at any given carriage position. If this programmed capacity is exceeded relay K35 (upper center of FIGURE 141) will indicate the fact. Terminal 2 of the pull-in coil P of this relay is connected to terminal 10 of relay K21 (FIGURES 144 and 64) and the pull-in coil will be energized via K21 if the capacity has been exceeded. The manner in which this is achieved will be described subsequently. With the pull-in coil energized, K35 will transfer and buzzer DS1 (also see FIGURE 29) and signal light DS6 (FIGURE 39) will both be energized, indicating to the operator that the entry exceeds the programmed capacity. DS6 is connected in the line between terminals 28—7 and 28—8 and is connected to terminal 7 of K35 via socket 1–R, while buzzer DS–1 is connected to terminal 5 of K35 via socket 1–BB.

*Starting the Perforator—Selecting a Program*
*(FIGURE 142)*

The main cam shaft 126 of the accounting machine is at zero degrees. For the timing of machine 10 reference may be had to FIGURES 178 through 180 of the Butler patent. Pin 167 is present in electrical lane 1 of the control panel on the accounting machine, and the motor 285 within the perforator 11 is causing the drive side of the program selector drive shaft 394 to rotate. However, the program selector clutch 413 is disengaged and therefore the driven side 412 of the shaft and the program selector itself are at rest. See FIGURES 85–95 for details.

As is best illustrated in FIGURE 142, switch S6 (upper left corner, also see FIGURE 6) associated with the main cam shaft 126 of the accounting machine, has its terminal 2 connected to terminal 23—5 which is in turn connected to B+ via sockets 1–a, 7–S and 7–R. Terminal 1 of S6 is connected to terminal 2 of S1 (electrical lane 1) while terminal 1 of S1 is connected to terminal 12—4 via sockets 1–f, 7–K and 7–L. The program selector clutch engage solenoid L11 (also 368 in FIGURES 96–103) as well as the reset coils R (342 and 343 in FIGURE 115) of control board relays K1 through K5 (FIGURE 63), all of which will be discussed more fully hereinafter, are connected in parallel between terminal 12—4 and ground.

As the accounting machine commences to operate, its main cam shaft 126 will rotate and cam C6 (FIGURE 29) which is located thereon will close switch S6 (FIGURE 6). The cam is so designed that it will maintain S6 closed from 120° to 140° of the accounting machine cycle and permit it to remain open for the remainder of the cycle. As a pin is present in electrical lane 1 switch S1 will also be closed. Accordingly, a voltage pulse will be applied to terminal 12—4 from B+ via the two above mentioned switches. It is understood that switch S6 will be closed from 120° to 140° of every cycle of the accounting machine but that S1 will be closed only if a pin is present at the location in electrical lane 1 corresponding to the then existant position of the carriage. Accordingly, whether or not the entry made at any given carriage position will be punched into the tape is primarily determined by the presence or absence of a pin in electrical lane 1 at that carriage position.

The pulse at 12—4 energizes L11 (368) and returns to ground via terminal 12—3. Electromagnet 369 (FIG- URE 103) when energized pulls in its associated latch 371, permitting the clutch clapper 375 to rise under the urging of its spring so as to release the clutch. With the clutch released its driven side 417 (FIGURE 94) moves forward engaging the drive side 416 and the program selector commences operation.

Concurrently, the reset coils R–342 (FIGURE 115) of perforator control board relays K1—K5 are pulsed via terminal 12—4 so as to return these relays to their normal position illustrated in FIGURE 142. As is illustrated in FIGURE 115, each of relays K1—K5 comprises a pull-in coil P (343), a reset coil R (342), and two single pole double throw switches (347 and 348). The reset coils are, as was mentioned previously, connected between terminal 12—4 and ground. The pull-in coils P are connected respectively between terminals V7, X7, Z7, BB7 and DD7 on the control board (FIGURE 135) of the perforator and ground. This configuration permits the selective energization of the pull-in coils from other parts of the system for the purpose of setting up or modifying program operations. As the control board is readily accessible this wiring may be changed with facility—making possible variations in the programming at will. In a like manner the switching elements of the relays are also connected to control board terminals, as described heretofore, in order to make it possible to wire them to other components of the system and to change the wiring, if desired, with dispatch. The manner in which these and other elements which are wired to the control board may be interconnected so as to modify the operation of the perforator will be discussed more fully hereinafter.

Switches S2—S5 are associated respectively with electrical lanes 2 through 5 of the accounting machine. Their common terminals 2 are connected in parallel to switch S51 (FIGURE 88) via socket 1–y. Additionally their terminals 1 are connected respectively to the program selector slide solenoids L25—L28 (FIGURE 71) via sockets 1-EE, 1–u,1–cc and 1-AA.

Selected ones of switches S2—S5 will be closed if pins are present in their associated electrical lanes and they will be closed simultaneously with the closure of S1. When L11 (368) is energized as a result of the closure of S6 by cam C6, the clutch of the program selector drive shaft engages, causing the driven side of the shaft to commence rotating. With the shaft rotating, the four coded slides (208—211 of FIGURE 73) within the program selector are moved by their associated cams as was previously described. Each slide carries its clapper with it, moving the latter into abutting relationship with the solenoids L25—L28, lower right of FIGURE 142 and physically shown in FIGURE 69.

At 35° of rotation of the program selector drive shaft, cam C51 (FIGURE 94) operatively connected to shaft 441 closes its associated switch S51 and maintains it closed until 185° of rotation of the selector drive shaft. S51 is connected in the line between B+ and socket 1–y. Accordingly, when S51 is closed a voltage pulse will be applied via S51 to those solenoids among L25—L28 whose corresponding switches S2—S5 is closed. It should be noted that switches S2—S5 are located in the accounting machine and whether or not each of them will be open or closed during any given cycle is dependent upon the presence or absence of a pin in the electrical lane corresponding to the switch at the particular carriage position being utilized during that cycle. It may therefore be seen that which of solenoids L25—L28 is to be energized during any given cycle is determined by the location of the pins in the control panel of the accounting machine.

Shortly after selective energization of the solenoids, the slides are urged back to their home position. Those slides associated with clappers whose corresponding solenoids have not been energized are free to so move. However, the energized solenoids retain their corresponding clappers in abutting relationship thereto, and accordingly the coded slides associated with these clappers are prevented from returning to their home position. As was explained previously, which of the slides was or was not permitted to return to its home position will determine the particular program to be employed during the cycle.

In addition to the above, closure of S51 will also result in the resetting of relays K11, K12, K21, K22, K26 and K36 (FIGURE 64) as will be discussed more fully hereinafter.

*Bail and Motor Bar Switches—Blank Keyboard and Limit Rack Circuits (FIGURE 143)*

When the program selector drive shaft reaches 130 degrees of rotation, cam C52, the second cam associated with the program selector will close its switch S52, and will maintain S52 closed until 175 degrees of drive shaft rotation. During this period (130°–175° of drive shaft rotation) current will pass from B+ across S52, terminal 17—18 and socket P1 to bail switch S10 (FIGURE 42) and switches S17, S18 and S19 (FIGURES 6, 49, 50, 51 and 52), the latter being actuated respectively by depression of main motor bars MB1, 3 and 4. It should be noted that switches S10, and S17—S19, as well as the motor bars, are all located in the accounting machine 10.

The circuitry is such that S10 is in parallel with S17, S18 and S19, which are in series with one another. S10 is associated with the index lock bail 650 (FIGURE 42) of the accounting machine. (This bail operates on "total," and "subtotal" cycles only, locking the keyboard so as to prevent movement of the sectors 491 (FIGURE 7). With the sectors immobilized the machine is compelled to "read-out" the values stored in the registers and/or crossfooters of the Butler machine.) S10 is a single pole, double throw switch whose terminals 2 and 3 are interconnected when the index lock bail 650 is inoperative ("no total" cycle), and whose terminals 1 and 2 are interconnected when the index lock bail is operative ("total" or "subtotal" cycle). Terminal 1 of S10 is connected to terminals R6 and R7 on the control board, FIGURE 135. These terminals are labelled "total." Similarly, terminal 3 of S10 is connected to terminals R8 and R9 on the control board and these terminals are labelled "no total."

Switches S17, S18 and S19 are also single pole double throw switches. They are in series with one another and in parallel with S10. Terminal 3 of S17 is wired to terminal 2 of S18 whose terminal 3 is wired to terminal 2 of S19 whose terminal 3 is wired to terminal S–9 on the control board. S–9 is labelled A.O. (all others). Accordingly, if either of motor bars 1, 3 or 4 is utilized, the current will pass from the source across S52, terminal 17—18 and socket P1, across the back contacts of S17, S18 and S19 out to A.O. via socket 1–K and terminal 4—9. Motor bar 2 is assumed depressed, in the event of any repeat other than a motor bar repeat, and when any of the operational control keys (total, subtotal, non-add, add, and subtract keys) are depressed. This is due to the fact that from the point of view of the perforator they all "look like" a motor bar 2 operation.

If motor bar 1 is depressed, terminals 1 and 2 of S17 will be interconnected, and the pulse will appear at terminal S–6 (which is labelled motor bar 1 on the control board) rather than at S–9. Similarly, if either motor bars 3 or 4 is depressed by levers shown in FIGURE 49, its associated switches S18 and S19 will be operated and the pulse will appear respectively at terminals S–7 or S–8 (labelled motor bar 3 and motor bar 4 respectively) rather than at terminal S–9.

In addition to the above, the pulse from S52 will also energize the reset coils R(343) of relays K14—K17 (FIGURE 64) for a purpose to be discussed hereinafter.

At 270° of rotation of the program selector drive shaft cam C54 closes switch S54 and maintains S54 closed until 315° of rotation of the program selector drive shaft.

It may be recalled that from 130° to 175° of rotation, bail switch S10 and motor bar switches S17, S18 and S19 were pulsed by switch S52 which is activated by cam C52. At 270° and until 315°, an additional pulse from S54 is applied to these switches. When S54 is closed by cam C54, current from the source moves across S54, terminal 17—19 and rectifier CR112 (FIGURE 125) to terminal 17—18, from which point it is applied to switches S10, S17, S18 and S19, which are connected to terminals R6—R9 and S–6—S–9 as was previously discussed.

In summation switches S10, S17, S18 and S19 are pulsed by S52 from 130° to 175°, and by S54 from 270° to 315°. These pulses are utilized in modifying a preselected program. The manner in which this is accomplished will be discussed hereinafter.

Simultaneously with the pulsing of the bail and the motor bar switches, S54 energizes solenoid L12 (368) operatively connected to the program selector clutch disengage clapper, so that when energized it will pull the latter down into active position as was previously discussed.

The only requirement here is that the clapper be placed in active position before the disengage pin 425 (FIGURE 99) on the clutch has come around far enough to contact the cam surface 424 of the clapper. Accordingly, L12 could have been energized at any time after the clutch engaged, up until 340° of shaft rotation. Energization takes place at this point for purposes of convenience only, to even out the "make and break" loads on switches S51—S55.

In this circuit the current from B+ passes across S54 and terminals 17—19, and 12—6 into solenoid L12 and then to ground.

Occasionally, due to its programming, it is necessary to cycle the accounting machine with nothing entered in its keyboard. It is obviously not desirable to punch the series of zeroes which result from this cycle. The "blank keyboard" circuit is provided for the purpose of automatically interrupting punching for the single "blank keyboard" cycle and then immediately reinstituting punching for the next and all subsequent cycles.

The output of switch S54 is connected to the leftmost extra zero common terminal in the read-out unit of the accounting machine. The rightmost extra zero terminal is connected via socket 2–T, terminal 2—13 and socket 1–N to terminal 2 of switch S30, operatively associated with electrical lane 6 of the accounting machine. Terminal 1 of S30 is connected to terminal 3 of bail switch S11 (FIGURE 42) whose terminal 2 is connected to the pull-in coil P (343) of relay K20 (FIGURE 64). The circuitry of the read-out unit is such that if a "blank keyboard" condition exists in the accounting machine there will be continuity from the common terminal of the leftmost extra zero switch to the zero terminal of the rightmost extra zero switch. If any digit is entered in the keyboard, the continuity will be disrupted by the extra zero switch in the digit column corresponding to the column in which the digit was entered.

Assuming a "blank keyboard" condition exists, at 270° of rotation of the program selector drive shaft, S54 will be closed by C54 and current from the source will pass across S54 and socket 3–Z to the read-out unit in the accounting machine. The current entering the leftmost extra zero common terminal will pass across the read-out unit and exit through the zero terminal of the rightmost switch. The current then passes across to normally closed switches S30 and S11 and into the "blank keyboard" relay K20 (FIGURES 64 and 144), energizing the latter, as will be explained in detail hereinafter. With K20 energized, punching is interrupted. K20 will be reset later in the cycle.

It should be noted that for relay K20 to operate, all the extra zero switches in the read-out unit must be closed, i.e. a "blank keyboard" condition exists in the accounting machine and switches S30 and S11 must be closed. Bail switch S11 is similar to bail switch S10 discussed previously, and it will be closed during all cycles except "total" or "subtotal" cycles. It opens during such "total" or "subtotal" cycles and disables the above described blank keyboard circuit. This permits the punching of the "total" or "subtotal" regardless of whether the amount is zero or any other value. Switch S30 will be closed only if a pin is present in its associated electrical lane at the carriage position under consideration. Accordingly and in addition to the selectivity imposed upon the "blank keyboard" circuit by S10, additional flexibility is imparted to the circuit by the choice made possible by S30, i.e., the choice as to whether or not to punch during a blank keyboard cycle which is not a "total" or "subtotal" cycle.

As may be noted from FIGURE 143, terminal Q13 on the control board is connected in parallel with switch S30. Accordingly a pulse will be applied to Q13 every time a "blank keyboard" condition exists. This pulse, as described hereinafter, may be employed for control purposes regardless of whether or not it is desired to punch the series of zeroes resulting from the "blank keyboard" cycle.

The manner in which relay K20 controls punching will be discussed hereinafter.

Since the tape produced by the perforator may be employed in conjunction with punch cards which have a fixed format, a format control must be provided in the perforator. At each carriage position of the accounting machine no more than a predetermined number of digits columns may be employed. This is necessary in order to maintain synchronism with the corresponding fields on the punch card. When a greater number of digit columns is being employed, i.e. when the programmed capacity is being exceeded by the utilization of a column to the left of the "limit rack," the instant circuit is provided to indicate this fact.

The common terminal of each extra zero switch in the read-out unit is wired to a corresponding terminal on the control board. The control board terminals employed for this purpose are Q14 through Q17, R14 through R17, and S–14 through S–17.

If the capacity has not been exceeded, continuity should exist from the leftmost extra zero switch to the extra zero switch corresponding to the "limit rack" since all digit columns to the left of the "limit rack" will be in a zero condition. Accordingly, a pulse will be available at the control board terminal corresponding to the "limit rack" when S54 is closed. This control board terminal will be wired to a corresponding control board terminal reserved for the "limit rack" circuit of the program selector, see FIGURE 146, and may accordingly be any one of terminals B25–R25, FIGURE 146, depending upon the manner in which the perforator has been programmed. Any one of the terminals B25–R25 may be selectively connected to the pull-in coil P of the "limit rack" gate relay K21 (FIGURE 144). Which terminal is actually so connected is dependent upon the programming as will be hereinafter explained.

Assume that the programmed capacity has not been exceeded. When S54 is closed by C54 at 270° of rotation, a pulse from the source will pass across S54 and socket 3–Z and enter the read-out unit at the extra zero common of the leftmost switch. The current will then pass down the line of extra zero switches until it comes to the switch corresponding to the "limit rack" at which time the current will move out of the read-out unit to the associated one of terminals Q14 through Q17, R14 through R17, and S–14 through S–17 on the control board. This terminal will be wired to an associated one of terminals B25 to R25 corresponding to the "limit rack" (or exceed capacity) circuit of the program selector for the particular program selected. From that terminal the current will move to the pull-in coil P of relay K21 energizing the latter and then back to the source.

If a digit is entered into the keyboard of the accounting machine to the left of the limit rack, then continuity between the leftmost extra zero switch and the one corresponding to the limit rack will be disrupted. Accordingly the pull-in coil 343 of K21 will not be energized indicating that the programmed capacity has been exceeded.

The manner in which K21 makes this indication will be described hereinafter.

No Character Key Depressed—Function Control Keys (FIGURE 144)

As was previously discussed, if the programmed capacity of the accounting machine has not been exceeded, the pull-in coil P (343) of K21 (FIGURE 64) the limit rack gate relay will be energized. However, if the programmed capacity has been exceeded, then one of the extra zero switches in the read-out unit will be opened, disrupting the continuity and the pull-in coil will not be energized.

At 310° of rotation of the program selector drive shaft, cam C55 closes switch S55, which is connected directly to B+, and maintains it closed until 355°. Accordingly, a pulse will be applied, through S55 to terminal 9 of relay K21. If the pull-in coil has been energized, then K21 will have transferred and its terminals 8 and 10 will be interconnected, while terminal 9 is open circuited. Accordingly, the pulse to K21-9 will go no further. However, if the pull-in coil is not energized, (capacity exceeded), K21-9 and K21-10 will remain interconnected and the pulse will be applied to K35-2 (see FIGURE 141) via terminal 5—16, energizing the pull-in coil of that relay so as to actuate the exceed capacity warning light DS6 (FIGURE 39) and a buzzer in the perforator. In addition, terminal 5—16 is also connected to terminal T16 on the control board. By connecting a jumper from this terminal to T17, also on the control board, the pull-in coil of K36, the exceed capacity punch control relay, will be placed in parallel with that of K35, and will also be energized by the pulse coming through K21. Energization of the pull-in coil of K36 results in a manner to be hereinafter described, in a single cycling of the punch, indicating by a special symbol on the tape that the capacity has been exceeded.

K21 will remain in its transferred position for the duration of the cycle. At the commencement of the next cycle it will be returned to its normal position by a pulse from S51 to its reset coil R, as is indicated in the drawing.

When the machine is initially set in operation, the operator depresses key 703 (FIGURE 43) to actuate switch S29, the "punch on" switch, as by lever 704 (also see FIGURES 29 and 46). Terminal 2 of S29 is connected to B+ in parallel with S6 (see FIGURES 29 and 142) and as a result of its closure, current will flow from the source across S29, into the pull-in coil P of K34, the "punch on" relay, via terminal 23—6, socket 1-J and terminal 17—8 energizing the pull-in coil.

Energization of the pull-in coil results in the transfer of the relay and the interconnection of K34-5 and K34-6 as well as K34-7 and K34-8. K34-6 is connected directly to the source, (see FIGURE 141), and when the above described transfer occurs current passes from the source across K34 and vibrator switch S94 in the perforator via socket 6-L to the "punch on" indicator light DS5 via sockets 6-M and 1-T and terminal 28—6. S94 has no functional control, it is vibrated by the punch causing DS5 to flicker on and off.

As was previously explained, the pull-in coil P of K20, the blank keyboard relay, is normally energized by S54, see FIGURE 143, via switches S30 (in electrical lane) and S11 (FIGURE 42) if no entry has been made on the keyboard of the accounting machine. If an entry has been made, or if for any of the reasons described previously, it is not desired to interrupt punching, the pull-in coil of K20 will not be energized. Accordingly, when S55 is closed by C55 at 310° of drive shaft rotation, a pulse will pass from B+ across S55 and via sockets 7–J and 7–H to K20-9 which is normally interconnected with K20-10, and from K20-10 the pulse passes to K34-8. It should be recalled that K34 has transferred due to the energization of its pull-in coil by S29, and accordingly K34-7 and K34-8 will be interconnected. From K34-7 the pulse passes across terminal 17—12, rectifier CR109 and terminal 17—11 to terminal 12—8. The stepper clutch (609) engage solenoid L13 (368) and the pull-in coil P of relay K33 (FIGURE 147) are connected in parallel to, and both are energized by the pulse applied to terminal 12—8. As was previously discussed, energization of L13 will result in the engagement of the stepper switch clutch, causing that switch to commence operation. It should be noted that this pulse terminates at 355° of rotation of the program selector drive shaft. Accordingly the stepper switch commences operation just as the program selector clutch is about to disengage.

In addition to the above, the female portion of socket 7–E is also connected to, and receives a pulse from, terminal 12—8. The effect resulting from pulsing 7–E and the pull-in coil of K33 will be discussed hereinafter.

It may be noted from the drawing that in addition to the pulse from S29 the pull-in coil P of relay K34 may be energized from other parts of the system via terminals R10 through R13 of the control board and the related circuitry indicated in FIGURE 144. Which components are utilized for this purpose is dependent upon the programming and will be discussed further hereinafter.

Although the circuitry permits the operator of the machine to activate the punch by depressing switch S29 (FIGURE 43), the punch can be de-energized only through circuits set up in the internal programming and are totally inaccessible to the operator. The is accomplished by pulsing the reset coil R of relay K34 via terminals S10–S13 on the control board and by utilizing the related circuitry indicated in FIGURE 144. The manner in which this is accomplished will be discussed hereinafter.

It may be recalled that the read-out unit within the accounting machine contains both decimal and duo-decimal switches. The former are associated with the digital values entered on the keyboard and are provided with extra zero or limit rack switches. The latter are associated with the character columns on the keyboard, and since there are 12 character keys in each column, no provision can be made within the duo-decimal switch itself for a "no key depressed" indication. However, such indication must be provided since failure to depress a key may invalidate an entry in the same manner as depression of the wrong key. The instant circuit relates to the manner in which the "no key depressed" indication is made.

Switches S8 and S9 (FIGURE 6) are attached to the back plate of the accounting machine, extending inwardly therefrom. The switching elements which are connected to S8-2 and S9-2 respectively, are operatively associated with the racks corresponding to the character columns and are normally held in a closed position thereby. If no character entry is made, the racks will remain stationary and the associated switches S8 and S9 (FIGURES 6, 14 and 27c) closed. If a character entry is made, the corresponding rack will move forward permitting the associated switch S8 or S9 to open.

At 310° of drive shaft rotation, cam C55 will close S55 and the pulse from B+ (lasting until 355° at which time cam C55 permits switch S55 to open), will travel across S55 and then S8 and S9 (assuming no character entry, and closed switches) which are connected in series with S55. The pulse will accordingly energize the pull-in coils P of relays K18 and K19, the rack 12 and the rack 13 zero relays, which are connected respectively to S8 and S9 via terminal 24—7 and socket 1–D for K18 and terminal 24—5 and socket 1–X for K19. Energization of the pull-in coils results in the transfer of these relays and the interconnection of their respective terminals 8 and 10.

As will be hereinafter explained, specific levels of the stepper switch are wired through the control board to read the various decimal and duo-decimal switches of the readout unit by applying pulses to their commons. The common of the rack 12 duo-decimal is wired to terminal P2 on the control board via socket 3–AA and terminal board 1 contact 2 (five terminal boards 357 in FIGURE 63), while the rack 13 duo-decimal common is wired to terminal P1 on control board, FIGURE 135, via socket 3–V on P2 (FIGURE 28), and terminal 1—1. P1 and P2 are in turn wired to specific fixed stepper terminals on the control board in accordance with the predetermined program. K18–10 is connected to P2 in parallel with the rack 12 common at terminal 1—2 and K19–10 to P1 in parallel with the rack 13 common at terminal 1—1.

If no character is entered all the switches of both duo-decimals will be open and K18 and K19 will be transferred as hereinbefore explained. Accordingly, when the pulses from the stepper switch enter terminals P1 and P2 they will pass across the interconnected terminals K18–8 and K18–10 as well as K19–8 and K19–10 (the duo-decimals are open circuited) and then to terminals T13 and T14 on the control board which are connected to K18–8 and K19–8 at terminals 5—13 and 5—14 respectively. T13 and T14 are wired to the encoder to give any desired "no key depressed" indication as will be hereinafter explained.

It should be understood that only one duo-decimal switch is used in the present embodiment of the invention but that provision, as described above, has been made to accommodate two, if desired.

Additionally, although it may be desired to print certain characters on the accounting machine, it may be equally undesirable to punch them. Accordingly, the switches corresponding to these characters in the rack 12 duo-decimal are internally wired in parallel to socket 3–X which is connected to terminal T13 in parallel with K18–8 at terminal 5—13. If a switch corresponding to the rack 13 characters is provided it is similarly wired to socket 3–W which is connected to terminal T14 in parallel with K19–8 at terminal 5—14. Accordingly, when any of these character keys is depressed, the pulse will appear at T13 or T14 as if no key were depressed and such will be the indication punched although the character will be printed by the accounting machine.

The accumulators which may be either registers or crossfooters in the accounting machine (see Butler patent) are capable of performing a plurality of arithmetic functions. A register can add, subtract and take a positive total or subtotal. A crossfooter can take negative (or credit) totals and subtotals as well. What calculating operation will be performed by the accumulators in the accounting machine depends on which of the function control keys is depressed.

Operatively associated with the function control keys are a plurality of switches, S12–S16, only three of which, S12, S13 and S15 (see FIGURES 6, 58, 59 and 60) are used in this embodiment, the description will proceed on the basis that all five can be used, if desired. S12, S13 and S14 correspond respectively to each of the accumulators, and are employed to distinguish between addition and subtraction. In addition, switches S15 and S16 are also associated with those accumulators which are crossfooters in order to distinguish between positive and negative (or credit) totals and subtotals. No such switch is necessary for the remaining accumulator which is always a register since registers cannot take negative totals or subtotals. All total and subtotal operations from the register are positive. There is therefore no need to distinguish between positive and negative total and tubtotal operations from this accumulator since the negative will never occur.

These switches are actuated from the main cam shaft 126 through cams 452 and 454 and 592, Y-shaped lever 449 on shaft 450, Y-shaped lever 594 on shaft 595 and rack bars 444, 445, and 446. For further details see FIGURES 34 and 36 of the Butler patent.

Switches S12—S16 are connected in parallel to switch S55 via socket 1–F and the terminals indicated in the drawing. S12—S14 are also respectively operatively connected to the pull-in coils P of relays K14, K15 and K16, as indicated, while switches S15 and S16 are connected in parallel to the pull-in coil P of relay K17 via socket 1–S. The common terminals of the relays K14—K17 which are of the single pole double throw variety have their terminals 10 respectively connected to terminals Q6—Q9 on the control board. These latter terminals are connected through external wiring to the stepper switch in a manner dependent upon the specific programming of the machine.

The terminals 9 of relays K14—K17 are connected in parallel to terminal Q10 on the control board. Similarly, the terminals 8 of relays K14—K17 are conected in parallel to terminal Q11 on the control board.

Terminals 9 and 10 of the relays are normally interconnected, but upon energization of their pull-in coils, the relays transfer and close in the opposite direction. Switches S12—S16 are normally open and are closed when their associated function control key for a negative operation is depressed.

Assuming a positive calculating operation is to take place, the switches S12—S16 will remain open and the pulse from S55 (which is closed by its associated cam C55 from 310° to 355° of rotation) will get no further. Accordingly the associated relay will remain in its normal position. Subsequently, the stepper switch will apply a pulse to the appropriate one of terminals Q6—Q9. The pulse will travel through the associated relay to terminal Q10. This will result in the punching of the symbol designating a positive operation.

Similarly, if a negative operation is to occur, depression of the appropriate function control key will result in the closure of the associated one of switches S12—C16. When the pulse from S55 occurs, it will travel across the closed switch to the pull-in coil of the corresponding relay, energizing the latter and so causing the relay to transfer. When the pulse from the stepper switch is subsequently applied to the appropriate one of terminals Q6—Q9, it will travel across the transferred relay and out its terminal 8 to terminal Q11. This will result in the punching of the symbol designating a negative operation.

During the next cycle, the reset coils R of K18 and K19 will be pulsed by switch S53 and the reset coils R of K12—K17 will be pulsed by switch S52. Any of these relays which may have transferred will therefore be returned to its normal position.

At the completion of the pulse from S52 at 175° of rotation of the program selector drive shaft, the rotors within the program selector have engaged the coded slides and a program has been selected.

The auxiliary control circuit of the program selector is utilized in conjunction with a desired one of motor bars MB1, 3 or 4 of the accounting machine to modify the selected program. As was hereinbefore explained, if any of motor bars 1, 3 or 4 is depressed, closure of its associated switches S17, S18 or S19 will result in the energization, through S52, of a relay corresponding to the motor bar depressed. This particular relay will always be energized when the corresponding motor bar is depressed regardless of the carriage position.

At 190° of rotation of the program selector drive shaft, cam C53 will close switch S53 and it remains closed until 235°. Accordingly, a pulse will be applied through S53 and terminal 17—21 to the auxiliary control circuits of the program selector. As was previously explained only one of these circuits will be closed, and the pulse will therefore appear at the one of control board terminals B22—R22, corresponding to the closed circuit. Through the program wiring, this terminal will be connected to a preselected relay, and the pulse will energize the latter. This energized relay, in conjunction with the relay energized as a result of the depression of one of motor bars 1, 3 or 4 will cause the preselected program to be modified in a manner to be hereinafter discussed.

It should be noted that the relay energized by closure of S53 is determined by the position of the carriage at the time S53 is closed, while the determination of which motor bar controlled relay will be energized is solely dependent upon the motor bar depressed irrespective of the carriage position.

In addition to pulsing the auxiliary control circuit, S53 will also pulse the zero to space circuit through rectifier CR113 and terminal 17—20. This circuit will be discussed hereinafter.

At the commencement of the cycle of operation the punch clutch is normally engaged, and the driving side of its shaft is connected by a timing belt to the driven side of the stepper switch drive shaft. Accordingly, when the stepper switch clutch engages, causing its driven side to rotate, the punch will immediately commence rotating in synchronism therewith.

At 35° of rotation of the punch cycle, cam C81 closes switch S81 and maintains it closed until 185° of the cycle. Switch S81 is connected to B+, and when closed will apply a pulse to terminal 7 of relay K11, terminal 10 of relay K25 and also to terminal 10 of relay K13. Relay K13 will be discussed subsequently.

K25–10 is normally open circuited while K11–6 and K11–7 are interconnected. Accordingly the pulse to K11 will pass across its terminals 6 and 7 and be applied to K36–8 which is normally connected to K36–9. From K36–9 the pulse is applied to terminal 17—22, and from there to the sequence circuits of the program selector as well as to the zero to space circuits via rectifier CR114 and terminal 17—20. The zero to space circuits will be discussed subsequently.

It may be recalled that a specified program was selected by the program selector by 175° of its cycle, long before the stepper switch and punch commenced operation. It should be further noted that the wabble gear (FIGURES 112, 113, 114 and 91) is interposed between the driven side of the stepper shaft and its rotor. The wabble gear provides an intermittent motion and a sixteen to one speed reduction. Accordingly, sixteen punch cycles will occur for each cycle of the stepper switch rotor, and because of the intermittent motion of the rotor will dwell momentarily upon each of the sixteen contacts as it scans the latter. It is during these dwell periods that S81 applies pulses to the sequence level of the program selector through K11 and K36 as described above.

The program selector contains 16 contacts, R21–B21, corresponding to programs 0–15 respectively. All of these contacts are brought out to the control board. However, only one will be selected during any given program cycle, and this one is determined by the manner in which the coded slides are pulsed by the switches in the electrical lanes of the accounting machine. The specific one of R21–B21 chosen for any given carriage position program is externally wired at the control board to one of the commons A17–L17 of the sequence levels of the stepper switch. Which level is chosen for any given program is immaterial and totally dependent upon the capriciousness of the programmer.

During each punch cycle the stepper switch rotor will move 1/16 of a revolution and dwell momentarily on each of the contacts 1–16 of the particular sequence level A–L chosen. It is during this dwell period that S81 closes and through K11 and K36 pulses the chosen one of sequence contacts R21—B21 of the program selector. Through the external wiring the pulses will be applied to the chosen sequence common A17–L17 of the stepper switch, and through its rotor the pulses will be applied sequentially to the contacts 1–16 associated therewith. The contacts 1–16 are brought out to the control board, and through external wiring, totally dependent upon the programming, may be connected to the commons of the decimal switches or the duo-decimal switches of the read-out unit, the function control keys, or directly to the encoder. It is in this manner that the previously discussed portions of the systems are "read."

As was previously mentioned, the tape perforated by the machine may be employed in conjunction with punch cards. Therefore the series of perforations made at each carriage position must be of a number compatible with the corresponding field on the punch card. The word length circuit is employed for this purpose.

At 35° of rotation of each punch cycle, cam C82 closes switch S82 and maintains it closed until 185° of the cycle. Switch S82 is connected to B+, and when closed will apply a pulse to K11–9 and K25–7 which are connected in parallel to S82–1. K25–7 is normally connected to K25–6 which transmits the pulse to K12–7 and K36–6, both of which are normally open circuited. K11–9 is normally connected to K11–10 which transmits the pulse directly to the word length circuits of the program selector.

As was mentioned previously, a specific program was selected by the program selector by 175° of its cycle, before the stepper and the punch commenced operation. It should further be recalled that the wabble gear, interposed between the driven side of the stepper switch shaft and its rotor, provides an intermittent motion and a 16 to 1 speed reduction. Accordingly, sixteen punch cycles will occur for each cycle of the rotor, and because of the intermittent motion, the rotor will dwell momentarily upon each of the sixteen contacts as it scans the latter. It is during this dwell period that S82 applies pulses to the word length circuits of the program selector.

The program selector contains sixteen contacts, R23–B23, corresponding to programs 0–15 respectively. All of these contacts are brought out to the control board. However, only one will be selected during any given program cycle, and this one is determined by the manner in which the coded slides are pulsed by the switches in the electrical lanes of the accounting machine. The specific one of R23–B23 chosen for any given carriage position program is externally wired at the control board to one of the terminals M1–M16 of the word length level of the stepper switch. The particular terminal employed will determine the length of the word punched, M1–one digit, M2–two digits, M3–three digits, all the way to M16 for the maximum capacity of the system, sixteen digits. M17, the common of the word length level, is always wired at the control board to terminal P17 for a purpose to be hereinafter explained.

During each punch cycle the stepper switch rotor will move 1/16 of a revolution and dwell momentarily on each of the contacts M1–M16. It is during these dwell periods that S82 closes and through K11–9 and –10 pulses the chosen one of the word length terminals R23–B23 of the program selector. Through the external wiring these pulses will be applied to the particular one of contacts M1–M16 of the stepper switch corresponding to the word length desired. However, this terminal is normally open circuited and the pulse gets no further. When the rotor reaches the selected contact, indicating that the last of the desired digits is being punched via the sequence level, it closes the circuit and the pulse passes across the rotor to the common M17. As was previously mentioned M17 is wired to P17 and the pulse passes from there to the pull-in coil of relay K26 for a purpose to be hereinafter explained, and via rectifier CR116 to the punch clutch disengage solenoid L16.

With L16 energized, the disengage clapper will come down causing the punch clutch to disengage at the end of this particular punching cycle. Accordingly, there will be no further punching until after commencement of the next accounting machine cycle. Additionally, since the punch has been disabled, its cam actuated switches S81—S85 will no longer operate—the punch is out of the system.

In addition to the automatic control of perforator operation through the carriage position code, the perforator may be manually controlled by means of the keyboard control keys located on the right side of the accounting machine keyboard. These keys control switches S21, S22, S23, S24, S25 and S27.

If it is desired to obtain a burst of tape, the tape feed key 706 is utilized. When depressed half way this key will close switch S23. When fully depressed, it will, through a slide 707 (FIGURE 55) close switch S21 as well. S21 is connected between B+ an switch S64 via socket 1–H. S64 is in the perforator and is located on the stepper switch slow speed shaft. It is maintained closed by its cam C64 from 350° of rotation, over zero until 10° of the next cycle. This switch is in turn connected to switch S72 on the stepper switch high speed shaft. S72 is maintained closed by its associated cam C72 from 350° of high speed rotation, over zero until 10° of the next cycle. Converted to slow speed rotation, S72 is maintained closed from 359⅜° of one cycle, over zero until ⅝° of the next cycle.

Since both S64 and S72 are closed over zero, closure of S21 will immediately result in the application of a pulse to K11–4, K12–4, K33–2, to be discussed hereinafter, and to L13–2. The same pulse is also applied to K25–4 through terminals 26–3 and 26–4 and switch S23.

As was hereinbefore explained (see FIGURE 144), energization of L13 will result in the engagement of the stepper switch clutch, causing both it and the punch to commence operating.

The program selector is sitting in the position indicative of the program utilized during the previous cycle, and if not disabled will cause the punching of that program during the present keyboard instituted cycle. Relay K11 is utilized to disable the sequence and word length circuits of the program selector in order to prevent the repetition of the last program.

Normally, and as was hereinbefore explained, when S81 is closed by its associated cam C81, a pulse will be transmitted across that switch to K11–7 which is normally connected to K11–6. The pulse will go from K11–6 across terminals 8 and 9 of relay K36 to terminal 17—22 from where it is applied to the sequence circuits (and the zero to space circuits, to be discussed subsequently) of the program selector. This same pulse from S81 will also be applied to K25–10, but since that terminal is normally open circuited, the pulse will get no farther.

Similarly, when S82 is closed by its cam C82, a pulse will travel from B+ across that switch to K11–9, and then across terminal 10 of the relay to the word length circuits of the program selector. The pulse will also travel to K25–7 and from there across K11–6 to K12–7 and K36–6, connected in parallel. Since both K12 and K36 are normally open, the pulse will get no farther. If, as was hereinbefore stated, the tape feed key 706 was fully depressed, S21 and S23 would be closed. Accordingly, a pulse will travel from the source across switches S21, S64, and S72 to the pull-in coils of relays K11 and K12. Additionally, since S23 is closed as well, the pulse will also be applied to the pull-in coil of relay K25, energizing the latter. When the pull-in coil of K11 is energized, the relay transfers, interconnecting K11–5 and K11–7 as well as K11–8 and K11–10. Accordingly, the pulse from S82 will not get through to the word length circuits since K11–10 is now open circuited, and the pulse to K11 from S81 will be transferred to the normally open switches S22, S24, S25 and S27 via K11–5 and socket 1–D, for a purpose to be hereinafter explained.

Energization of K25 results in its common (connected to terminal K25–7) being transferred from terminal 6 to terminal 5, and its common 10 being transferred from the open terminal 9 to terminal 8. Accordingly, the pulse from S81 which by-passes the sequence level of the program selector because of the energization of K11 will travel across K25–10 and –8 to the encoder via socket 5X. At the encoder it is connected to the tape feed code terminal.

The pulse will also, via K11–5 and –7, be applied to S22, S24, S25 and S27 via socket 1–D. But since these switches are normally open, the pulse will get no farther.

Similarly, the pulse from S82 which by-passes the word length level of the program selector because of the energization of K11 will travel across K25–7 to K25–5 which is open. The pulse therefore gets no farther.

In sum, S23 is closed when the tape feed key is depressed half way; S21 is closed when the key is depressed fully. With S21 closed a pulse will energize the pull-in coil of K11 causing the relay to transfer and disable the word length and sequence circuits of the program selector. Simultaneously K33 and L13 are energized, the former to be discussed subsequently and the latter causing engagement of the stepper switch clutch.

Through S23, in series with S21, the pull-in coil of K25 is energized, cutting K12 and K36 out of the circuit. This results in the transference of the sequence pulse from S81 to the encoder and the channelling of the word length pulse from S82 to an open circuit.

The remaining keyboard control keys 708, 709, 710 and 711, as seen in FIGURE 43, are associated respectively with levers 712, 713, 714 and 715 to actuate switches S22, S24, S25 and S27. As was the case with S23, partial depression of the appropriate key will close the corresponding one of S22, S24, S25 and S27. Full depression will close S21 as well, see FIGURE 55, resulting, when S64 and S72 are closed by their cams, in the pulsing of K11, K12 and K33 as well as L13. It should be noted that since S23 is open, K25 will not be energized and therefore will not transfer.

Energization of L13 will cause the stepper switch clutch to engage. The pulse to K11 disables the sequence and word length circuits of the program selector and transfers the sequence pulse from S81 to switch S22, S24, S25 and S27. The pulse from S81 to K25–9 gets no farther since that terminal is open (K25 is not energized). However, the pulse from S82 to K25–7 is applied, via K25–6, to K36 and K12 in parallel. K12 has been energized through S21, S64 and S72, and accordingly closes terminal 5. The pulse from K25, terminal 6, will therefore pass across the common 7 and terminal 5 of K12 into the punch clutch disengage solenoid L16 via terminals 17—23 and 13—10, energizing the solenoid. This results in the punch clutch disengage clapper dropping down immediately so as to disengage the punch clutch at the end of its first cycle, giving an automatic and invariable word length of "1."

The pulse applied to S22, S24, S25 and S27 from K11–5 will pass across whichever one is operated and out to the corresponding one of terminals R1–R4 on the control board. The terminal can be wired directly to the desired code terminal in the encoder, or alternatively to either of control board terminals S–1 and S–2 which are connected in parallel to terminals S–3 and S–4, also connected in parallel, and to exceed capacity warning relay K35 (see FIGURE 141). Accordingly, the pulse will energize K35, extinguishing the exceed capacity warning light and buzzer, and also through rectifier CR117 appear at terminals S–3 and S–4. Either of these terminals may be wired to the desired code terminal on the encoder. CR117 is provided to insure that only a pulse from S–1 or S–2 will reset K35. Other terminals may in common with S–3 and S–4 be wired to the same code terminal on the encoder. This will result in a pulse from the other terminal passing through the encoder and appearing at S–3 and S–4. CR117 prevents such pulse from getting through to K35.

Zero to Space (FIGURE 145)

As was previously explained, the maximum word length obtainable with the instant system is sixteen digits. Through programming, the actual word length obtained at any given carriage position of the machine can be diminished from sixteen to any lesser number of digits as desired. Additionally and through the zero to space circuit any zero not preceded by a significant digit may be converted to a space indication by the perforator. This latter circuit may be activated at any of the sixteen digit positions and inactivated at any subsequent position. If desired it may be activated and de-activated several times in one word. This is an optional feature of the system utilized to give a clearer and more readable format. As an example, assuming that an eight digit word length is called for while the actual number to be entered involves only five digits. If the zero to space circuit were not employed zeros would appear in the three leftmost digit positions. By utilizing the instant circuit these zeros would be eliminated and only the five significant digits actually involved in the desired number would appear.

Early in a cycle of operation various portions of the circuit will be pulsed by switch S51, in a manner to be explained in detail hereinafter, to bring the circuit to the condition indicated. As was previously mentioned, at the completion of 175° of rotation of the program selector drive shaft the rotors have engaged the coded slides and a program has been selected. From 190° to 235° of rotation of the program selector drive shaft, cam C53 will close its associated switch S53 causing the application of a pulse to the auxiliary control circuits within the program selector, and through rectifier CR113 to the zero to space circuits, all as was previously explained. Assuming that it is desired to institute zero to space conversion in the first punching cycle, the one of zero to space terminals B24–R24 corresponding to the selected program will be externally wired at the control board to terminal P15. Accordingly the pulse from S53 will be applied to terminal P15 and as indicated in the drawing pass across terminal 1—15 and appear at terminal 5 of relay K22. The pulse will then travel across K22 terminal 7 to the pull-in coil of relay K23, the coil being connected between terminals 3 and 4 of K23. Energization of the pull-in coil will cause K23 to transfer and accordingly its terminal 7 will now be connected to terminal 6 rather than to terminal 5.

From 270° to 315° of rotation of the program selector drive shaft cam C54 will close switch S54, causing the application of a pulse to relay K22. The pulse will travel from K22–10 to K22–8 and then to the now transferred relay K23, entering the latter at terminal 7 and leaving through terminal 6 from which point it is applied to terminal 17—25. From this point the pulse is applied to the pull-in coil of relay K13, the coil being connected between terminals 3 and 4 of the relay. Energization of the pull-in coil results in the transference of K13 so that its terminal 10 is now connected to terminal 9 rather than to terminal 8. In addition to causing the transference of K13, the pulse from S54 also passes across rectifier CR115, connected between terminals 17—25 and 17—24, to the pull-in coil of relay K24. The pull-in coil is connected between terminals 3 and 4 of K24, and when energized causes the transference of the latter so that K24–10 will be connected to K24–9 rather than to K24–8.

As was mentioned with respect to FIGURE 144, S54 will also pulse the decimal switches, and if the particular number entered upon the keyboard does not exceed the programmed capacity, the pull-in coil of relay K21, connected between terminals 3 and 4 of K21, will be energized. The pulse enters at K21–4 from limit rack terminal 10—5 of the program selector. With the pull-in coil energized, K21 will transfer and its terminal 10 will now be connected to terminal 9 which is open circuited, rather than to terminal 8, and K21–7 will be connected to K21–6 rather than to K21–5. If the programmed capacity has been exceeded, then as was previously explained, the pull-in coil of K21 will not be energized and the above described transfer will not occur.

From 310° to 355° of rotation of the program selector drive shaft cam C55 maintains switch S55 closed. This results in the application of a pulse to the pull-in coil of relay K22 which is connected between terminals K22–3 and K22–4. Energization of the pull-in coil results in the transfer of K22–7 from K22–5 to K22–6 and of K22–10 from K22–8 to K22–9. The same pulse from S55 is utilized in starting the stepper switch as was explained in relation to FIGURE 144 and is also applied to K21–8. If the programmed capacity has not been exceeded K21 will have transferred and K21–8 will be open circuited. However, if the capacity has been exceeded K21 will not have transferred and the pulse on K21–8 will be applied, via K21–10, to terminal 2 of K35 the exceed capacity warning relay DS6 (FIGURE 39).

With the stepper switch in operation the punch will rotate in synchronism therewith and switch S81 (FIGURE 93) will be closed by cam C81 from 35° to 185° of each punch cycle. These "reading" pulses to K11–7 will occur once for every $\frac{1}{16}$ revolution of the stepper and will be applied to the encoder either directly from the stepper switch or via the read-out switches, all as explained above. In addition these pulses are applied to K13–10, and as this relay is in its transferred condition, the pulses are transmitted via K13–9 to the reset coil of K23. This coil is connected between K23–1 and K23–2, and when energized will reset the relay so that K23–7 is again connected to K23–5.

If, because of the entries to be made, the first "reading" pulse from S81 arrives at the zero bus of the encoder, it will, via socket J5–P, be applied to K24–10. It should be recalled that K24 is in its transfer position as is relay K21. Accordingly the pulse will move from K24–10 to K24–9, to K21–7 and K21–6, appearing ultimately at socket J4–R. From J4–R the pulse is applied to the space bus of the encoder, and via rectified CR54 of the encoder to socket J4–8 which is connected to socket 6–F of the punch. From 6F the pulse is applied to solenoid L22 of the punch. This solenoid is connected between terminals 31—11 and 31—12, and when energized its associated hammer will punch the space symbol into the tape.

Only three of the punch solenoids are indicated here it being understood that in the particular code used in this embodiment will employ seven punches as indicated below solenoids L21, L22, and L24 in this figure, each including an associated solenoid.

The above discussion presupposes that the programmed capacity has not been exceeded. If in fact the capacity has been exceeded, then K21 would not have transferred and the pulse at K21–7 would via K21–5 be applied to socket J5–B and then to rectifiers CR44, CR6, CR54, and CR43, resulting in the energization of solenoids L21, L22 and L24. Accordingly the hammers associated with these solenoids would punch the zero symbol into the tape.

Assuming again that the capacity has not been exceeded, and referring back to the pulse from K21–6 which was applied to socket J4–R, in addition to being transmitted to the space bus on the encoder as was described above, this pulse is also, via rectifier CR55 and socket J4–S applied to the pull-in coil of K24. It should be recalled that this pulse, originating at S81, commences at 35° of punch rotation, and terminates at 185°.

At 45° of punch rotation cam C84 closes switch S84 and maintains the latter closed until 175°. The pulse resulting from the closure of S84 is transmitted across sockets J4–Z and J4–22 to the reset coil of relay K24. This coil, connected between terminals K24–1 and K24–2, when energized, returns the relay from its transferred position to the normal illustrated position. However the pull-in coil was energized 10 degrees earlier by S81 and as the air gap between the clapper and the pull-in coil is less than the gap between the clapper and the reset coil, the latter will be overridden by the pull-in coil since the two coils are of equal strength. Accordingly the relay will not return to its normal position since the reset coil is de-energized at 175°, 10 degrees prior to the de-energization of the pull-in coil.

At 175° of punch rotation, cam C83 closes switch S83 and maintains it closed until 345°. The pulse resulting from this closure is applied to K23–7, and to K22–8. However, as K22 is in its transfer position K22–9 is open circuited. K23 has been returned to its normal position by the prior pulse from S81, and therefore the pulse on K23–7 moves via K23–5 to the reset coil of K13, connected between its terminals 1 and 2. Energization of the reset coil results in the return of K13 to its normal position and the interconnection of K13–8 and K13–10.

As long as a zero is indicated S81 will continue to pulse K24 through the read-out switches and the procedure outlined above will continue. However when a digit other than zero is indicated no pulse will be received by this relay from S81. Accordingly, K24 will return to its normal position when its reset coil receives the pulse from S84 since there is no countering voltage from S81 on the pull-in coil. Subsequent to this point, any zero pulse received at K24–10 will be transmitted via K24–8 and socket J5–B to rectifier CR44 in the encoder. This will, as described above, result in the energization of solenoids L21, L22 and L24, and the impression of a zero indication on the tape.

If it is desired to reinstitute zero to space conversion at some later point in the number, the zero to space terminal among B24–R24 of the program selector corresponding to the instant program is connected to the segment among N1–N15 on the zero to space wafer of the stepper switch corresponding to the digit column in which the conversion is desired. In addition, the stepper switch common N17 of the zero to space wafer is connected to terminal P16 as is indicated in the drawing. Accordingly, when the stepper rotor reaches the above defined segment, the pulse from S81 will travel via K11–7, the program selector, and the stepper switch to K22–6 which is connected in common with P16 to terminal 1–16. It should be recalled that K22 is still in its transferred position, and the pulse will travel across K22–7 to the pull-in coil of K23 causing the transference of the latter relay.

At 175° of this punch cycle S83 will through the transferred relay K23 apply a pulse to the pull-in coil of K13 and also via rectifier CR115 to the pull-in coil of K24. Accordingly these two relays will transfer. The circuitry is now in a condition identical to that existant when the zero to space conversion was instituted in the very first step, and the subsequent operation continues in a like manner.

At the termination of the complete cycle of the system all relays with the exception of K21 and K22 have been returned to their normal positions. At 35° of rotation of the program selector drive shaft in the next cycle, cam C51 closes its associated switch S51 and maintains it closed until 185°. The pulse resulting from this closure is applied to the reset coils of relay K21 and K22 to bring them back to their normal position. This brings the circuitry back to the condition illustrated in the drawing and the operation may recommence in accordance with the now applicable pre-selected program.

*Accounting Machine—Perforator Coordinator Circuits*
*(FIGURES 146 and 147)*

It is obvious that the accounting machine and perforator must operate in conjunction with one another. However, the two are asynchronous. Accordingly, means must be provided to co-ordinate the two units. The following circuit is provided for this purpose.

Cam C65 (FIGURE 91) the fifth cam on the stepper switch slow speed shaft 625, is designed to maintain switch S65 closed from 355° of rotation of the stepper switch drive shaft during one cycle, over zero, and until 260° of the next stepper switch cycle. S65 is directly connected to B+, and when closed transmits a pulse across the normally open terminals 7 and 8 of K33 to L1, the machine block solenoid (FIGURES 32 and 33) via sockets 7–L, 7–D and 1–M. The machine block solenoid, when energized, and this occurs at approximately 195° of the accounting machine cycle, activates an interlock which, although having no effect on the present cycle, prevents commencement of the next accounting machine cycle. In this manner the accounting machine is prevented from starting a new cycle until the perforator has progressed sufficient far into its present cycle to avoid any possibility of interference. The interlock, as seen in FIGURES 32 and 33 is substantially the same as used in the Butler patent, see FIGURES 18 through 23 and columns 17 through 23 of the specification for its description and operation. In the present case a signal to L1 causes the link MBL to move to the position from that shown in FIGURE 32 to that shown in FIGURE 33 rotating link MBL2 to lock levers 142' and 145' in machine blocking position.

Assuming that the stepper switch has not been disabled, at approximately 201° of the accounting machine cycle, the stepper switch clutch will engage, and its drive shaft will commence rotating. At 35° of the stepper switch cycle, cam C61 will transfer S61. This occurs at approximately 236° of the accounting machine cycle. S61 is maintained in its transferred position until 185° of the stepper switch cycle.

Additionally, when transferred, S61 is in parallel with S65 and K33 and in series with L1. Accordingly, current is applied to L1 from this additional circuit through S61 as well as through the circuit from S65 and K33.

Through means to be described hereinafter, relay K33 has a variable release time varying from early in the stepper switch cycle until its termination. S65 will always open at 260° of the stepper switch cycle while S61 opens at 185°. Accordingly, if K33 opens early, the accounting machine interlock solenoid L1 will be held in until 185° by S61. 185° of the stepper switch cycle is the earliest time at which the accounting machine can be permitted to recycle without causing interference.

If K33 has not opened early, L1 will continue to be energized through the S65—K33 circuit even after S61 opens at 185°. From 185° until 260° L1 will be de-energized at the time K33 opens. At 260° L1 will be de-energized by the opening of S65 even if K33 has not yet opened.

In sum, if the stepper switch is disabled, L1 will not be energized. If the stepper switch operates, S61 will transfer and place itself in series with L1. L1 will then be de-energized and the accounting machine permitted to recycle by the return of S61 to its normal position at 185° of the stepper switch cycle if K33 opens early; at any time between 185° and 260°, substantially simultaneously with the opening of K33, if the latter has an intermediate opening; and at 260° by the opening of S65 if K33 has a late opening. The exact time at which K33 opens is dependent upon the programming of the system.

The S101 circuit is employed for remote operation of the tape feed and will be discussed hereinafter.

As was previously explained, L16, the punch clutch disengage solenoid (368 in FIGURES 103 and 89) will be pulsed by S82 from 35°–185° of the punch cycle, terminating the desired word length. The pulse is applied to L16 from S82 through the word length levels of the program selector and stepper switch, and terminal P17 on the control board. The pull-in coil P of K26, the word length interlock release relay, is connected in parallel with L16 and receives its pulse in a similar manner through P17.

At 175° of the punch cycle, switch S83 (FIGURE 145) is closed by cam C83 and maintained closed until 355°.

S83, which is connected directly to B+ applies a pulse to K26-7 and through it and K26-5 to the reset coil of K33 via sockets 7-A and 7-B.

Pulsing the reset coil of K33 causes its interconnected terminals 7 and 8 to open, breaking the circuit from S65 to L1, the machine block solenoid, deenergizing the latter and permitting the accounting machine to start a new cycle upon completion of the present one.

If the stepper switch operates, S61 will be transferred placed in series with L1. L1 will then be energized by S61 up until 185° of the stepper switch cycle regardless of whether or not K26 is energized early due to a short word length—8 digits or less. If a short word length was called for, K26 will be energized prior to 185° of the stepper switch cycle, opening K33 and permitting L1 to de-energize when S61 opens at 185°. If an intermediate word length—9 to 12 digits—was called for, K26 will not be energized until after 185° of the stepper switch cycle. Accordingly K33 will remain closed and L1 will remain energized through K33 even after S61 opens. In this case L1 will become de-energized when K33 opens. S65 will open at 260° of the stepper switch word length 12. Accordingly, L1 will become de-energized at 260° by the opening of S65 even though K33 is still closed because of a long word length—12 to 16 digits. 185° of the stepper switch cycle is then the earliest that L1 can open and 260° is the latest. L1 may also open at any time between these points. The exact time at which L1 does open at any given carriage position is dependent upon the word length called at that carriage position.

At this point, all punching, whether instituted automatically by a preselected program, or manually via the punch control keys, has been completed and the punch clutch has disengaged.

Switch S71 on the stepper switch high speed shaft is closed by its associated cam C71 from 205° to 355° of each revolution of the stepper switch high speed shaft which has the same r.p.m. as the punch shaft. Switches S62 and S63 associated with the stepper switch slow speed shaft are connected in parallel to S71 which is connected directly to B+. The stepper switch is on the fifteenth contact from 315° until 337½° while S62 is closed by its associated cam C62 from 320° to 340°. Therefore, S62 is closed during substantially the fifteenth step, and the fifteenth pulse from S71 will commence at 327 13/16° of the stepper switch slow speed shaft rotation. Accordingly, during the fifteenth step a pulse will pass across S71 and S62 and be applied to K12 terminal 10. It may be recalled from the discussion of the punch control keys that K12 is normally open but that it is closed whenever one of the punch control keys is operated. Therefore, in a perforator cycle instituted by a punch control key the pulse will pass across the now closed relay K12 and energize the punch control keys release solenoid L2 via socket 1-V (FIGURE 146). This solenoid is operatively connected to the punch control key slide, and when energized will reset the slide and its associated keys, as seen in FIGURES 53 through 56, similar to those shown in the Butler patent.

It should be noted that even though the keys are reset during the fifteenth step, it is still possible to get a burst of sixteen punches when switch S23 is actuated through lever 705 when the tape feed key 706 is depressed, as shown in FIGURES 43 and 46. This is because K12 is by-passed (as a result of the energization of K25 by S23) during a tape feed cycle and it has no effect.

Additional resetting occurs during the sixteenth step. The stepper switch is on the sixteenth contact from 337½° until 360°. S63 is closed by its associated cam C63 from 345° of one stepper switch cycle over zero to five degrees of the next cycle. Therefore, S63 is closed during the sixteenth pulse from S71 which will commence at 350 5/16° of rotation of the stepper switch slow speed shaft and will terminate at 359 11/16°, well within the last half of the sixteenth step.

The stepper switch clutch disengage solenoid L14, the punch clutch engage solenoid L15, the tape feed relay K25 and the reset coil of K33 are all connected in parallel to S63. It should be noted that rectifier CR118 is interposed between K33R and the remainder of the circuit. Due to the circuit arrangement, during the sixteenth step L14, L15, K25R and K33R will all be energized by the pulse passing across S71 and S63. This results in the stepper switch clutch disengaging just as the rotor returns to home position and the punch clutch re-engaging at the same time. The perforator is therefore ready for the next cycle to commence.

It may therefore be seen that K33R may be energized from any one of three different sources. In a normal accounting machine instituted cycle, K33R is energized by S83 and K26 under the control of the word length sequence of the program selector. In a cycle instituted by one of the punch control keys, the word length sequence of the program selector is by-passed, disabling K26. Additionally, during a punch control key instituted cycle, K33R is energized through switches S71 and S63.

In addition to the above, it should be noted that control board relays K6—K10 are also reset via S71 and S63 through the indicated circuitry. These relays may also be selectively reset through the utilization of control board terminals V24, X24, Z24, BB24, and DD24. The function of these relays and their resetting will be discussed hereinafter.

Quite often the installation of the system will be such that the perforator will be located remotely from the accounting machine, and a different operator will be attending each. Switch S101 (see FIGURE 3) and switch 102 are both located in the perforator just below the supply reel. If the operator at the perforator desires a burst of tape, he would first move S101 to the "on" position. Since S101 parallels S61, this would energize L1, the accounting machine interlock. Such action would prevent the operator at the accounting machine from starting a new cycle. The perforator operator would then depress S102 which is a compound switch. One half of S102 is connected to B+ via S101 while the other half parallels S23. Accordingly, closure of S102 will have the same effect as depression of the tape feed key on the accounting machine keyboard. After the desired burst of tape is obtained, S101 and S102 are re-opened in order to permit another accounting machine cycle to occur.

*Programming of Perforator Unit*

For the purposes of illustration, it is assumed that an accounting machine of the type shown, programmed to add into both accumulators at every carriage position is used. Assume further that out of a number of carriage positions across the record medium, twelve will control punching. For simplicity, the punching positions will be numbered 1-12 inclusive. In the following, the term carriage position code (CPC), will correspond to the condition of the switches S2—S5 at a particular carriage position. For example, at carriage position 1, switches S2, S3, S4, and S5 are actuated, giving carriage position code (CPC) 15, which means that in the program selector the selected rotor is R15 (FIGURE 65) making O15 (FIGURE 66) the group of terminals energized.

In carriage position 1, the perforator will punch the letter "A," the data in racks 12 to 1, the data in the register read-out switch and the sign of accumulator "A" and the sign of accumulator "B." This is wired in sequence 11 and has a word length of 16. The carriage position code will be 15, with a limit rack of 8, since in this case limit rack 8 is maximum for this machine. A zero to space operation is initiated in step 5. There are no modifications to the basic tape format by motor bar control or auxiliary control.

Carriage position 2 illustrates the fact that reading does not have to be in any prescribed order. Using sequence 10 and carriage position code 14, and merely reversing all the entries that were punched in carriage position 1, the perforator punches the sign of "B," sign of "A" register racks 1 to 12, and "A," which is directly wired to the encoder. The ZTS start in this case would be in step 4, since this will be the first step in which we would have a variable zero programmed. Again, no motor bar control or auxiliary control is used.

In carriage position 3 illustrates the fact that data need not be read out in any sequence, either forward or reverse, by calling for punching rack 8 to rack 1, then rack 10 and rack 9, whereas before the punching was in numerical sequence, as illustrated above. This would be sequence 8 with a word length of 10, carriage position code 13. Since ZTS has been illustrated in two sequences, it will not be used again in the rest of the programming. Limit rack once again is 8, and there are still no motor bar or auxiliary control features.

Carriage position 4 illustrates the use of limit rack pulses to change the programming. Carriage position code 12 in carriage position 4 may select either sequence 7 or sequence 6, depending on the information in the limit rack switches. Sequence 7 calls for reading rack 7 to rack 1, sequence 6 calls for punching a duplication code, then punching the information in rack 2 and rack 1. This will be useful if the seven digits called for in sequence 7 were an account number which could be broken into a base account of five digits and a sub account of two digits, where, in some cases it would be desirable to index a complete new account number. In other cases with repeat entries to that base account number, but different sub accounts, it is desirable to duplicate the first five digits and index only the last two. In still other cases where it is necessary to make repeat entries to the full account (base and sub), it is desirable to index no digits and repeat the hole account. This is done by looking at the extra zero switches and determining whether or not anything has been indexed in racks 7, 6, 5, 4, and 3 to call for duplication of those racks and punching the new information in racks 2 and 1. In the third case if no data had been indexed into the racks, all the extra zero switches would be set at zero and in this case sequence 6 would be modified to punch two "duplicate" codes with a word length of 2. The limit rack 2 terminal is wired to the pull in coil of relay K6. If relay 6 transfers, the wiring from the sequence terminal of carriage position code 12 will be transferred from the "in" terminal of sequence 7 to the "in" terminal of sequence 6. The word length terminal of carriage position code 12 is wired to the common of relay K6 and is routed to the word length 7 terminal through the normal contacts of K6, and when K6 is transferred, is routed to the common terminal of K7. K7 pull-in coil terminal is wired to the limit rack zero terminal such that when all racks are set at zero, the limit rack pulse will pass limit rack 2, energize K6, and also be available at limit rack zero and energize K7. K7 will then transfer the word length from word length 7 through the transfer contacts of K6, and the transfer contacts of K7 to word length 2. Since K6 transferred selects sequence 6 will punch a "duplicate" code, and since K7 is transferred, a second "duplicate" code in place of rack 2. The other half of K7 is used to route the pulse from step 2, sequence 6, from the rack 2 terminal to the "duplicate" terminal at the encoder. Recapping, carriage position code 12 will punch the data from rack 7 to rack 1 provided a digit is entered in any one of the racks 7, 6, 5, 4, or 3. If no information is entered in racks 7 to 3, and is entered in racks 2 and/or 1, then carriage position code 12 will cause punching of a "duplicate" code and the data in rack 2 and rack 1. If no digit is indexed in any of these seven racks, carriage position code 12 will call for punching of two "duplicate" codes.

Carriage position 5 illustrates reading the sign of the total by calling for reading racks 8 to 1, rack 12, and the sign of the total, using carriage position code 10, word length 10, limit rack 8 and sequence 5. Motor bar and auxiliary control are not used.

Carriage position 6 illustrates the use of the motor bar or the total indication to turn the punch off. Carriage position code 9 in carriage position 6 calls for a word length 8, punching racks 8 to 1 through sequence 4 with limit rack 8. The auxiliary control for carriage position code 9 is used to energize relay 8 and through the transferred contacts of relay 8, motor bar 3 and the total terminals are wired to the "punch off" terminals. Any of the motor bars could be used here to do this, or conversely to turn the punch on. The "total" illustrates the use of turning the punch off in a position where normally punching occurs through carriage controlled programming. If a manual total is taken, it would not be desirable to punch this information, therefore, the total terminal is used to pulse the punch off terminals.

Carriage position 7 illustrates the use of one of the keys in the character column which are brought to the control board for changing the format. Sequence Number 3 is wired so that in step 1, the information contained in rack 11 and a tape feed code will be punched. Assume that the tape feed code is such a code that it will delete the information contained in any other code. For instance, if the data from rack 11 calls for punching holes 1, 2, and 3, then it would be assumed that the tape feed code would be such that it would punch the holes 1, 2, 3, 4, 5, 6, and 7, so that in all cases the first step would look like a tape feed code. The second step is one to be modified, calling for punching rack 8 or tape feed. From step three on, the punching is rack 7 to rack 1 and rack 11. In this latter case the information in rack 11 is to punch in the tape as such.

A word length of 10, carriage position code 8, and a limit rack of 8 or 7, depending on whether or not the character key has been depressed in the column from which we are reading rack 11 is used. To accomplish this the auxiliary control of carriage position code 8 energizes relay 9. The control is as follows: if the pulse to rack 11 is sensed at position 5 indicating that the fifth key in the keyboard column controlling rack 11 has been depressed, then relay 1 will be energized through the transfer contacts of relay 9. Relay 1, rather than relay 9 is also used to control the reset of the limit rack warning. Relay 1 is wired so that both common terminals go to step 2 of sequence 3. The normal terminal V2 of relay 1 is wired to "tape feed," the transfer terminal V3 is wired to rack 8 so that if key 5 has been depressed, rack 8 rather than "tape feed" will be punched. On the other side of the relay the transfer contact V6 is wired to limit rack reset "in" terminal. This means that limit rack 7 is called for in the program and if rack 8 is used when key 5 in rack 11 is used, the exceed capacity warning will be energized. The warning will be reset at the second punch step so that the operator in effect receives no warning.

In carriage position 8, sequence 7, which was used previously, is selected by carriage position code 7 demonstrating that more than one carriage position code may be used to select a sequence, since 7 was previously selected by carriage position code 12. However, none of the modifications on sequence 7 performed by carriage position code 12 will be performed by carriage position code 7. In this position limit rack is 7 and auxiliary control energizes relay 10, and pulses the "punch on" terminals illustrating punch on or off operation from the program selector. When relay 10 is energized, it causes the exceed capacity punch control terminal Number 1 to be connected to exceed capacity punch control terminal Number 2, and in the other half of the relay, the exceed capacity punch control terminal Number 3 is connected to the terminal marked "E" (GG5) at the encoder. "E" is illustrative and may be any one of the 52 terminals of the encoder.

In carriage positions 9 and 10 sequence 2 is used, wired rack 7 to rack 1, with a different carriage position code in each position; CPC 6 in position 9 and CPC 5 in position 10, to illustrate the fact that one motor bar relay may control more than one carriage position code. In each of these positions "punch off" will be controlled by use of motor bar 1 which is wired to energize relay K2. Although K2 is energized in all carriage positions by motor bar 1, it will only be operative, as far as control is concerned, when CPC 6 or 5 are selected. In these cases, the auxiliary control terminal is wired through relay K2 to the punch off terminals.

In carriage position 11 carriage position code 4 is used to select sequence 2, rack 7 to rack 1, word length 7, limit rack 7 with ZTS starting in step 1 and step 5. This means that on the tape if a non zero digit is indexed in rack 7 a non zero digit will be punched in rack 7, and all succeeding zeros will punch as zeros. However, if rack 7 and rack 6 contain zeros and all other racks are non zero digits, the tape will be punched with a "space" code for the zeros in racks 7 and 6. If rack 7 and rack 6 contain zeros and rack 3 contains a zero, then the punching will be "space," "space" (for rack 7 and rack 6 zeros), the non zero digits of racks 5 and 4 (should rack 4 be a zero it will punch as a zero). A zero in rack 3, however, will be converted to a space since the zero to space circuit which had dropped out when the non zero in rack 5 was punched will be brought back in and operative again when the data from rack 3 is punched. Rack 2 will be punched and then if rack 1 contains a zero it will punch as a zero similar to what happened in rack 4.

Carriage position 11 along with carriage position 12 illustrates the use of one relay energized by the auxiliary control of each of these carriage position codes. CPC 4 in 11 and CPC 3 in 12, energize relay 3 through which the motor bar 4 and motor bar "A.O." pulses are gated to turn the punch off.

In its operation it is now obvious that the apparatus encompasses a wide scope of program possibilities impracticable even to attempt fully to describe herein and certainly unnecessary in view of the detailed description of the apparatus throughout the specification. However, a description of a typical cycle in a bank bookkeeping problem will serve to exemplify its versatility. The following description of a cycle of the machine will add a deposited amount to a customer's balance:

The operator will index into the keyboard the deposited amount, in this case $2,525.15, with the carriage positioned properly through its mechanical programming from the preceding cycle, the operator will depress the deposit motor bar initiating machine operation. As the machine cycles, its normal functions are accomplished by transferring the information from the keyboard into the add racks at 120° of its cycle. The carriage position code or lane switches on the machine are operated by the carriage to cause the coded slide solenoids of the program selector to be operated, thus to select a program rotor which operates to close the five contacts associated with the selected program. This will be accomplished during the first 180° of the program selector cycle. Simultaneously the add racks in the sensimatic will have reached the limit of their travel and the printing on the journal and customer's record is in progress. In addition, the read-out switches which sense the information to be punched are set and available to control perforator functions.

At this time the limit rack relay is pulsed through the limit rack contact on the plug board at the program selector. This plug board contact (PBC) is wired to the appropriate limit rack contact on the plug board from which the signal is directed through the read-out switches to determine if significant digits have been entered into the read-out switches to the left of a specified position. If there is a non-zero digit to the left of the specified limit rack position, the exceed capacity signal circuit will be energized. Assuming there is no digit to the left of the specified limit rack position, the normal cycle will continue. In addition, the program selector clutch disengage solenoid will be energized to limit the program selector to a single cycle. Following this, the exceed capacity circuit will be interrogated to energize the stepper switch clutch engage solenoid. The machine block solenoid in the machine will also be energized because it has been determined that everything is in order and therefore a punching cycle will be initiated. This solenoid will remain energized to prevent a further machine cycle from starting until such time as a succeeding cycle will not destroy the information in the read-out switches while there is still need for punching. Determination of when the machine block solenoid is released is made on the basis of the word length program to be punched during the present cycle. At this time the program selector clutch will disengage and the program selector will return to its rest position with the selected program rotor latched in place and the fifteen non-selected rotors latched out.

For purposes of illustration, we will assume that the carriage position code (and hence the program number) is 7, that the limit rack position is 6, that the sequence to be scanned on the stepper is 2 and the word length is 6. The plug board is wired to punch the numeric data contained in the first 6 read-out switches in sequence starting at the highest order switch in step No. 1 and proceeding to the lowest order switch (pennies column) in step No. 6, after punching the six characters, the word length wired to 6 will disconnect the punching mechanism at the appropriate time.

When the machine is at rest, the punch clutch is energized and connected to the driven side of the stepper clutch. The stepper clutch in addition will drive the wobble mechanism whose output is the stepper mechanism itself. The wobble mechanism in addition will cause a 16 to 1 speed reduction from input to output. As the stepper shaft rotates a punch cycle is initiated. The appropriate punch solenoid is pulsed to set up the code. A pulse is sent through the program selector to the input terminal of the selected stepper sequence via the plug board. Since the stepper is at step No. 1, the pulses transferred through the selected PBC to the appropriate data rack, in this case rack No. 6. From this point wiring will take the pulse from the perforator to the read-out assembly where it will interrogate the decimal value of the number stored in the switch sensing rack No. 6. The pulse will appear on one of the ten decimal output lines (in this case we are punching the number 2525.15) which are connected to the encoding matrix. The output of this matrix is connected to and operates the proper punch solenoids. Simultaneously, a pulse is routed through the word length terminal on the program selector to the designated word length terminal on the stepper, in this case 6. Since we are now in the first step, the pulse is open-circuited at this terminal.

As the cycle continues, the stepper shaft will start its second revolution moving, through the wobble, the sequence selection to stepper contact No. 2 and bring the punch through its second cycle. This procedure is repeated with the punching accomplished through step 2 and the switch connected to rack No. 5, punching a coded 5 in the tape. This sequence of operations will be repeated for the third, fourth and fifth revolutions of the stepper shaft punching additionally 2, 5 and 1 from switches connected to racks 4, 3 and 2. During the sixth stepper shaft revolution, the machine will be punching the last program digit. As before, this operation will cause the punching to occur. However, during this cycle of the punch a pulse will be developed through the word length terminal on the program selector and thence through step 6 on the word length sequence to its output terminal. This pulse will then be used to operate the word length interlock release relay and the punch clutch disengage solenoid. The clutch solenoid will lock out the punch mechanism during the remaining portion of the stepper cycle. The word length interlock release relay also is used to release the machine block solenoid to allow another cycle to proceed if the operator has by this time indexed her information and depressed the motor bar, or if a programmed operation is called for. At this point the punching of the deposit information is complete and the machine cycle recording this information in the machine registers and crossfooters and printing of the information on the journal and passbook is just about complete. The only parts of the system still operating is the stepper mechanism. The clutch will remain energized to return the stepper to its home position in preparation for the next punching cycle. The stepper will be disengaged by a pulse as the shaft goes through the last third of its 16th revolution. At this point the machine will be at rest as it was in the beginning provided no new operations have been initiated.

From the above detailed description of this exemplary embodiment of the instant invention it is seen that it provides novel combined printing calculating machine with a tape record output, and wherein the latter output is produced automatically in any sequence desired without additional operation by the machine operator beyond those necessary to run the machine itself.

What is claimed is:

1. Apparatus for recording data comprising a plurality of movable elements, means for moving said elements into positions corresponding to specified data, read-out means for sensing the positions of said elements after positioning by said moving means, electrical means for scanning the said read-out sensing means and thereby obtaining electrical pulses corresponding to the positions of said elements, said electrical scanning means comprising a plurality of switching means each operable through a predetermined sequence of individual circuit selecting positions, a program selector for determining in which of the predetermined sequences the electrical scanning means shall scan the read-out sensing means, and recording means operatively associated with the electrical scanning means, said recording means being energized as a result of the pulses from the electrical scanning means so as to record the data in patterns corresponding to the electrical pulses.

2. A calculating and recording system comprising, in combination, a calculating machine including a keyboard having a plurality of denominational orders for entering data into the machine, a plurality of electrical switches, one for each denominational order, movable to positions corresponding to the keys of their respective orders which are activated on the keyboard, means operatively connected to the keys of the keyboard for printing in a first predetermined sequence upon a recording medium the data represented by the activated keys of the keyboard, electrical means for scanning the switches in a second sequence and thereby obtaining electrical pulses represented by the activated keys of the keyboard, a program selector for choosing one of a plurality of predetermined programs for the scanning operation performed by said electrical scanning means, means for selectively modifying the program chosen by the program selector, signalling means operatively associated with said switches and said electrical scanning means for indicating when the above-mentioned data exceeds a predetermined number of characters, and dot-like marking means operatively associated with said electrical scanning means, said marking means being energized as a result of the pulses from the electrical scanning means so as to mark a record member in dot-like patterns corresponding to the electrical pulses.

3. A calculating and recording system comprising, in combination, a calculating machine including a movable carriage capable of holding and printing upon record material in different columnar positions and further including a keyboard having a plurality of denominational orders for entering data into the machine, a plurality of electrical switches, one for each denominational order, movable to positions corresponding to the keys of their respective orders which are activated on the keyboard, electrical means for scanning the switches in a sequence called for by a program and thereby obtaining electrical pulses indicative of the data entered into the machine by the activated keys of the keyboard, a program selector for determining the sequence of the scanning of said switches by the electrical scanning means, motive means for moving said carriage to any one of the columnar positions, means operatively associated with said carriage and with said program selector for controlling the selection of a program by the selector, said control means being influenced by the columnar position of the carriage at the time the program is being selected, and recording means operatively associated with said electrical scanning means, said recording means being energized as a result of the pulses from the scanning means so as to record the data signified thereby in patterns corresponding to the electrical pulses.

4. A calculating and recording system comprising, in combination, a calculating machine capable of performing a plurality of different calculating operations and including a movable carriage capable of holding and printing upon a record medium in different columnar positions and further including a keyboard having keys for entering data into the machine, a plurality of switching units operatively associated with the keys of the keyboard and which are settable in accordance with the data represented by the activated keys for the keyboard, electrical means for scanning the plurality of switching units in a sequence and thereby obtaining electrical pulses corresponding to the data represented by the activated keys of the keyboard, a program selector operatively associated with said electrical scanning means for determining the sequence of the scan of the plurality of switches performed by the scanning means, means for moving the carriage to any one of the columnar positions, a control panel connected to and jointly movable with the carriage and containing a plurality of pins, a plurality of actuable switching elements fixed to the machine adjacent to the path of travel of the carriage and electrically connected to the program selector, said switching elements being selectively operable by said pins when the same and their associated control panel are moved with the carriage, the program chosen by the program selector being determined by those switching elements which are operated by the pins, marking means for forming dot-like patterns upon a record member and operatively associated with said electrical scanning means, said marking means being energized as a result of the pulses from the scanning means so as to mark a record member in dot-like patterns corresponding to the electrical pulses, and control means for selecting one of said plurality of operations capable of being performed by the machine and for causing the marking means to indicate on its associated record member the particular calculating operation performed by the machine.

5. Apparatus for recording selectively data on two record mediums comprising, in combination, a calculating machine including a keyboard having a plurality of denominational orders for entering data into the machine, electrical switching means, one for each denominational order operatively associated with the keys of the keyboard and settable in positions corresponding to the keys of their respective orders which are actuated on the keyboard, means operatively connected to the keys of the keyboard for printing upon a first record medium the data entered into the machine by the actuated keys of the keyboard, electrical means for scanning the switching means and thereby obtaining electrical pulses corresponding to the positions of the switching means as set by the actuated keys of the keyboard, said electrical means including a plurality of stepper switches each of which establishes a different sequence for scanning said switching means, a program selector for selecting the stepper switch for determining the scanning sequence performed by the electrical scanning means, means including a plurality of electrically actuated marking elements for marking a second record medium with dot-like patterns, an encoder connected to said electrical scanning means for selectively channeling the electrical pulses of the latter to the marking elements in order to obtain dot-like patterns on the second record medium which correspond to the data entered into the machine by the actuated keys of the keyboard.

6. The apparatus defined in claim 5 further including electrical means operatively interposed between the switching means and the encoder for selectively converting those electrical pulses corresponding to "zeros" in the data entered into the machine to "space" pulses when the zeros of such data are not preceded by a significant digit.

7. Apparatus for recording data comprising, a plurality of movable members, means for moving said members into positions corresponding to specified data, switch means for sensing the position of said members, said switch means including one switching unit for each member, electrical means for scanning the switching units in a sequence called for by a preselected program and thereby obtaining electrical pulses corresponding to the positions of said members associated with the switching units, said electrical means including a plurality of switching means each operable through a sequence of individual circuit selecting positions for scanning said switching units in a predetermined program order, a program selector for choosing which of said plurality of predetermined programs the electrical means shall scan, means between said program selector and said electrical means for selectively modifying the program chosen by the program selector, and recording means operatively associated with the electrical means, said recording means being energized as a result of the pulses from the electrical means so as to record said data in patterns corresponding to the electrical pulses.

8. Apparatus for recording data comprising, a plurality of longitudinally movable racks, means for moving said racks into positions corresponding to specified data, switch means movable into positions representative of the positions of said racks, said switch means including one switching unit for each rack, electrical means for scanning the switching units in a sequence called for by a preselected program and thereby obtaining electrical pulses corresponding to the positions of the racks, said electrical means including a plurality of stepper switches each operable through a sequence of circuit selecting positions thus establishing predetermined program sequences, a program selector for choosing which of said stepper switches shall scan said switching units, means between said program selector and said stepper switches for selectively modifying the program chosen by the program selector, punch means including a plurality of electrically activated punches for perforating an associated record member, and an encoder including a plurality of rectifiers for selectively channeling the above mentioned electrical pulses to the proper punches within the punch means in order to obtain perforated patterns in the associated record member which correspond to the positions of the aforementioned racks.

9. A computer recording machine comprising, a plurality of racks, means for moving said racks into positions corresponding to specified data, means operatively connected to said racks for printing in a first predetermined sequence upon an associated recording medium the data represented by the positions of the racks, switch means movable into positions representative of the positions of said racks, said switch means including one switching unit for each rack, electrical means for scanning the switching units in a second sequence as called for by a preselected program and thereby obtaining electrical pulses corresponding to the positions of the racks, said electrical means including a plurality of stepper switches each operable through a sequence of circuit closing positions establishing one of said programs, selector means for choosing which of said stepper switches shall scan said switching units, additional means between said electrical means and said program selector for selectively modifying the program chosen by the program selector, and punch means operatively associated with the electrical means, said punch means being energized as a result of the pulses from the electrical means so as to perforate an associated record member in patterns corresponding to the electrical pulses.

10. A data recording machine comprising, a plurality of longitudinally movable racks, means for moving said racks into positions corresponding to specified data formed by characters, switch means for sensing the positions of said racks, said switch means including one switching unit for each rack, electrical means for scanning the switching units in any predetermined sequence desired and thereby obtaining electrical pulses corresponding to the positions of the racks associated with the switching units, said electrical means including a plurality of stepper switches with a common actuator, each stepper switch establishing a predetermined program sequence for scanning said switching units, signalling means controlled by said switch means and said electrical means for indicating when the above mentioned specified data includes more than a predetermined number of characters, punch means including a plurality of electrically activated punches for perforating an associated record member, and an encoder for selectively channeling the above mentioned electrical pulses to the proper punches in order to obtain perforated patterns in the associated record member which correspond to the positions of the aforementioned racks.

11. A data recording machine comprising, a plurality of racks, means for moving said racks into positions corresponding to specified character formed data, means operatively connected to said racks for printing in a first predetermined sequence upon an associated recording medium the data represented by the positions of the racks, switch means for sensing the positions of the racks, said switch means including one switching unit for each rack, electrical means for scanning the switching units in a second sequence as called for by a preselected program and thereby obtaining electrical pulses corresponding to the positions of the racks, said electrical means including a plurality of stepper switches each operable through a predetermined sequence of individual circuit selecting positions and cooperating to establish a plurality of selectable programs, signalling means controlled by said switch means and said electrical means for indicating when the above mentioned data exceeds a predetermined number of characters, a program selector for choosing in accordance with which one of the plurality of predetermined programs the electrical means shall scan said switching units, means intermediate said program selector and said stepper switches for selectively modifying the program chosen by the program selector, and punch means operatively associated with said electrical means, said punch means being energized as a result of the pulses from the electrical means so as to perforate an associated record member in patterns corresponding to the electrical pulses.

12. Apparatus for recording data comprising, a plurality of movable racks, means for moving said racks into positions corresponding to specified character formed data, switch means for sensing the positions of said racks, said switch means including one switching unit for each rack, means for scanning the switching units in a sequence set forth in a predetermined program desired and thereby obtaining electrical pulses corresponding to the positions of the racks associated with the switching units, said means for scanning including a plurality of multi-contact stepper switches each comprising a predetermined program sequence of scanning said switch units, signalling means controlled by said switch means and said electrical means for indicating when the above mentioned specified data includes more than a predetermined number of characters, a program selector for determining in accordance with which of said plurality of predetermined programs the electrical means shall scan the switching units, means between said program selector and said stepper switches for selectively modifying the program chosen by the program selector, punch means operatively associated with the electrical means, said punch means being energized as a result of the pulses from the electrical means so as to perforate an associated record member in patterns corresponding to the electrical pulses, and means under control of said stepper switches for automatically deactivating the punch means after a predetermined number of patterns have been punched.

13. Apparatus for recording selected data comprising, a plurality of movable racks, means for moving said racks into positions corresponding to specified data, switch means for sensing the position of said racks, said switch means including one switching unit for each rack, electrical means for scanning the switching units in a sequence called for by a preselected program and thereby obtaining electrical pulses corresponding to the positions of the racks associated with the switching units, said electrical means including a plurality of stepping switches each providing a different predetermined program sequence for scanning said switching units, a program selector for choosing in accordance with which of a plurality of said predetermined programs the electrical means shall scan said switching units, means interposed between said program selector and said stepper switches for selectively modifying the program chosen by the program selector, punch means including a plurality of electrically activated punches for perforating an associated record member, an encoder including a plurality of rectifiers for selectively channeling the above mentioned electrical pulses to the proper punches in order to obtain perforated patterns in the associated record member which correspond to the positions of the aforementioned racks, and electrical circuitry interposed between the switch means and the encoder for selectively converting those pulses corresponding to zeros in the above mentioned data to space pulses when said zeros are not preceded by a significant digit.

14. Apparatus for recording selectively data on two mediums comprising, a plurality of racks, means for moving said racks into positions corresponding to specified data, means operatively connected to said racks for printing in a first predetermined sequence upon an associated recording medium the data represented by the positions of the racks, switch means for sensing the positions of said racks, said switch means including one switching unit for each rack, electrical means for scanning the switching units in a second predetermined sequence and thereby obtaining electrical pulses corresponding to the positions of the racks associated with the switching units, said electrical means including a plurality of stepper switches in which each switch establishes a different second sequence for scanning said switching units, a program selector for determining in accordance with which of said plurality of predetermined second sequences the electrical means shall scan the switching units, punch means including a plurality of electrically activated punches for perforating an associated record member, an encoder including a plurality of rectifiers for selectively channeling the above mentioned electrical pulses to the proper punches within the punch means in order to obtain perforated patterns in the associated record member which correspond to the positions of the aforementioned racks, and electrical circuitry interposed between the switch means and the encoder for selectively converting those pulses corresponding to zeros in the above mentioned data to space pulses when said zeros are not preceded by a significant digit.

15. Apparatus for recording selected data comprising, a plurality of movable racks, means for moving said racks into positions corresponding to specified character formed data, switch means for indicating the position of said racks, said switch means including one switching unit for each rack, electrical means for scanning the switching units in a desired predetermined sequence and thereby obtaining electrical pulses corresponding to the positions of the racks associated with the switching units, said means including means establishing a plurality of predetermined sequence orders and means for selecting one of said orders, signalling means controlled by the switch means and the electrical means for indicating when the above mentioned specified data includes more than a predetermined number of characters, punch means including a plurality of electrically activated punches for perforating an associated record member, an encoder for selectively channeling the above mentioned electrical pulses to the proper punches within the punch means in order to obtain perforated patterns in the associated record member which correspond to the positions of the aforementioned racks, electrical circuitry interposed between the switch means and the encoder for selectively converting those pulses corresponding to zeros in the above mentioned data to space pulses when said zeros are not preceded by a significant digit, and control means in said sequence order for automatically deactivating the punch means after a predetermined number of patterns have been punched.

16. A data and recording system comprising in combination with a calculating machine having a movable carriage and depressible keys for entering alphameric data into the machine, a plurality of movable members within the machine, means for moving said members into positions indicative of the keys depressed, means for sensing the positions of said members, said means including one switching unit for each member, electrical means for scanning the switching units in a sequence called for by a predetermined program and thereby obtaining electrical pulses indicative of the positions of said members, said electrical means including a plurality of stepper switches each providing a different predetermined program sequence, a program selector for determining in accordance with which of said predetermined programs the electrical means shall scan said switching units, motive means for moving said carriage to any of a plurality of preselected positions, switch means operatively associated with said carriage and said program selector for controlling the selection of a program by the selector, said control means being influenced by the position of the carriage at the time the program is being selected, and record means operatively associated with the electrical means, said record means being energized as a result of the pulses from the electrical means so as to record said data in patterns corresponding to the electrical pulses.

17. A calculating and recording system comprising in combination with a calculating machine having a movable carriage and depressible keys for entering alphameric data into the machine, a plurality of movable racks within the machine, means for moving said racks into positions indicative of the keys depressed, switch means for sensing the positions of said racks, said switch means including one switching unit for each rack, electrical means for scanning the switching units in a sequence called for by a predetermined program and thereby obtaining electrical pulses indicative of the positions of the racks associated with the switching units, a program selector having a plurality of electrically operated actuators, said program selector determining in accordance to which of a plurality of predetermined programs the electrical means shall scan, manually controllable motive means for moving the above mentioned carriage to any of a plurality of preselected positions, a control panel containing a plurality of pins, said control panel being connected to and movable with the carriage, a plurality of switches fixed to the calculating machine and electrically connected to the actuators within the program selector, each switch being connected to a different actuator, energization of the actuators associated with the switches resulting from the selective operation of said switches by the above mentioned pins when said pins and their associated control panel move with the carriage, the program chosen by the program selector being determined by which actuators are energized as a result of operation of their associated switches by the pins, and punch means operatively associated with the electrical means, said punch means being energized as a result of the pulses from the electrical means so as to perforate an associated record medium in patterns corresponding to the electrical pulses.

18. A calculating and recording system comprising in combination with a calculating machine having a movable carriage and depressible keys for entering alphameric data into the machine, a plurality of movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of said racks, a program selector having a plurality of actuators, said program selector determining in accordance with which of a plurality of predetermined programs the electrical means shall scan, a plurality of movable slides, each slide being operatively associated with one of the actuators, means for moving said slides from a home position to a forward position and then yieldingly returning said slides to the home position, means for moving the above mentioned carriage to any of a plurality of preselected positions, a control panel containing a plurality of pins, said control panel being connected to and movable with the carriage, a plurality of switches fixed to the calculating machine and electrically connected to the actuators within the program selector, each switch being connected to a different actuator, energization of the actuators resulting from the selective operation of said switches by said pins when the latter move with the carriage, each actuator when energized causing its associated slide to be arrested in its forward position, the program chosen by the program selector being determined by which slides are arrested in their forward positions and which are permitted unrestrainedly to return to their home positions, and punch means operatively associated with said electrical means, said punch means being energized as a result of the pulses from the electrical means so as to perforate an associated record medium in patterns corresponding to the electrical pulses.

19. A calculating and recording system comprising in combination with a calculating machine having a movable carriage and depressible keys for entering alphameric data into the machine, a plurality of movable racks within the machine, means for moving said racks into positions corresponding to the keys depressed, switch means for sensing the positions of said racks, said switch mean including one switch unit including a plurality of switches for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance with which of a plurality of predetermined programs the electrical means shall scan, a plurality of movable slides, each slide being operatively associated with one of the actuators, means for moving said slides from a home position to a forward position, means to return said slides to the home position, a plurality of rotors operatively associated with the slides, means for yieldingly rotating said rotors to a forward position and then subsequently returning the rotors to their home position, manually controllable means for moving the above mentioned carriage to any of a plurality of preselected positions, a control panel containing a plurality of pins, said control panel being connected to and movable with the carriage, a plurality of switches fixed to the calculating machine and electrically connected to the actuators within the program selector, each switch being connected to a different actuator, energization of the actuators associated with the switches resulting from the selective operation of the switches by the above mentioned pins when said pins and their associated control panel move with the carriage, each actuator when energized causing its associated slide to be arrested in its forward position and thus prevented from being returned to its home position while the solenoid is energized, the configuration of the individual slides and their relationship to the rotors being such that said slides will conjointly obstruct the movement of all but one of the rotors to their forward positions, which rotor is permitted to move unobstructedly to its forward position being determined by which slides are permitted to return to their home positions and which are arrested in their forward positions, the program chosen by the program selector being determined by which of the plurality of rotors is permitted to move to its forward position, and punch means operatively associated with the electrical means, said punch means being energized as a result of the pulses from the electrical means so as to perforate an associated record medium in patterns corresponding to the electrical pulses.

20. A calculating and recording system comprising in combination with a calculating machine having a movable carriage and depressible keys for entering alphameric data into the machine, a plurality of movable racks within the machine, means for moving said racks into positions corresponding to the keys depressed, switch means for sensing the positions of said racks, said switch mean including one switching unit for each rack, electrical means for scanning the switching units in a sequence called for by a predetermined program and thereby obtaining electrical pulses corresponding to the positions of the racks associated with the switching units, a program selector for determining in accordance with which of a plurality of predetermined programs the electrical means shall scan, motor means for moving the above mentioned carriage to any of a plurality of preselected positions, a plurality of manually operable motor bars for controlling the motor means, operation of each motor bar resulting in the movement of the carriage to a position different from that caused by operation of any of the other motor bars, a control panel containing a plurality of pins, said control panel being connected to and movable with the carriage, a plurality of switches fixed to the calculating machine and electrically connected to the program selector, said switches being selectively operable by the above mentioned pins when said pins and their associated control panel move with the carriage into its new position, the program chosen by the program selector being determined by which switches are operated by the pins, and punch means operatively associated with the electrical means, said punch means being energized as a result of the pulses from the electrical means so as to perforate an associated record medium in patterns corresponding to the electrical pulses.

21. A calculating and recording system comprising in combination with a calculating machine having a movable carriage and depressible keys for entering alphameric data into the machine, a plurality of movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance to which of a plurality of predetermined programs the electrical means shall scan, motor means for moving the above mentioned carriage to any of a plurality of preselected positions, a plurality of manually operable motor bars for controlling the motor means, operation of each motor bar resulting in the movement of the carriage to a position different from that caused by operation of any of the other motor bars, a control panel containing a plurality of pins, said control panel being connected to and movable with the carriage, a plurality of switches fixed to the calculating machine and electrically connected to the actuators within the program selector, each switch being connected to a different actuator, energization of the actuators associated with the switches resulting from the selective operation of said switches by the above mentioned pins when said pins and their associated control panel move with the carriage, the program chosen by the program selector being determined by which actuators are energized as a result of operation of their associated switches by the pins, and punch means operatively associated with the electrical means, said punch means being energized as a result of the pulses from the electrical means so as to perforate an associated record medium in patterns corresponding to the electrical pulses.

22. A calculating and recording system comprising in combination with a calculating machine having a movable carriage and depressible keys for entering alphameric data into the machine, a plurality of movable racks within the machine, means for moving said racks into positions corresponding to the keys depressed, switch means for sensing the positions of said racks, said switch mean including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance to which of a plurality of predetermined programs the electrical means shall scan, a plurality of movable slides, each slide being operatively associated with one of the actuators, means for moving said slides from a home position to a forward position and then yieldingly returning said slides to the home position, motor means for moving the above mentioned carriage to any of a plurality of preselected positions, a plurality of manually operable motor bars for controlling the motor means, operation of each motor bar resulting in the movement of the carriage to a position different from that caused by operation of any of the other motor bars, a control panel containing a plurality of pins, said control panel being connected to and movable with the carriage, a plurality of switches fixed to the calculating machine and electrically connected to the actuators within the program selector, each switch being connected to a different actuator, energization of the actuators associated with the switches resulting from the selective operation of the switches by the above mentioned pins when said pins and their associated control panel move with the carriage, each actuator when energized causing its associated slide to be arrested in its forward position and thus prevented from being returned to its home position while the actuator is energized, the program chosen by the program selector being determined by which slides are arrested in their forward positions and which are permitted unrestrainedly to return to their home positions, and punch means operatively associated with the electrical means, said punch means being energized as a result of the pulses from the electrical means so as to perforate an associated record medium in patterns corresponding to the electrical pulses.

23. A calculating and recording system comprising in combination with a calculating machine having a movable carriage and depressible keys for entering alphameric data into the machine, a plurality of racks within the machine, means for moving said racks into positions corresponding to the keys depressed, means for sensing the positions of said racks, said means including a switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance to which of a plurality of predetermined programs the electrical means shall scan, a plurality of movable slides, each slide being operatively associated with one of the actuators, means for moving said slides from a home position to a forward position and then yieldingly returning said slides to the home position, a plurality of rotors operatively associated with the slides, means for yieldingly rotating said rotors to a forward position and then subsequently returning the rotors to their home position, motor means for moving the above mentioned carriage to any of a plurality of preselected positions, a plurality of motor bars for controlling the motor means, operation of each motor bar resulting in the movement of the carriage to a position different from that caused by operation of any of the other motor bars, a control panel containing a plurality of pins, said control panel being connected to and movable with the carriage, a plurality of switches fixed to the calculating machine and electrically connected to the actuators within the program selector, each switch being connected to a different actuator, energization of the actuators resulting in the selective operation of the switches by the above mentioned pins when said pins and their associated control panel move with the carriage, each actuator when energized causing its associated slide to be arrested in its forward position and thus prevented from being returned to its home position while the actuator is energized, the configuration of the individual slides and their relationship to the rotors being such that said slides will conjointly obstruct the movement of all but one of the rotors to the forward position of said rotors, which rotor is permitted to move unobstructedly to its forward position is determined by which slides are permitted to return to their home positions and which are arrested in their forward positions, the program chosen by the program selector being determined by which of the plurality of rotors is permitted to move to its forward position, and punch means operatively associated with the electrical means, said punch means being energized as a result of the pulses from the electrical means so as to perforate an associated record medium in patterns corresponding to the electrical pulses.

24. A calculating and recording system comprising in combination with a calculating machine capable of selectively performing a plurality of different calculating operations and having a movable carriage as well as manually depressible keys for entering alphameric data into the machine, a plurality of longitudinally movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector for determining in accordance with which of a plurality of predetermined programs the electrical means shall scan, manually controllable motive means for moving the above mentioned carriage to any of a plurality of preselected positions, a control panel containing a plurality of pins, said control panel being connected to and movable with the carriage, a plurality of switches fixed to the calculating machine and electrically connected to the program selector, said switches being selectively operable by the above mentioned pins when said pins and their associated control panel move with the carriage, the program chosen by the program selector being determined by which switches are operated by the pins, punch means operatively associated with the electrical means, said punch means being energized as a result of the pulses from the electrical means so as to perforate an associated record medium in patterns corresponding to the electrical pulses, and a plurality of manually operable function control means for causing the calculating machine to perform the calculating operation corresponding to the function control means utilized and for also causing the punch to perforate its associated record medium with a pattern indicative of the calculating operation performed by the calculating machine.

25. A calculating and recording system comprising in combination, a calculating machine capable of selectively performing a plurality of different calculating operations, a carriage movably mounted on said machine, manually depressible keys for entering alphameric data into the machine, a plurality of movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining which of a plurality of predetermined programs the electrical means shall scan, motive means for moving the above mentioned carriage to any of a plurality of preselected positions, a control panel containing a plurality of pins, said control panel being connected to and movable with said carriage, a plurality of switches fixed to the calculating machine and electrically connected to the actuators within the program selector, each switch being connected to a different actuator, said actuators being energized by selective operation of said switches by the above mentioned pins when said carriage moves, the program chosen by the program selector being determined by which actuators are energized, punch means operatively associated with the electrical means, said punch means being energized by the pulses from said electrical means to perforate an associated record member in pattern corresponding to the electrical pulses, and a plurality of function control means for causing the calculating machine to perform the calculating operation corresponding to the function control means utilized and for also causing the punch to perforate its associated record medium with a pattern indicative of the calculating operation performed by the calculating machine.

26. A calculating and recording system comprising in combination with a calculating machine capable of selectively performing a plurality of different calculating operations and having a movable carriage as well as manually depressible keys for entering alphameric data into the machine, a plurality of racks within the machine, means for moving said racks into positions indicative of said data, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance with which of a plurality of predetermined programs the electrical means shall scan, a plurality of movable slides, each slide being operatively associated with one of the actuators, means for moving said slides from a home position to a forward position and then yieldingly returning said slides to the home position, manually controllable means for moving the above mentioned carriage to any of a plurality of preselected positions, a control panel containing a plurality of pins, said control panel being connected to and movable with the carriage, a plurality of switches fixed to the calculating machine and electrically connected to the actuators within the program selector, each switch being connected to a different actuator, energization of the actuators associated within the switches resulting from the selective operation of the switches by the above mentioned pins when said pins and their associated control panel move with the carriage, each actuator when energized causing its associated slide to be arrested in its forward position and thus prevented from being returned to its home position while the actuator is energized, the program chosen by the program selector being determined by which slides are arrested in their forward positions and which are permitted unrestrainedly to return to their home positions, punch means operatively associated with the electrical means, said punch means being energized as a result of the pulse from the electrical means so as to perforate an associated record member in patterns corresponding to the electrical pulses, and a plurality of manually operable function control means for causing the calculating machine to perform the calculating operation corresponding to the function control means utilized and for also causing the punch to perforate its associated record member with a pattern indicative of the calculating operation performed by the calculating machine.

27. A calculating and recording system comprising in combination with a calculating machine capable of selectively performing a plurality of different calculating operations and having a movable carriage as well as manually depressible keys for entering alphameric data into the machine, a plurality of movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance with which of a plurality of predetermined programs the electrical means shall scan, a plurality of movable slides, each slide being operatively associated with one of the actuators, means for moving said slides from a home position to a forward position and then yieldingly returning said slides to the home position, a plurality of rotors operatively associated with the slides, means for yieldingly rotating said rotors to a forward position and then subsequently returning the rotors to their home position, manually controllable means for moving the above mentioned carriage to any of a plurality of preselected positions, a control panel containing a plurality of pins, said control panel being connected to and movable with the carriage, a plurality of switches fixed to the calculating machine and electrically connected to the actuators within the program selector, each switch being connected to a different actuator, energization of the actuators associated with the switches resulting from the selective operation of the switches by said pins when said pins and their associated control panel move with the carriage, each actuator when energized causing its associated slide to be arrested in its forward position and thus prevented from being returned to its home position while the actuator is energized, the configuration of the individual slides and their relationship to the rotors being such that said slides will conjointly obstruct the movement of all but one of the rotors to the forward position of said rotors, which rotor is permitted to move unobstructedly to its forward position is determined by which slides are permitted to return to their home positions and which are arrested in their forward positions, the program chosen by the program selector being determined by which of the plurality of rotors is permitted to move to its forward position, punch means operatively associated with the electrical means, said punch means being energized as a result of the pulses from the electrical means so as to perforate an associated record member in patterns corresponding to the electrical pulses, and a plurality of manually operable function control means for causing the calculating machine to perform the calculating operation corresponding to the function control means utilized and for also causing the punch to perforate its associated record member with a pattern indicative of the calculating operation performed by the calculating machine.

28. A calculating and recording system comprising in combination with a calculating machine capable of selectively performing a plurality of different calculating operations and having a movable carriage as well as manually depressible keys for entering alphameric data into the machine, a plurality of longitudinally movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector for determining in accordance with which of a plurality of predetermined programs the electrical means shall scan, motor means for moving the above mentioned carriage to any of a plurality of preselected positions, a plurality of manually operable motor bars for controlling the motor means, operation of each motor bar resulting in the movement of the carriage to a position different from that caused by operation of any of the other motor bars, a control panel connected to said carriage and containing a plurality of pins, a plurality of switches fixed to the calculating machine and electrically connected to the program selector, said switches being selectively operable by the above mentioned pins when said pins and their associated control panel move with the carriage into its new position, the program chosen by the program selector being determined by which switches are operated by the pins, punch means operatively associated with the electrical means, said punch means being energized as a result of the pulses from the electrical means so as to perforate an associated record member in patterns corresponding to the electrical pulses, and a plurality of manually operable function control means for causing the calculating machine to perform the calculating operation corresponding to the function control means utilized and for also causing the punch to perforate its associated record member with a pattern indicative of the calculating operation performed by the calculating machine.

29. A calculating and recording system comprising in combination with a calculating machine capable of selectively performing a plurality of different calculating operations and having a movable carriage as well as manually depressible keys for entering alphameric data into the machine, a plurality of movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance with which of a plurality of predetermined programs the electrical means shall scan, motor means for moving the above mentioned carriage to any of a plurality of preselected positions, a plurality of manually operable motor bars for controlling the motor means, operation of each motor bar resulting in the movement of the carriage to a position different from that caused by operation of any of the other motor bars, a control panel containing a plurality of pins, said control panel being connected to and movable with the carriage, a plurality of switches fixed to the calculating machine and electrically connected to the actuators within the program selector, each switch being connected to a different actuator, energization of the actuators associated with the switches resulting from the selective operation of said switches by the above mentioned pins when said pins and their associated control panel move with the carriage, the program chosen by the program selector being determined by which actuators are energized as a result of operation of their associated switches by the pins, punch means operatively associated with the electrical means, said punch means being energized as a result of the pulses from the electrical means so as to perforate an associated record member in patterns corresponding to the electrical pulses, and a plurality of manually operable function control means for causing the calculating machine to perform the calculating operation corresponding to the function control means utilized and for also causing the punch to perforate its associated record member with a pattern indicative of the calculating operation performed by the calculating machine.

30. A calculating and recording system comprising in combination with a calculating machine capable of selectively performing a plurality of different calculating operations and having a movable carriage as well as manually depressible keys for entering alphameric data into the machine, a plurality of longitudinally movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance with which of a plurality of predetermined programs the electrical means shall scan, a plurality of movable slides, each slide being operatively associated with one of the actuators, means for moving said slides from a home position to a forward position and then yieldingly returning said slides to the home position, motor means for moving the above mentioned carriage to any of a plurality of preselected positions, a plurality of manually operable motor bars for controlling the motor means, operation of each motor bar resulting in the movement of the carriage to a position different from that caused by operation of any of the other motor bars, a control panel containing a plurality of pins, said control panel being connected to and movable with the carriage, a plurality of switches fixed to the calculating machine and electrically connected to the actuators within the program selector, each switch being connected to a different actuator, energization of the actuators resulting from the selective operation of the switches by the above mentioned pins when said pins and their associated control panel move with the carriage, each actuator when energized causing its associated slide to be arrested in its forward position and thus preventing it being returned to its home position while the actuator is energized, the program chosen by the program selector being determined by which slides are arrested in their forward positions and which are permitted unrestrainedly to return to their home positions, punch means operatively associated with the electrical means, said punch means being energized as a result of the pulses from the electrical means so as to perforate an associated record member in patterns corresponding to the electrical pulses, and a plurality of manually operable function control means for causing the calculating machine to perform the calculating operation corresponding to the function control means utilized and for also causing the punch to perforate its associated record member with a pattern indicative of the calculating operation performed by the calculating machine.

31. A calculating and recording system comprising in combination with a calculating maching capable of selectively performing a plurality of different calculating operations and having a movable carriage as well as manually depressible keys for entering alphameric data into the machine, a plurality of longitudinally movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector having a plurality of electrically operated actuators, said program selector determining in accordance with which of a plurality of predetermined programs the electrical means shall scan, a plurality of movable slides, each slide being operatively associated with one of the actuators, means for moving said slides from a home position to a forward position and then yieldingly returning said slides to the home position, a plurality of rotors operatively associated with the slides, means for yieldingly rotating said rotors to a forward position and then subsequently returning the rotors to their home position, motor means for moving the above mentioned carriage to any of a plurality of preselected positions, a plurality of manually operable motor bars for controlling the motor means, operation of each motor bar resulting in the movement of the carriage to a position different from that caused by operation of any of the other motor bars, a control panel containing a plurality of pins, said control panel being connected to and movable with the carriage, a plurality of switches fixed to the calculating machine and electrically connected to the actuators within the program selector, each switch being connected to a different actuator, energization of the actuators associated with the switches resulting in the selective operation of the switches by the above mentioned pins when said pins and their associated control panel move with the carriage, each actuator when energized causing its associated slide to be arrested in its forward position and thus prevented from being returned to its home position while the actuator is energized, the configuration of the individual slides and their relationship to the rotors being such that said slides will conjointly obstruct the movement of all but one of the rotors to the forward position of said rotors, which rotor is permitted to move unobstructedly to its forward position is determined by which slides are permitted to return to their home positions and which are arrested in their forward positions, the program chosen by the program selector being determined by which of the plurality of rotors is permitted to move to its forward position, punch means operatively associated with the electrical means, said punch means being energized as a result of the pulses from the electrical means so as to perforate an associated record member in patterns corresponding to the electrical pulses, and a plurality of manually operable function control means for causing the calculating machine to perform the calculating operation corresponding to the function control means utilized and for also causing the punch to perforate its associated record member with a pattern indicative of the calculating operation performed by the calculating machine.

32. The combination with a recording device having a plurality of selectively energizable recording elements and a calculating device having a movable carriage and a plurality of differentially positionable data racks, of an electrical power supply having one side connected to one side of each of said recording elements, means for sensing the differential positions of each of said data racks, and control means connected between said devices including first switching means operated from said calculating device and affording a selection at selected carriage positions of said calculating device of any one of several different groups of selectively operable control circuit paths extending from the other side of said power supply through various ones of said sensing means to the other side of each of said recording elements, and second switching means actuable from said calculating device to complete in succession the individual circuit paths of a selected group of control circuits and to energize said recording elements through different ones of said sensing means in accordance with the differential positions of the data racks to be read in a selected carriage position of said calculating device.

33. The combination with a recording device having a plurality of selectively energizable recording elements and a device having a movable carriage and a plurality of differentially positionable data racks, of an electrical power supply having one side connected to one side of each of said recording elements, means for sensing the differential positions of each of said data racks, and control means connected between said devices including a plurality of selectively operable control circuit paths extending from the other side of said power supply through different ones of said sensing means to the other side of each of said recording elements, step by step switching means for completing said selectively operable control circuit paths in succession for energization of said recording elements through different ones of said sensing means in accordance with the differential positions of the data racks to be read in a carriage position of said movable carriage device, and means operable through said data rack sensing means preventing actuation of said switching means when all of said data racks are in their zero setting positions.

34. The combination with a recording device having a plurality of selectively energizable recording elements and a calculating device having a movable carriage and a plurality of differentially positionable data racks, of an electrical power supply having one side connected to one side of each of said recording elements, means for sensing the differential positions of each of said data racks, and control means connected between said recording device and said calculating machine including a plurality of selectively operable control circuit paths extending from the other side of said power supply through different ones of said sensing means to the other side of each of said recording elements, step by step switching means actuable from said calculating machine to complete said selectively operable control circuit paths in succession for energization of said recording elements through different ones of said sensing means in accordance with the differential positions of the data racks to be read in a carriage position of said calculating machine, and means operable through said data rack sensing means preventing actuation of said switching means when all of said data racks are in their zero setting positions.

35. In apparatus including a recording device having a plurality of selectively energizable recording elements and a device operable through repeated cycles of operation having a movable carriage, a plurality of differentially positionable data racks, and means for moving said carriage to different carriage positions and said data racks to different data representing positions at each of said carriage positions, the combination of an electrical power supply having one side connected to one side of each of said recording elements, means for sensing the differential positions of each of said data racks, and control means connected between said devices including switching means having a plurality of multiple-contact switching levels providing several different groups of control circuit paths from the other side of said power supply through various ones of said sensing means to the other side of each of said recording elements, switching level selecting means operated from said movable carriage device affording a selection of any one of said switching levels at selected carriage positions thereof, means to advance said switching means including a selected one of said switching levels to successive contact positions connected to individual ones of said control circuits containing the sensing means for the data racks to be read at a selected carriage position of the movable carriage device, locking means actuated from said movable carriage device upon initiation of a cycle of operation thereof to prevent initiation of a subsequent cycle of operation during operation of said switching means, and means to unlock said movable carriage device in preparation for a subsequent cycle of operation thereof.

36. The combination with a cyclically operable recording device having a plurality of selectively energizable recording elements and a cyclically operable data entry device having a movable carriage, a plurality of differentially positionable data racks and means for initiating a cycle of operation thereof, of an electrical power supply having one side connected to one side of each of said recording elements, read-out means for sensing the differential positions of each of said data racks, and control means connected between said devices including first switching means operated at different carriage stop positions and prior to initiation of a cycle of operation of said data entry device affording a selection of any one of several different groups of selectively operable control circuit paths extending from the other side of said power supply through different ones of said sensing means to the other side of each of said recording elements, and second switching means being operable to complete in succession the individual circuit paths of a selected group of control circuits and to energize said recording elements through different ones of said sensing means in accordance with the differential positions of the data racks to be read in a selected carriage position of the data entry device.

37. The combination with a cyclically operable recording device having a plurality of selectively energizable recording elements and a cyclically operable data entry device having a movable carriage, a plurality of differentially positionable data racks and means for initiating a cycle of operation thereof, of an electrical power supply having one side connected to one side of each of said recording elements, read-out means for sensing the differential positions of each of said data racks, and control means connected between said devices including first switching means operated by said carriage at different carriage stop positions and prior to initiation of a cycle of operation of said data entry device affording a selection of any one of several different groups of selectively operable control circuit paths extending from the other side of said power supply through different ones of said sensing means to the other side of each of said recording elements, and second switching means operable from said data entry device to complete in succession the individual circuit paths of a selected group of control circuits and to energize said recording elements through different ones of said sensing means in accordance with the differential positions of the data racks to be read in a selected carriage position of the data entry device.

38. A calculating and recording system comprising in combination with a calculating machine having a movable carriage and depressible keys for entering alphameric data into the machine, a plurality of movable racks within the machine, means for moving said racks into positions corresponding to the keys depressed, switch means for sensing the positions of said racks, said switch means including one switching unit for each rack, electrical means for scanning the switching units in a sequence called for by a predetermined program and thereby obtaining electrical pulses corresponding to the positions of the racks associated with the switching units, a program selector for determining in accordance with which of a plurality of predetermined programs the electrical means shall scan, motor means for moving the above-mentioned carriage to any of a plurality of preselected positions, a plurality of manually operable motor bars for controlling the motor means, operation of each motor bar resulting in the movement of the carriage to a position different from that caused by operation of any of the other motor bars, control means on and movable with the carriage, a plurality of switches fixed to the calculating machine and electrically connected to the program selector, said switches being selectively operable by the above-mentioned control means when the carriage moves into a new position, the program chosen by the program selector being determined by which switches are operated by the control means, and punch means operatively associated with the electrical means, said punch means being energized as a result of the pulses from the electrical means so as to perforate an associated record medium in patterns corresponding to the electrical pulses.

References Cited in the file of this patent

UNITED STATES PATENTS

| | | |
|---|---|---|
| 975,023 | Dudley | Nov. 8, 1910 |
| 1,005,555 | Kettering | Oct. 10, 1911 |
| 1,775,117 | Bryce | Sept. 9, 1930 |
| 1,834,561 | Watson | Dec. 1, 1931 |
| 2,018,368 | Lake | Oct. 22, 1935 |
| 2,056,361 | Mills | Oct. 6, 1936 |
| 2,103,921 | Thompson | Dec. 28, 1937 |
| 2,131,914 | Carroll et al. | Oct. 4, 1938 |
| 2,255,030 | Tholstrup | Sept. 2, 1941 |
| 2,285,353 | Peirce | June 2, 1942 |
| 2,295,518 | Meuer | Sept. 8, 1942 |
| 2,315,191 | Elliott | Mar. 30, 1943 |
| 2,323,824 | Maschmeyer | July 6, 1943 |
| 2,332,755 | Robertson et al. | Oct. 26, 1943 |
| 2,490,348 | Ghertman | Dec. 6, 1499 |
| 2,528,394 | Sharpless et al. | Oct. 31, 1950 |
| 2,540,029 | Hamilton et al. | Jan. 30, 1951 |
| 2,546,392 | Grupp | Mar. 27, 1951 |
| 2,597,162 | Mehan et al. | May 20, 1952 |
| 2,605,879 | O'Halloran | Aug. 5, 1952 |
| 2,616,626 | Lake et al. | Nov. 4, 1952 |
| 2,652,196 | Sterling | Sept. 15, 1953 |
| 2,660,369 | Schulz | Nov. 24, 1953 |
| 2,714,985 | Saxby et al. | Aug. 9, 1955 |
| 2,717,733 | Luhn | Sept. 13, 1955 |
| 2,737,647 | Oliwa | Mar. 6, 1956 |
| 2,754,453 | Noell | July 10, 1956 |
| 2,754,454 | McNutt et al. | July 10, 1956 |
| 2,756,823 | Laville et al. | July 31, 1956 |
| 2,771,242 | Waldbergen | Nov. 20, 1956 |
| 2,775,299 | Doury | Dec. 25, 1956 |
| 2,812,902 | Runde et al. | Nov. 12, 1957 |
| 2,861,739 | Chall et al. | Nov. 25, 1958 |
| 2,878,872 | Burns et al. | Mar. 24, 1959 |

FOREIGN PATENTS

| | | |
|---|---|---|
| 707,283 | Great Britain | Apr. 14, 1954 |
| 709,407 | Great Britain | May 26, 1954 |

OTHER REFERENCES

Brown et al.: "Rectifier Network for Multiposition Switching" from the Proceedings of the I.R.E., February 1949, pages 139–147.